US010223691B2

(12) United States Patent
Katzin et al.

(10) Patent No.: US 10,223,691 B2
(45) Date of Patent: Mar. 5, 2019

(54) UNIVERSAL ELECTRONIC PAYMENT APPARATUSES, METHODS AND SYSTEMS

(75) Inventors: Edward Katzin, San Francisco, CA (US); Julian Hua, San Francisco, CA (US); Gregory Kenneth Storey, Lilli Pilli (AU); Michael Mori, San Mateo, CA (US); Abhinav Shrivastava, Redmond, WA (US); Amit Bhargava, San Jose, CA (US); Andrew Beck, San Francisco, CA (US); Ayman Hammad, Pleasanton, CA (US); Ben Pfisterer, Northcote (AU); Diane Salmon, Lafayette, CA (US); Igor Karpenko, Sunnyvale, CA (US); Jennifer Schulz, Pacific Palisades, CA (US); Miroslav Gavrilov, Santa Clara, CA (US); Peter Ciurea, Orinda, CA (US); Patrick Faith, Pleasanton, CA (US); Phillip Kumnick, Phoenix, AZ (US); Saurav Chatterjee, Foster City, CA (US); Sebastian Badea, Sunnyvale, CA (US); Shaw Li, San Francisco, CA (US); Shipra Jha, Fremont, CA (US); Stacy Pourfallah, San Ramon, CA (US); Susan French, Foster City, CA (US); Tenni Theurer, San Jose, CA (US); Theodore Harris, San Francisco, CA (US); Thomas Purves, San Francisco, CA (US); Vanita Pandey, Foster City, CA (US); Victoria Graham, Centennial, CO (US); Prakash Hariramani, San Francisco, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 13/520,481

(22) PCT Filed: Feb. 22, 2012
(Under 37 CFR 1.47)

(86) PCT No.: PCT/US2012/026205
§ 371 (c)(1),
(2), (4) Date: Mar. 31, 2014

(87) PCT Pub. No.: WO2012/116125
PCT Pub. Date: Aug. 30, 2012

(65) Prior Publication Data

US 2014/0337175 A1 Nov. 13, 2014

Related U.S. Application Data

(63) Continuation-in-part of application No. 13/348,634, filed on Jan. 11, 2012, now abandoned, and a
(Continued)

(51) Int. Cl.
*G06Q 30/00* (2012.01)
*G06Q 20/36* (2012.01)
(Continued)

(52) U.S. Cl.
CPC .......... *G06Q 20/36* (2013.01); *G06Q 20/204* (2013.01); *G06Q 20/322* (2013.01);
(Continued)

(58) Field of Classification Search
CPC ...... G06Q 20/36; G06Q 20/204; G06Q 30/06; G06Q 20/367; G06Q 20/322; G06Q 30/0623; G06Q 30/00; G07F 7/0886
See application file for complete search history.

(56) References Cited

U.S. PATENT DOCUMENTS

| | | | |
|---|---|---|---|
| 789,106 | A | 5/1905 | Seymour |
| 4,896,363 | A | 1/1990 | Taylor |

(Continued)

FOREIGN PATENT DOCUMENTS

| | | | |
|---|---|---|---|
| CN | 1841425 | A | 10/2006 |
| CN | 101025806 | A | 8/2007 |

(Continued)

OTHER PUBLICATIONS

David Breitkopf, "ACS to Take Over Mich. WC Distribution Program", American Banker, New York, NY: Jul. 20, 2006, vol. 171. Issue 138, p. 6.

(Continued)

*Primary Examiner* — William J Allen
*Assistant Examiner* — Anand R Loharikar
(74) *Attorney, Agent, or Firm* — Loeb & Loeb LLP

(57) ABSTRACT

The UNIVERSAL ELECTRONIC PAYMENT APPARATUS, METHODS AND SYSTEMS ("UEP") transform
(Continued)

Example: Universal Electronic Payment ("UEP")

touchscreen inputs into a virtual wallet mobile application interface via UEP components into purchase transaction triggers and receipt notices. In one implementation the UEP provides, via a user device, a product information search request; and obtains, in response to the product information search request, information on a first product for sale by a first merchant and a second product for sale by a second merchant. The UEP generates a single purchase transaction request, using the information on the first product for sale by the first merchant and the second product for sale by the second merchant. The UEP provides, via the user device, the single purchase transaction request for payment processing. Also, the UEP obtains an electronic purchase receipt for the first product for sale by the first merchant and the second product for sale by the second merchant.

21 Claims, 121 Drawing Sheets

Related U.S. Application Data continuation-in-part of application No. 13/398,817, filed on Feb. 16, 2012.

(60) Provisional application No. 61/445,482, filed on Feb. 22, 2011, provisional application No. 61/466,409, filed on Mar. 22, 2011, provisional application No. 61/469,965, filed on Mar. 31, 2011, provisional application No. 61/473,728, filed on Apr. 8, 2011, provisional application No. 61/538,761, filed on Sep. 23, 2011, provisional application No. 61/545,971, filed on Oct. 11, 2011, provisional application No. 61/539,969, filed on Sep. 27, 2011.

(51) Int. Cl.

| | |
|---|---|
| ***G06Q 20/20*** | (2012.01) |
| ***G06Q 30/06*** | (2012.01) |
| ***G07F 7/08*** | (2006.01) |
| ***G06Q 20/32*** | (2012.01) |

(52) U.S. Cl.

CPC .......... *G06Q 20/367* (2013.01); *G06Q 30/00* (2013.01); *G06Q 30/06* (2013.01); *G06Q 30/0623* (2013.01); *G07F 7/0886* (2013.01)

(56) References Cited

U.S. PATENT DOCUMENTS

| | | | |
|---|---|---|---|
| 5,177,342 | A | 1/1993 | Adams |
| 5,221,838 | A | 6/1993 | Gutman et al. |
| 5,237,164 | A | 8/1993 | Takada |
| 5,311,594 | A | 5/1994 | Penzias |
| 5,384,449 | A | 1/1995 | Peirce |
| 5,446,890 | A | 8/1995 | Renslo et al. |
| 5,459,656 | A | 10/1995 | Fields et al. |
| 5,500,513 | A | 3/1996 | Langhans et al. |
| 5,510,777 | A | 4/1996 | Pilc et al. |
| 5,521,362 | A | 5/1996 | Powers |
| 5,526,409 | A | 6/1996 | Conrow et al. |
| 5,530,438 | A | 6/1996 | Bickham et al. |
| 5,536,045 | A | 7/1996 | Adams |
| 5,590,038 | A | 12/1996 | Pitroda |
| 5,613,012 | A | 3/1997 | Hoffman et al. |
| 5,615,110 | A | 3/1997 | Wong |
| 5,615,264 | A | 3/1997 | Kazmierczak et al. |
| 5,621,201 | A | 4/1997 | Langhans et al. |
| 5,649,118 | A | 7/1997 | Carlisle et al. |
| 5,655,007 | A | 8/1997 | McAllister |
| 5,748,737 | A | 5/1998 | Daggar |
| 5,781,438 | A | 7/1998 | Lee et al. |
| 5,796,832 | A | 8/1998 | Kamran |
| 5,815,657 | A | 9/1998 | Williams et al. |
| 5,850,446 | A | 12/1998 | Berger et al. |
| 5,878,337 | A | 3/1999 | Joao et al. |
| 5,883,810 | A | 3/1999 | Franklin et al. |
| 5,884,271 | A | 3/1999 | Pitroda |
| 5,892,838 | A | 4/1999 | Brady |
| 5,903,830 | A | 5/1999 | Joao et al. |
| 5,914,472 | A | 6/1999 | Foladare et al. |
| 5,943,624 | A | 8/1999 | Fox et al. |
| 5,953,710 | A | 9/1999 | Fleming |
| 5,956,699 | A | 9/1999 | Wong et al. |
| 5,963,924 | A | 10/1999 | Williams et al. |
| 6,000,832 | A | 12/1999 | Franklin et al. |
| 6,006,200 | A | 12/1999 | Boies et al. |
| 6,014,635 | A | 1/2000 | Harris et al. |
| 6,044,360 | A | 3/2000 | Picciallo |
| 6,052,675 | A | 4/2000 | Checchio |
| 6,064,990 | A | 5/2000 | Goldsmith |
| 6,092,053 | A | 7/2000 | Boesch et al. |
| 6,160,903 | A | 12/2000 | Hamid |
| 6,163,771 | A | 12/2000 | Walker et al. |
| 6,182,894 | B1 | 2/2001 | Hackett et al. |
| 6,195,447 | B1 | 2/2001 | Ross |
| 6,202,052 | B1 | 3/2001 | Miller |
| 6,202,933 | B1 | 3/2001 | Poore et al. |
| 6,226,624 | B1 | 5/2001 | Watson et al. |
| 6,227,447 | B1 | 5/2001 | Campisano |
| 6,236,981 | B1 | 5/2001 | Hill |
| 6,263,447 | B1 | 7/2001 | French et al. |
| 6,267,292 | B1 | 7/2001 | Walker et al. |
| 6,327,578 | B1 | 12/2001 | Linehan |
| 6,336,099 | B1 | 1/2002 | Barnett et al. |
| 6,339,766 | B1 | 1/2002 | Gephart |
| 6,341,724 | B2 | 1/2002 | Campisano |
| 6,381,584 | B1 | 4/2002 | Ogram |
| 6,385,596 | B1 | 5/2002 | Wiser et al. |
| 6,385,655 | B1 | 5/2002 | Smith |
| 6,422,462 | B1 | 7/2002 | Cohen |
| 6,425,523 | B1 | 7/2002 | Shem-Ur et al. |
| 6,456,984 | B1 | 9/2002 | Demoff et al. |
| 6,473,500 | B1 | 10/2002 | Risafi et al. |
| 6,529,725 | B1 | 3/2003 | Joao et al. |
| 6,535,855 | B1 | 3/2003 | Cahill et al. |
| 6,560,581 | B1 | 5/2003 | Fox et al. |
| 6,592,044 | B1 | 7/2003 | Wong et al. |
| 6,601,761 | B1 | 8/2003 | Katis |
| 6,636,833 | B1 | 10/2003 | Flitcroft et al. |
| 6,735,572 | B2 | 5/2004 | Landesmann |
| 6,748,367 | B1 | 6/2004 | Lee |
| 6,805,287 | B2 | 10/2004 | Bishop et al. |
| 6,853,982 | B2 | 2/2005 | Smith et al. |
| 6,857,073 | B2 | 2/2005 | French et al. |
| 6,865,522 | B1 | 3/2005 | Gastiger |
| 6,873,974 | B1 | 3/2005 | Schutzer |
| 6,879,965 | B2 | 4/2005 | Fung et al. |
| 6,891,953 | B1 | 5/2005 | DeMello et al. |
| 6,898,598 | B2 | 5/2005 | Himmel et al. |
| 6,901,387 | B2 | 5/2005 | Wells et al. |
| 6,925,439 | B1 | 8/2005 | Pitroda |
| 6,931,382 | B2 | 8/2005 | Laage et al. |
| 6,934,528 | B2 | 8/2005 | Loureiro et al. |
| 6,938,019 | B1 | 8/2005 | Uzo |
| 6,941,285 | B2 | 9/2005 | Sarcanin |
| 6,944,595 | B1 | 9/2005 | Graser |
| 6,980,670 | B1 | 12/2005 | Hoffman et al. |
| 6,990,470 | B2 | 1/2006 | Hogan et al. |
| 6,991,157 | B2 | 1/2006 | Bishop et al. |
| 6,999,943 | B1 | 2/2006 | Johnson et al. |
| 7,024,383 | B1 | 4/2006 | Mancini et al. |
| 7,028,052 | B2 | 4/2006 | Chapman et al. |
| 7,047,041 | B2 | 5/2006 | Vanska et al. |
| 7,051,002 | B2 | 5/2006 | Keresman, III et al. |
| 7,051,929 | B2 | 5/2006 | Li |
| 7,069,249 | B2 | 6/2006 | Stolfo et al. |
| 7,089,208 | B1 | 8/2006 | Levchin et al. |
| 7,096,003 | B2 | 8/2006 | Joao et al. |
| 7,103,576 | B2 | 9/2006 | Mann, III et al. |
| 7,111,789 | B2 | 9/2006 | Rajasekaran et al. |

(56) References Cited

U.S. PATENT DOCUMENTS 7,113,930 B2 9/2006 Eccles et al.
7,117,172 B1 10/2006 Black
7,136,835 B1 11/2006 Flitcroft et al.
7,155,411 B1 12/2006 Blinn et al.
7,167,903 B2 1/2007 Percival
7,177,835 B1 2/2007 Walker et al.
7,177,848 B2 2/2007 Hogan et al.
7,180,457 B2 2/2007 Trott
7,194,437 B1 3/2007 Britto et al.
7,206,847 B1 4/2007 Alberth et al.
7,209,561 B1 4/2007 Shankar et al.
7,212,979 B1 5/2007 Matz et al.
RE39,736 E 7/2007 Morrill, Jr.
7,264,154 B2 9/2007 Harris
7,266,557 B2 9/2007 Aschen
7,268,667 B2 9/2007 Beenau et al.
7,268,668 B2 9/2007 Beenau et al.
7,287,692 B1 10/2007 Patel et al.
7,290,704 B1 11/2007 Ball et al.
7,292,999 B2 11/2007 Hobson et al.
7,313,546 B2 12/2007 Alarcon-Luther
7,318,049 B2 1/2008 Iannacci
7,337,119 B1 2/2008 Geschwender et al.
7,337,144 B1 2/2008 Blinn et al.
7,343,149 B2 3/2008 Benco et al.
7,343,351 B1 3/2008 Bishop et al.
7,349,885 B2 3/2008 Gangi
7,350,230 B2 3/2008 Forrest
7,353,382 B2 4/2008 Labrou et al.
7,356,505 B2 4/2008 March
7,357,310 B2 4/2008 Calabrese et al.
7,359,880 B2 4/2008 Abel et al.
7,373,669 B2 5/2008 Eisen et al.
7,379,899 B1 5/2008 Junger
7,379,919 B2 5/2008 Hogan et al.
7,392,222 B1 6/2008 Hamilton et al.
RE40,444 E 7/2008 Linehan
7,395,242 B2 7/2008 Blinn et al.
7,398,250 B2 7/2008 Blinn et al.
7,413,113 B1 8/2008 Zhu
7,415,443 B2 8/2008 Hobson et al.
7,427,021 B2 9/2008 Kemper et al.
7,444,676 B1 10/2008 Asghari-Kamrani et al.
7,450,966 B2 11/2008 Vanska et al.
7,469,151 B2 12/2008 Khan et al.
7,477,780 B2 1/2009 Boncyk et al.
7,499,889 B2 3/2009 Golan et al.
7,500,607 B2 3/2009 Williams
7,505,935 B2 3/2009 Mendiola
7,533,064 B1 5/2009 Boesch
7,536,318 B1 5/2009 Wolfe
7,536,335 B1 5/2009 Weston
7,536,360 B2 5/2009 Salvotore et al.
7,548,889 B2 6/2009 Bharnbri et al.
7,567,934 B2 7/2009 Flitcroft et al.
7,567,936 B1 7/2009 Peckover et al.
7,571,139 B1 8/2009 Giordano et al.
7,571,140 B2 8/2009 Weichert et al.
7,571,142 B1 8/2009 Flitcroft et al.
7,580,898 B2 8/2009 Brown et al.
7,584,153 B2 9/2009 Brown et al.
7,593,858 B2 9/2009 Matz et al.
7,593,896 B1 9/2009 Flitcroft et al.
7,603,311 B1 10/2009 Yadav-Ranjan
7,606,560 B2 10/2009 Labrou et al.
7,627,531 B2 12/2009 Breck et al.
7,627,895 B2 12/2009 Gifford et al.
7,630,937 B1 12/2009 Mo et al.
7,634,295 B2 12/2009 Hayaashi et al.
7,644,037 B1 1/2010 Ostrovsky
7,644,859 B1 1/2010 Zhu
7,650,314 B1 1/2010 Saunders
7,660,749 B2 2/2010 Koski
7,668,754 B1 2/2010 Bridgelall
7,669,760 B1 3/2010 Zettner
7,676,434 B2 3/2010 Evans
7,685,037 B2 3/2010 Reiners et al.
7,685,067 B1 3/2010 Britto et al.
7,698,221 B2 4/2010 Blinn et al.
7,702,578 B2 4/2010 Fong et al.
7,707,113 B1 4/2010 Dimartino et al.
7,707,120 B2 4/2010 Dominguez et al.
7,708,194 B2 5/2010 Vawter
7,708,198 B2 5/2010 Gangi
7,712,655 B2 5/2010 Wong
7,712,658 B2 5/2010 Gangi
7,734,527 B2 6/2010 Uzo
7,739,194 B2 6/2010 Blinn et al.
7,742,984 B2 6/2010 Mohsenzadeh
7,753,265 B2 7/2010 Harris
7,770,789 B2 8/2010 Oder, II et al.
7,774,076 B2 8/2010 Skowronek
7,783,569 B2 8/2010 Abel et al.
7,784,684 B2 8/2010 Labrou et al.
7,784,685 B1 8/2010 Hopkins, III
7,793,851 B2 9/2010 Mullen
7,797,215 B1 9/2010 Zerenner
7,801,826 B2 9/2010 Labrou et al.
7,801,829 B2 9/2010 Gray et al.
7,802,719 B2 9/2010 Johnson et al.
7,805,376 B2 9/2010 Smith
7,805,378 B2 9/2010 Berardi et al.
7,810,720 B2 10/2010 Lovett
7,818,264 B2 10/2010 Hammad
7,819,307 B2 10/2010 Lyons et al.
7,827,288 B2 11/2010 Da
7,828,206 B2 11/2010 Hessburg et al.
7,828,220 B2 11/2010 Mullen
7,828,992 B2 11/2010 Kilickiran et al.
7,835,960 B2 11/2010 Breck et al.
7,837,125 B2 11/2010 Biskupski
7,841,523 B2 11/2010 Oder, II et al.
7,841,539 B2 11/2010 Hewton
7,844,530 B2 11/2010 Ziade et al.
7,844,550 B2 11/2010 Walker et al.
7,848,980 B2 12/2010 Carlson
7,849,014 B2 12/2010 Erikson
7,849,020 B2 12/2010 Johnson
7,853,529 B1 12/2010 Walker et al.
7,853,995 B2 12/2010 Chow et al.
7,865,414 B2 1/2011 Fung et al.
7,870,027 B1 1/2011 Tannenbaum
7,873,579 B2 1/2011 Hobson et al.
7,873,580 B2 1/2011 Hobson et al.
7,877,299 B2 1/2011 Bui
7,878,400 B2 2/2011 Harris
7,890,370 B2 2/2011 Whitsitt et al.
7,890,393 B2 2/2011 Talbert et al.
7,891,563 B2 2/2011 Oder, II et al.
7,895,119 B2 2/2011 Praisner
7,896,238 B2 3/2011 Fein et al.
7,899,744 B2 3/2011 Bishop et al.
7,904,360 B2 3/2011 Evans
7,908,216 B1 3/2011 Davis et al.
7,908,227 B2 3/2011 Zizzimopoulos et al.
7,922,082 B2 4/2011 Muscato
7,926,714 B1 4/2011 Zhu
7,931,195 B2 4/2011 Mullen
7,933,779 B2 4/2011 Rooks et al.
7,937,324 B2 5/2011 Patterson
7,938,318 B2 5/2011 Fein et al.
7,942,337 B2 5/2011 Jain
7,954,705 B2 6/2011 Mullen
7,959,076 B1 6/2011 Hopkins, III
7,962,418 B1 6/2011 Wei et al.
7,967,196 B1 6/2011 Bierbaum et al.
7,971,782 B1 7/2011 Shams
7,996,259 B1 8/2011 Distefano, III
7,996,288 B1 8/2011 Stolfo
8,016,192 B2 9/2011 Messerges et al.
8,020,763 B1 9/2011 Kowalchyk et al.
8,024,260 B1 9/2011 Hogl et al.
8,025,223 B2 9/2011 Saunders et al.
8,028,041 B2 9/2011 Olliphant et al.

(56) References Cited

U.S. PATENT DOCUMENTS 8,032,438 B1 10/2011 Barton et al.
8,041,338 B2 10/2011 Chen et al.
8,046,256 B2 10/2011 Chien et al.
8,050,997 B1 11/2011 Nosek et al.
8,060,413 B2 11/2011 Castell et al.
8,060,448 B2 11/2011 Jones
8,060,449 B1 11/2011 Zhu
8,074,876 B2 12/2011 Foss et al.
8,074,877 B2 12/2011 Mullen et al.
8,074,879 B2 12/2011 Harris
8,082,210 B2 12/2011 Hansen et al.
8,090,351 B2 1/2012 Klein
8,095,113 B2 1/2012 Kean et al.
8,104,679 B2 1/2012 Brown
8,108,261 B2 1/2012 Carlier et al.
RE43,157 E 2/2012 Bishop et al.
8,109,436 B1 2/2012 Hopkins, III
8,117,127 B1 2/2012 Sanders
8,121,942 B2 2/2012 Carlson et al.
8,121,956 B2 2/2012 Carlson et al.
8,126,449 B2 2/2012 Beenau et al.
8,127,982 B1 3/2012 Casey et al.
8,131,666 B2 3/2012 OBrien
8,140,418 B1 3/2012 Casey et al.
8,145,188 B2 3/2012 Park et al.
8,145,561 B1 3/2012 Zhu et al.
8,145,566 B1 3/2012 Ahuja et al.
8,145,569 B2 3/2012 Gong
8,145,898 B2 3/2012 Kamalakantha
8,150,767 B2 4/2012 Wankmueller
8,150,772 B2 4/2012 Mardikar et al.
8,151,328 B1 4/2012 Lundy
8,151,330 B2 4/2012 Vishik et al.
8,151,336 B2 4/2012 Savoor
8,155,999 B2 4/2012 De Boer et al.
8,156,000 B1 4/2012 Thompson
8,156,026 B2 4/2012 Junger et al.
8,156,042 B2 4/2012 Winkleman, III et al.
8,156,549 B2 4/2012 Rice et al.
8,157,178 B2 4/2012 Dewan et al.
8,157,181 B2 4/2012 Bates et al.
8,160,935 B2 4/2012 Bui
8,160,959 B2 4/2012 Rackley, III et al.
8,165,961 B1 4/2012 Dimartino et al.
8,166,068 B2 4/2012 Stevens
RE43,351 E 5/2012 Jordan, Jr.
8,170,921 B2 5/2012 Stocker
8,171,525 B1 5/2012 Pelly et al.
8,175,235 B2 5/2012 Mumford et al.
8,175,965 B2 5/2012 Moore et al.
8,175,967 B2 5/2012 O'Leary et al.
8,175,968 B2 5/2012 O'Leary et al.
8,175,973 B2 5/2012 Davis
8,175,975 B2 5/2012 Cai et al.
8,175,979 B2 5/2012 Baentsch et al.
8,176,416 B1 5/2012 Williams et al.
8,179,563 B2 5/2012 King et al.
8,180,289 B1 5/2012 Glickman
8,180,705 B2 5/2012 Kowalchyk et al.
8,180,804 B1 5/2012 Narayanan et al.
8,190,513 B2 5/2012 Felger
8,190,523 B2 5/2012 Patterson
8,191,775 B2 6/2012 Hildred
8,195,233 B2 6/2012 Morikuni et al.
8,195,544 B2 6/2012 Horsfall
8,195,547 B2 6/2012 Aaltonen et al.
8,195,565 B2 6/2012 Bishop et al.
8,195,576 B1 6/2012 Grigg et al.
8,196,131 B1 6/2012 Von Behren et al.
8,196,813 B2 6/2012 Vadhri
8,200,582 B1 6/2012 Zhu
8,204,774 B2 6/2012 Chwast et al.
8,204,829 B2 6/2012 Alvarez et al.
8,205,791 B2 6/2012 Randazza et al.
8,209,245 B2 6/2012 Dennes
8,209,744 B2 6/2012 Zhu et al.
8,214,288 B2 7/2012 Olliphant et al.
8,214,289 B2 7/2012 Scipioni
8,214,291 B2 7/2012 Pelegero et al.
8,214,292 B2 7/2012 Duggal et al.
8,214,293 B2 7/2012 Powell
8,214,886 B2 7/2012 Foley et al.
8,215,546 B2 7/2012 Lin et al.
8,219,411 B2 7/2012 Matz et al.
8,219,474 B2 7/2012 Sutton et al.
8,219,489 B2 7/2012 Patterson
8,219,490 B2 7/2012 Hammad et al.
8,220,047 B1 7/2012 Soghoian et al.
8,224,702 B2 7/2012 Mangerink et al.
8,224,754 B2 7/2012 Pastusiak et al.
8,224,773 B2 7/2012 Spiegel
8,225,385 B2 7/2012 Chow et al.
8,225,997 B1 7/2012 Bierbaum et al.
8,227,936 B1 7/2012 Folk et al.
8,229,354 B2 7/2012 Sklovsky et al.
8,229,808 B1 7/2012 Heit
8,229,844 B2 7/2012 Felger
8,229,851 B2 7/2012 Doran et al.
8,229,852 B2 7/2012 Carlson
8,229,854 B2 7/2012 Stephen et al.
8,233,841 B2 7/2012 Griffin et al.
8,234,183 B2 7/2012 Smith
8,239,276 B2 8/2012 Lin et al.
8,244,580 B2 8/2012 Mankoff et al.
8,245,139 B2 8/2012 Michelman
8,249,925 B2 8/2012 Broms
8,249,965 B2 8/2012 Tumminaro
8,255,278 B1 8/2012 Young et al.
8,255,323 B1 8/2012 Casey et al.
8,255,324 B2 8/2012 Bercy et al.
8,265,993 B2 9/2012 Chien et al.
8,275,704 B2 9/2012 Bishop et al.
8,280,777 B2 10/2012 Mengerink et al.
8,281,991 B2 10/2012 Wentker et al.
8,281,998 B2 10/2012 Tang et al.
8,282,002 B2 10/2012 Shams
8,285,640 B2 10/2012 Scipioni
8,285,820 B2 10/2012 Olliphant et al.
8,285,832 B2 10/2012 Schwab et al.
8,286,875 B2 10/2012 Tang et al.
8,290,433 B2 10/2012 Fisher et al.
8,290,819 B2 10/2012 Bawcutt
8,290,829 B1 10/2012 Katz et al.
8,295,898 B2 10/2012 Ashfield et al.
8,296,187 B2 10/2012 Light et al.
8,296,204 B2 10/2012 Templeton et al.
8,296,228 B1 10/2012 Kloor
8,296,231 B2 10/2012 Britto et al.
8,301,500 B2 10/2012 Pharris
8,301,510 B2 10/2012 Boesch
8,301,556 B2 10/2012 Hogl et al.
8,311,520 B2 11/2012 Choi et al.
8,312,096 B2 11/2012 Cohen et al.
8,321,267 B2 11/2012 Hoerenz et al.
8,321,294 B2 11/2012 Carlier et al.
8,321,315 B2 11/2012 Abel et al.
8,321,338 B2 11/2012 Baumgart et al.
8,321,343 B2 11/2012 Ramavarjula et al.
8,321,364 B1 11/2012 Gharpure et al.
8,326,756 B2 12/2012 Egendorf
8,326,769 B1 12/2012 Weisman
8,326,770 B1 12/2012 Weisman
8,327,450 B2 12/2012 Clement et al.
8,328,095 B2 12/2012 Oder, II et al.
8,332,272 B2 12/2012 Fisher
8,332,275 B2 12/2012 Poon et al.
8,332,323 B2 12/2012 Stals et al.
8,335,720 B2 12/2012 Juang et al.
8,335,726 B1 12/2012 Ling et al.
8,335,822 B2 12/2012 Ahmed et al.
8,335,921 B2 12/2012 Von Behren et al.
8,335,932 B2 12/2012 Von Behren et al.
8,336,088 B2 12/2012 Raj et al.
8,340,666 B2 12/2012 Ramer et al.

(56) References Cited

U.S. PATENT DOCUMENTS

| | | | |
|---|---|---|---|
| 8,341,029 | B1 | 12/2012 | Ramalingam et al. |
| 8,346,643 | B2 | 1/2013 | Boyer et al. |
| 8,346,659 | B1 | 1/2013 | Mohsenzadeh |
| 8,346,663 | B2 | 1/2013 | Kawan |
| 8,346,666 | B2 | 1/2013 | Lindelsee et al. |
| 8,352,323 | B2 | 1/2013 | Fisher |
| 8,352,362 | B2 | 1/2013 | Mohsenzadeh |
| 8,352,499 | B2 | 1/2013 | Bharat et al. |
| 8,352,749 | B2 | 1/2013 | Von Behren et al. |
| 8,355,987 | B2 | 1/2013 | Hirson et al. |
| 8,359,070 | B1 | 1/2013 | Zhu |
| 8,364,587 | B2 | 1/2013 | Nuzum et al. |
| 8,364,590 | B1 | 1/2013 | Casey et al. |
| 8,370,264 | B1 | 2/2013 | Wei et al. |
| 8,376,225 | B1 | 2/2013 | Hopkins, III |
| 8,380,177 | B2 | 2/2013 | Laracey |
| 8,380,349 | B1 | 2/2013 | Hickman et al. |
| 8,386,078 | B1 | 2/2013 | Hickman et al. |
| 8,387,873 | B2 | 3/2013 | Saunders et al. |
| 8,396,750 | B1 | 3/2013 | Hariharan et al. |
| 8,396,810 | B1 | 3/2013 | Cook |
| 8,401,398 | B2 | 3/2013 | Chien et al. |
| 8,401,539 | B2 | 3/2013 | Beenau et al. |
| 8,401,904 | B1 | 3/2013 | Simakov et al. |
| 8,402,555 | B2 | 3/2013 | Grecia |
| 8,403,211 | B2 | 3/2013 | Brooks et al. |
| 8,412,586 | B1 | 4/2013 | Foulser et al. |
| 8,412,623 | B2 | 4/2013 | Moon et al. |
| 8,412,630 | B2 | 4/2013 | Ross et al. |
| 8,412,837 | B1 | 4/2013 | Emigh et al. |
| 8,417,633 | B1 | 4/2013 | Chmara et al. |
| 8,417,642 | B2 | 4/2013 | Oren |
| 8,423,462 | B1 | 4/2013 | Amacker et al. |
| 8,429,521 | B2 | 4/2013 | Lloyd |
| 8,437,633 | B2 | 4/2013 | Chmara |
| 8,447,699 | B2 | 5/2013 | Batada et al. |
| 8,453,223 | B2 | 5/2013 | Svigals et al. |
| 8,453,925 | B2 | 6/2013 | Fisher et al. |
| 8,458,487 | B1 | 6/2013 | Palgon et al. |
| 8,484,134 | B2 | 7/2013 | Hobson et al. |
| 8,485,437 | B2 | 7/2013 | Mullen et al. |
| 8,494,959 | B2 | 7/2013 | Hathaway et al. |
| 8,498,908 | B2 | 7/2013 | Mengerink et al. |
| 8,504,475 | B2 | 8/2013 | Brand et al. |
| 8,504,478 | B2 | 8/2013 | Saunders et al. |
| 8,510,816 | B2 | 8/2013 | Quach et al. |
| 8,433,116 | B2 | 9/2013 | Davis |
| 8,533,860 | B1 | 9/2013 | Grecia |
| 8,538,845 | B2 | 9/2013 | Liberty |
| 8,555,079 | B2 | 10/2013 | Shablygin et al. |
| 8,566,168 | B1 | 10/2013 | Bierbaum et al. |
| 8,567,670 | B2 | 10/2013 | Stanfield et al. |
| 8,571,939 | B2 | 10/2013 | Lindsey et al. |
| 8,577,336 | B2 | 11/2013 | Mechaley, Jr. |
| 8,577,803 | B2 | 11/2013 | Chatterjee et al. |
| 8,577,813 | B2 | 11/2013 | Weiss |
| 8,578,176 | B2 | 11/2013 | Mattsson |
| 8,583,494 | B2 | 11/2013 | Fisher |
| 8,584,251 | B2 | 11/2013 | McGuire et al. |
| 8,589,237 | B2 | 11/2013 | Fisher |
| 8,589,271 | B2 | 11/2013 | Evans |
| 8,589,291 | B2 | 11/2013 | Carlson et al. |
| 8,595,098 | B2 | 11/2013 | Starai et al. |
| 8,595,312 | B2 | 11/2013 | Bomar et al. |
| 8,595,850 | B2 | 11/2013 | Spies et al. |
| 8,606,638 | B2 | 12/2013 | Dragt |
| 8,606,700 | B2 | 12/2013 | Carlson et al. |
| 8,606,720 | B1 | 12/2013 | Baker et al. |
| 8,615,468 | B2 | 12/2013 | Varadarajan |
| 8,620,754 | B2 | 12/2013 | Fisher |
| 8,635,157 | B2 | 1/2014 | Smith et al. |
| 8,639,621 | B1 | 1/2014 | Ellis |
| 8,646,059 | B1 | 2/2014 | von Behren et al. |
| 8,651,374 | B2 | 2/2014 | Brabson et al. |
| 8,656,180 | B2 | 2/2014 | Shablygin et al. |
| 8,739,016 | B1 | 5/2014 | Goldman et al. |
| 8,751,391 | B2 | 6/2014 | Freund |
| 8,762,263 | B2 | 6/2014 | Gauthier et al. |
| 8,793,186 | B2 | 7/2014 | Patterson |
| 8,838,982 | B2 | 9/2014 | Carlson et al. |
| 8,856,539 | B2 | 10/2014 | Weiss |
| 8,887,308 | B2 | 11/2014 | Grecia |
| 9,065,643 | B2 | 6/2015 | Hurry et al. |
| 9,070,129 | B2 | 6/2015 | Sheets et al. |
| 9,100,826 | B2 | 8/2015 | Weiss |
| 9,105,050 | B2 | 8/2015 | Tietzen |
| 9,160,741 | B2 | 10/2015 | Wentker et al. |
| 9,195,750 | B2 | 11/2015 | Hayden |
| 9,229,964 | B2 | 1/2016 | Stevelinck |
| 9,245,267 | B2 | 1/2016 | Singh |
| 9,249,241 | B2 | 2/2016 | Dai et al. |
| 9,256,871 | B2 | 2/2016 | Anderson et al. |
| 9,280,765 | B2 | 3/2016 | Hammad |
| 9,355,393 | B2 | 5/2016 | Purves |
| 9,448,972 | B2 | 9/2016 | Greenberg |
| 9,530,137 | B2 | 12/2016 | Weiss |
| 9,582,598 | B2 | 2/2017 | Kalgi |
| 9,710,807 | B2 | 7/2017 | Theurer |
| 2001/0037297 | A1 | 3/2001 | McNair |
| 2001/0029485 | A1 | 10/2001 | Brody et al. |
| 2001/0034720 | A1 | 10/2001 | Armes |
| 2001/0054003 | A1 | 12/2001 | Chien et al. |
| 2001/0056359 | A1 | 12/2001 | Abreu |
| 2001/0056409 | A1 | 12/2001 | Bellovin et al. |
| 2002/0002522 | A1 | 1/2002 | Clift |
| 2002/0004783 | A1 | 1/2002 | Paltenghe |
| 2002/0007320 | A1 | 1/2002 | Hogan et al. |
| 2002/0016749 | A1 | 2/2002 | Borecki et al. |
| 2002/0026575 | A1 | 2/2002 | Wheeler |
| 2002/0029193 | A1 | 3/2002 | Ranjan et al. |
| 2002/0035548 | A1 | 3/2002 | Hogan et al. |
| 2002/0040325 | A1 | 4/2002 | Takae et al. |
| 2002/0052778 | A1 | 5/2002 | Murphy |
| 2002/0073045 | A1 | 6/2002 | Rubin et al. |
| 2002/0077976 | A1 | 6/2002 | Meyer et al. |
| 2002/0077978 | A1 | 6/2002 | OLeary |
| 2002/0087894 | A1 | 7/2002 | Foley |
| 2002/0099642 | A1 | 7/2002 | Schwanki et al. |
| 2002/0099647 | A1 | 7/2002 | Howorka |
| 2002/0099656 | A1 | 7/2002 | Poh Wong |
| 2002/0107755 | A1 | 8/2002 | Steed et al. |
| 2002/0111919 | A1 | 8/2002 | Weller |
| 2002/0112014 | A1 | 8/2002 | Bennett et al. |
| 2002/0116271 | A1 | 8/2002 | Mankoff |
| 2002/0116341 | A1 | 8/2002 | Hogan et al. |
| 2002/0120864 | A1 | 8/2002 | Wu |
| 2002/0133467 | A1 | 9/2002 | Hobson et al. |
| 2002/0138290 | A1 | 9/2002 | Metcalfe |
| 2002/0138445 | A1 | 9/2002 | Laage et al. |
| 2002/0141575 | A1 | 10/2002 | Hird |
| 2002/0143614 | A1 | 10/2002 | MacLean et al. |
| 2002/0147913 | A1 | 10/2002 | Lun Yip |
| 2002/0174030 | A1 | 11/2002 | Praisner et al. |
| 2002/0178370 | A1 | 11/2002 | Gurevich |
| 2002/0194081 | A1 | 12/2002 | Perkowski |
| 2003/0014307 | A1 | 1/2003 | Heng |
| 2003/0018524 | A1 | 1/2003 | Fishman |
| 2003/0026404 | A1 | 2/2003 | Joyce et al. |
| 2003/0028451 | A1 | 2/2003 | Ananian |
| 2003/0028481 | A1 | 2/2003 | Flitcroft et al. |
| 2003/0055785 | A1 | 3/2003 | Lahiri |
| 2003/0080185 | A1 | 5/2003 | Werther |
| 2003/0097318 | A1 | 5/2003 | Yu et al. |
| 2003/0101134 | A1 | 5/2003 | Liu et al. |
| 2003/0126076 | A1 | 7/2003 | Kwok |
| 2003/0130955 | A1 | 7/2003 | Hawthorne |
| 2003/0144935 | A1 | 7/2003 | Sobek |
| 2003/0174823 | A1 | 9/2003 | Justice et al. |
| 2003/0177361 | A1 | 9/2003 | Wheeler et al. |
| 2003/0179230 | A1 | 9/2003 | Seidman |
| 2003/0191709 | A1 | 10/2003 | Elston et al. |
| 2003/0191711 | A1 | 10/2003 | Jamison et al. |
| 2003/0191945 | A1 | 10/2003 | Keech |
| 2003/0195659 | A1 | 10/2003 | Kasuga et al. |

(56) References Cited

U.S. PATENT DOCUMENTS

2003/0200142 A1 10/2003 Hicks et al.
2003/0200184 A1 10/2003 Dominguez et al.
2003/0212589 A1 11/2003 Kish
2003/0212642 A1 11/2003 Weller et al.
2003/0216996 A1 11/2003 Cummings et al.
2003/0220835 A1 11/2003 Barnes
2004/0010462 A1 1/2004 Moon et al.
2004/0050928 A1 3/2004 Bishop et al.
2004/0059682 A1 3/2004 Hasumi et al.
2004/0068443 A1 4/2004 Hopson
2004/0078332 A1 4/2004 Ferguson et al.
2004/0093281 A1 5/2004 Silverstein et al.
2004/0103037 A1 5/2004 Wetmore et al.
2004/0111698 A1 6/2004 Soong
2004/0128197 A1 7/2004 Bam et al.
2004/0138999 A1 7/2004 Friedman et al.
2004/0139008 A1 7/2004 Mascavage
2004/0143532 A1 7/2004 Lee
2004/0148255 A1 7/2004 Beck et al.
2004/0158532 A1 8/2004 Breck et al.
2004/0204128 A1 10/2004 Zakharia
2004/0210449 A1 10/2004 Breck et al.
2004/0210498 A1 10/2004 Freund
2004/0215560 A1 10/2004 Amalraj
2004/0215963 A1 10/2004 Kaplan
2004/0230536 A1 11/2004 Fung et al.
2004/0232225 A1 11/2004 Bishop et al.
2004/0236646 A1 11/2004 Wu et al.
2004/0254891 A1 12/2004 Blinn et al.
2004/0260646 A1 12/2004 Berardi et al.
2004/0267608 A1 12/2004 Mansfield, Jr.
2004/0267655 A1 12/2004 Davidowitz
2004/0267878 A1 12/2004 Osias
2005/0010483 A1 1/2005 Ling
2005/0037735 A1 2/2005 Coutts
2005/0038724 A1 2/2005 Roever
2005/0065819 A1 3/2005 Schultz
2005/0080730 A1 4/2005 Sorrentino
2005/0080747 A1 4/2005 Anderson et al.
2005/0080821 A1 4/2005 Breil et al.
2005/0097320 A1 5/2005 Golan et al.
2005/0101309 A1 5/2005 Croome
2005/0102188 A1 5/2005 Hutchison
2005/0108178 A1 5/2005 York
2005/0137969 A1 6/2005 Shah
2005/0144082 A1* 6/2005 Coolman ........... G06Q 30/0635 705/26.81
2005/0171894 A1 8/2005 Traynor
2005/0171898 A1 8/2005 Bishop
2005/0184145 A1 8/2005 Law et al.
2005/0187873 A1 8/2005 Labrou
2005/0192893 A1 9/2005 Keeling et al.
2005/0192895 A1 9/2005 Rogers et al.
2005/0199709 A1 9/2005 Linlor
2005/0220326 A1 10/2005 Sim
2005/0234817 A1 10/2005 VanFleet et al.
2005/0246278 A1 11/2005 Gerber et al.
2005/0246293 A1 11/2005 Ong et al.
2005/0251446 A1 11/2005 Jiang
2005/0254714 A1 11/2005 Anne
2005/0256802 A1 11/2005 Ammermann
2005/0261967 A1 11/2005 Barry et al.
2005/0269401 A1 12/2005 Spitzer et al.
2005/0269402 A1 12/2005 Spitzer et al.
2005/0273462 A1 12/2005 Reed
2006/0002607 A1 1/2006 Boncyk
2006/0020542 A1 1/2006 Litle
2006/0053056 A1 3/2006 Alspach-goss et al.
2006/0059277 A1 3/2006 Zito et al.
2006/0069619 A1 3/2006 Walker
2006/0075235 A1 4/2006 Renkis
2006/0085328 A1 4/2006 Cohen et al.
2006/0085477 A1 4/2006 Phillips et al.
2006/0124729 A1 6/2006 Martin
2006/0129427 A1 6/2006 Wennberg
2006/0163349 A1 7/2006 Neugebauer
2006/0178918 A1 8/2006 Mikurak
2006/0178986 A1 8/2006 Giordano et al.
2006/0178994 A1 8/2006 Stolfo
2006/0190347 A1 8/2006 Cuervo
2006/0195598 A1 8/2006 Fujita et al.
2006/0208060 A1 9/2006 Mendelovich et al.
2006/0212434 A1 9/2006 Crawford
2006/0226216 A1 10/2006 Keithley
2006/0235795 A1 10/2006 Johnson et al.
2006/0237528 A1 10/2006 Bishop et al.
2006/0247982 A1 11/2006 Stolfo et al.
2006/0277143 A1 12/2006 Almonte et al.
2006/0278704 A1 12/2006 Saunders et al.
2006/0282332 A1 12/2006 Pfleging
2006/0293947 A1 12/2006 Nicholson
2007/0011025 A1 1/2007 Cracchiolo et al.
2007/0016523 A1 1/2007 Blair
2007/0022007 A1 1/2007 Lawe
2007/0038515 A1 2/2007 Postrel
2007/0038516 A1 2/2007 Apple et al.
2007/0055571 A1 3/2007 Fox et al.
2007/0067215 A1 3/2007 Agarwal
2007/0087820 A1 4/2007 Van Luchene et al.
2007/0094066 A1 4/2007 Kumar et al.
2007/0100691 A1 5/2007 Patterson
2007/0100728 A1 5/2007 Rotman et al.
2007/0106504 A1 5/2007 Deng
2007/0106607 A1 5/2007 Seib et al.
2007/0106627 A1 5/2007 Srivastava
2007/0107044 A1 5/2007 Yuen et al.
2007/0113289 A1 5/2007 Blumenau
2007/0125840 A1 6/2007 Law
2007/0129955 A1 6/2007 Dalmia et al.
2007/0136193 A1 6/2007 Starr
2007/0136211 A1 6/2007 Brown et al.
2007/0143204 A1 6/2007 Claus et al.
2007/0150413 A1 6/2007 Morgenstern
2007/0156726 A1 7/2007 Levy
2007/0170247 A1 7/2007 Friedman
2007/0179885 A1 8/2007 Bird et al.
2007/0180119 A1 8/2007 Khivesara et al.
2007/0198435 A1 8/2007 Siegal
2007/0198587 A1 8/2007 Kobayashi et al.
2007/0208662 A1 9/2007 Jeronimus et al.
2007/0208671 A1 9/2007 Brown et al.
2007/0214078 A1 9/2007 Coppinger
2007/0214250 A1 9/2007 Ahmed et al.
2007/0226152 A1 9/2007 Jones
2007/0233590 A1 10/2007 Hardison, III
2007/0233615 A1 10/2007 Tumminaro
2007/0239502 A1 10/2007 Babu
2007/0245414 A1 10/2007 Chan et al.
2007/0276765 A1 11/2007 Hazel et al.
2007/0288377 A1 12/2007 Shaked
2007/0291995 A1 12/2007 Rivera
2008/0004116 A1 1/2008 Van Luchene et al.
2008/0004952 A1 1/2008 Koli
2008/0010096 A1 1/2008 Patterson et al.
2008/0013335 A1 1/2008 Tsutsumi
2008/0015988 A1 1/2008 Brown et al.
2008/0021829 A1 1/2008 Kranzley
2008/0027218 A1 1/2008 Daugs
2008/0027850 A1 1/2008 Brittan
2008/0029607 A1 2/2008 Mullen
2008/0035738 A1 2/2008 Mullen
2008/0048022 A1 2/2008 Vawter
2008/0052226 A1 2/2008 Agarwal et al.
2008/0054068 A1 3/2008 Mullen
2008/0054079 A1 3/2008 Mullen
2008/0054081 A1 3/2008 Mullen
2008/0059370 A1 3/2008 Sada
2008/0065554 A1 3/2008 Hogan et al.
2008/0065555 A1 3/2008 Mullen
2008/0077489 A1 3/2008 Gilley et al.
2008/0086365 A1 4/2008 Zollino et al.
2008/0090513 A1 4/2008 Collins
2008/0091553 A1 4/2008 Koski
2008/0091616 A1 4/2008 Helwin et al.

(56) References Cited

U.S. PATENT DOCUMENTS

| | | | |
|---|---|---|---|
| 2008/0097856 | A1 | 4/2008 | Blagg et al. |
| 2008/0103795 | A1 | 5/2008 | Jakubowski |
| 2008/0114639 | A1 | 5/2008 | Meek et al. |
| 2008/0114737 | A1 | 5/2008 | Neely et al. |
| 2008/0126145 | A1 | 5/2008 | Racklet, III et al. |
| 2008/0133351 | A1 | 6/2008 | White et al. |
| 2008/0140568 | A1 | 6/2008 | Henry |
| 2008/0140684 | A1 | 6/2008 | OReilly |
| 2008/0147883 | A1 | 6/2008 | Philyaw |
| 2008/0154623 | A1 | 6/2008 | Derker |
| 2008/0162361 | A1 | 7/2008 | Sklovsky et al. |
| 2008/0167965 | A1 | 7/2008 | Von Nothaus et al. |
| 2008/0172274 | A1 | 7/2008 | Hurowitz et al. |
| 2008/0172331 | A1 | 7/2008 | Graves et al. |
| 2008/0177574 | A1 | 7/2008 | Marcos et al. |
| 2008/0177672 | A1 | 7/2008 | Brunner et al. |
| 2008/0201232 | A1 | 8/2008 | Walker |
| 2008/0201264 | A1 | 8/2008 | Brown et al. |
| 2008/0201265 | A1 | 8/2008 | Hewton |
| 2008/0221945 | A1 | 9/2008 | Pace |
| 2008/0223918 | A1 | 9/2008 | Williams et al. |
| 2008/0228646 | A1 | 9/2008 | Myers et al. |
| 2008/0235261 | A1 | 9/2008 | Malek |
| 2008/0024561 | A1 | 10/2008 | Fein |
| 2008/0243305 | A1 | 10/2008 | Lee et al. |
| 2008/0243702 | A1 | 10/2008 | Hart et al. |
| 2008/0245855 | A1 | 10/2008 | Fein et al. |
| 2008/0245861 | A1 | 10/2008 | Fein et al. |
| 2008/0270300 | A1 | 10/2008 | Jones et al. |
| 2008/0272188 | A1 | 11/2008 | Keithley et al. |
| 2008/0283591 | A1 | 11/2008 | Oder, II et al. |
| 2008/0288376 | A1 | 11/2008 | Panthaki |
| 2008/0288889 | A1 | 11/2008 | Hunt |
| 2008/0300980 | A1 | 12/2008 | Benjamin et al. |
| 2008/0301055 | A1 | 12/2008 | Borgs |
| 2008/0302869 | A1 | 12/2008 | Mullen |
| 2008/0302876 | A1 | 12/2008 | Mullen |
| 2008/0313264 | A1 | 12/2008 | Pestoni |
| 2008/0319905 | A1 | 12/2008 | Carlson |
| 2009/0006181 | A1 | 1/2009 | Ghosh et al. |
| 2009/0006262 | A1 | 1/2009 | Brown et al. |
| 2009/0010488 | A1 | 1/2009 | Matsuoka et al. |
| 2009/0013266 | A1 | 1/2009 | Gandhi |
| 2009/0018895 | A1 | 1/2009 | Weinblatt et al. |
| 2009/0024527 | A1 | 1/2009 | Sellen et al. |
| 2009/0024636 | A1 | 1/2009 | Shiloh |
| 2009/0037255 | A1 | 2/2009 | Chiu et al. |
| 2009/0037326 | A1 | 2/2009 | Chitti et al. |
| 2009/0037333 | A1 | 2/2009 | Flitcroft et al. |
| 2009/0037388 | A1 | 2/2009 | Cooper et al. |
| 2009/0043702 | A1 | 2/2009 | Bennett |
| 2009/0048934 | A1 | 2/2009 | Haddad et al. |
| 2009/0048971 | A1 | 2/2009 | Hathaway et al. |
| 2009/0061884 | A1 | 3/2009 | Rajan et al. |
| 2009/0063261 | A1 | 3/2009 | Scribner et al. |
| 2009/0064056 | A1 | 3/2009 | Anderson et al. |
| 2009/0076953 | A1 | 3/2009 | Saville et al. |
| 2009/0076966 | A1 | 3/2009 | Bishop et al. |
| 2009/0083065 | A1 | 3/2009 | Unland |
| 2009/0089176 | A1 | 4/2009 | Mccabe |
| 2009/0089193 | A1 | 4/2009 | Paintin |
| 2009/0104888 | A1 | 4/2009 | Cox |
| 2009/0106112 | A1 | 4/2009 | Dalmia et al. |
| 2009/0106151 | A1 | 4/2009 | Nelsen et al. |
| 2009/0106160 | A1 | 4/2009 | Skowronek |
| 2009/0108080 | A1 | 4/2009 | Meyer |
| 2009/0112775 | A1 | 4/2009 | Chiulli |
| 2009/0119176 | A1 | 5/2009 | Johnson |
| 2009/0119190 | A1 | 5/2009 | Realini |
| 2009/0119211 | A1 | 5/2009 | Johnson |
| 2009/0125429 | A1 | 5/2009 | Takayama |
| 2009/0132347 | A1 | 5/2009 | Anderson et al. |
| 2009/0132366 | A1 | 5/2009 | Lam et al. |
| 2009/0132395 | A1 | 5/2009 | Lam et al. |
| 2009/0134217 | A1 | 5/2009 | Flitcroft et al. |
| 2009/0144104 | A1 | 6/2009 | Johnson |
| 2009/0144201 | A1 | 6/2009 | Gierkink et al. |
| 2009/0157555 | A1 | 6/2009 | Biffle et al. |
| 2009/0159673 | A1 | 6/2009 | Mullen et al. |
| 2009/0159700 | A1 | 6/2009 | Mullen et al. |
| 2009/0159707 | A1 | 6/2009 | Mullen et al. |
| 2009/0164344 | A1 | 6/2009 | Shiftan et al. |
| 2009/0170608 | A1 | 7/2009 | Herrmann et al. |
| 2009/0171778 | A1 | 7/2009 | Powell |
| 2009/0173782 | A1 | 7/2009 | Muscato |
| 2009/0182664 | A1 | 7/2009 | Trombley |
| 2009/0187492 | A1 | 7/2009 | Hammad |
| 2009/0200371 | A1 | 8/2009 | Kean et al. |
| 2009/0210300 | A1 | 8/2009 | Cansler et al. |
| 2009/0216910 | A1 | 8/2009 | Duchesneau |
| 2009/0222347 | A1 | 9/2009 | Whitten |
| 2009/0228211 | A1 | 9/2009 | Rasanen et al. |
| 2009/0233579 | A1 | 9/2009 | Castell et al. |
| 2009/0234751 | A1 | 9/2009 | Chan et al. |
| 2009/0241159 | A1 | 9/2009 | Campagna et al. |
| 2009/0248583 | A1 | 10/2009 | Chhabra |
| 2009/0248738 | A1 | 10/2009 | Martinez |
| 2009/0254471 | A1 | 10/2009 | Seidel et al. |
| 2009/0254479 | A1 | 10/2009 | Pharris |
| 2009/0254535 | A1 | 10/2009 | Eickelmann et al. |
| 2009/0265274 | A1 | 10/2009 | Hahn-Carlson et al. |
| 2009/0271246 | A1 | 10/2009 | Alvarez et al. |
| 2009/0271265 | A1 | 10/2009 | Lay et al. |
| 2009/0276347 | A1 | 11/2009 | Kargman |
| 2009/0281948 | A1 | 11/2009 | Carlson |
| 2009/0288012 | A1* | 11/2009 | Hertel et al. .................. 715/738 |
| 2009/0294527 | A1 | 12/2009 | Brabson et al. |
| 2009/0307060 | A1 | 12/2009 | Merz et al. |
| 2009/0307135 | A1 | 12/2009 | Gupta et al. |
| 2009/0307139 | A1 | 12/2009 | Mardikar et al. |
| 2009/0308921 | A1 | 12/2009 | Mullen |
| 2009/0313132 | A1 | 12/2009 | McKenna et al. |
| 2009/0319638 | A1 | 12/2009 | Faith |
| 2009/0327045 | A1 | 12/2009 | Olives et al. |
| 2009/0327088 | A1 | 12/2009 | Puthupparambil et al. |
| 2009/0327131 | A1 | 12/2009 | Beenau et al. |
| 2010/0004989 | A1 | 1/2010 | Bonalle et al. |
| 2010/0005025 | A1 | 1/2010 | Kumar |
| 2010/0008535 | A1 | 1/2010 | Abulafia et al. |
| 2010/0009663 | A1 | 1/2010 | Chang |
| 2010/0010964 | A1 | 1/2010 | Skowronek et al. |
| 2010/0021149 | A1 | 1/2010 | Mulder |
| 2010/0023386 | A1 | 1/2010 | Avisar et al. |
| 2010/0023455 | A1 | 1/2010 | Dispensa et al. |
| 2010/0023457 | A1 | 1/2010 | Riviere |
| 2010/0036741 | A1 | 2/2010 | Cleven |
| 2010/0036775 | A1 | 2/2010 | Edens |
| 2010/0036884 | A1 | 2/2010 | Brown |
| 2010/0042456 | A1 | 2/2010 | Stinchcombe et al. |
| 2010/0042537 | A1 | 2/2010 | Smith et al. |
| 2010/0042540 | A1 | 2/2010 | Graves et al. |
| 2010/0049879 | A1 | 2/2010 | Leavitt et al. |
| 2010/0057548 | A1 | 3/2010 | Edwards |
| 2010/0063903 | A1 | 3/2010 | Whipple et al. |
| 2010/0070359 | A1 | 3/2010 | Heasley |
| 2010/0076873 | A1 | 3/2010 | Taylor et al. |
| 2010/0078471 | A1 | 4/2010 | Lin et al. |
| 2010/0078472 | A1 | 4/2010 | Lin et al. |
| 2010/0082444 | A1 | 4/2010 | Lin et al. |
| 2010/0082445 | A1 | 4/2010 | Hodge et al. |
| 2010/0082447 | A1 | 4/2010 | Lin et al. |
| 2010/0082455 | A1 | 4/2010 | Rosenblatt et al. |
| 2010/0082480 | A1 | 4/2010 | Korosec |
| 2010/0082481 | A1 | 4/2010 | Lin et al. |
| 2010/0082485 | A1 | 4/2010 | Lin et al. |
| 2010/0082490 | A1 | 4/2010 | Rosenblatt et al. |
| 2010/0082491 | A1 | 4/2010 | Rosenblatt et al. |
| 2010/0088188 | A1 | 4/2010 | Kumar et al. |
| 2010/0088237 | A1 | 4/2010 | Wankmueller |
| 2010/0094730 | A1 | 4/2010 | Koski |
| 2010/0094755 | A1 | 4/2010 | Kloster |
| 2010/0094878 | A1 | 4/2010 | Soroca et al. |
| 2010/0100480 | A1 | 4/2010 | Altman et al. |
| 2010/0106644 | A1 | 4/2010 | Annan et al. |

(56) References Cited

U.S. PATENT DOCUMENTS

| | | | |
|---|---|---|---|
| 2010/0114664 | A1 | 5/2010 | Jobin |
| 2010/0120408 | A1 | 5/2010 | Beenau et al. |
| 2010/0121707 | A1 | 5/2010 | Goeldi |
| 2010/0125492 | A1 | 5/2010 | Lin et al. |
| 2010/0125495 | A1 | 5/2010 | Smith et al. |
| 2010/0125803 | A1 | 5/2010 | Johnson |
| 2010/0131347 | A1 | 5/2010 | Sarptipi |
| 2010/0131415 | A1 | 5/2010 | Sartipi |
| 2010/0133334 | A1 | 6/2010 | Vadhri |
| 2010/0133339 | A1 | 6/2010 | Gibson |
| 2010/0138026 | A1 | 6/2010 | Kaushal et al. |
| 2010/0138347 | A1 | 6/2010 | Chen |
| 2010/0145860 | A1 | 6/2010 | Pelegero |
| 2010/0153865 | A1 | 6/2010 | Barnes |
| 2010/0155470 | A1 | 6/2010 | Woronec |
| 2010/0161433 | A1 | 6/2010 | White |
| 2010/0135545 | A1 | 7/2010 | Royyuru et al. |
| 2010/0174599 | A1 | 7/2010 | Rosenblatt et al. |
| 2010/0179855 | A1 | 7/2010 | Chen |
| 2010/0185505 | A1 | 7/2010 | Sprogoe et al. |
| 2010/0185531 | A1 | 7/2010 | Van Luchene |
| 2010/0191578 | A1 | 7/2010 | Tran et al. |
| 2010/0191622 | A1 | 7/2010 | Reiss et al. |
| 2010/0191770 | A1 | 7/2010 | Cho et al. |
| 2010/0198626 | A1 | 8/2010 | Cho et al. |
| 2010/0211445 | A1 | 8/2010 | Bodington |
| 2010/0211452 | A1 | 8/2010 | D'Angelo et al. |
| 2010/0211469 | A1 | 8/2010 | Salmon |
| 2010/0211499 | A1 | 8/2010 | Zanzot et al. |
| 2010/0211505 | A1 | 8/2010 | Saunders et al. |
| 2010/0217613 | A1 | 8/2010 | Kelly |
| 2010/0217682 | A1 | 8/2010 | Chan |
| 2010/0223186 | A1 | 9/2010 | Hogan et al. |
| 2010/0228668 | A1 | 9/2010 | Hogan et al. |
| 2010/0235284 | A1 | 9/2010 | Moore |
| 2010/0243728 | A1 | 9/2010 | Wiesman |
| 2010/0250351 | A1 | 9/2010 | Gillenson et al. |
| 2010/0256976 | A1 | 10/2010 | Atsmon |
| 2010/0258620 | A1 | 10/2010 | Torreyson et al. |
| 2010/0268645 | A1 | 10/2010 | Martino |
| 2010/0276484 | A1 | 11/2010 | Banerjee et al. |
| 2010/0287048 | A1 | 11/2010 | Ramer et al. |
| 2010/0287229 | A1 | 11/2010 | Hauser |
| 2010/0291904 | A1 | 11/2010 | Musfeldt et al. |
| 2010/0293032 | A1 | 11/2010 | Engelsma |
| 2010/0299267 | A1 | 11/2010 | Faith et al. |
| 2010/0299292 | A1 | 11/2010 | Collazo |
| 2010/0305848 | A1 | 12/2010 | Stallman |
| 2010/0306075 | A1 | 12/2010 | Drance et al. |
| 2010/0306076 | A1 | 12/2010 | Taveau et al. |
| 2010/0306113 | A1 | 12/2010 | Grey et al. |
| 2010/0312645 | A1 | 12/2010 | Niekadlik et al. |
| 2010/0312676 | A1 | 12/2010 | Muthukumaran |
| 2010/0312724 | A1 | 12/2010 | Pinckney |
| 2010/0325041 | A1 | 12/2010 | Berardi et al. |
| 2010/0332262 | A1 | 12/2010 | Horvitz et al. |
| 2010/0332283 | A1 | 12/2010 | Ng et al. |
| 2011/0004498 | A1 | 1/2011 | Readshaw |
| 2011/0010292 | A1 | 1/2011 | Giordano et al. |
| 2011/0016047 | A1 | 1/2011 | Wu et al. |
| 2011/0016320 | A1 | 1/2011 | Bergsten et al. |
| 2011/0035273 | A1 | 2/2011 | Parikh et al. |
| 2011/0040640 | A1 | 2/2011 | Erikson |
| 2011/0040655 | A1 | 2/2011 | Hendrickson |
| 2011/0047017 | A1 | 2/2011 | Lieblang |
| 2011/0047075 | A1 | 2/2011 | Fourez |
| 2011/0047076 | A1 | 2/2011 | Carlson et al. |
| 2011/0078082 | A1 | 3/2011 | Gupta |
| 2011/0082789 | A1 | 4/2011 | Boyd |
| 2011/0083018 | A1 | 4/2011 | Kesanupalli et al. |
| 2011/0087596 | A1 | 4/2011 | Dorsey |
| 2011/0087726 | A1 | 4/2011 | Shim et al. |
| 2011/0093335 | A1 | 4/2011 | Fordyce, III et al. |
| 2011/0093397 | A1 | 4/2011 | Carlson et al. |
| 2011/0099057 | A1 | 4/2011 | Tenyer |
| 2011/0105183 | A1 | 5/2011 | Hsiao et al. |
| 2011/0106698 | A1 | 5/2011 | Issacson et al. |
| 2011/0109737 | A1 | 5/2011 | Aben et al. |
| 2011/0119300 | A1 | 5/2011 | Marcade |
| 2011/0125597 | A1 | 5/2011 | Oder, II et al. |
| 2011/0137740 | A1 | 6/2011 | Bhattacharya |
| 2011/0137742 | A1 | 6/2011 | Parikh |
| 2011/0153437 | A1 | 6/2011 | Archer et al. |
| 2011/0153498 | A1 | 6/2011 | Makhotin et al. |
| 2011/0154466 | A1 | 6/2011 | Harper et al. |
| 2011/0161233 | A1 | 6/2011 | Tieken |
| 2011/0178896 | A1 | 7/2011 | Nakajima et al. |
| 2011/0178926 | A1 | 7/2011 | Lindelsee et al. |
| 2011/0180598 | A1 | 7/2011 | Morgan |
| 2011/0184827 | A1 | 7/2011 | Hubert |
| 2011/0191244 | A1 | 8/2011 | Dai |
| 2011/0208418 | A1 | 8/2011 | Looney |
| 2011/0215146 | A1 | 9/2011 | Shams |
| 2011/0218870 | A1 | 9/2011 | Shams et al. |
| 2011/0221692 | A1 | 9/2011 | Seydoux et al. |
| 2011/0238474 | A1 | 9/2011 | Carr |
| 2011/0238511 | A1 | 9/2011 | Park et al. |
| 2011/0238573 | A1 | 9/2011 | Varadarejan |
| 2011/0246290 | A1 | 10/2011 | Howard et al. |
| 2011/0246317 | A1 | 10/2011 | Coppinger |
| 2011/0251892 | A1 | 10/2011 | Laracey |
| 2011/0258049 | A1 | 10/2011 | Ramer et al. |
| 2011/0258111 | A1 | 10/2011 | Raj et al. |
| 2011/0258123 | A1 | 10/2011 | Dawkins et al. |
| 2011/0270665 | A1 | 11/2011 | Kim |
| 2011/0272471 | A1 | 11/2011 | Mullen |
| 2011/0272478 | A1 | 11/2011 | Mullen |
| 2011/0276380 | A1 | 11/2011 | Mullen et al. |
| 2011/0276381 | A1 | 11/2011 | Mullen et al. |
| 2011/0276424 | A1 | 11/2011 | Mullen |
| 2011/0276425 | A1 | 11/2011 | Mullen |
| 2011/0282780 | A1 | 11/2011 | French |
| 2011/0288684 | A1 | 11/2011 | Farlow et al. |
| 2011/0295745 | A1 | 12/2011 | White et al. |
| 2011/0296508 | A1 | 12/2011 | Os et al. |
| 2011/0302081 | A1 | 12/2011 | Saunders et al. |
| 2011/0312423 | A1 | 12/2011 | Mosites |
| 2011/0320344 | A1 | 12/2011 | Faith et al. |
| 2011/0320345 | A1 | 12/2011 | Taveau et al. |
| 2012/0011009 | A1 | 1/2012 | Lindsey |
| 2012/0011063 | A1 | 1/2012 | Killian et al. |
| 2012/0022943 | A1 | 1/2012 | Howard et al. |
| 2012/0023026 | A1 | 1/2012 | Chen et al. |
| 2012/0023417 | A1 | 1/2012 | Nesladek |
| 2012/0023567 | A1 | 1/2012 | Hammad |
| 2012/0028609 | A1 | 2/2012 | Hruska |
| 2012/0030047 | A1 | 2/2012 | Fuentes et al. |
| 2012/0030101 | A1 | 2/2012 | Boyd |
| 2012/0035998 | A1 | 2/2012 | Chien et al. |
| 2012/0036071 | A1 | 2/2012 | Fulton et al. |
| 2012/0041881 | A1 | 2/2012 | Basu et al. |
| 2012/0047237 | A1 | 2/2012 | Arvidsson et al. |
| 2012/0066065 | A1 | 3/2012 | Switzer |
| 2012/0066078 | A1 | 3/2012 | Kingston et al. |
| 2012/0072350 | A1 | 3/2012 | Goldthwalte et al. |
| 2012/0078735 | A1 | 3/2012 | Bauer et al. |
| 2012/0078798 | A1 | 3/2012 | Downing et al. |
| 2012/0078799 | A1 | 3/2012 | Jackson et al. |
| 2012/0084204 | A1 | 4/2012 | Castell et al. |
| 2012/0095852 | A1 | 4/2012 | Bauer et al. |
| 2012/0095865 | A1 | 4/2012 | Doherty et al. |
| 2012/0095895 | A1 | 4/2012 | Aston |
| 2012/0101881 | A1 | 4/2012 | Taylor et al. |
| 2012/0110044 | A1 | 5/2012 | Nagpal et al. |
| 2012/0116902 | A1 | 5/2012 | Cardina et al. |
| 2012/0116966 | A1 | 5/2012 | Tan |
| 2012/0118950 | A1 | 5/2012 | Belk |
| 2012/0123838 | A1 | 5/2012 | Sparks |
| 2012/0123882 | A1 | 5/2012 | Carlson et al. |
| 2012/0123940 | A1 | 5/2012 | Killian et al. |
| 2012/0124496 | A1 | 5/2012 | Rose et al. |
| 2012/0129514 | A1 | 5/2012 | Beenau et al. |
| 2012/0130794 | A1 | 5/2012 | Strieder |
| 2012/0136780 | A1 | 5/2012 | El-Awady et al. |

(56) References Cited

U.S. PATENT DOCUMENTS

| | | | |
|---|---|---|---|
| 2012/0143767 | A1 | 6/2012 | Abadir |
| 2012/0143772 | A1 | 6/2012 | Abadir |
| 2012/0158580 | A1 | 6/2012 | Eram et al. |
| 2012/0158593 | A1 | 6/2012 | Garfinkle et al. |
| 2012/0158792 | A1 | 6/2012 | MacLaurin et al. |
| 2012/0158893 | A1 | 6/2012 | Boyns |
| 2012/0159163 | A1 | 6/2012 | von Behren |
| 2012/0165978 | A1 | 6/2012 | Li et al. |
| 2012/0166333 | A1 | 6/2012 | von Behren et al. |
| 2012/0166655 | A1 | 6/2012 | Maddali |
| 2012/0173431 | A1 | 7/2012 | Ritchie et al. |
| 2012/0173962 | A1 | 7/2012 | Oh |
| 2012/0185386 | A1 | 7/2012 | Salama et al. |
| 2012/0190386 | A1 | 7/2012 | Anderson |
| 2012/0197691 | A1 | 8/2012 | Grigg et al. |
| 2012/0197794 | A1 | 8/2012 | Grigg et al. |
| 2012/0197807 | A1 | 8/2012 | Schlesser et al. |
| 2012/0203664 | A1 | 8/2012 | Torossian et al. |
| 2012/0203666 | A1 | 8/2012 | Torossian et al. |
| 2012/0209749 | A1 | 8/2012 | Hammad |
| 2012/0215640 | A1 | 8/2012 | Ramer et al. |
| 2012/0215648 | A1 | 8/2012 | Rose |
| 2012/0215650 | A1 | 8/2012 | Oba et al. |
| 2012/0215684 | A1 | 8/2012 | Kidron |
| 2012/0215688 | A1 | 8/2012 | Musser et al. |
| 2012/0215696 | A1 | 8/2012 | Salonen |
| 2012/0221421 | A1 | 8/2012 | Hammad |
| 2012/0221502 | A1 | 8/2012 | Jerram et al. |
| 2012/0226582 | A1 | 9/2012 | Hammad |
| 2012/0231844 | A1 | 9/2012 | Coppinger |
| 2012/0233004 | A1 | 9/2012 | Bercaw |
| 2012/0233170 | A1 | 9/2012 | Musgrove |
| 2012/0239417 | A1 | 9/2012 | Pourfallah |
| 2012/0239556 | A1 | 9/2012 | Magruder |
| 2012/0239560 | A1 | 9/2012 | Pourfallah |
| 2012/0246070 | A1 | 9/2012 | Vadhri |
| 2012/0246071 | A1 | 9/2012 | Jain et al. |
| 2012/0246079 | A1 | 9/2012 | Wilson et al. |
| 2012/0254108 | A1 | 10/2012 | Wedewer et al. |
| 2012/0259763 | A1 | 10/2012 | Pessin |
| 2012/0265631 | A1 | 10/2012 | Cronic et al. |
| 2012/0265685 | A1 | 10/2012 | Brudnicki |
| 2012/0271770 | A1 | 10/2012 | Harris et al. |
| 2012/0284035 | A1 | 11/2012 | Gillin |
| 2012/0297446 | A1 | 11/2012 | Webb et al. |
| 2012/0300932 | A1 | 11/2012 | Cambridge et al. |
| 2012/0303425 | A1 | 11/2012 | Katzin |
| 2012/0303503 | A1 | 11/2012 | Cambridge et al. |
| 2012/0303736 | A1 | 11/2012 | Novotny |
| 2012/0303961 | A1 | 11/2012 | Kean et al. |
| 2012/0304273 | A1 | 11/2012 | Bailey et al. |
| 2012/0310725 | A1 | 12/2012 | Chien et al. |
| 2012/0310826 | A1 | 12/2012 | Chatterjee |
| 2012/0310831 | A1 | 12/2012 | Harris et al. |
| 2012/0316992 | A1 | 12/2012 | Oborne |
| 2012/0317035 | A1 | 12/2012 | Royyuru et al. |
| 2012/0317036 | A1 | 12/2012 | Bower et al. |
| 2012/0317149 | A1 | 12/2012 | Jagota et al. |
| 2012/0323664 | A1 | 12/2012 | Klems |
| 2012/0330874 | A1 | 12/2012 | Jerram |
| 2013/0013499 | A1 | 1/2013 | Kalgi |
| 2013/0017784 | A1 | 1/2013 | Fisher |
| 2013/0018757 | A1 | 1/2013 | Anderson et al. |
| 2013/0019098 | A1 | 1/2013 | Gupta et al. |
| 2013/0024364 | A1 | 1/2013 | Shrivastava |
| 2013/0024371 | A1 | 1/2013 | Hariramani |
| 2013/0024916 | A1 | 1/2013 | Evans |
| 2013/0030828 | A1 | 1/2013 | Pourfallah |
| 2013/0031006 | A1 | 1/2013 | McCullagh et al. |
| 2013/0054337 | A1 | 2/2013 | Brendell et al. |
| 2013/0054466 | A1 | 2/2013 | Muscato |
| 2013/0054470 | A1 | 2/2013 | Campos et al. |
| 2013/0054474 | A1 | 2/2013 | Yeager |
| 2013/0080238 | A1 | 3/2013 | Kelly |
| 2013/0081122 | A1 | 3/2013 | Svigals et al. |
| 2013/0090750 | A1 | 4/2013 | Herrman et al. |
| 2013/0091028 | A1 | 4/2013 | Oder ("J.D."), II et al. |
| 2013/0103574 | A1 | 4/2013 | Conrad |
| 2013/0110658 | A1 | 5/2013 | Lyman et al. |
| 2013/0111599 | A1 | 5/2013 | Gargiulo |
| 2013/0117170 | A1 | 5/2013 | Coppinger |
| 2013/0117185 | A1 | 5/2013 | Collison et al. |
| 2013/0124290 | A1 | 5/2013 | Fisher |
| 2013/0124291 | A1 | 5/2013 | Fisher |
| 2013/0124364 | A1 | 5/2013 | Mittal |
| 2013/0138525 | A1 | 5/2013 | Bercaw |
| 2013/0144785 | A1 | 6/2013 | Karpenko |
| 2013/0144888 | A1 | 6/2013 | Faith et al. |
| 2013/0145148 | A1 | 6/2013 | Shablygin et al. |
| 2013/0145172 | A1 | 6/2013 | Shablygin et al. |
| 2013/0151417 | A1 | 6/2013 | Gupta |
| 2013/0159081 | A1 | 6/2013 | Shastry |
| 2013/0159112 | A1 | 6/2013 | Schultz et al. |
| 2013/0159178 | A1 | 6/2013 | Colon et al. |
| 2013/0159184 | A1 | 6/2013 | Thaw |
| 2013/0166332 | A1 | 6/2013 | Hammad |
| 2013/0166402 | A1 | 6/2013 | Parento et al. |
| 2013/0166456 | A1 | 6/2013 | Zhang et al. |
| 2013/0166621 | A1 | 6/2013 | Zhu |
| 2013/0173736 | A1 | 7/2013 | Krzeminski et al. |
| 2013/0179340 | A1 | 7/2013 | Alba |
| 2013/0185202 | A1 | 7/2013 | Goldthwaite et al. |
| 2013/0191286 | A1 | 7/2013 | Cronic et al. |
| 2013/0191289 | A1 | 7/2013 | Cronic et al. |
| 2013/0198071 | A1 | 8/2013 | Jurss |
| 2013/0198080 | A1 | 8/2013 | Anderson et al. |
| 2013/0200146 | A1 | 8/2013 | Moghadam |
| 2013/0204787 | A1 | 8/2013 | Dubois |
| 2013/0204793 | A1 | 8/2013 | Kerridge et al. |
| 2013/0212007 | A1 | 8/2013 | Mattsson et al. |
| 2013/0212017 | A1 | 8/2013 | Bangia |
| 2013/0212019 | A1 | 8/2013 | Mattsson et al. |
| 2013/0212024 | A1 | 8/2013 | Mattsson et al. |
| 2013/0212026 | A1 | 8/2013 | Powell et al. |
| 2013/0212666 | A1 | 8/2013 | Mattsson et al. |
| 2013/0218640 | A1 | 8/2013 | Kidder et al. |
| 2013/0218657 | A1 | 8/2013 | Salmon |
| 2013/0218698 | A1 | 8/2013 | Moon et al. |
| 2013/0218721 | A1 | 8/2013 | Borhan |
| 2013/0218765 | A1 | 8/2013 | Hammad |
| 2013/0218769 | A1 | 8/2013 | Pourfallah et al. |
| 2013/0226799 | A1 | 8/2013 | Raj |
| 2013/0226813 | A1 | 8/2013 | Voltz |
| 2013/0246199 | A1 | 9/2013 | Carlson |
| 2013/0246202 | A1 | 9/2013 | Tobin |
| 2013/0246203 | A1 | 9/2013 | Laracey |
| 2013/0246258 | A1 | 9/2013 | Dessert |
| 2013/0246259 | A1 | 9/2013 | Dessert |
| 2013/0246261 | A1 | 9/2013 | Purves et al. |
| 2013/0246267 | A1 | 9/2013 | Tobin |
| 2013/0254028 | A1 | 9/2013 | Salci |
| 2013/0254052 | A1 | 9/2013 | Royyuru et al. |
| 2013/0254102 | A1 | 9/2013 | Royyuru |
| 2013/0254117 | A1 | 9/2013 | von Mueller et al. |
| 2013/0262296 | A1 | 10/2013 | Thomas et al. |
| 2013/0262302 | A1 | 10/2013 | Lettow et al. |
| 2013/0262315 | A1 | 10/2013 | Hruska |
| 2013/0262316 | A1 | 10/2013 | Hruska |
| 2013/0262317 | A1 | 10/2013 | Collinge et al. |
| 2013/0275300 | A1 | 10/2013 | Killian et al. |
| 2013/0275307 | A1 | 10/2013 | Khan |
| 2013/0275308 | A1 | 10/2013 | Paraskeva et al. |
| 2013/0282502 | A1 | 10/2013 | Jooste |
| 2013/0282575 | A1 | 10/2013 | Mullen et al. |
| 2013/0282588 | A1 | 10/2013 | Hruska |
| 2013/0297501 | A1 | 11/2013 | Monk et al. |
| 2013/0297504 | A1 | 11/2013 | Nwokolo et al. |
| 2013/0297508 | A1 | 11/2013 | Belamant |
| 2013/0304649 | A1 | 11/2013 | Cronic et al. |
| 2013/0308778 | A1 | 11/2013 | Fosmark et al. |
| 2013/0311382 | A1 | 11/2013 | Fosmark et al. |
| 2013/0317982 | A1 | 11/2013 | Mengerink et al. |
| 2013/0325579 | A1 | 12/2013 | Salmon |
| 2013/0332344 | A1 | 12/2013 | Weber |

(56) References Cited

U.S. PATENT DOCUMENTS

| | | | |
|---|---|---|---|
| 2013/0339240 | A1 | 12/2013 | Anderson |
| 2013/0339253 | A1 | 12/2013 | Sincai |
| 2013/0346302 | A1 | 12/2013 | Purves |
| 2013/0346305 | A1 | 12/2013 | Mendes |
| 2013/0346314 | A1 | 12/2013 | Mogollon et al. |
| 2014/0006198 | A1 | 1/2014 | Daly |
| 2014/0006283 | A1 | 1/2014 | Hogg |
| 2014/0007213 | A1 | 1/2014 | Sanin et al. |
| 2014/0013106 | A1 | 1/2014 | Redpath |
| 2014/0013114 | A1 | 1/2014 | Redpath |
| 2014/0013452 | A1 | 1/2014 | Aissi et al. |
| 2014/0019352 | A1 | 1/2014 | Shrivastava |
| 2014/0025581 | A1 | 1/2014 | Calman |
| 2014/0025585 | A1 | 1/2014 | Calman |
| 2014/0025958 | A1 | 1/2014 | Calman |
| 2014/0032417 | A1 | 1/2014 | Mattsson |
| 2014/0032418 | A1 | 1/2014 | Weber |
| 2014/0040127 | A1 | 2/2014 | Chatterjee |
| 2014/0040137 | A1 | 2/2014 | Carlson et al. |
| 2014/0040139 | A1 | 2/2014 | Brudnicki et al. |
| 2014/0040144 | A1 | 2/2014 | Plomske et al. |
| 2014/0040145 | A1 | 2/2014 | Ozvat et al. |
| 2014/0040148 | A1 | 2/2014 | Ozvat et al. |
| 2014/0040628 | A1 | 2/2014 | Fort et al. |
| 2014/0041018 | A1 | 2/2014 | Bomar et al. |
| 2014/0046853 | A1 | 2/2014 | Spies et al. |
| 2014/0047517 | A1 | 2/2014 | Ding |
| 2014/0047551 | A1 | 2/2014 | Nagasundaram et al. |
| 2014/0052532 | A1 | 2/2014 | Tsai et al. |
| 2014/0052620 | A1 | 2/2014 | Rogers et al. |
| 2014/0052637 | A1 | 2/2014 | Jooste et al. |
| 2014/0068706 | A1 | 3/2014 | Aissi |
| 2014/0074637 | A1 | 3/2014 | Hammad |
| 2014/0095589 | A1 | 4/2014 | Johnson |
| 2014/0108172 | A1 | 4/2014 | Weber et al. |
| 2014/0114857 | A1 | 4/2014 | Griggs et al. |
| 2014/0136945 | A1 | 5/2014 | Ligman |
| 2014/0143137 | A1 | 5/2014 | Carlson |
| 2014/0164243 | A1 | 6/2014 | Aabye et al. |
| 2014/0188586 | A1 | 7/2014 | Carpenter et al. |
| 2014/0294701 | A1 | 10/2014 | Dai et al. |
| 2014/0297534 | A1 | 10/2014 | Patterson |
| 2014/0310080 | A1 | 10/2014 | Salmon |
| 2014/0310183 | A1 | 10/2014 | Weber |
| 2014/0330721 | A1 | 11/2014 | Wang |
| 2014/0330722 | A1 | 11/2014 | Laxminarayanan et al. |
| 2014/0331265 | A1 | 11/2014 | Mozell et al. |
| 2014/0337175 | A1 | 11/2014 | Katzin |
| 2014/0337236 | A1 | 11/2014 | Wong et al. |
| 2014/0344153 | A1 | 11/2014 | Raj et al. |
| 2014/0365295 | A1 | 12/2014 | Postrel |
| 2014/0372308 | A1 | 12/2014 | Sheets |
| 2015/0019443 | A1 | 1/2015 | Sheets et al. |
| 2015/0019944 | A1 | 1/2015 | Kalgi |
| 2015/0026049 | A1 | 1/2015 | Theurer |
| 2015/0032626 | A1 | 1/2015 | Dill et al. |
| 2015/0032627 | A1 | 1/2015 | Dill et al. |
| 2015/0046338 | A1 | 2/2015 | Laxminarayanan et al. |
| 2015/0046339 | A1 | 2/2015 | Wong et al. |
| 2015/0052064 | A1 | 2/2015 | Karpenko et al. |
| 2015/0088756 | A1 | 3/2015 | Makhotin et al. |
| 2015/0089350 | A1 | 3/2015 | Davis |
| 2015/0106239 | A1 | 4/2015 | Gaddam et al. |
| 2015/0112870 | A1 | 4/2015 | Nagasundaram et al. |
| 2015/0112871 | A1 | 4/2015 | Kumnick |
| 2015/0120472 | A1 | 4/2015 | Aabye et al. |
| 2015/0127529 | A1 | 5/2015 | Makhotin et al. |
| 2015/0127547 | A1 | 5/2015 | Powell et al. |
| 2015/0140960 | A1 | 5/2015 | Powell et al. |
| 2015/0142673 | A1 | 5/2015 | Nelsen et al. |
| 2015/0161597 | A1 | 6/2015 | Subramanian et al. |
| 2015/0178724 | A1 | 6/2015 | Ngo et al. |
| 2015/0180836 | A1 | 6/2015 | Wong et al. |
| 2015/0186864 | A1 | 7/2015 | Jones et al. |
| 2015/0193222 | A1 | 7/2015 | Pirzadeh et al. |
| 2015/0195133 | A1 | 7/2015 | Sheets et al. |
| 2015/0199679 | A1 | 7/2015 | Palanisamy et al. |
| 2015/0199689 | A1 | 7/2015 | Kumnick et al. |
| 2015/0220917 | A1 | 8/2015 | Aabye et al. |
| 2015/0269566 | A1 | 9/2015 | Gaddam et al. |
| 2015/0302453 | A1 | 10/2015 | Tietzen |
| 2015/0312038 | A1 | 10/2015 | Palanisamy |
| 2015/0319158 | A1 | 11/2015 | Kumnick |
| 2015/0332262 | A1 | 11/2015 | Lingappa |
| 2015/0339767 | A1 | 11/2015 | Chen |
| 2015/0356560 | A1 | 12/2015 | Shastry et al. |
| 2016/0028550 | A1 | 1/2016 | Gaddam et al. |
| 2016/0042263 | A1 | 2/2016 | Gaddam et al. |
| 2016/0065370 | A1 | 3/2016 | Le Saint et al. |
| 2016/0092696 | A1 | 3/2016 | Guglani et al. |
| 2016/0092872 | A1 | 3/2016 | Prakash et al. |
| 2016/0103675 | A1 | 4/2016 | Aabye et al. |
| 2016/0119296 | A1 | 4/2016 | Laxminarayanan et al. |
| 2016/0224976 | A1 | 8/2016 | Basu |
| 2016/0379192 | A1 | 12/2016 | Purves |
| 2017/0046696 | A1 | 2/2017 | Powell |
| 2017/0103387 | A1 | 4/2017 | Weber |
| 2017/0134479 | A1 | 5/2017 | Kalgi |
| 2017/0220818 | A1 | 8/2017 | Nagasundaram |
| 2017/0228723 | A1 | 8/2017 | Taylor |
| 2017/0300314 | A1 | 10/2017 | Lopyrev |
| 2018/0075081 | A1 | 3/2018 | Chipman |

FOREIGN PATENT DOCUMENTS

| | | | |
|---|---|---|---|
| CN | 101075316 | A | 11/2007 |
| CN | 101231727 | A | 7/2008 |
| CN | 101388125 | A | 3/2009 |
| CN | 101840550 | A | 9/2010 |
| EP | 0745961 | A2 | 12/1996 |
| EP | 0855659 EP | | 11/2007 |
| EP | 1921578 | A1 | 5/2008 |
| EP | 2156397 | A1 | 2/2010 |
| JP | 2005004621 | A | 1/2005 |
| JP | 2008527495 | A | 7/2008 |
| JP | 08-545210 | | 12/2008 |
| JP | 2009151730 | A | 7/2009 |
| JP | 2011186660 | A | 9/2011 |
| JP | 2012027824 | A | 2/2012 |
| KR | 20000058839 | A | 10/2000 |
| KR | 10-0432430 | | 5/2004 |
| KR | 06-0117177 | | 11/2006 |
| KR | 07-0104087 | | 10/2007 |
| SG | 2013069539 | | 10/2013 |
| WO | 0046769 | A1 | 8/2000 |
| WO | 0135304 | A1 | 5/2001 |
| WO | WO01/165502 | | 9/2001 |
| WO | 03001866 | A1 | 1/2003 |
| WO | 2003046697 | A2 | 6/2003 |
| WO | 2003071386 | A2 | 8/2003 |
| WO | 03083737 | A1 | 10/2003 |
| WO | WO03023674 | | 4/2004 |
| WO | 2004042536 | A2 | 5/2004 |
| WO | 2006113834 | A2 | 10/2006 |
| WO | 2009032523 | A1 | 3/2009 |
| WO | 2010078522 | A1 | 7/2010 |
| WO | 2010148704 | A1 | 12/2010 |
| WO | WO10/148737 | | 12/2010 |
| WO | 2012068078 | A2 | 5/2012 |
| WO | 2012098556 | A1 | 7/2012 |
| WO | 2012142370 | A2 | 10/2012 |
| WO | 2012167941 | A1 | 12/2012 |
| WO | 2013048538 | A1 | 4/2013 |
| WO | 2013056104 | A1 | 4/2013 |
| WO | 2013119914 | A1 | 8/2013 |
| WO | 2013179271 | A2 | 12/2013 |

OTHER PUBLICATIONS

Business Wire, "New York State Department of Labor Selects JPMorgan Chase to Provide New Banking Services for Unemployment Insurance Benefits; JPMorgan Chase Electronic Services to

(56) References Cited

OTHER PUBLICATIONS

Help Speed Benefit Payments", Business Wire, New York, Aug. 4, 2006, p. 1.
Gopalan, NP & Selvan, B Siva. TCP/IP Illustrated. Prentice-Hall. 2008. pp. 101-102, 175-176 and 235.
Shadrach, D.C. "A Weighted Metric Based Adaptive Algorithm for Web Server Load Balancing." 2009 Third International Symposium on Intelligenr Information Technology Application, http://ieeexplore.ieee.org/xpl/articleDetails.jsp?amumber=5369384, pp. 449-452.
International Search Report and Written Opinion for PCT/US09/54921 dated Oct. 21, 2009.
International Search Report and Written Opinion for PCT/US2010/048344 dated Nov. 15, 2010.
International Search Report and Written Opinion for PCT/US2010/033861 dated Dec. 9, 2010.
International Search Report and Written Opinion for PCT/US2010/033547 dated Dec. 14, 2010.
International Preliminary Report on Patentability for PCT/US2010/033229 dated Dec. 29, 2010.
International Search Report and Written Opinion for PCT/US2010/041860 dated Feb. 1, 2011.
International Search Report and Written Opinion for PCT/US2010/045445 dated Feb. 24, 2011.
International Search Report and Written Opinion for PCT/US2010/045500 dated Mar. 29, 2011.
International Search Report and Written Opinion for PCT/US2011/024941 dated Apr. 19, 2011.
International Search Report and Written Opinion for PCT/US2010/046833 dated Apr. 26, 2011.
International Search Report and Written Opinion for PCT/US2011/26734 dated Apr. 29, 2011.
International Search Report and Written Opinion for PCT/US2011/29790 dated May 19, 2011.
International Search Report and Written Opinion for PCT/US2011/035268 dated Aug. 5, 2011.
International Search Report and Written Opinion for PCT/US2011/032093 dated Aug. 24, 2011.
International Search Report and Written Opinion for PCT/US11/39178 dated Sep. 16, 2011.
International Search Report and Written Opinion for PCT/US2011/42062 dated Sep. 29, 2011.
International Search Report for PCT/US11/49393 dated Dec. 5 2011.
International Search Report and Written Opinion for PCT/US11/57179 dated Jan. 5, 2012.
International Search Report and Written Opinion for PCT/US11/57173 dated Mar. 15, 2012.
International Search Report and Written Opinion for PCT/US11/57180 dated Mar. 15, 2012.
International Search Report for PCT/US12/21000 dated May 15, 2012.
International Search Report for PCT/US11/65305 dated Apr. 16, 2012.
International Search Report for PCT/US12/26205, dated May 29, 2012.
International Search Report for PCT/US12/23856 dated Jun. 6, 2012.
International Search Report and Written Opinion for PCT/US2012/027043 dated Jul. 13, 2012.
International Search Report for PCT/US12/24772 dated Jul. 24, 2012.
International Search Report for PCT/US12/25530 dated Aug. 7, 2012.
International Search Report PCT/US12/27620 dated Aug. 10, 2012.
International Search Report and Written Opinion for PCT/US12/41437 dated Aug. 24, 2012.
International Search Report and Written Opinion for PCT/US12/37597 dated Sep. 21, 2012.
International Search Report for PCT/US12/39638 dated Sep. 24, 2012.
International Search Report for PCT/US12/45875 dated Nov. 16, 2012.
International Search Report for PCT/US12/47092 dated Nov. 26, 2012.
International Search Report for PCT/US12/57577 dated Nov. 29, 2012.
International Search Report and Written Opinion for PCT/US12/55636 dated Nov. 30, 2012.
International Search Report for PCT/US12/57528 dated Dec. 17, 2012.
International Search Report and Written Opinion for PCT/US2012/045601 dated Feb. 1, 2013.
International Search Report for PCT/US12/66898 dated Feb. 11, 2013.
International Search Report and Written Opinion for PCT/US2012/069557 dated Feb. 22, 2013.
International Search Report for PCT/US12/56759 dated Feb. 25, 2013.
International Search Report and Written Opinion for PCT/US12/65738 dated Apr. 19, 2013.
International Search Report and Written Opinion for PCT/US2013/020411 dated May 21, 2013.
International Search Report and Written Opinion for PCT/US2013/024538, dated May 31, 2013.
International Search Report and Written Opinion dated May 29, 2012 corresponding to PCT/US12/26205.
Aissi et al., U.S. Appl. No. 61/738,832 (unpublished), Management of Sensitive Data, filed Dec. 18, 2012.
Cash et al., U.S. Appl. No. 15/041,495 (unpublished), Peer Forward Authorization of Digital Requests, filed Feb. 11, 2016.
Dimmick, U.S. Appl. No. 14/952,444 (unpublished), Tokenization Request Via Access Device, filed Nov. 25, 2015.
Dimmick, U.S. Appl. No. 14/952,514 (unpublished), Systems Communications With Non-Sensitive Identifiers, filed Nov. 25, 2015.
European Patent Office, Supplementary European Search Report and European Search Opinion, in EP Application No. 12749451.6, dated Apr. 20, 2015, 7 pages.
Flurscheim et al., U.S. Appl. No. 15/004,705 (unpublished), Cloud-Based Transactions With Magnetic Secure Transmission, filed Jan. 22, 2016.
Flurscheim et al., U.S. Appl. No. 62/108,403 (unpublished), Wearables With NFC HCE, filed Jan. 27, 2015.
Gaddam et al., U.S. Appl. No. 62/053,736 (unpublished), completing Tansactions Without a User Payment Device, filed Sep. 22, 2014.
Galland et al., U.S. Appl. No. 62/128,709 (unpublished), Tokenizing Transaction Amounts, filed Mar. 5, 2015.
Hoverson et al., U.S. Appl. No. 62/038,174 (unpublished), Customized Payment Gateway, filed Aug. 15, 2014.
International Search Report and Written Opinion for PCT/US13/46875, dated Oct. 24, 2013, 14 pages.
IP Australia, Patent Examination Report No. 1, Australian Application No. 2012220669, dated Sep. 8, 2014, 6 pages.
IP Australia, Patent Examination Report No. 2, Australian Application No. 2012220669, dated Jun. 8, 2016, 4 pages.
Kalgi et al., U.S. Appl. No. 62/024,426 (unpublished), Secure Transactions Using Mobile Devices, filed Jul. 14, 2014.
Kinagi, U.S. Appl. No. 62/117,291 (unpublished), Token and Cryptogram Using Transaction Specific Information, filed Feb. 17, 2015.
Le Saint et al., U.S. Appl. No. 15/008,338 (unpublished), Methods for Secure Credential Provisioning, filed Jan. 27, 2016.
Li, U.S. Appl. No. 61/894,749 (unpublished), Methods and Systems for Authentication and Issuance of Tokens in a Secure Environment, filed Oct. 23, 2013.
McGuire, U.S. Appl. No. 14/600,523 (unpublished); Secure Payment Processing Using Authorization Request, filed Jan. 20, 2015.
Patterson, U.S. Appl. No. 15/019,157 (unpublished), Token Processing Utilizing Multiple Authorizations, filed Feb. 9, 2016.
Patterson, U.S. Appl. No. 62/054,346 (unpublished), Mirrored Token Vault, filed Sep. 23, 2014.

(56) References Cited

OTHER PUBLICATIONS

Petition for Inter Partes Review of U.S. Pat. No. 8,533,860 Challenging Claims 1-30 Under 35 U.S.C. § 312 and 37 C.F.R. § 42.104, filed Feb. 17, 2016, before the USPTO Patent Trial and Appeal Board, IPR 2016-00600, 65 pages.
Powell, U.S. Appl. No. 61/926,236 (unpublished), Methods and Systems for Provisioning Mobile Devices With Payment Credentials and Payment Token Identifiers, filed Jan. 10, 2014.
Powell, U.S. Appl. No. 61/892,407 (unpublished), Issuer Over-The-Air Update Method and System, filed Oct. 17, 2013.
Prakash et al., U.S. Appl. No. 62/037,033 (unpublished), Sharing Payment Token, filed Aug. 13, 2014.
Prakash, et al., U.S. Appl. No. 14/955,716 (unpublished), Provisioning Platform for Machine-to-Machine Devices, filed Dec. 1, 2015.
Rangarajan et al., U.S. Appl. No. 61/751,76 (unpublished), Payments Bridge, filed Jan. 11, 2013.
Sabba et al., U.S. Appl. No. 15/011,366 (unpublished), Token Check Offline, filed Jan. 29, 2016.
Sharma et al., U.S. Appl. No. 62/003,717 (unpublished), Mobile Merchant Application, filed May 28, 2014.
State Intellectual Property of the People'S Republic of China, First Office Action in Chinese Application No. 201280019629.X, dated Aug. 1, 2016, 15 pages.
Stubbs et al., U.S. Appl. No. 62/103,522 (unpublished), Methods and Systems for Wallet Provider Provisioning, filed Jan. 14, 2015.
Wang, U.S. Appl. No. 62/000,288 (unpublished), Payment System Canonical Address Format, filed May 19, 2014.
Wang, U.S. Appl. No. 62/042,050 (unpublished), Payment Device Authentication and Authorization System, filed Aug. 26, 2014.
Wong et al., U.S. Appl. No. 14/966,948 (unpublished), Automated Access Data Provisioning, filed Dec. 11, 2015.
Wong et al., U.S. Appl. No. 61/879,362 (unpublished), Systems and Methods for Managing Mobile Cardholder Verification Methods, filed Sep. 18, 2013.
Chinese Office Action dated Oct. 10, 2017 for CN Application No. 201280019629.X, 7 pages.
Pan Kexian "Development of the Location-Based Service LBS Application of Intelligent Mobile Phone", Information Technologies, Oct. 25, 2009, pp. 134-137, cited on Oct. 10, 2017 in CN201280019629.
Yang Jingjing "Help Web: Life Search Forerunner"Scientific and Technological Information, Aug. 5, 2010, pp. 36-37, cited on Oct. 10, 2017 in CN201280019629.
Wang Lepeng et al. "Discuss of Foursquare Pattern and Its Deelopment Strategies in China" Scientific and Technological Information, Aug. 15, 2010, pp. 90-91, cited on Oct. 10, 2017 in CN201280019629.
Chinese Office Action dated Nov. 6, 2017 for CN Application No. 201280018719.7, 24 pages.
Australian Examination Report for AU2017203295 dated Apr. 19, 2018, 4 pages.
Ratha, N., and Bolle, R., 1. History of Fingerprint Pattern Recognition—1.1 Introduction; 1.2 The Development of Fingerprint Classification Systems "Automatic Fingerprint Recognition Systems," Springer-Verlag, (2004) (466 pages).
Office Action dated May 22, 2018 for U.S. Appl. No. 14/216,382 (pp. 1-8).
Australian Patent Office, Patent Examination Report No. 2 in Australian Patent Application No. 2012217606, dated Jun. 15, 2016, 6 pages.
Dizaj, Mohammad Vahid Alizadeh, Moghaddam, Rexa Askari, Momenebellah, Samad, New Mobile Payment Protocol: Mobile Pay Center Protocol 2 (MPCP2) by Using New Key Agreement Protocol: VAM, 3d International Conference on Electronics Computer Technology, vol. 2, Apr. 2011, pp. 12-18.
State Intellectual Property Office of the People's Republic of China, First Office Action in Chinese Application No. 201280018719.7, dated Jul. 4, 2016, 15 pages.
Gao, Jerry, Kulkarni, Vijay, Ranavat, Himanshu, Chang, Lee, Mei, Hsing, A2D Barcode-Based Mobile Payment System, 3d International Conference on Multimedia and Ubiquitous Engineering, Jun. 2009, pp. 320-329.
International Search Report and Written Opinion for PCT/US2014/030517, dated Aug. 18, 2014. (9 pages).
International Search Report and Written Opinion for PCT/US2010/033229 dated Dec. 29, 2010, 8 pages.
International Search Report and Written Opinion forPCT/US2013/031084, dated Jun. 4, 2013. 9 pages.
International Preliminary Report on Patentability dated Jan. 16, 2014 in related/corresponding PCT Patent Appl. No. PCT/US2012/045601 filed Jul. 5, 2012. (7 pages).
Smartphone e-payment and Google AD send blog, 'Google Wallet on Smartphone', <http://stockpedia.blogspot.kr/2011/06/google-wallet.html> Jun. 10, 2011, pp. 1-3.
International Preliminary Report on Patentability dated Jan. 14, 2014 cited in related/corresponding International PCT Appl. No. PCT/US2012/045875 filed Jul. 7, 2012. (11 pages).
Vitt, Elizabeth et al. Data Integration Solutions for Master Data Management (Feb. 2006). https://technet.microsoft.com/en-us/library/aa964123(v=sql.90).aspx (19 pages).
Vitt, Elizabeth, et al. "Microsoft SQL Server 2005 Analysis Services Performance Guide." White Paper, White Paper (2007). (116 pages).
ShopSawy Blog, Feb. 2012. Retrieved from https://web.archive.org/web/20120212104611 /http://shopsawy.com:80/blog/.pp. 1-13.
Charland et al., Mobile Application Development: Web vs. Native, Apr. 2011, 9 pages.
Lee et al., osgGap: scene graph library for mobile based on hybrid web app framework, Nov. 2013, 4 pages.
Immaneni et al., Hybrid retrieval from the unified web, Mar. 2007, 5 pages.
McCarney et al., "Tapas: Design, Implementation, and Usability Evaluation of a Password Manager," Copyright 2012, ACM 978 1-4503-1312-4/12/12 (10 pages).
Lowry P B XML data mediation and collaboration: a proposed comprehensive architecture and query requirements for using XML to mediate heterogeneous data sources and targets, Proceedings of the 34th Hawaii International Conference on System Sciences—2001, 20010103; 20010103—20010106, IEEE, pp. 1-9.
Gao et al., "A 2D Barcode-Based Mobile Payment System", (2009), XP031561633 (10 pages).
Stack Exchange, Why aren't there automated translators from one programming language to another, 2010 (5 pages).
International Search Report and Written Opinion for PCT/US2012/057528, dated May 29, 2012. (8 pages).
Petition for Inter Partes Review of U.S. Pat. No. 8,887,308 Challenging Claim 1 Under 35 U.S.C. 312 and 37 C.F. R. 42.104, dated Mar. 3, 2016, before the USPTO Patent Trial and Appeal Board, IPR 2016-00602, 58 pages.
Petition for Inter Partes Review of U.S. Pat. No. 8,402,555 Challenging Claims 1-26 Under 35 U.S.C. 312 and 37 C.F.R. 42.104, dated Mar. 22, 2016, before the USPTO Patent Trial and Appeal Board, IPR 2016-00789, 65 pages.
Corrected Petition for Inter Partes Review of U.S. Pat. No. 8,533,860 Challenging Claims 1-30 Under 35 U.S.C. .sctn.312 and 37 C.F.R. sctn.42.104, dated Mar. 14, 2016, before the USPTO Patent Trial and Appeal Board, IPR 2016-00600, 65 pages.
ShopSavvy Blog. Feb. 2012. Retrieved from https://web.archive.Org/web/20120212104611/http://shopsavvy.com/blog. pp. 1-13 (Year: 2012).
Chipman, et al., U.S. Appl. No. 15/265,282 (Unpublished), Self-Cleaning Token Vault, filed Sep. 14, 2016.
Lopez, et al., U.S. Appl. No. 15/462,658 (Unpublished), Replacing Token on a Multi-Token User Device, filed Mar. 17, 2017.
International Search Report and Written Opinion for PCT/US2010/045500 dated Mar. 29, 2011 (3 pages).
Office Action dated Feb. 28, 2018 for U.S. Appl. No. 14/242,403 (pp. 1-11).

* cited by examiner

Example: Universal Electronic Payment ("UEP")

Virtual Wallet Purchasing 1 00

Example: UEP Application Embodiment - Shop Mode

Example: UEP Application Embodiment - Shop Mode

Example: UEP Application Embodiment - Discovery Shopping Mode

Example UEP Application Embodiment - Discovery Shopping Mode

Example: UEP Application Embodiment - Discovery Shopping Mode

Example: UEP Application Embodiment - Shop Cart Mode

Example UEP Application Embodiment - Shop Cart Mode

Example: UEP Application Embodiment - Bill Pay Mode

Example: UEP Application Embodiment - (Local) Merchant Shopping Mode

Example: UEP Application Embodiment - (Local) Merchant Shopping Mode: Virtual Store Injection Example: UEP Application Embodiment - Wallet Funds Mode Example: UEP Application Embodiment - Wallet Payee Mode Example: UEP Application Embodiment - Additional Wallet Features: Real-time Offers Example: UEP Application Embodiment - Additional Wallet Features: Payment Mechanisms Example UEP Application Embodiment - History Mode Example: UEP Application Embodiment - History Mode Example: UEP Application Embodiment - History Shopping Trail Mode Example: User Shopping Trail Generation ("USTG") component 1100

Example: Shopping Trail Revenue Sharing ("STRS") component 1120

Example: UEP Application Embodiment - Snap Mode

Example: UEP Application Embodiment - Snap Mode

Example: UEP Application Embodiment - Snap Mode

Example: UEP Application Embodiment - Snap Mode

Example: UEP Application Embodiment - Snap Mode

Example: UEP Application Embodiment - Snap Mode: Web

Example: Snap Mobile Payment Execution ("SMPE") component 1200

Example: Quick Response Code Processing ("QRCP") component 1210

Example: Quick Response Code Processing ("QRCP") component 1220

Example: UEP Application Embodiment - Offers Mode

Example: Offer Recommendation and Exchange ("ORE") component 1300

Example UEP Application Embodiment - General Settings Mode

Example: UEP Application Embodiment - Wallet Bonds Settings Mode

Example: UEP Application Embodiment - Purchase Controls Settings Mode

Example: UEP Application Embodiment - Purchase Controls Settings Mode

Example: UEP Application Embodiment - Purchase Controls Settings Mode

Example: Virtual Wallet Settings Configuration ("VWSC") component 1700

Example: Purchase Controls Settings ("PCS") component 1720

Example: Purchase Controls Settings ("PCS") component 1720

Example: Centralized Personal Information Platform

Example: User Profile Attributes Data Model

Example: User Profile Attributes Data Model

Example: User Profile Attributes Data Model

Example: User Profile Attributes Data Model

Example: User Profile Attributes Data Model

Example: User Profile Attributes Data Model

*Example: Centralized Personal Information Platform Components*

Example: Search Results Aggregation

Example: Search Results Aggregation ("SRA") component 2200

Example: Card-Based Transaction Execution

Example: Card-Based Transaction Execution

Example: Card-Based Transaction Execution

Example: Card-Based Transaction Execution

Example: Card-Based Transaction Data Acquisition ("CTDA") component 2400

Example: Card-Based Transaction Data Acquisition ("CTDA") component 2400

Example: Card-Based Transaction Data Acquisition ("CTDA") component 2400

Example: Card-Based Transaction Data Acquisition ("CTDA") component 2400

Example: Card-Based Transaction Data Acquisition ("CTDA") component 2400

Example: Transaction Data Aggregation

Example: Transaction Data Aggregation (TDA) component 2600

Example: Social Data Aggregation

Example: Social Data Aggregation ("SDA") component 2800

Example: Value-Add Service Enrollment

Example: Value-Add Service Enrollment ("VASE") component 3000

Example: Aggregated Data Record Normalization ("ADRN") component 3100

Example: Aggregated Data Record Normalization ("ADRN") component 3100

Example: Data Field Recognition ("DFR") component 3200

Example: Entity Type Classification ("ETC") component 3300

Example: Cross-Entity Correlation ("CEC") component 3400

Example: Entity Attribute Association ("EAA") component 3500

Example: Entity Profile-Graph Updating ("EPGU") component 3600

Example: Search Term Generation ("STG") component 3700

Example: User Behavior Analysis ("UBA") component 3800

Example: User Behavior-Based Offer Recommendation ("UBOR") component 3900

Example Data Flow: Social Pay Enrollment

Example Logic Flow: Social Pay Enrollment ("SPE") component 4200

Example Data Flow: Social Payment Triggering

Example Data Flow: Social Payment Triggering

Example Data Flow: Social Payment Triggering

Example Logic Flow: Social Payment Triggering ("SPT") component 4400

Example Logic Flow: Social Payment Triggering ("SPT") component 4400

Example Logic Flow: Social Payment Triggering ("SPT") component 4400

Example Logic Flow: Wallet Security and Settings ("WSS") component 4500

Example Logic Flow: Wallet Security and Settings ("WSS") component 4500

Example Data Flow: Social Merchant Consumer Bridging

Example Logic Flow: Social Merchant Consumer Bridging ("SMCB") component 4700

Example: Virtual Wallet Mobile App - Feature Overview

Example: Virtual Wallet Mobile App - Shopping Mode

Example: Virtual Wallet Mobile App - Shopping Mode

Example: Virtual Wallet Mobile App - Shopping Mode

Example: Virtual Wallet Mobile App - SocialPay Mode

Example: Virtual Wallet Mobile App - Shopping Mode

Example: Virtual Wallet Mobile App - Shopping Mode 49 19o
49 19p
49 19l
49 19m

Example: Virtual Wallet Mobile App - Shopping Mode

Example: Virtual Wallet Mobile App - Payment Mode

Example: Virtual Wallet Mobile App - Dynamic Payment Optimization

Example: Virtual Wallet Mobile App

Example: Virtual Wallet Mobile App

Example: Virtual Wallet Mobile App

Example: Virtual Wallet Mobile App

Example: Virtual Wallet Mobile App - History

Example: Virtual Wallet Mobile App - Snap Mode

Example: Virtual Wallet Mobile App - Snap Mode

Example: Virtual Wallet Mobile App - Snap Mode

Example: Virtual Wallet Mobile App - Snap Mode

Example: Virtual Wallet Mobile App - Snap Mode

Example: Virtual Wallet Mobile App - Offers

Example: Virtual Wallet Mobile App

Example: Virtual Wallet Mobile App

Example Data Flow: User Purchase Checkout

Example Logic Flow: User Purchase Checkout ("UPC") component 5600

Example Data Flow: Purchase Transaction Authorization

Example Data Flow: Purchase Transaction Authorization

Example: Purchase Transaction Authorization ("PTA") component 5800

Example: Purchase Transaction Authorization ("PTA") component 5800

Example Data Flow: Purchase Transaction Clearance

Example Data Flow: Purchase Transaction Clearance

Example Logic Flow: Purchase Transaction Clearance ("PTC") component 6000

Example Logic Flow: Purchase Transaction Clearance ("PTC") component 6000

UNIVERSAL ELECTRONIC PAYMENT APPARATUSES, METHODS AND SYSTEMS

PRIORITY CLAIM

This application is a National Stage Entry entitled to, and hereby claims priority under 35 U.S.C. §§ 365, 371 corresponding to, PCT application no. PCT/US12/26205, filed Feb. 22, 2012, entitled "UNIVERSAL ELECTRONIC PAYMENT APPARATUSES, METHODS AND SYSTEMS,", which in turn claims priority under 35 USC § 119 to: U.S. provisional patent application Ser. No. 61/445,482 filed Feb. 22, 2011, entitled "UNIVERSAL ELECTRONIC PAYMENT APPARATUSES, METHODS AND SYSTEMS," U.S. provisional patent application Ser. No. 61/545,971 filed Oct. 11, 2011, entitled "UNIVERSAL ELECTRONIC PAYMENT APPARATUSES, METHODS AND SYSTEMS," U.S. provisional patent application Ser. No. 61/473,728 filed Apr. 8, 2011, entitled "APPARATUSES, METHODS AND SYSTEMS FOR AN APPLICATION INTEGRATION PAYMENT PLATFORM," U.S. provisional patent application Ser. No. 61/466,409 filed Mar. 22, 2011, entitled "ELECTRONIC WALLET," U.S. provisional patent application Ser. No. 61/469,965 filed Mar. 31, 2011, entitled "APPARATUSES, METHODS AND SYSTEMS FOR A TARGETED ACCEPTANCE PLATFORM," U.S. provisional patent application Ser. No. 61/538,761 filed Sep. 23, 2011, entitled "ELECTRONIC WALLET TRANSACTION CONSUMER LEASH APPARATUSES, METHODS AND SYSTEMS," and U.S. provisional patent application Ser. No. 61/539,969 filed Sep. 27, 2011, entitled "APPARATUSES, METHODS, AND SYSTEMS FOR FINDING, STORING, AND APPLYING DISCOUNTS FOR USE IN AN ELECTRONIC TRANSACTION."

PCT application no. PCT/US12/26205 is also a continuation-in-part of, and claims priority under 35 U.S.C. §§ 120, 365 to: U.S. nonprovisional patent application Ser. No. 13/398,817 filed Feb. 16, 2012, entitled "SNAP MOBILE PAYMENT APPARATUSES, METHODS AND SYSTEMS," and U.S. nonprovisional patent application Ser. No. 13/348,634 filed Jan. 11, 2012, entitled "UNIVERSAL VALUE EXCHANGE APPARATUSES, METHODS AND SYSTEMS."

The entire contents of the aforementioned applications are expressly incorporated by reference herein.

This patent for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published patent a Office file/records, but otherwise reserve all rights.

FIELD

The present innovations generally address apparatuses, methods, and systems for electronic commerce, and more particularly, include UNIVERSAL ELECTRONIC PAYMENT APPARATUSES, METHODS AND SYSTEMS ("UEP").

BACKGROUND

Consumer transactions typically require a customer to select a product from a store shelf or website, and then to check the out at a checkout counter or webpage. Product information is selected from a webpage catalog or entered into a point-of-sale terminal, or the information is entered automatically by scanning an item barcode with an integrated barcode scanner at the point-of-sale terminal. The customer is usually provided with a number of payment options, such as cash, check, credit card a or debit card. Once payment is made and approved, the point-of-sale terminal memorializes the transaction in the merchant's computer system, and a receipt is generated indicating the satisfactory consummation of the transaction.

BRIEF DESCRIPTION OF THE DRAWINGS

The accompanying appendices and/or drawings illustrate various non-limiting, example, inventive aspects in accordance with the present disclosure.

The leading number of each reference number within the drawings indicates the figure in which that reference number is introduced and/or detailed. As such, a detailed discussion of reference number lot would be found and/or introduced in FIG. 1. Reference number 201 is introduced in FIG. 2, etc.

DETAILED DESCRIPTION

Universal Electronic Payment (UEP)

Figure 1:
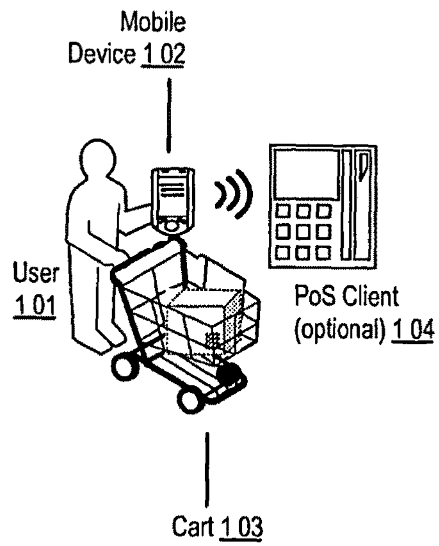
FIG. 1 shows a block diagram illustrating example aspects of virtual mobile wallet purchasing in some embodiments of the UEP.

The UNIVERSAL ELECTRONIC PAYMENT APPARATUSES, METHODS AND SYSTEMS (hereinafter "UEP") transform touchscreen inputs into a virtual wallet mobile application interface, via UEP components, into purchase transaction triggers and receipt notices. FIG. 1 shows a block diagram illustrating example aspects of virtual mobile wallet purchasing in some embodiments of the UEP. In some implementations, the UEP may facilitate use of a virtual wallet, e.g., too, for conducting purchase transactions. For example, a user lot may utilize a mobile device 102 (e.g., smartphone, tablet computer, etc.) to conduct a purchase transaction for contents of a cart 103 (e.g., physical cart at a brick-and-mortar store, virtual cart at an online shopping site), optionally at a point-of-sale (PoS) client 104 (e.g., legacy terminal at a brick-and-mortar store, computing device at an online shopping site, another user with a virtual wallet application, for person-to-person funds transfers, etc.). The user may be able to choose from one or more cards to utilize for a transactions, the cards chosen from a virtual wallet of cards stored within a virtual mobile wallet application executing on the mobile device. Upon selecting one or more of the card options, the mobile device may communicate (e.g., via one/two-way near-field communication [NFC], Bluetooth, Wi-Fi, cellular connection, creating and capturing images of QR codes, etc.) the card selection information to the PoS terminal for conducting the purchase transaction. In some embodiments, the mobile device may obtain a purchase receipt upon completion of authorization of the transaction. Various additional features may be provided to the user via the virtual mobile wallet application executing on the mobile device, as described further below in the discussion with reference to at least FIGS. 2-54.

Figure 2A:
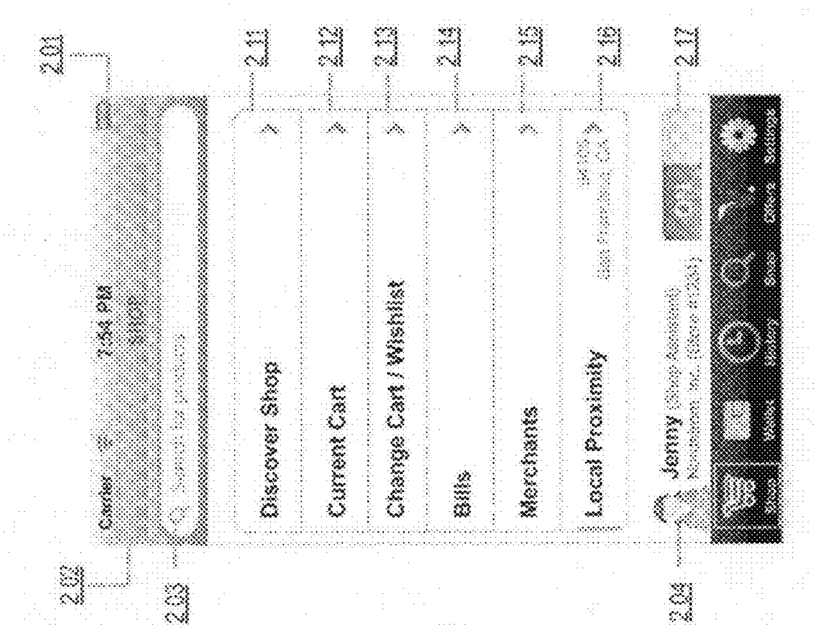
FIGS. 2A-B show user interface diagrams illustrating example aspects of a shopping mode of a virtual wallet application in some embodiments of the UEP.
Figure 2B:
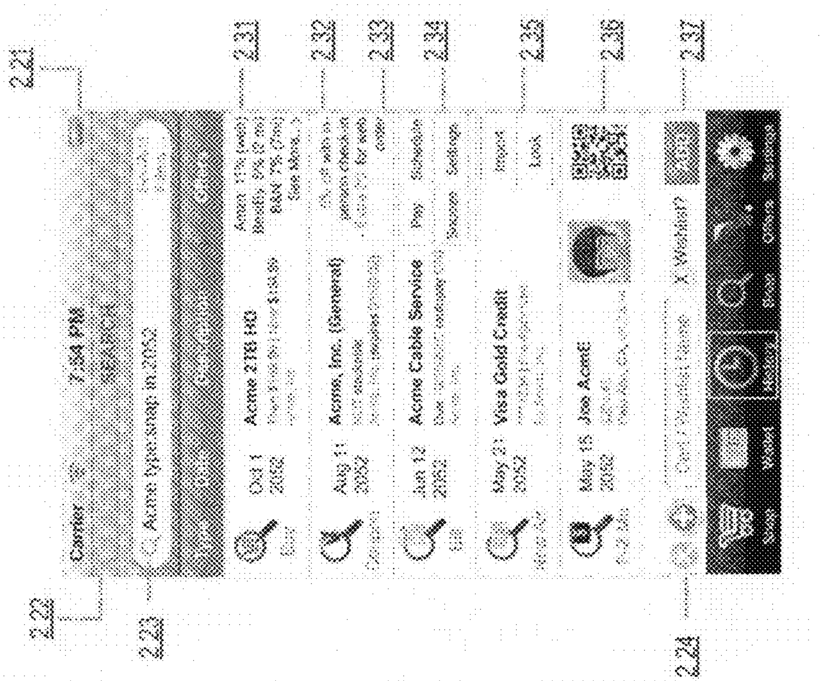

FIGS. 2A-B shows user interface diagrams illustrating example aspects of a shopping mode of a virtual wallet application in some embodiments of the UEP. With reference to FIG. 2A, in some embodiments, a user may utilize a virtual wallet application 201 to engage in purchase transactions. In various embodiments described herein, the virtual wallet application may provide numerous features to facilitate the user's shopping experience 202. For example, the virtual wallet application may allow a user to perform broad searches for products 203, as discussed further below in the discussion with reference to FIG. 2B.

In some implementations, the virtual wallet application may provide a 'discover shopping' mode 211. For example, the virtual wallet application executing on a user device may communicate with a server. The server may provide information to the virtual wallet on the consumer trends across a broad range of consumers in the aggregate. For example, the server may indicate what types of transactions consumers in the aggregate are engaging in, what they are buying, which reviews they pay attention to, and/or the like. In some implementations, the virtual wallet application may utilize such information to provide a graphical user interface to facilitate the user's navigation through such aggregate information, such as described in the discussion below with reference to FIGS. 3A-C. For example, such generation of aggregate information may be facilitate by the UEP's use of centralized personal information platform components described below in the discussion with reference to FIGS. 18-37.

In some implementations, the virtual wallet application may allow the user to simultaneously maintain a plurality of shopping carts, e.g., 212-213. Such carts may, in some implementation, be purely virtual carts for an online website, but in alternate implementations, may reflect the contents of a physical cart in a merchant store. In some implementations, the virtual wallet application may allow the user to specify a current cart to which items the user desires will be placed in by default, unless the user specifies otherwise. In some implementations, the virtual wallet application may allow the user to change the current cart (e.g., 213). In some implementations, the virtual wallet application may allow the user to create wishlists that may be published online or at social networks to spread to the user's friends. In some implementations, the virtual wallet application may allow the user to view, manage, and pay bills for the user, 214.

For example, the virtual wallet application may allow the user to import bills into the virtual wallet application interface by taking a snapshot of the bill, by entering information about the bill sufficient for the virtual wallet application to establish a communication with the merchant associated with the bill, etc.

In some implementations, the virtual wallet application may allow the user to shop within the inventories of merchants participating in the virtual wallet. For example, the inventories of the merchants may be provided within the virtual wallet application for the user to make purchases. In some implementations, the virtual wallet application may provide a virtual storefront for the user within the graphical user interface of the virtual wallet application. Thus, the user may be virtually injected into a store of the merchant participating in the UEP's virtual wallet application.

In some implementations, the virtual wallet application may utilize the location coordinates of the user device (e.g., via GPS, IP address, cellular tower triangulation, etc.) to identify merchants that are in the vicinity of the user's current location. In some implementations, the virtual wallet application may utilize such information to provide information to the user on the inventories of the merchants in the locality, and or may inject the merchant store virtually into the user's virtual wallet application.

In some implementations, the virtual wallet application may provide a shopping assistant 204. For example, a user may walk into a physical store of a merchant. The user may require assistance in the shopping experience. In some implementations, the virtual wallet application may allow the user to turn on the shop assistant (see 217), and a store executive in the merchant store may be able to assist the user via another device. In some embodiments, a user may enter into a store (e.g., a physical brick-and-mortar store, virtual online store [via a computing device], etc.) to engage in a shopping experience. The user may have a user device. The user device 102 may have executing thereon a virtual wallet mobile app, including features such as those as described herein. Upon entering the store, the user device may communicate with a store management server. For example, the user device may communicate geographical location coordinates, user login information and/or like check-in information to check in automatically into the store. In some embodiments, the UEP may inject the user into virtual wallet store upon check in. For example, the virtual wallet app executing on the user device may provide features as described below to augment the user's in-store shopping experience. In some embodiments, the store management server may inform a customer service representative ("CSR") of the user's arrival into the store. For example, the CSR may have a CSR device, and an app ("CSR app") may be executing thereon. For example, the app may include features such as described below in the discussion herein. The CSR app may inform the CSR of the user's entry, including providing information about the user's profile, such as the user's identity, user's prior and recent purchases, the user's spending patterns at the current and/or other merchants, and/or the like. In some embodiments, the store management server may have access to the user's prior purchasing behavior, the user's real-time in-store a behavior (e.g., which items' barcode did the user scan using the user device, how many times did the user scan the barcodes, did the user engage in comparison shopping by scanning barcodes of similar types of items, and/or the like), the user's spending patterns (e.g., resolved across time, merchants, stores, geographical locations, etc.), and/or like user profile information. The store management system may utilize this information to provide offers/coupons, recommendations and/or the like to the CSR and/or the user, via the CSR device and/or user device, respectively. In some embodiments, the CSR may assist the user in the shopping experience. For example, the CSR may convey offers, coupons, recommendations, price comparisons, and/or the like, and may perform actions on behalf of the user, such as adding/removing items to the user's physical/virtual cart, applying/removing coupons to the user's purchases, searching for offers, recommendations, providing store maps, or store 3D immersion views, and/or the like. In some embodiments, when the user is ready to checkout, the UEP may provide a checkout notification to the user's device and/or CSR device. The user may checkout using the user's virtual wallet app executing on the user device, or may utilize a communication mechanism (e.g., near field communication, card swipe, QR code scan, etc.) to provide payment information to the CSR device. Using the payment information, the UEP may initiate the purchase transaction(s) for the user, and provide an electronic receipt to the user device and/or CSR device. Using the electronic receipt, the user may exit the store with proof of purchase payment.

With reference to FIG. 2B, in some implementations, the virtual wallet application 221 may provide a broad range of search results 222 in response to a user providing search keywords and/or filters for a search query. For example, the in the illustration of FIG. 2B, a user searched for all items including "Acme" that were obtained by taking a snapshot of an item (as discussed further below in greater detail), and were dated in the year "2052" (see 223). In some implementations the search results may include historical transactions of the user 231, offers (235, for a new account, which the user can import into the virtual wallet application) and/or recommendations for the user based on the user's behavioral patterns, coupons 232, bills 234, discounts, person-2-person transfer requests 236, etc., or offers based on merchant inventory availability, and/or the like. For example, the search results may be organized according to a type, date, description, or offers. In some implementations, the descriptions may include listings of previous prior (e.g., at the time of prior purchase), a current price at the same location where it was previously bought, and/or other offers related to the item (see, e.g., 231). Some of the offerings may be stacked on top of each other, e.g., they may be applied to the same transaction. In some instances, such as, e.g., the payment of bills (see 234), the items may be paid for by an auto-pay system. In further implementations, the user may be have the ability to pay manually, or schedule payments, snooze a payment (e.g., have the payment alerts show up after a predetermined amount of time, with an additional interest charge provided to account for the delayed payment), and/or modify other settings (see 234). In some implementations, the user may add one or more of the items listed to a cart, 224, 237. For example, the user may add the items to the default current cart, or may enter the name of an alternate (or new cart/wishlist) to add the items, and submit the command by activating a graphical user interface ("GUI") element 237.

Figure 3A:
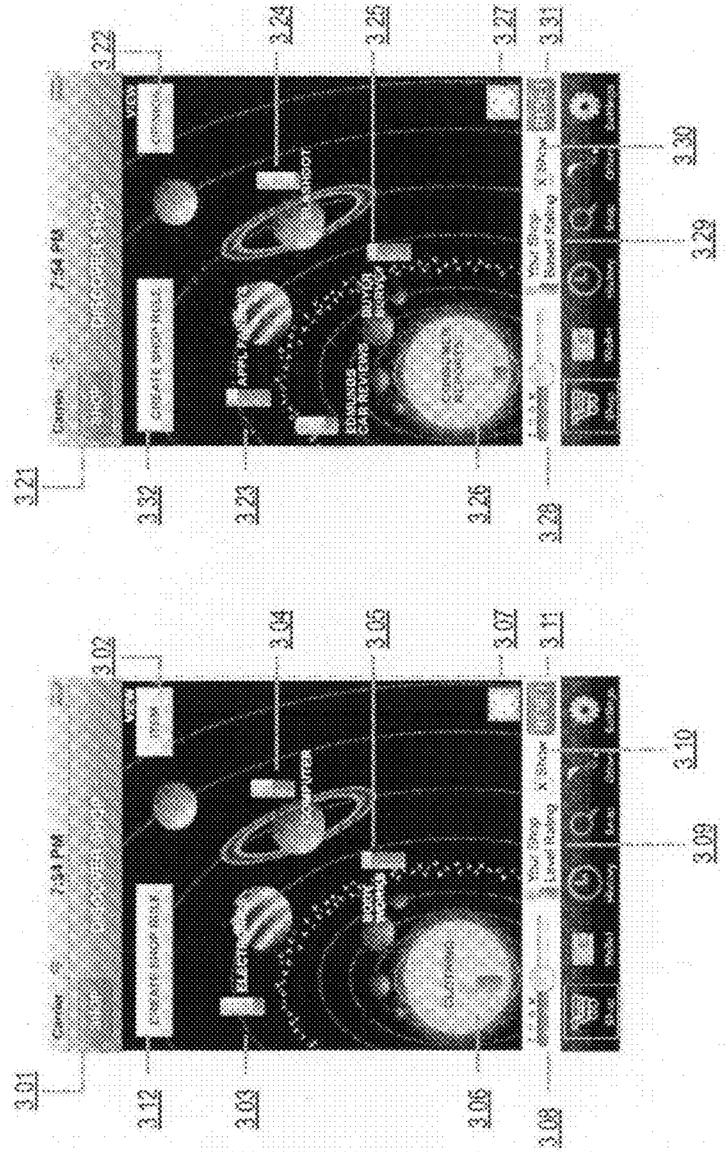
FIGS. 3A-C show user interface diagrams illustrating example aspects of a discovery shopping mode of a virtual wallet application in some embodiments of the UEP.
Figure 3B:
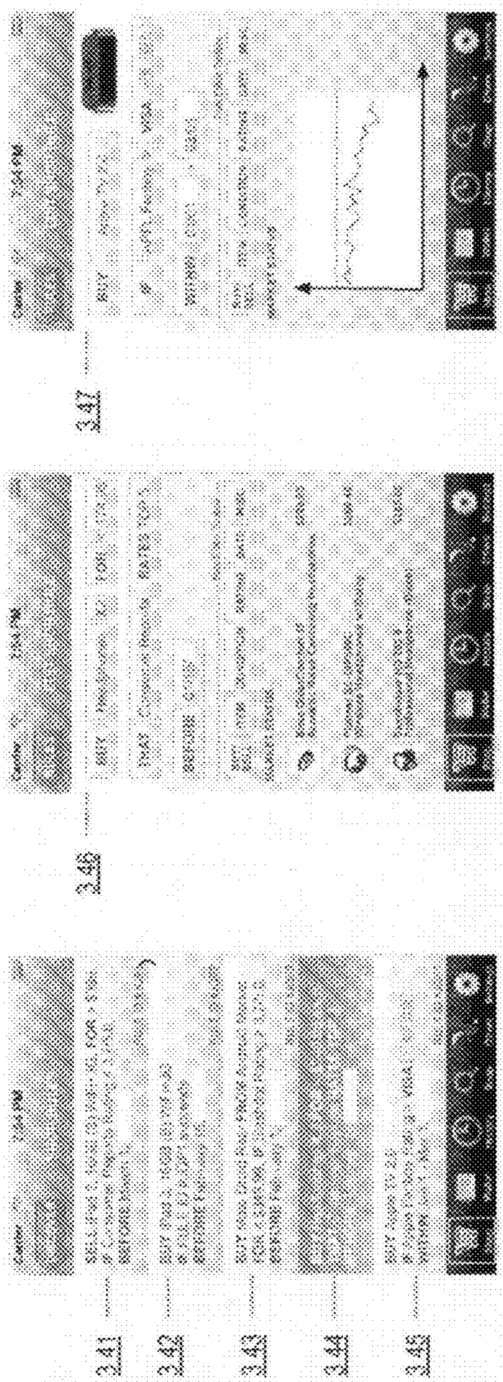
Figure 3C:
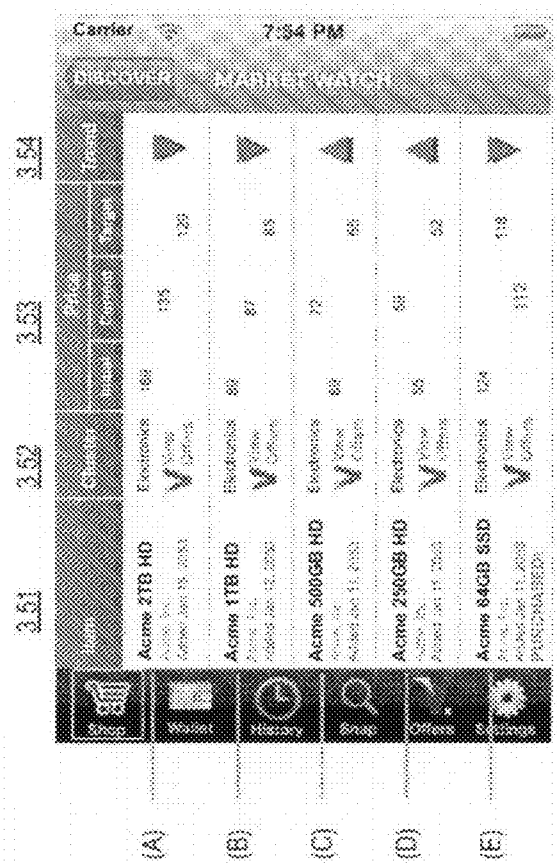

FIGS. 3A-C show user interface diagrams illustrating example aspects of a discovery shopping mode of a virtual wallet application in some embodiments of the UEP. In some embodiments, the virtual wallet application may provide a 'discovery a shopping' mode for the user. For example, the virtual wallet application may obtain information on aggregate purchasing behavior of a sample of a population relevant to the user, and may provide statistical/aggregate information on the purchasing behavior for the user as a guide to facilitate the user's shopping. For example, with reference to FIG. 3A, the discovery shopping mode 301 may provide a view of aggregate consumer behavior, divided based on product category (see 302). For example, the centralized personal information platform components described below in the discussion with reference to FIGS. 18-37 may facilitate providing such data for the virtual wallet application. Thus, the virtual wallet application may provide visualization of the magnitude of consumer expenditure in particular market segment, and generate visual depictions representative of those magnitudes of consumer expenditure (see 303-306). In some embodiments, the virtual wallet application may also provide an indicator (see 309) of the relative expenditure of the user of the virtual wallet application (see blue bars); thus the user may be able to visualize the differences between the user's purchasing behavior and consumer behavior in the aggregate. The user may be able to turn off the user's purchasing behavior indicator (see 310). In some embodiments, the virtual wallet application may allow the user to zoom in to and out of the visualization, so that the user may obtain a view with the appropriate amount of granularity as per the user's desire (see 307-308). At any time, the user may be able to reset the visualization to a default perspective (see 311).

Similarly, the discovery shopping mode 321 may provide a view of aggregate consumer response to opinions of experts, divided based on opinions of experts aggregated form across the web (see 302). For example, the centralized personal information platform components described below in the discussion with a reference to FIGS. 18-37 may facilitate providing such data for the virtual wallet application. Thus, the virtual wallet application may provide visualizations of how well consumers tend to agree with various expert opinion on various product categories, and whose opinions matter to consumers in the aggregate (see 323-326). In some embodiments, the virtual wallet application may also provide an indicator (see 329) of the relative expenditure of the user of the virtual wallet application (see blue bars); thus the user may be able to visualize the differences between the user's purchasing behavior and consumer behavior in the aggregate. The user may be able to turn off the user's purchasing behavior indicator (see 330). In some embodiments, the virtual wallet application may allow the user to zoom in to and out of the visualization, so that the user ie may obtain a view with the appropriate amount of granularity as per the user's desire (see 327-328). At any time, the user may be able to reset the visualization to a default perspective (see 331).

With reference to FIG. 3B, in some implementations, the virtual wallet application may allow users to create targeted shopping rules for purchasing (see FIG. 3A, 312, 322). For example, the user may utilize the consumer aggregate behavior and the expert opinion data to craft rules on when to initiate purchases automatically. As an example, rule 341 specifies that the virtual wallet should sell the users iPad2 if its consumer reports rating falls below 3.75/5.0, before March 1, provided a sale price of $399 can be obtained. As another example, rule 342 specifies that the virtual wallet should buy an iPad3 if rule 341 succeeds before February 15. As another example, rule 343 specifies that the wallet should buy a Moto Droid Razr from the Android Market for less than $349.99 if its Slashdot rating is greater than 3.75 before a February 1. Similarly, numerous rules with a wide variety of variations and dependencies may be generated for targeted shopping in the discovery mode. In some implementations, the virtual wallet user may allow the user to modify a rule. For example, the wallet may provide the user with an interface similar to 346 or 347. The user may utilize tools available in the rule editor toolbox to design the rule according to the user's desires. In some implementations, the wallet may also provide a market status for the items that are subject to the targeted shopping rules.

With reference to FIG. 3C, in some implementations, the virtual wallet application may provide a market watch feature, wherein the trends associated with items subject to targeted shopping rules may be tracked and visually represented for the user. For example, the visualization may take, in some implementations, the form of a ticker table, wherein against each item 351(A)-(E) are listed a product category or cluster of expert opinions to which the product is related 352, pricing indicators, including, but not limited to: price at the time of rule creation 352, price at the time of viewing the market watch screen 353, and a target price for the items (A)-(E). Based on the prices, the market watch screen may provide a trending symbol (e.g., up, down, no change, etc.) for each item that is subject to a targeted shopping rule. Where an item satisfied the targeted rule (see item (E)), the virtual wallet may automatically initiate a purchase transaction for that item once the target price is satisfied.

Figure 4A:
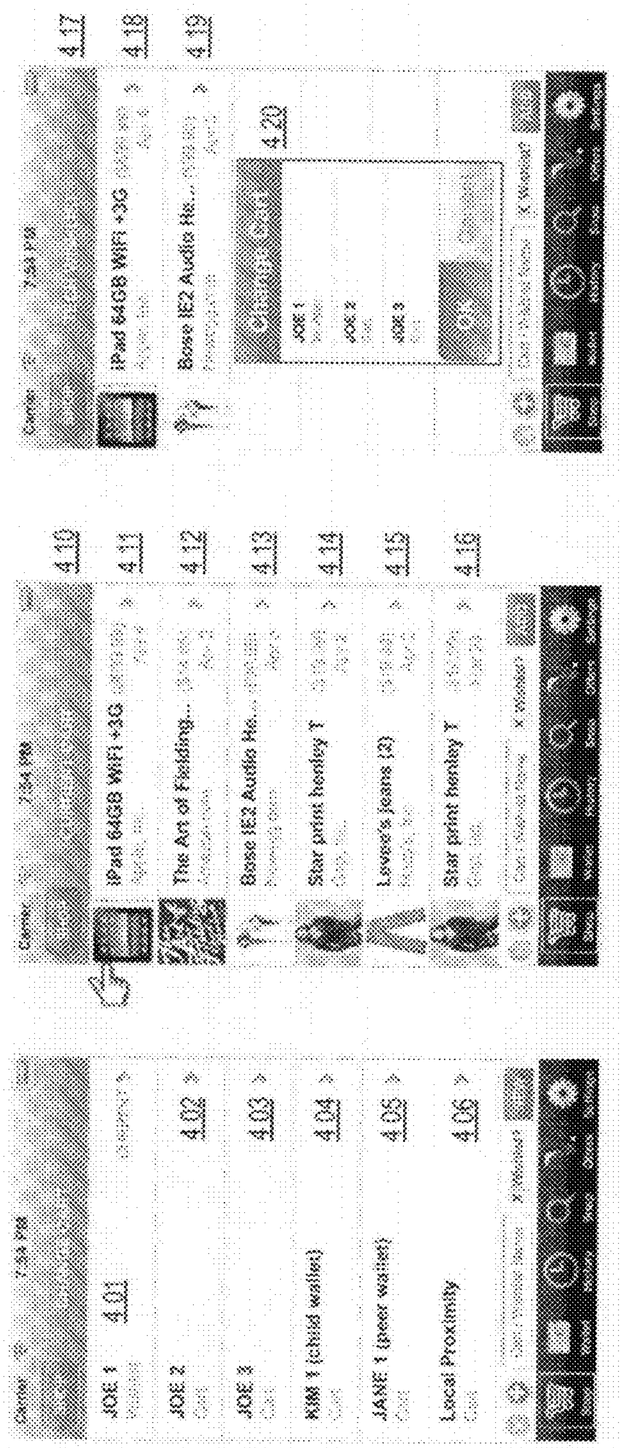
FIGS. 4A-B show user interface diagrams illustrating example aspects of a shopping cart mode of a virtual wallet application in some embodiments of the UEP.
Figure 4B:
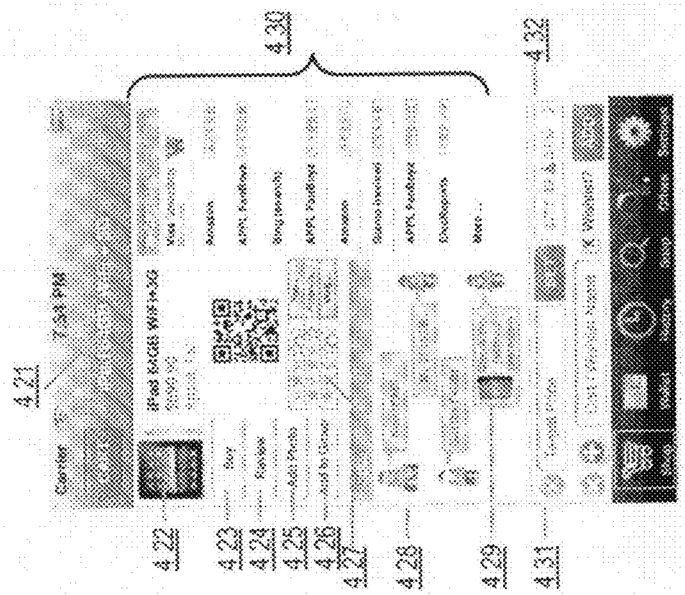

FIGS. 4A-B show user interface diagrams illustrating example aspects of a shopping cart mode of a virtual wallet application in some embodiments of the UEP. With reference to FIG. 4A, in some implementations, the virtual wallet application may be able to store, maintain and manage a plurality of shopping carts and/or wishlists (401-406) for a user. The carts may be purely virtual, or they may represent the a contents of a physical cart in a merchant store. The user may activate any of the carts listed to view the items currently stored in a cart (e.g., 410-416). In some implementations, the virtual wallet application may also provide wishlists, e.g., tech wishlist 417, with items that the user desires to be gifted (see 418-419). In some implementations, the virtual wallet may allow the user to quickly change carts or wishlists from another cart or wishlist, using a pop-up menu, e.g., 420.

With reference to FIG. 4B, in one implementation, the user may select a particular item to obtain a detailed view of the item, 421. For example, the user may view the details of the items associated with the transaction and the amount(s) of each item, the merchant, etc., 422. In various implementations, the user may be able to perform additional operations in this view. For example, the user may (re)buy the item 423, obtain third-party reviews of the item, and write reviews of the item 424, add a photo to the item so as to organize information related to the item along with the item 425, add the item to a group of related items (e.g., a household), 426, provide ratings 427, or view quick ratings from the user's friends or from the web at large. For example, such systems may be implemented using the example centralized personal information platform components described below in the discussion with reference to FIGS. 18-37. The user may add a photo to the transaction. In a further implementation, if the user previously shared the purchase via social channels, a post including the photo may be generated and sent to the social channels for publishing. In one implementation, any sharing may be optional, and the user, who did not share the purchase via social channels, may still share the photo through one or more social channels of his or her choice directly from the history mode of the wallet application. In another implementation, the user may add the transaction to a group such as company expense, home expense, travel expense or other categories set up by the user. Such grouping may facilitate year-end accounting of expenses, submission of work expense reports, submission for value added tax (VAT) refunds, personal expenses, and/or the like. In yet another implementation, the user may buy one or more items purchased in the transaction. The user may then execute a transaction without going to the merchant catalog or site to find the items. In a further implementation, the user may also cart one or more items in the transaction for later purchase.

The virtual wallet, in another embodiment, may offer facilities for obtaining and displaying ratings 427 of the items in the transaction. The source of the ratings may be the user, the user's friends (e.g., from social channels, contacts, etc.), reviews aggregated from the web, and/or the like. The user interface in some implementations may also allow the user to post messages to other users of social channels (e.g., TWITER or FACEBOOK). For example, the display area 428 shows FACEBOOK message exchanges between two users. In one implementation, a user may share a link via a message 429. Selection of such a message having embedded link to a product may allow the user to view a description of the product and/or purchase the product directly from the history mode.

In some implementations, the wallet application may display a shop trail for the user, e.g., 430. For example, a user may have reviewed a product at a number of websites (e.g., ElecReports, APPL FanBoys, Gizmo, Bing, Amazon, Visa Smartbuy feature (e.g., that checks various sources automatically for the best price available according to the user preferences, and provides the offer to the user), etc.), which may a have led the user to a final merchant website where the user finally bought the product. In some implementations, the UEP may identify the websites that the user visited, that contributed to the user deciding to buy the product, and may reward them with a share of the revenues obtained by the "point-of-sale" website for having contributed to the user going to the point-of-sale website and purchasing the product there. For example, the websites may have agreements with product manufacturers, wholesalers, retail outlets, payment service providers, payment networks, amongst themselves, and/or the like with regard to product placement, advertising, user redirection and/or the like. Accordingly, the UEP may calculate a revenue share for each of the websites in the user's shopping trail using a revenue sharing model, and provide revenue sharing for the websites.

In some implementations, the virtual wallet may provide a SmartBuy targeted shopping feature. For example, the user may set a target price 431 for the product 422 that the user wishes to buy. The virtual wallet may provide a real-time market watch status update 432 for the product. When the market price available for the user falls below the user's target price 431, the virtual wallet may automatically buy the product for the user, and provide a shipment/notification to the user.

Figure 5:
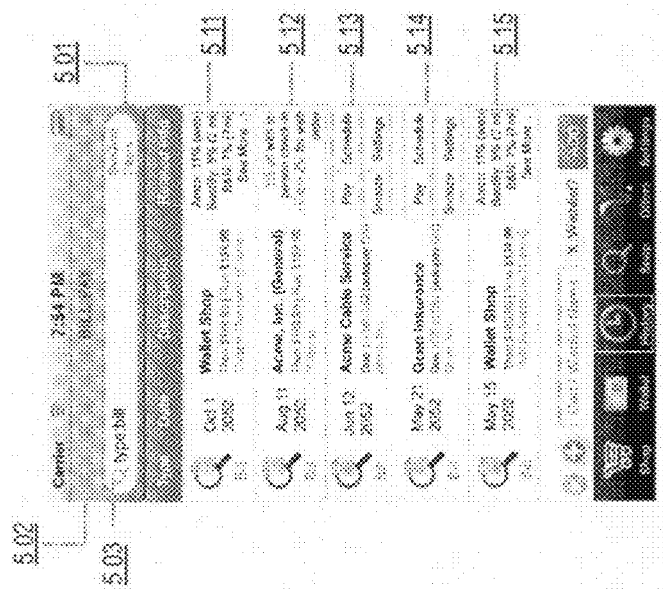
FIG. 5 shows a user interface diagram illustrating example aspects of a bill payment mode of a virtual wallet application in some embodiments of the UEP.

FIG. 5 shows a user interface diagram illustrating example aspects of a bill payment mode of a virtual wallet application in some embodiments of the UEP. In some implementations, the virtual wallet application may provide a list of search results for bills 501-503 in response to a user activating element 214 in FIG. 2A. In some implementations the search results may include historical billing transactions of the a user, as well as upcoming bills (e.g., 511-515). For example, the search results may be organized according to a type, date, description. In some implementations, the descriptions may include listings of previous prior (e.g., at the time of prior purchase), a current price at the same location where it was previously bought, and/or other offers related to the item (see, e.g., 511). In some instances, such as, e.g., the payment of bills (see 514), the items may be paid for by an auto-pay system. In further implementations, the user may be have the ability to pay manually, or schedule payments, snooze a payment (e.g., have the payment alerts show up after a predetermined amount of time, with an additional interest charge provided to account for the delayed payment), and/or modify other settings (see 514).

Figure 6A:
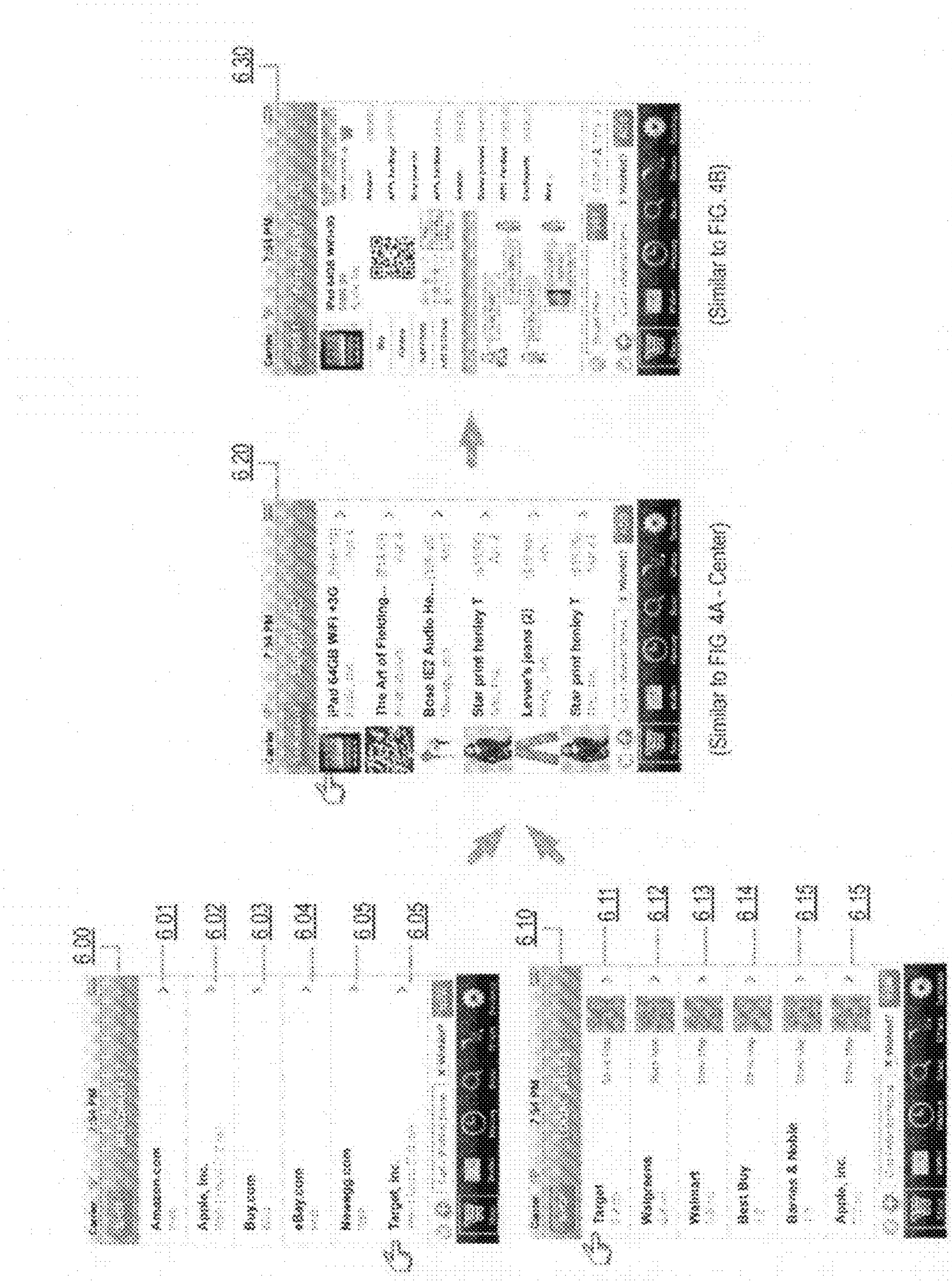
FIGS. 6A-B show user interface diagrams illustrating example aspects of a (local proximity) merchant shopping mode of a virtual wallet application in some embodiments of the UEP.
Figure 6B:
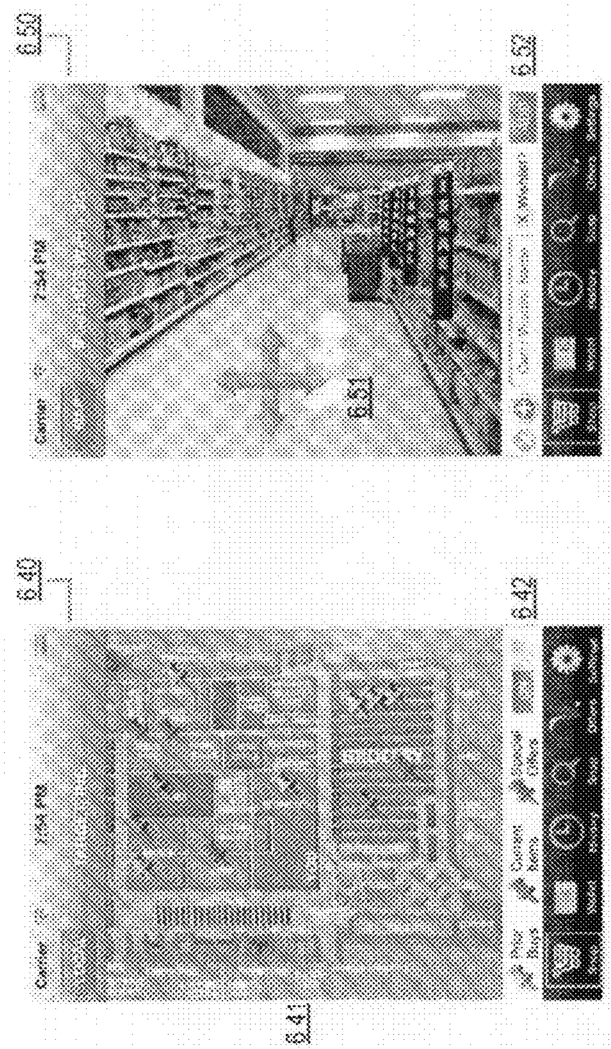

FIGS. 6A-B show user interface diagrams illustrating example aspects of a (local proximity) merchant shopping mode of a virtual wallet application in some embodiments of the UEP. In some implementations, upon activating elements 215 of in FIG. 2A, the virtual wallet application may presents screens 600 and 610, respectively, as depicted in FIG. 6A. In FIG. 6, 600, the virtual wallet application displays a list of merchants participating in the virtual wallet of the UEP, e.g., 601-605. Similarly, in FIG. 6A, 610, the virtual wallet application displays a list of merchants participating in the virtual wallet of the UEP and at or nearby the approximate location of the user the user. The user may click on any of the merchants listed in the two screens 600 and 610, to be injected into the store inventory of the merchant. Upon injection, the user may be presented with a screen such as 620, which is similar to the screen discussed above in the description with reference to FIG. 4A (center). Also, in some implementation, if a user clicks on any of the items listed on a screen 620, the user may be taken to a screen 630, similar to the screen discussed above in the description with reference to FIG. 4B. With reference to FIG. 6B, in some embodiments, the user may be injected into a virtual reality 2D/3D storefront of the merchant. For example, the user may be presented with a plan map view of the store 641. In some map views, the user may provided with the user's location (e.g., using GPS, or if not available, then using a coarse approximation using a cellular signal). In some implementations, the locations of the user's prior and current purchases may be provided for the user, if the user wishes (see 642, the user can turn the indications off, in some implementations). In some implementations, the user may be provided with a 3D aisle view of an aisle within the virtual storefront. The user may point the view direction at any of the objects to obtain virtual tools to obtain items from off the "virtual shelf," and place them in the user's virtual cart. The screen at 650 shows an augmented reality view of an aisle, where user may see pins of items suggested by a concierge, or that were bookmarked in their cart/wishlist highlighted through a live video view 65X. In another view, a virtual store aisle view (e.g., akin to a Google map Street View) may be navigated when the consumer is not at the store, but would like to look for product; the directional control 651 allows for navigation up and down the aisle, and rotation and views of items at the merchant location. Additionally, consumers may tap items in the shelves and create a new product pin, which may then be added 652 to a cart or wishlist for further transacting.

Figure 7:
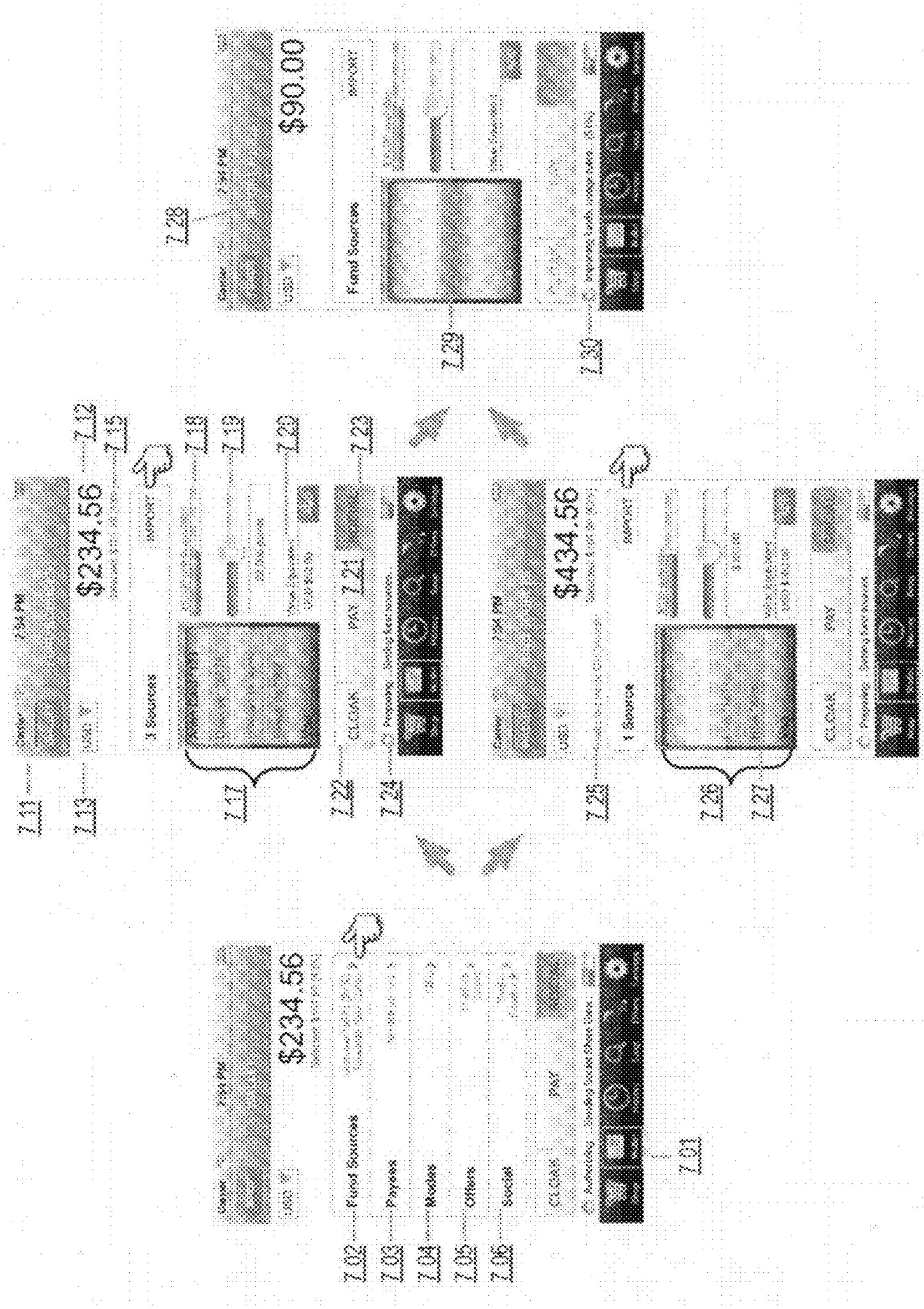
FIG. 7 shows user interface diagrams illustrating example aspects of allocating funds for a purchase payment within a virtual wallet application in some embodiments of the UEP.

FIG. 7 shows user interface diagrams illustrating example aspects of allocating funds for a purchase payment within a virtual wallet application in some embodiments of the UEP. In one embodiment, the wallet mobile application may provide a user with a number of options for paying for a transaction via the wallet mode 701. The wallet mode may facilitate a user to set preferences for a payment transaction, g including settings funds sources 702, payee 703, transaction modes 704, applying real-time offers to the transaction 705, and publishing the transaction details socially 706, as described in further detail below.

In one implementation, an example user interface 711 for making a payment is shown. The user interface may clearly identify the amount 712 and the currency 713 for the transaction. The amount may be the amount payable and the is currency may include real currencies such as dollars and euros, as well as virtual currencies such as reward points. The user may select the funds tab 702 to select one or more forms of payment 717, which may include various credit, debit, gift, rewards and/or prepaid cards. The user may also have the option of paying, wholly or in part, with reward points. For example, the graphical indicator 718 on the user interface shows the number of points available, the graphical indicator 719 shows the number of points to be used towards the amount due 234.56 and the equivalent 720 of the number of points in a selected currency (USD, for example).

In one implementation, the user may combine funds from multiple sources to pay for the transaction. The amount 715 displayed on the user interface may provide an indication of the amount of total funds covered so far by the selected forms of payment (e.g., Discover card and rewards points). The user may choose another form of payment or adjust the amount to be debited from one or more forms of payment until the amount 715 matches the amount payable 714. Once the amounts to be debited from one or more forms of payment are finalized by the user, payment authorization may a begin.

In one implementation, the user may select a secure authorization of the transaction by selecting the cloak button 722 to effectively cloak or anonymize some (e.g., pre-configured) or all identifying information such that when the user selects pay button 721, the transaction authorization is conducted in a secure and anonymous manner. In another implementation, the user may select the pay button 721 which may use standard authorization techniques for transaction processing. In yet another implementation, when the user selects the social button 723, a message regarding the transaction may be communicated to one of more social networks (set up by the user), which may post or announce the purchase transaction in a social forum such as a wall post or a tweet. In one implementation, the user may select a social payment processing option 723. The indicator 724 may show the authorizing and sending social share data in progress.

In another implementation, a restricted payment mode 725 may be activated for certain purchase activities such as prescription purchases. The mode may be activated in accordance with rules defined by issuers, insurers, merchants, payment processor and/or other entities to facilitate processing of specialized goods and services. In this mode, the user may scroll down the list of forms of payments 726 under the funds tab to select specialized accounts such as a flexible spending account (FSA), health savings account (HAS) 727, and/or the like and amounts to be debited to the selected accounts. In one implementation, such restricted payment mode 725 processing may disable social sharing of purchase information.

In one embodiment, the wallet mobile application may facilitate importing a of funds via the import funds user interface 728. For example, a user who is unemployed may obtain unemployment benefit fund 729 via the wallet mobile application. In one implementation, the entity providing the funds may also configure rules for using the fund as shown by the processing indicator message 730. The wallet may read and apply the rules prior, and may reject any purchases with the unemployment funds that fail to meet the criteria set by the rules. Example criteria may include, for example, merchant category code (MCC), time of transaction, location of transaction, and/or the like. As an example, a transaction with a grocery merchant having MCC 5411 may be approved, while a transaction with a bar merchant having an MCC 5813 may be refused.

Figure 8:
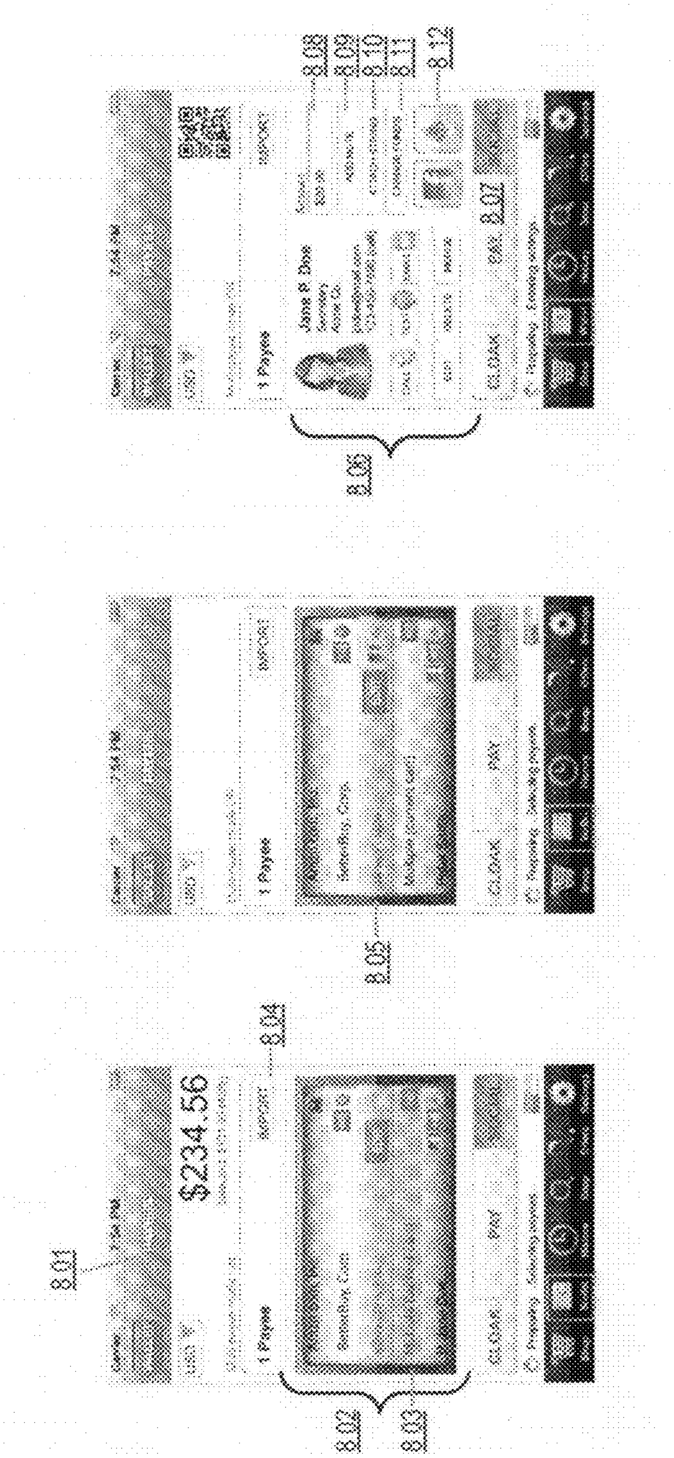
FIG. 8 shows user interface diagrams illustrating example aspects of selecting payees for funds transfers within a virtual wallet application in some embodiments of the UEP.

FIG. 8 shows user interface diagrams illustrating example aspects of selecting payees for funds transfers within a virtual wallet application in some embodiments of the UEP. In one embodiment, the payee screen 801 in the wallet mobile application user interface may facilitate user selection of one or more payees receiving the funds selected in the funds tab. In one implementation, the user interface may show a list of all payees 802 with whom the user has previously transacted or available to transact. The user may then select one or more payees, 803. For example, a selection may include a multiple-merchant entry—this may be the case when a user is paying for products in a cart, wherein the products themselves are from multiple merchants. In another example, the user may be paying for the products placed in a plurality of cart, each cart including products from one or more merchants. The payees 803 may include larger merchants such as Amazon.com Inc., and individuals such as Jane P. Doe. Next to each payee name, a list of accepted payment modes for the payee may be displayed. In some implementations, the user may import 804 additional names into the address a book included within the user interface 802.

In one implementation, the user may select the payee Jane P. Doe 805 for receiving payment. Upon selection, the user interface may display additional identifying information 806 relating to the payee. The user interface may allow the user to contact the payee (e.g., call, text, email), modify the entry of the payee in the address book (e.g., edit, delete, merge with another contact), or make a payment to the payee 807. For example, the user can enter an amount 808 to be paid to the payee. The user can include a note for the payee (or for the user herelf) related to the payment, 809. The user can also include strings attached to the payment. For example, the user can provide that the payment processing should occur only if the payee re-posts the user's note on a social networking site, 810. The user can, at any time, modify the funding sources to utilize in the payment, 811. Also, the user can utilize a number of different payment modes for each user, 812. For example, additional modes such as those described in the discussion with reference to FIG. 9B may be used for the person-to-person payment. For example, a social payment mechanism may be employed for the person-to-person payment. Additional description on the social payment mechanism may be found in the discussion with reference to FIGS. 40-47 and 49D. As another example, person-to-person payment may be made via a snap mobile mechanism, as described further below in the discussion with reference to FIG. 12A.

Figure 9A:
FIGS. 9A-B show user interface diagrams illustrating example additional aspects of the virtual wallet application in some embodiments of the UEP.
Figure 9B:
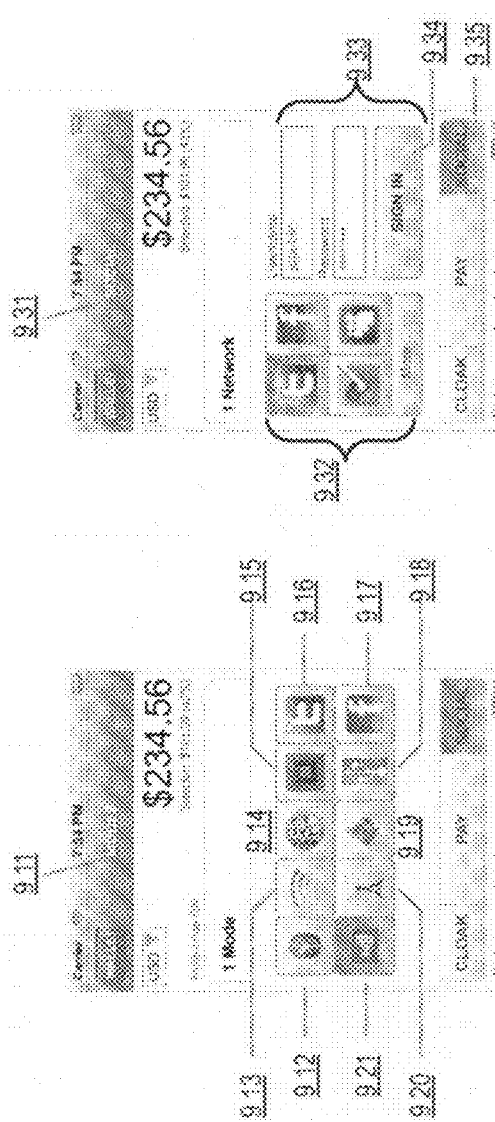

FIGS. 9A-B show user interface diagrams illustrating example additional aspects of the virtual wallet application in some embodiments of the UEP. With reference to FIG. 9A, in some implementations, an offers screen 901 may provide real-time offers that are relevant to items in a user's cart for selection by the user. The user may select one or more offers (see 902) from the list of applicable offers a 903 for redemption. In one implementation, some offers may be combined (see, e.g., 904), while others may not (optionally). When the user selects an offer that may not be combined with another offer, the unselected offers may be disabled. In a further implementation, offers that are recommended by the wallet application's recommendation engine may be identified by an indicator, such as the one shown by 905. An example offer recommendation engine is described further below in the discussion with reference to FIG. 39. In a further implementation, the user may read the details of the offer by expanding the offer row as shown by 905 in the user interface. The user may refresh offers displayed in the real-time offers screen at any time (see 906).

With reference to FIG. 9B, in some implementations, the mode tab 911 may facilitate selection of a payment mode accepted by the payee. A number of payment modes may be available for selection. Example modes include, Bluetooth 912, wireless 913, snap mobile by user-obtained QR code 914, secure chip 915, TWITTER 916, near-field communication (NFC) 921, cellular 920, snap mobile by user-provided QR code 919, USB 918 and FACEBOOK 917, among others. In one implementation, only the payment modes that are accepted by the payee may be selectable by the user. Other non-accepted payment modes may be disabled.

In one embodiment, the social tab 931 may facilitate integration of the wallet application with social channels 932. In one implementation, a user may select one or more social channels 932 and may sign in to the selected social channel from the wallet application by providing to the wallet application the social channel user name and password 933 and signing in 934. The user may then use the social button 935 to a send or receive money through the integrated social channels. In a further implementation, the user may send social share data such as purchase information or links through integrated social channels. In another embodiment, the user supplied login credentials may allow UEP to engage in interception parsing.

Figure 10A:
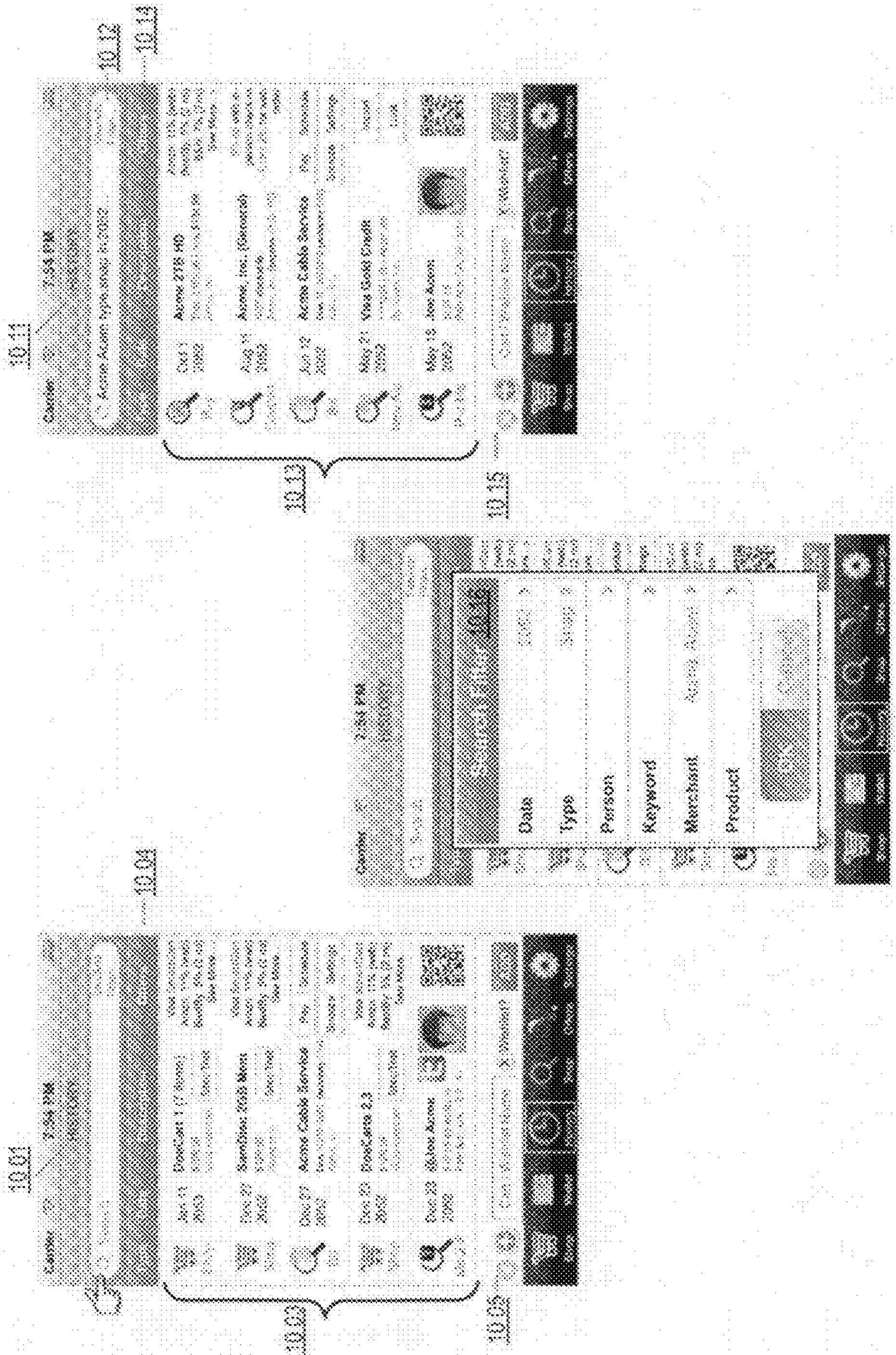
FIGS. 10A-B show user interface diagrams illustrating example aspects of a history mode of a virtual wallet application in some embodiments of the UEP.
Figure 10B:
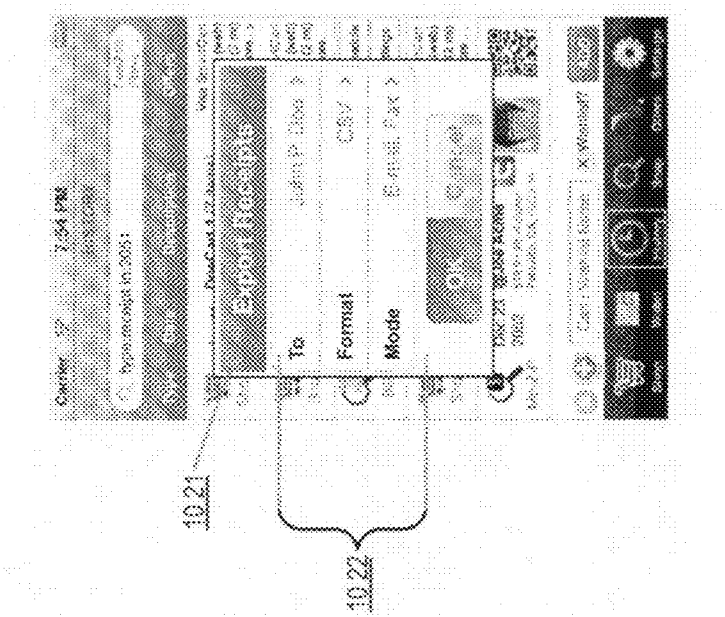

FIGS. 10A-B show user interface diagrams illustrating example aspects of a history mode of a virtual wallet application in some embodiments of the UEP. With reference to FIG. 10A, in one embodiment, a user may select the history mode tool to view a history of prior purchases and perform various actions on those prior purchases. The wallet application may query the storage areas in the mobile device or elsewhere (e.g., one or more databases and/or tables remote from the mobile device) for prior transactions. The user interface may then display the results of the query such as transactions 1003. The user interface may identify 1004: a type of the transaction (e.g., previously shopped for items, bills that have been captured by camera in a snap mode, a person-to-person transfer [e.g., via social payment mechanism as described below in the discussion with reference to FIGS. 40-47], etc.); the date of the transaction; a description of the transaction, including but not limited to: a cart name, cart contents indicator, total cost, merchant(s) involved in the transaction; a link to obtain a shoptrail (explained further below in greater detail), offers relating to the transaction, and any other relevant information. In some implementation, any displayed transaction, coupon, bill, etc. may be added to a cart for (re)purchase, 1005.

In one embodiment, a user may select the history mode 1011 to view a history of filtered prior purchases and perform various actions on those prior purchases. For example, a user may enter a merchant identifying information such as name, a product, MCC, and/or the like in the search bar 1012. In another implementation, the user may use voice activated search feature to search the history. In another implementations, the wallet application may display a pop up screen 1016, in which the user may enter advanced search filters, keywords, and/or the like. The wallet application may query the storage areas in the mobile device or elsewhere (e.g., one or more databases and/or tables remote from the mobile device) for transactions matching the search keywords. The user interface may then display the results of the query such as transactions 1003. The user interface may identify 1014: a type of the transaction (e.g., previously shopped for items, bills that have been captured by camera in a snap mode, a person-to-person transfer [e.g., via social payment mechanism as described below in the discussion with reference to FIGS. 40-47], etc.); the date of the transaction; a description of the transaction, including but not limited to: a cart name, cart contents indicator, total cost, merchant(s) involved in the transaction; a link to obtain a shoptrail (explained further below in greater detail), offers relating to the transaction, and any other relevant information. In some implementation, any displayed transaction, coupon, bill, etc. may be added to a cart for (re)purchase, 1015.

With reference to FIG. 10B, in one embodiment, the history mode may also include facilities for exporting receipts. The export receipts pop up 1021 may provide a number of options for exporting the receipts of transactions in the history. For example, a user may use one or more of the options 1022, which include save (to local mobile memory, to server, to a cloud account, and/or the like), print to a printer, fax, email, and/or the like. The user may utilize his or her address book to look up email or fax number for exporting. The user may also specify format options for exporting a receipts. Example format options may include, without limitation, text files (.doc, .txt, .rtf, iif, etc.), spreadsheet (.csv, .xls, etc.), image files (.jpg, .tff, .png, etc.), portable document format (.pdf), postscript (.ps), and/or the like. The user may then click or tap the export button to initiate export of receipts.

Figure 11A:
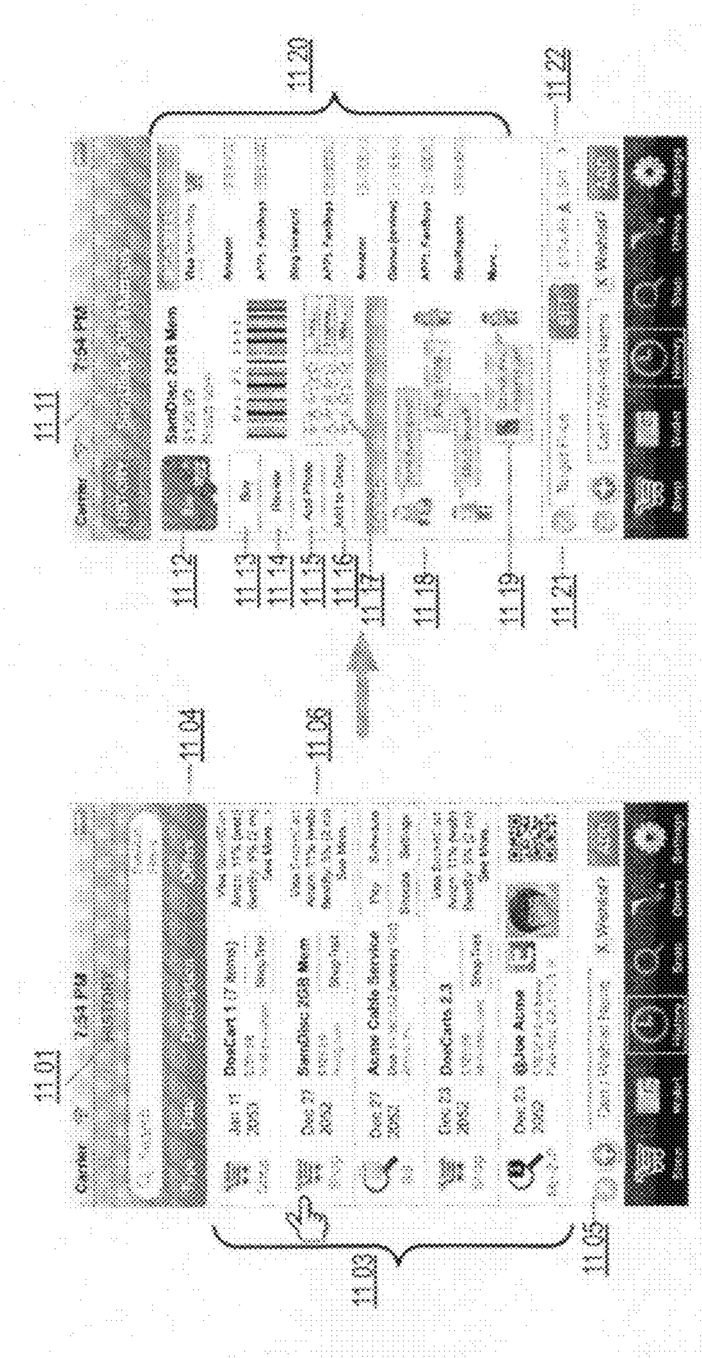
FIGS. 11A-C show user interface and logic flow diagrams illustrating example aspects of creating a user shopping trail within a virtual wallet application and associated revenue sharing scheme in some embodiments of the UEP.
Figure 11B:
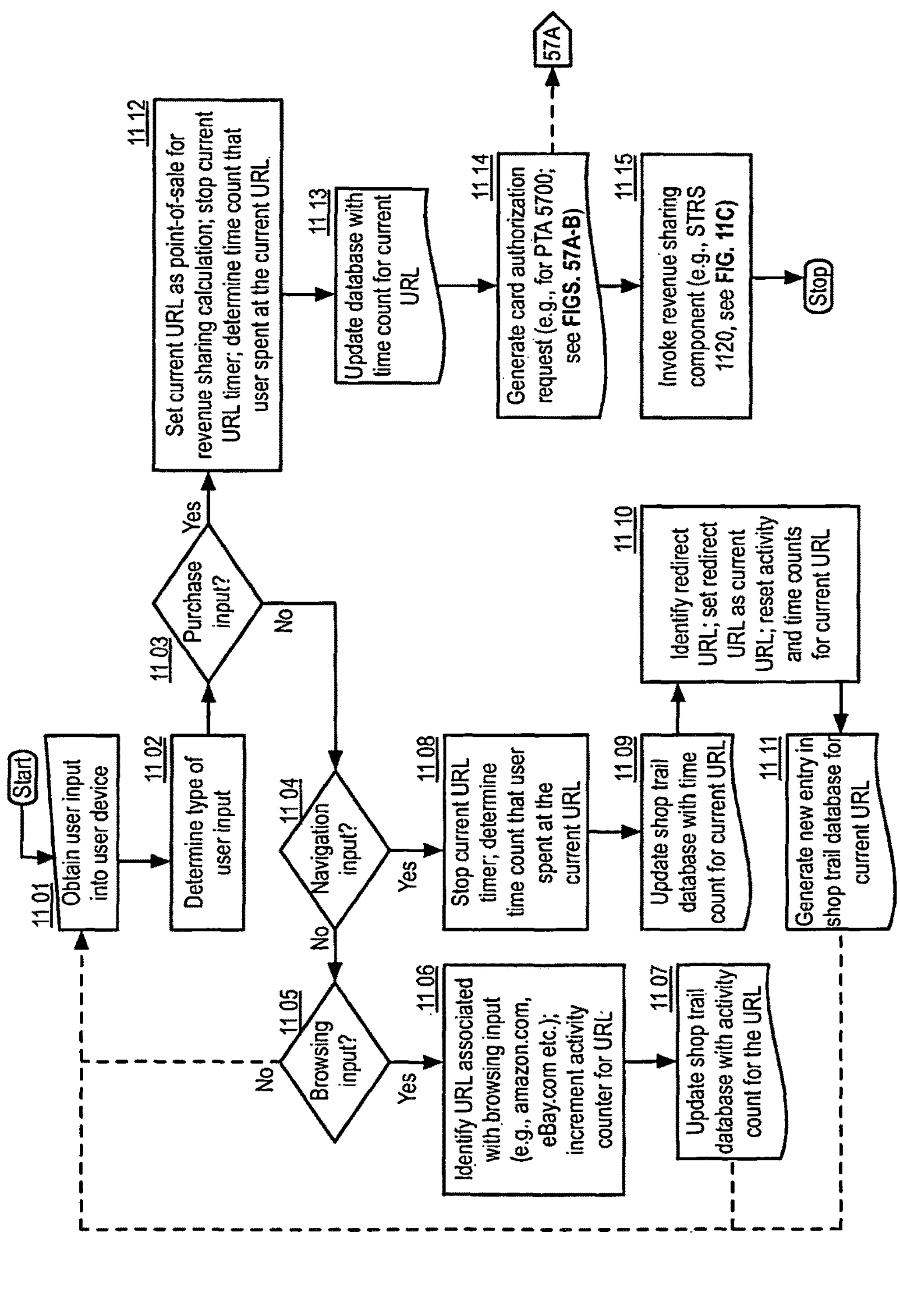
Figure 11C:
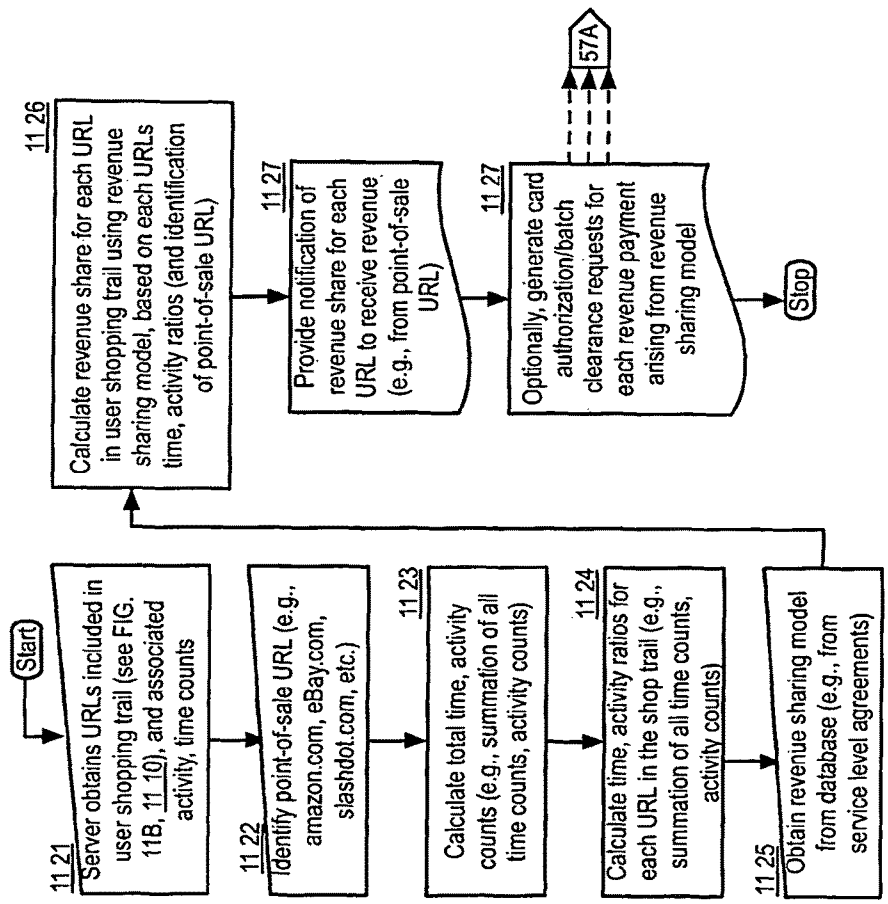

FIGS. 11A-C show user interface and logic flow diagrams illustrating example aspects of creating a user shopping trail within a virtual wallet application and associated revenue sharing scheme in some embodiments of the UEP. With reference to FIG. 11A, in some implementations, a user may select the history mode 1101 to view a history of prior purchases and perform various actions on those prior purchases. The wallet application may query the storage areas in the mobile device or elsewhere (e.g., one or more databases and/or tables remote from the mobile device) for prior transactions. The user interface may then display the results of the query such as transactions 1103. The user interface may identify 1104: a type of the transaction (e.g., previously shopped for items, bills that have been captured by camera in a snap mode, a person-to-person transfer [e.g., via social payment mechanism as described below in the discussion with reference to FIGS. 40-47], etc.); the date of the transaction; a description of the transaction, including but not limited to: a cart name, cart contents indicator, total cost, merchant(s) involved in the transaction; a link to obtain a shoptrail (explained further below in greater detail), offers relating to the transaction, and any other relevant information. In some implementation, any displayed transaction, coupon, bill, etc. may be added to a cart for (re)purchase, 1105.

In one implementation, the user may select a transaction, for example transaction 1106, to view the details of the transaction. For example, the user may view the details of the items associated with the transaction and the amount(s) of each item, the merchant, etc., 1112. In various implementations, the user may be able to perform additional operations in this view. For example, the user may (re)buy the item 1113, obtain third-party reviews of the item, and write reviews of the item 1114, add a photo to the item so as to organize information related to the item along with the item 1115, add the item to a group of related items (e.g., a household), provide ratings 1117, or view quick ratings from the user's friends or from the web at large. For example, such systems may be implemented using the example centralized personal information platform components described below in the discussion with reference to FIGS. 18-37. The user may add a photo to the transaction. In a further implementation, if the user previously shared the purchase via social channels, a post including the photo may be generated and sent to the social channels for publishing. In one implementation, any sharing may be optional, and the user, who did not share the purchase via social channels, may still share the photo through one or more social channels of his or her choice directly from the history mode of the wallet application. In another implementation, the user may add the transaction to a group such as company expense, home expense, travel expense or other categories set up by the user. Such grouping may facilitate year-end accounting of expenses, submission of work expense reports, submission for value added tax (VAT) refunds, personal expenses, and/or the like. In yet another implementation, the user may buy one or more items purchased in the transaction. The user may then execute a transaction without going to the merchant catalog or site to find the items. In a further implementation, the user may also cart one or more items in the transaction for later purchase.

The history mode, in another embodiment, may offer facilities for obtaining and displaying ratings 1117 of the items in the transaction. The source of the ratings may be the user, the user's friends (e.g., from social channels, contacts, etc.), reviews aggregated from the web, and/or the like. The user interface in some implementations may also allow the user to post messages to other users of social channels (e.g., TWITER or FACEBOOK). For example, the display area 1118 shows FACEBOOK message exchanges between two users. In one implementation, a user may share a link via a message 1119. Selection of such a message having embedded link to a product may allow the user to view a description of the product and/or purchase the product directly from the history mode.

In some implementations, the wallet application may display a shop trail for the user, e.g., 1120. For example, a user may have reviewed a product at a number of websites (e.g., ElecReports, APPL FanBoys, Gizmo, Bing, Amazon, Visa Smartbuy feature (e.g., that checks various sources automatically for the best price available according to the user preferences, and provides the offer to the user), etc.), which may have led the user to a final merchant website where the user finally bought the product. In some implementations, the UEP may identify the websites that the user visited, that contributed to the user deciding to buy the product, and may reward them with a share of the revenues obtained by the "point-of-sale" website for having contributed to the user going to the point-of-sale website and purchasing the product there. For example, the websites may have agreements with product manufacturers, wholesalers, retail outlets, payment service providers, payment networks, amongst themselves, and/or the like with regard to product placement, advertising, user redirection and/or the like. Accordingly, the UEP may calculate a revenue share for each of the websites in the user's shopping trail using a revenue sharing model, and provide revenue sharing for the a websites.

In some implementations, the virtual wallet may provide a SmartBuy targeted shopping feature. For example, the user may set a target price 1121 for the product 1112 that the user wishes to buy. The virtual wallet may provide a real-time market watch status update 1122 for the product. When the market price available for the user falls below the user's target price 1121, the virtual wallet may automatically buy the product for the user, and provide a shipment/notification to the user.

FIG. 11B shows a logic flow diagram illustrating example aspects of generating a virtual wallet user shopping trail in some embodiments of the UEP, e.g., a User Shopping Trail Generation ("USTG") component 1100. In some implementations, a user device of a user, executing a virtual wallet application for the user, may track the shopping activities of a user for later retrieval and/or analysis. The device may obtain a user's input, 1101, and determine a type of user input, 1102. If the user engages in either browsing activity at a website of a merchant, or is navigating between websites (e.g., sometime when 1103, option "No"), the device may track such activities. For example, the device may determine that the user's input is a navigational input (1104, option "Yes"). The device may stop a timer associated with the current URL (e.g., of a merchant such as amazon.com, ebay.com, newegg.com, etc., or a review website such as shlashdot.org, cnet.com, etc.) that the user is located at, and determine a time count that the user spent at the URL, 1108. The device may update a shop trail database (e.g., a local database, a cloud database, etc.) with the time count for the current URL, 1109. The device may also identify a redirect URL to which the user will be navigating as a result of the user's navigation input, 1110. The device may set the redict URL as the a current URL, and reset activity and time counters for the current URL. The device may generate a new entry in the shop trail database for the URL that has been made current by the user's navigational input, 1111.

If the user engaged in browsing activity at a current URL (1105, option "Yes"), the device may identify the URL associated with the browsing activity (e.g., if the browsing can be performed on the device across multiple windows or tabs, etc.). The device may increment an activity counter to determine a level of user activity of the user at the URL where the browsing activity is occurring, 1106. The device may update the shop trail database with the activity count for the URL, 1107.

If the user desires to engage in a purchase transaction, e.g., after visiting a number of URLs about the product (e.g., after reading reviews about a product at a number of consumer report websites, the user navigates to amazon.com to buy the product), see 1103, option "Yes," the device may set the current URL as the "point-of-sale" URL (e.g., the merchant at which the user finally bought the product—e.g., amazon.com), 1112. The device may stop the time for the current URL, and update the shop trail database for the current URL, 1113. The device may generate a card authorization request to initiate the purchase transaction, 1114, and provide the card authorization request for transaction processing (see, e.g., PTA 5700 component described below in the discussion with reference to FIG. 57A-B).

In some implementations, the device may also invoke a revenue sharing component, such as the example STRS 1120 component described below in the discussion with reference to FIG. 11C.

FIG. 11C shows a logic flow diagram illustrating example aspects of a implementing a user shopping trail-based revenue sharing model in some embodiments of the UEP, e.g., a Shopping Trail Revenue Sharing ("STRS") component 1120. In some implementations, a user may have reviewed a product at a number of websites, which may have led the user to a final merchant website where the user finally bought the product. In some implementations, the UEP may identify the websites that the user visited, that contributed to the user deciding to buy the product, and may reward them with a share of the revenues obtained by the "point-of-sale" website for having contributed to the user going to the point-of-sale website and purchasing the product there. For example, the websites may have agreements with product manufacturers, wholesalers, retail outlets, payment service providers, payment networks, amongst themselves, and/or the like with regard to product placement, advertising, user redirection and/or the like. For example, a server may have stored a table of revenue sharing ratios, that provides a predetermined revenue sharing scheme according to which contributing websites will receive revenue for the user's purchase.

Accordingly, in some implementations, a server may obtain a list of URLs included in a suer's shopping trail, and their associated activity and time counts, 1121. The server may identify a point-of-sale URL where the user made the purchase for which revenue is being shared among the URLs in the shopping trail, 1122. The server may calculate a total activity count, and a total time count, by summing up activity and time counts, respectively, of all the URLs in the user's shopping trail, 1123. The server may calculate activity and time ratios of each of the URLs, 1124. The server may obtain a rvenue sharing model (e.g., a database table/matrix of weighting values) for converting activity and time ratios for each URL into a revenue ratio for that URL, 1125. The server may calculate a revenue share, 1126, for each of the URLs in the user's shopping trail using the revenue sharing model and the revenue ratios calculated for each URL. The server may provide a notification of the revenue for each URL (e.g., to each of the URLs and/or the point-of-sale URL from whom revenue will be obtained to pay the revenue shares of the other URLs in the user's shopping trail), 1127. In some implementations, the server may generate card authorization requests and/or batch clearance requests for each of the revenue payments due to the URLs in the user's shopping trail, to process those transactions for revenue sharing.

Figure 12A:
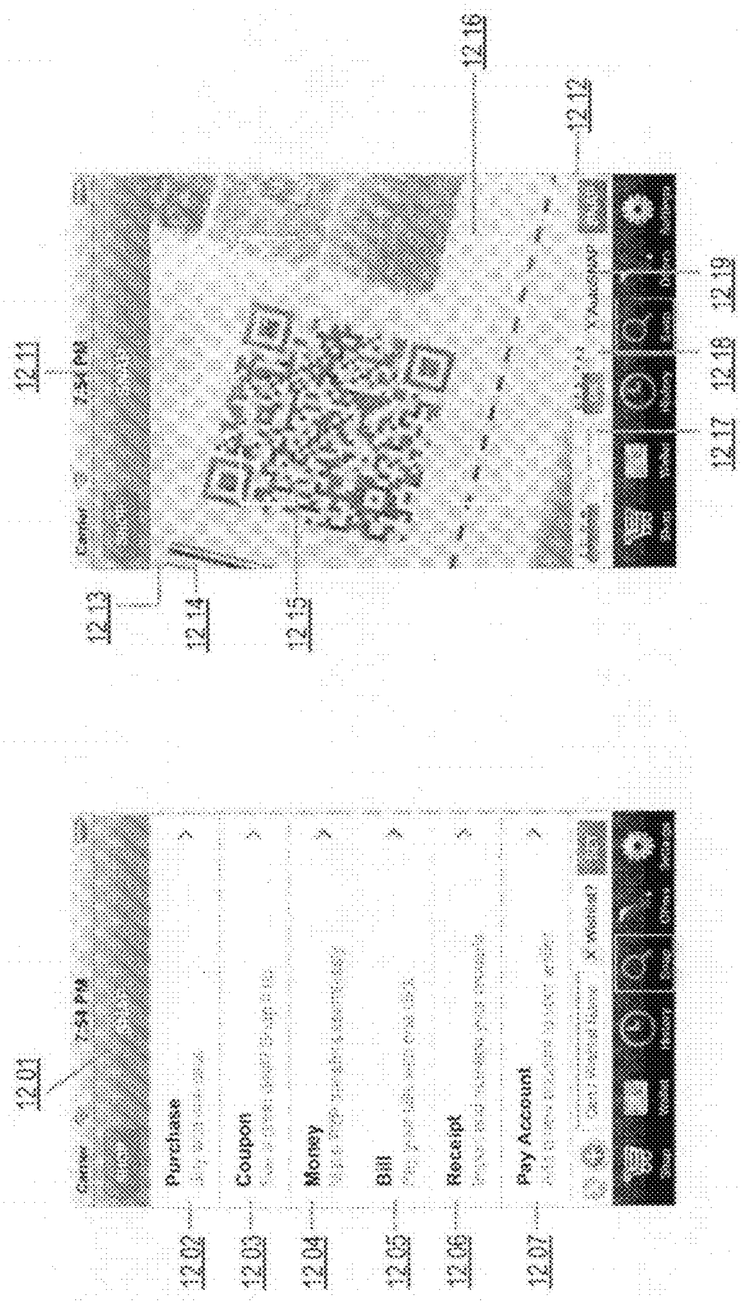
FIGS. 12A-I show user interface and logic flow diagrams illustrating example aspects of a snap mode of a virtual wallet application in some embodiments of the UEP.

FIGS. 12A-H show user interface and logic flow diagrams illustrating example aspects of a snap mode of a virtual wallet application in some embodiments of the UEP. With reference to FIG. 12A, in some implementations, a user may select the snap mode 1201 to access its snap features. The snap mode may handle any machine-readable representation of data. Examples of such data may include linear and 2D bar codes such as UPC code and QR codes. These codes may be found on receipts 1206, product packaging 1202, coupons 1203, payment notes 1204, invoices 1205, credit cards and/or other payment account plastic cards or equivalent 1207, and/or the like. The snap mode may process and handle pictures of receipts, products, offers, credit cards or other payment devices, and/or the like. An example user interface 1211 in snap mode is shown in FIG. 12A. A user may use his or her mobile phone to take a picture of a QR code 1215 and/or a barcode 1214. In one implementation, the bar 1216 and snap frame 1213 may assist the user in snapping codes properly. For example, the snap frame 1213, as shown, does not capture the entirety of the code 1214. As such, the code captured in this view may not be resolvable as information in the code may be incomplete. When the code 1215 is completely framed by the snap frame 5215, the a device may automatically snap a picture of the code, 1219. Upon finding the code, in one implementation, the user may initiate code capture using the mobile device camera, 1212. In some implementations, the user may adjust the zoom level of the camera to assist in captureing the code, 1217. In some implementations, the user may add a GPS tag to the captured code, 1218.

Figure 12B:

With reference to FIG. 12B, in some implementations, where the user has not yet interacted with an item, the user may view details of the item designed to facilitate the user to purchase the item at the best possible terms for the user. For example, the virtual wallet application may provide a detailed view of the item at the point where it was snapped by the user using the user device, 1221, including an item description, price, merchant name, etc. The view may also provide a QR code 1222, which the user may tap to save to the wallet for later use, or to show to other users who may snap the QR code to purchase the item. In some implementations, the view may provide additional services for the user, including but not limited to: concierge service; shipment services, helpline, and/or the like, 1223. In some implementations, the view may provide prices from competing merchants locally or on the web, 1224. Such pricing data may be facilitated by the centralized personal information platform components described further below in the discussion with reference to FIGS. 18-37. In some implementations, the view may provide the user with the option to (see 1225): store the snapped code for later, start over and generate a new code, turn on or off a GPS tagging feature, use a previously snapped QR code, enter keywords associated with the QR code, associated the items related to the QR code to an object, and/or the like. In some implementations, the virtual wallet may provide a SmartBuy targeted shopping feature. For example, the user may set a target price 1226 for the product 1221 that the user a wishes to buy. The virtual wallet may provide a real-time market watch status update 1227 for the product. When the market price available for the user falls below the user's target price 1226, the virtual wallet may automatically buy the product for the user, and provide a shipment/notification to the user. The user may at any time add the item to one of the user's carts or wishlists (see 1228).

In one implementation, in particular when the user has previously interacted with the item that is snapped, the user may view the details of the items 1232 and the amount(s) of each item, the merchant, etc., 1232. In various implementations, the user may be able to perform additional operations in this view. For example, the user may (re)buy the item 1233, obtain third-party reviews of the item, and write reviews of the item 1234, add a photo to the item so as to organize information related to the item along with the item 1235, add the item to a group of related items (e.g., a household), provide ratings 1237, or view quick ratings from the user's friends or from the web at large. For example, such systems may be implemented using the example centralized personal information platform components described below in the discussion with reference to FIGS. 18-37. The user may add a photo to the transaction. In a further implementation, if the user previously shared the purchase via social channels, a post including the photo may be generated and sent to the social channels for publishing. In one implementation, any sharing may be optional, and the user, who did not share the purchase via social channels, may still share the photo through one or more social channels of his or her choice directly from the history mode of the wallet application. In another implementation, the user may add the transaction to a group such as company expense, home expense, travel expense or other categories set up by the user. Such grouping may facilitate year-end accounting of expenses, a submission of work expense reports, submission for value added tax (VAT) refunds, personal expenses, and/or the like. In yet another implementation, the user may buy one or more items purchased in the transaction. The user may then execute a transaction without going to the merchant catalog or site to find the items. In a further implementation, the user may also cart one or more items in the transaction for later purchase.

The history mode, in another embodiment, may offer facilities for obtaining and displaying ratings 1237 of the items in the transaction. The source of the ratings may be the user, the user's friends (e.g., from social channels, contacts, etc.), reviews aggregated from the web, and/or the like. The user interface in some implementations may also allow the user to post messages to other users of social channels (e.g., TWITTER or FACEBOOK). For example, the display area 1238 shows FACEBOOK message exchanges between two users. In one implementation, a user may share a link via a message 1239. Selection of such a message having embedded link to a product may allow the user to view a description of the product and/or purchase the product directly from the history mode.

In some implementations, the wallet application may display a shop trail for the user, e.g., 1240. For example, a user may have reviewed a product at a number of websites (e.g., ElecReports, APPL FanBoys, Gizmo, Bing, Amazon, Visa Smartbuy feature (e.g., that checks various sources automatically for the best price available according to the user preferences, and provides the offer to the user), etc.), which may have led the user to a final merchant website where the user finally bought the product. In some implementations, the UEP may identify the websites that the user visited, that a contributed to the user deciding to buy the product, and may reward them with a share of the revenues obtained by the "point-of-sale" website for having contributed to the user going to the point-of-sale website and purchasing the product there. For example, the websites may have agreements with product manufacturers, wholesalers, retail outlets, payment service providers, payment networks, amongst themselves, and/or the like with regard to product placement, advertising, user redirection and/or the like. Accordingly, the UEP may calculate a revenue share for each of the websites in the user's shopping trail using a revenue sharing model, and provide revenue sharing for the is websites.

In some implementations, the virtual wallet may provide a SmartBuy targeted shopping feature. For example, the user may set a target price 1241 for the product 1232 that the user wishes to buy. The virtual wallet may provide a real-time market watch status update 1242 for the product. When the market price available for the user falls below the user's target price 1241, the virtual wallet may automatically buy the product for the user, and provide a shipment/notification to the user.

Figure 12C:
Figure 12D:

With reference to FIGS. 12C-D, in one embodiment, the snap mode may facilitate payment reallocation for a previously completed transaction (FIG. 12C), or a transaction to performed at present (FIG. 12D). For example, a user may buy grocery and prescription items from a retailer Acme Supermarket. The user may, inadvertently or for ease of checkout for example, have already used his or her traditional payment card to pay for both grocery and prescription items, and obtained a receipt. However, the user may have an FSA account that could have been used to pay a for prescription items, and which would have provided the user a better price or other economic benefits. In such a situation, the user may use the snap mode to initiate transaction reallocation.

As shown, the user may snap 1251, 1261 a picture of a barcode on an receipt 1253, 1263, upon which the virtual wallet application may present the receipt data 1252, 1262 using information from the pay code. The user may now reallocate expenses to their optimum accounts 1254, 1264. In some implementations, the user may also dispute the transaction 1255, 1265 or archive the receipt 1256, 1266.

In one implementation, when the reallocate button is selected, the wallet application may perform optical character recognition (OCR) of the receipt. Each of the items in the receipt may then be examined to identify one or more items which could be charged to which payment device or account for tax or other benefits such as cash back, reward points, etc. In this example, there is a tax benefit if the prescription medication charged to the user's Visa card is charged to the user's FSA. The wallet application may then perform the reallocation as the back end. The reallocation process may include the wallet contacting the payment processor to credit the amount of the prescription medication to the Visa card and debit the same amount to the user's FSA account. In an alternate implementation, the payment processor (e.g., Visa or MasterCard) may obtain and OCR the receipt, identify items and payment accounts for reallocation and perform the reallocation. In one implementation, the wallet application may request the user to confirm reallocation of charges for the selected items to another payment account. The receipt may be generated after the completion of the reallocation process. As discussed, the receipt shows that some charges have been moved from the Visa account to the FSA.

Figure 12E:
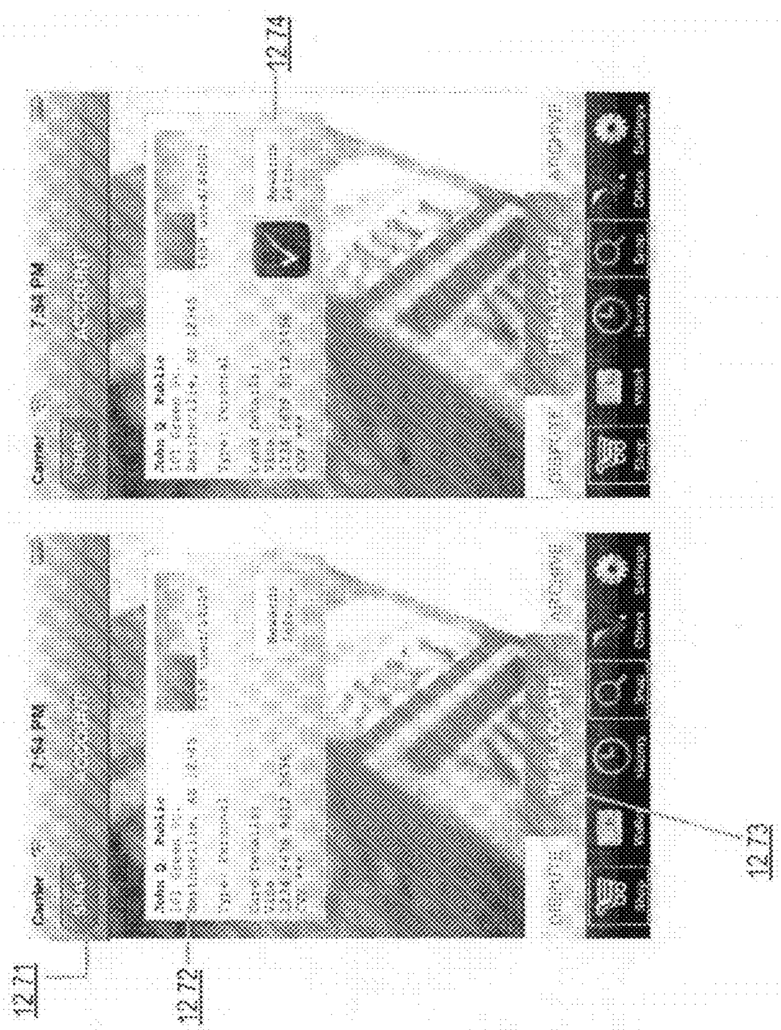

With reference to FIG. 12E, in one embodiment, the snap mode may also facilitate offer identification, application and storage for future use. For example, in one implementation, a user may snap an account code, an offer code 1271 (e.g., a bar code, a QR code, and/or the like). The wallet application may then generate an account card text, coupon text, offer text 1272 from the information encoded in the offer code. The user may perform a number of actions on the offer code. For example, the user may use the reallocate button 1273 to reallocate prior purchases that would have been better made using the imported card, coupon, offer, etc., and the virtual wallet application may provide a notification of reallocation upon modifying the accounts charged for the previous transactions of the user.

In one embodiment, the snap mode may also offer facilities for adding a funding source to the wallet application. In one implementation, a pay card such as a credit card, debit card, pre-paid card, smart card and other pay accounts may have an associated code such as a bar code or QR code. Such a code may have encoded therein pay card information including, but not limited to, name, address, pay card type, pay card account details, balance amount, spending limit, rewards balance, and/or the like. In one implementation, the code may be found on a face of the physical pay card. In another implementation, the code may be obtained by accessing an associated online account or another secure location. In yet another implementation, the code may be printed on a letter accompanying the pay card. A user, in one implementation, may snap a picture of the code. The wallet application may identify the pay card and may display the textual information encoded in the pay card. The user may then perform verification of the information by selecting a verify button. In one implementation, the verification a may include contacting the issuer of the pay card for confirmation of the decoded information and any other relevant information. In one implementation, the user may add the pay card to the wallet by selecting a 'add to wallet' button. The instruction to add the pay card to the wallet may cause the pay card to appear as one of the forms of payment under the funds tab discussed above.

Figure 12F:
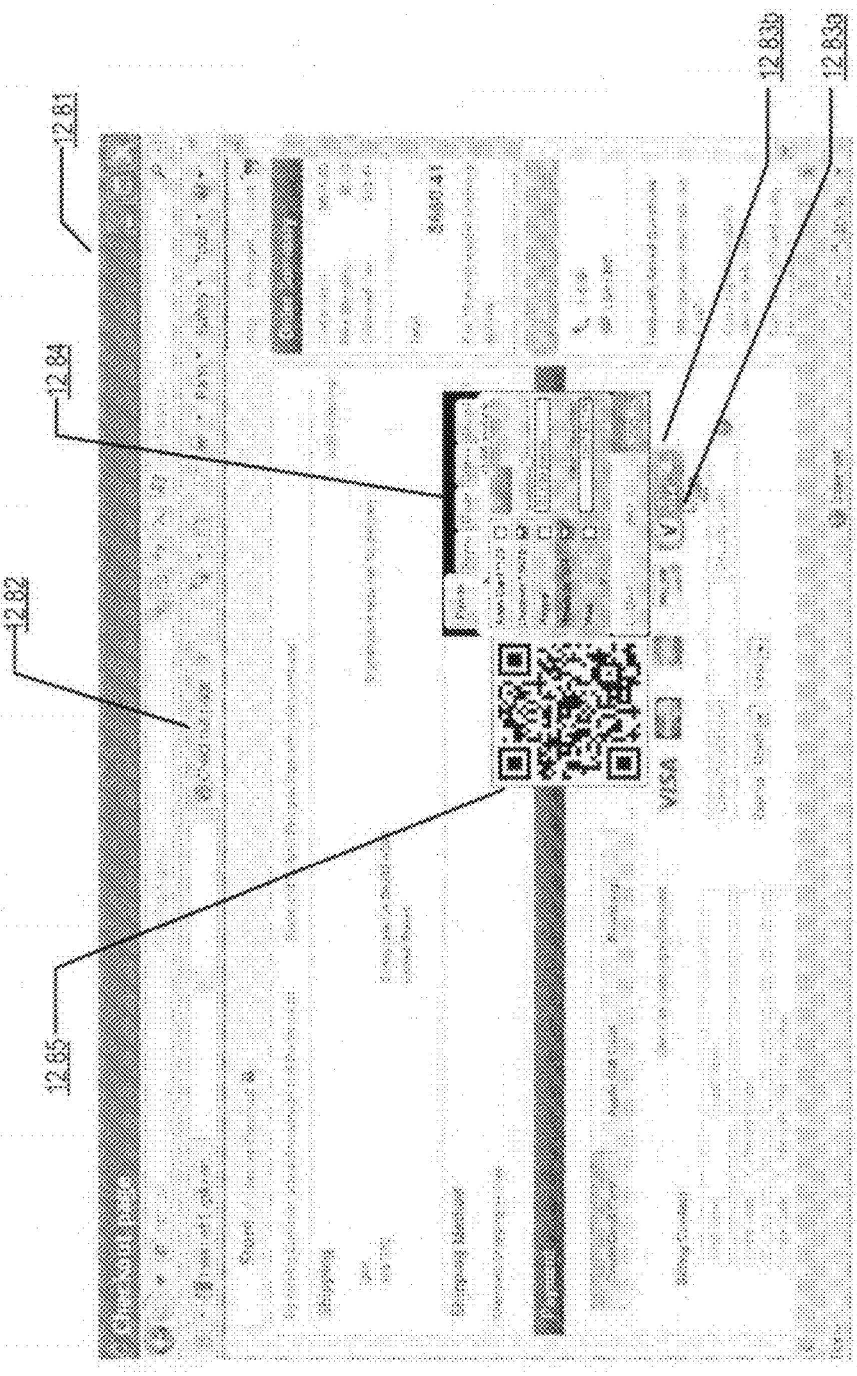

With reference to FIG. 12F, in some implementations, a user may be advantageously able to provide user settings into a device producing a QR code for a purchase transaction, and then capture the QR code using the user's mobile device. For example, a display device of a point-of-sale terminal may be displaying a checkout screen, such as a web browser executing on a client, e.g., 1281, displaying a checkout webpage of an online shopping website, e.g., 1282. In some implementations, the checkout screen may provide a user interface element, e.g., 1283*a*-*b*, whereby the user can indicate the desire to utilize snap mobile payment. For example, if the user activates element 1281*a*, the website may generate a QR code using default settings of the user, and display the QR code, e.g., 1285, on the screen of the client for the user to capture using the user's mobile device.

In some implementations, the user may be able to activate a user interface element, e.g., 1283*b*, whereby the client may display a pop-up menu, e.g., 1284, with additional options that the user may select from. In some implementations, the website may modify the QR code 1285 in real-time as the user modifies settings provided by activating the user interface element 1283*b*. Once the user has modified the settings using the pop-up menu, the user may capture a snapshot of the QR code to initiate purchase transaction processing.

Figure 12G:
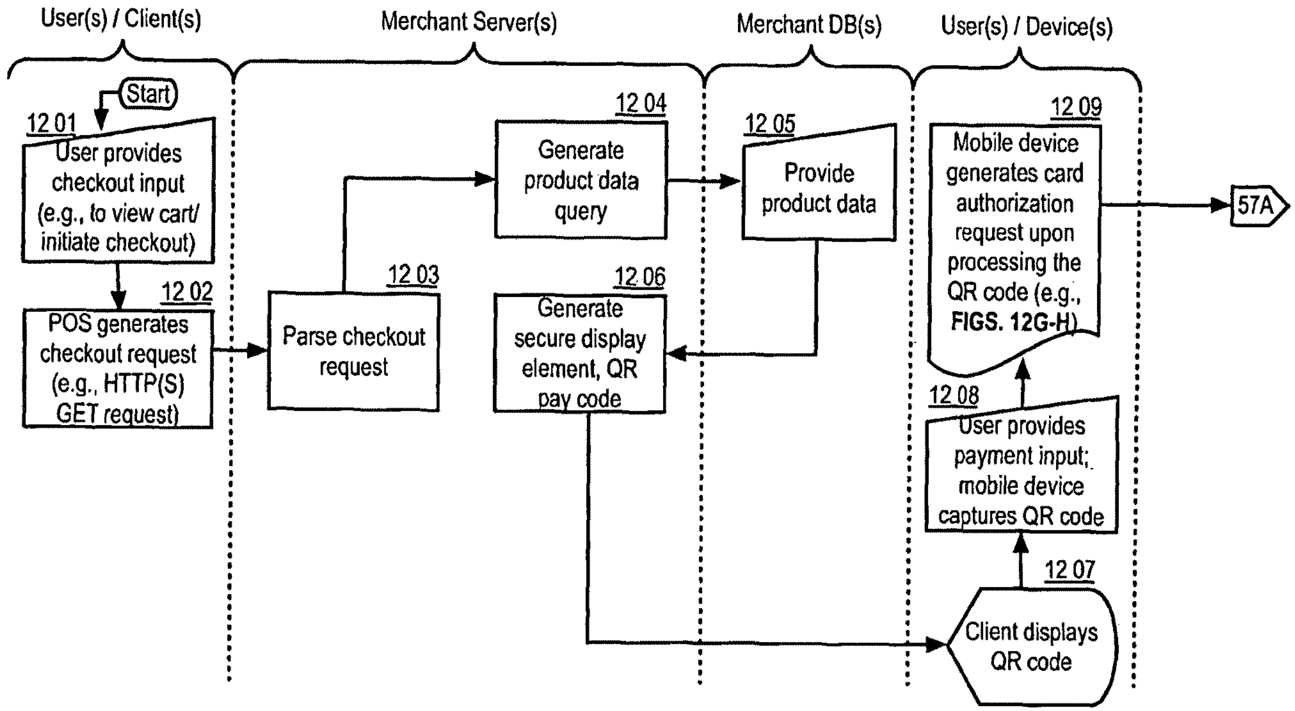

FIG. 12G shows a logic flow diagram illustrating example aspects of executing a snap mobile payment in some embodiments of the UEP, e.g., a Snap Mobile a Payment Execution ("SMPE") component 1200. In some implementations, a user may desire to purchase a product, service, offering, and/or the like ("product"), from a merchant via a merchant online site or in the merchant's store. The user may communicate with a merchant server via a client. For example, the user may provide user input, e.g., 1201, into the client indicating the user's desire to checkout shopping items in a (virtual) shopping cart. The client may generate a checkout request, e.g., 1202, and provide the checkout request to the merchant server. The merchant server may obtain the checkout request from the client, and extract the checkout detail (e.g., XML data) from the checkout request, e.g., 1203. For example, the merchant server may utilize a parser such as the example parsers described below in the discussion with reference to FIG. 61. The merchant server may extract the product data, as well as the client data from the checkout request. In some implementations, the merchant server may query, e.g., 1204, a merchant database to obtain product data, e.g., 1205, such as product pricing, sales tax, offers, discounts, rewards, and/or other information to process the purchase transaction.

In response to obtaining the product data, the merchant server may generate, e.g., 1206, a QR pay code, and/or secure display element according to the security settings of the user. For example, the merchant server may generate a QR code embodying the product information, as well as merchant information required by a payment network to process the purchase transaction. For example, the merchant server may first generate in real-time, a custom, user-specific merchant-product XML data structure having a time-limited validity period, such as the example 'QR_data'

```
<QR_data>
  <session_ID>4NFU4RG94</session_ID>
  <timestamp>2011-02-22 15:22:43</timestamp>
  <expiry_lapse>00:00:30</expiry_lapse>
  <transaction_cost>$34.78</transaction_cost>
  <user_ID>john.q.public@gmail.com</user_ID>
  <client_details>
    <client_IP>192.168.23.126</client_IP>
    <client_type>smartphone</client_type>
    <client_model>HTC Hero</client_model>
    <OS>Android 2.2</OS>
    <app_installed_flag>true</app_installed_flag>
  </client_details>
  <secure_element>www.merchant.com/securedyn/
  0394733/123.png</secure_element>
  <purchase_details>
    <num_products>1</num_products>
    <product>
      <product_type>book</product_type>
      <product_params>
        <product_title>XML for dummies</product_title>
        <ISBN>938-2-14-168710-0</ISBN>
        <edition>2nd ed.</edition>
        <cover>hardbound</cover>
        <seller>bestbuybooks</seller>
      </product_params>
```

-continued

```
      <quantity>1</quantity>
    </product>
  </purchase_details>
  <merchant_params>
    <merchant_id>3FBCR4INC</merchant_id>
    <merchant_name>Books & Things, Inc.</merchant_name>
    <merchant_auth_key>1NNF484MCP59CHB27365
    </merchant_auth_key>
  </merchant_params>
<QR_data>
```

In some implementations, the merchant may generate QR code using the XML data. For example, the merchant server may utilize the PHP QR Code open-source (LGPL) library for generating QR Code, 2-dimensional barcode, available at http://phpqrcode.sourceforge.net/. For example, the merchant server may issue PHP commands similar to the example commands provided below:

```
<?PHP
header('Content-Type: text/plain');
// Create QR code image using data stored in $data variable
QRcode::png($data, 'qrcodeimg.png');
?>
```

The merchant server may provide the QR pay code to the client, e.g., 1206. The client may obtain the QR pay code, and display the QR code, e.g., 1207 on a display screen associated with the client device. In some implementations, the user may utilize a user device, e.g., 1209, to capture the QR code presented by the client device for payment processing. The client device may decode the QR code to extract the information embedded in the QR code. For example, the client device may utilize an application such as the ZXing multi-format 1D/2D barcode image processing library, available at http://code.google.com/p/zxing/ to extract the information from the QR code. In some implementations, the user may provide payment input into the user device, e.g., 1208. Upon obtaining the user purchase input, the user device may generate a card authorization request, e.g., 1209, and provide the card authorization request to a pay network server (see, e.g., FIG. 57A).

Figure 12H:
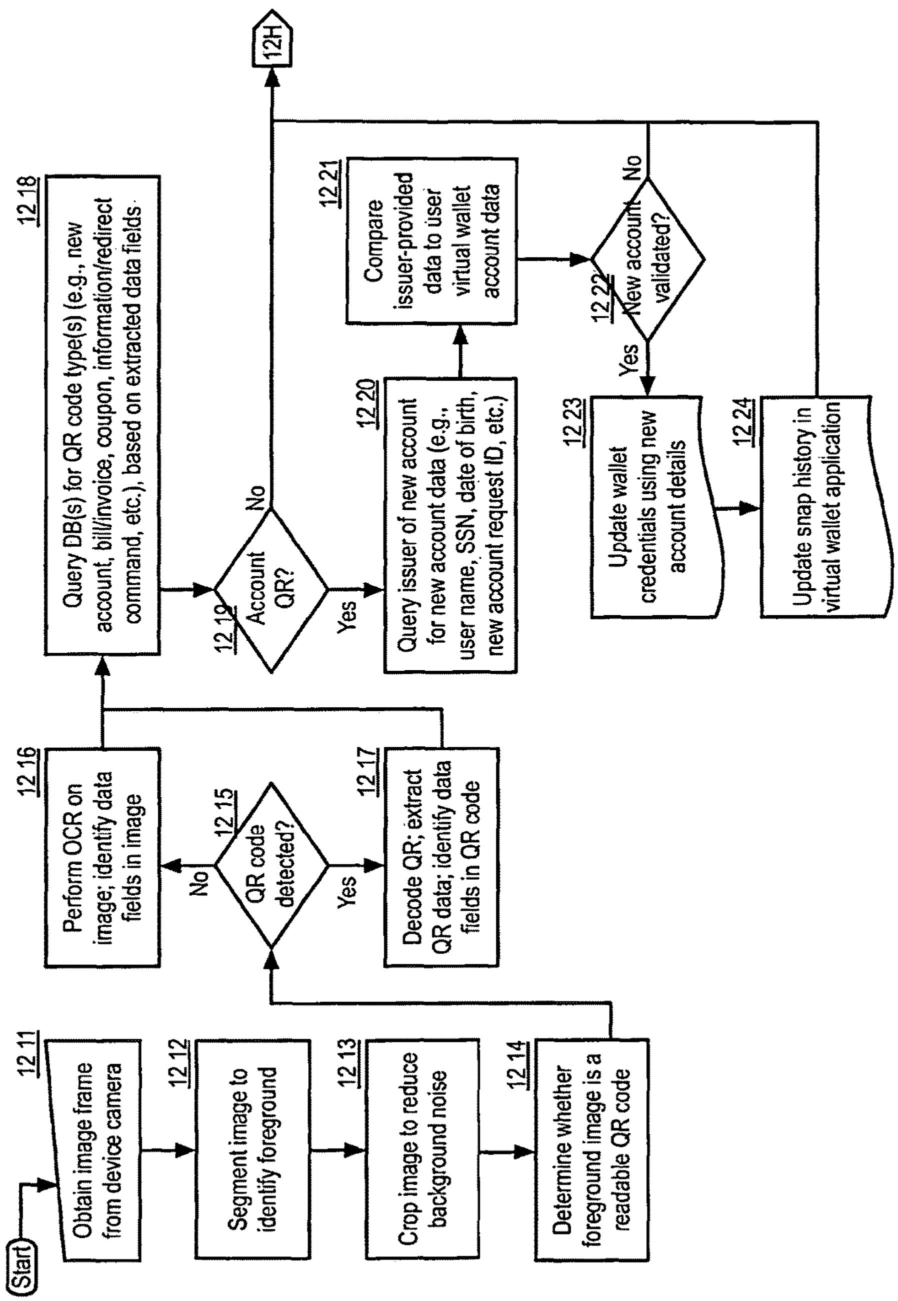
Figure 12I:
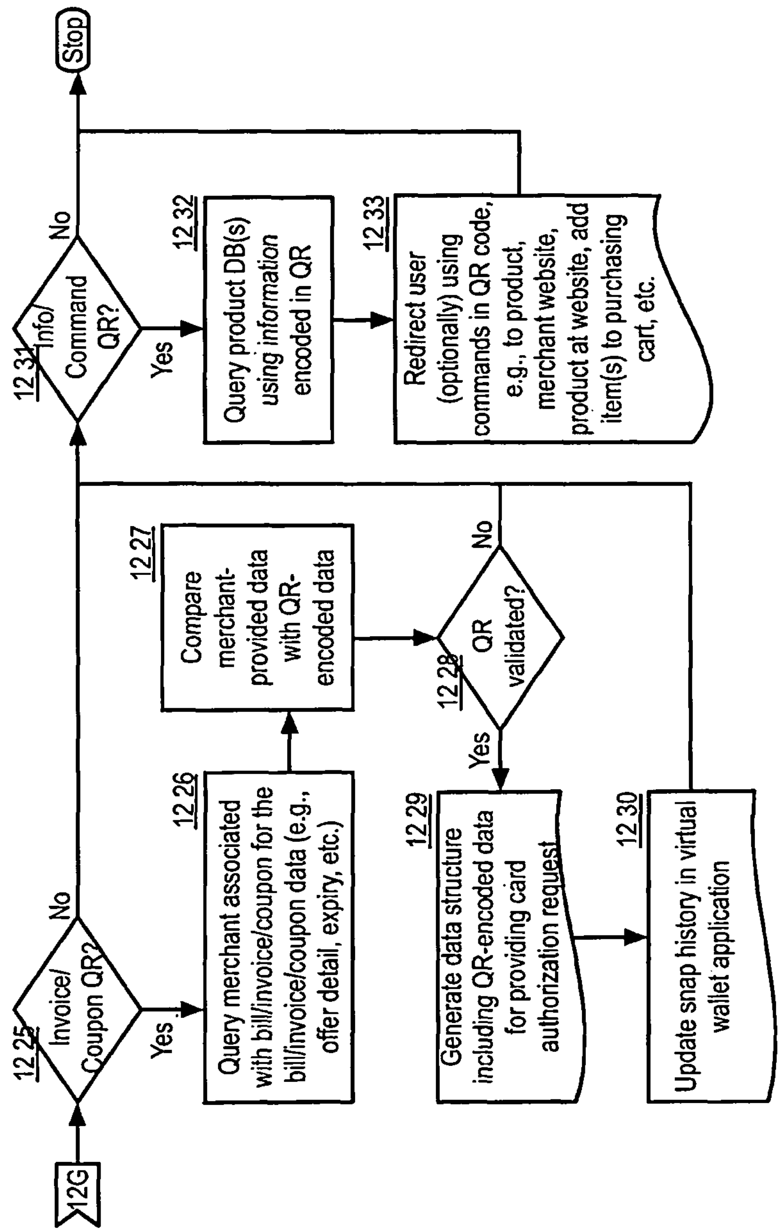

FIGS. 12H-I show logic flow diagrams illustrating example aspects of processing a Quick Response code in some embodiments of the UEP, e.g., a Quick Response Code Processing ("QRCP") component 1210. With reference to FIG. 12H, in some implementations, a virtual wallet application executing on a user device may determine whether a QR code has been captured in an image frame obtained by a camera operatively connected to the user device, and may also determine the type, contents of the QR code. Using such information, the virtual wallet application may redirect the user experience of the user and/or initiating purchases, update aspects of the virtual wallet application, etc. For example, the virtual wallet application may trigger the capture of an image frame by a camera operatively connected to the user device, 1211. The virtual wallet application may utilize an image segmentation algorithm to identify a foreground in the image, 1212, and may crop the rest of the image to reduce background noise in the image, 1213. The virtual wallet application may determine whether the foreground image includes a QR code from which data can be reliably read (e.g., this may not be so if the image does not include a QR code, or the QR code is partially cropped, blurred, etc.), 1214. For example, the virtual wallet application may utilize a code library such as the ZXing multi-format 1D/2D barcode image processing library, available at http://code.google.com/p/zxing/ to try and extract the information from the QR code. If the virtual wallet application is able to detect a QR code (1215, option "Yes"), the virtual wallet application may decode the QR code, and extract data from the QR code, 1217. If the virtual wallet application is unable to detect a QR code (1215, option "No"), the virtual wallet application may attempt to perform Optical Character Recognition on the image. For example, the virtual wallet application may utilize the Tesseract C++ open source OCR engine, available at www.pixel-technology.com/freewarw/tessnet2, to perform the optical character recognition, 1216. Thus, the virtual wallet application may obtain the data encoded into the image, and may continue if the data can be processed by the virtual wallet application. The virtual wallet application may query a database using fields identified in the extracted data, for a type of the QR code, 1218. For example, the QR code could include an invoice/bill, a coupon, a money order (e.g., in a P2P transfer), a new account information packet, product information, purchase commands, URL navigation instructions, browser automation scripts, combinations thereof, and/or the like.

In some embodiments, the QR code may include data on a new account to be added to the virtual wallet application (see 1219). The virtual wallet application may query an issuer of the new account (as obtained from the extracted data), for the data associated with the new account, 1220. The virtual wallet application may compare the issuer-provided data to the data extracted from the QR code, 611. If the new account is validated (1221, option "Yes"), the virtual wallet application may update the wallet credentials with the details of the new account, 1223, and update the snap history of the virtual wallet application using the data from the QR code, 1224.

With reference to FIG. 12I, in some embodiments, the QR code may include data on a bill, invoice, or coupon for a purchase using the virtual wallet application (see 1225). The virtual wallet application may query merchant(s) associated with the purchase (as obtained from the extracted data), for the data associated with the bill, invoice, or coupon for a purchase (e.g., offer details, offer ID, expiry time, etc.), 1226. The virtual wallet application may compare the merchant-provided data to the data extracted from the QR code, 1227. If the bill, invoice, or coupon for a purchase is validated (1228, option "Yes"), the virtual wallet application may generate a data structure (see e.g., XML QR_data structure in description above with reference to FIG. 12F) including the QR-encoded data for generating and providing a card authorization request, 1229, and update the snap history of the virtual wallet application using the data from the QR code, 1230.

In some embodiments, the QR code may include product information, commands, user navigation instructions, etc. for the virtual wallet application (see 1231). The virtual wallet application may query a product database using the information encodd in the QR. The virtual wallet application may provide various features including, without limitation, displaying product information, redirecting the user to: a product page, a merchant website, a product page on a merchant website, add item(s) to a user shopping cart at a merchant website, etc. In some implementations, the virtual wallet application may perform a procedure such as described above for any image frame pending to be processed, and/or selected for processing by the user (e.g., from the snap history).

Figure 13A:
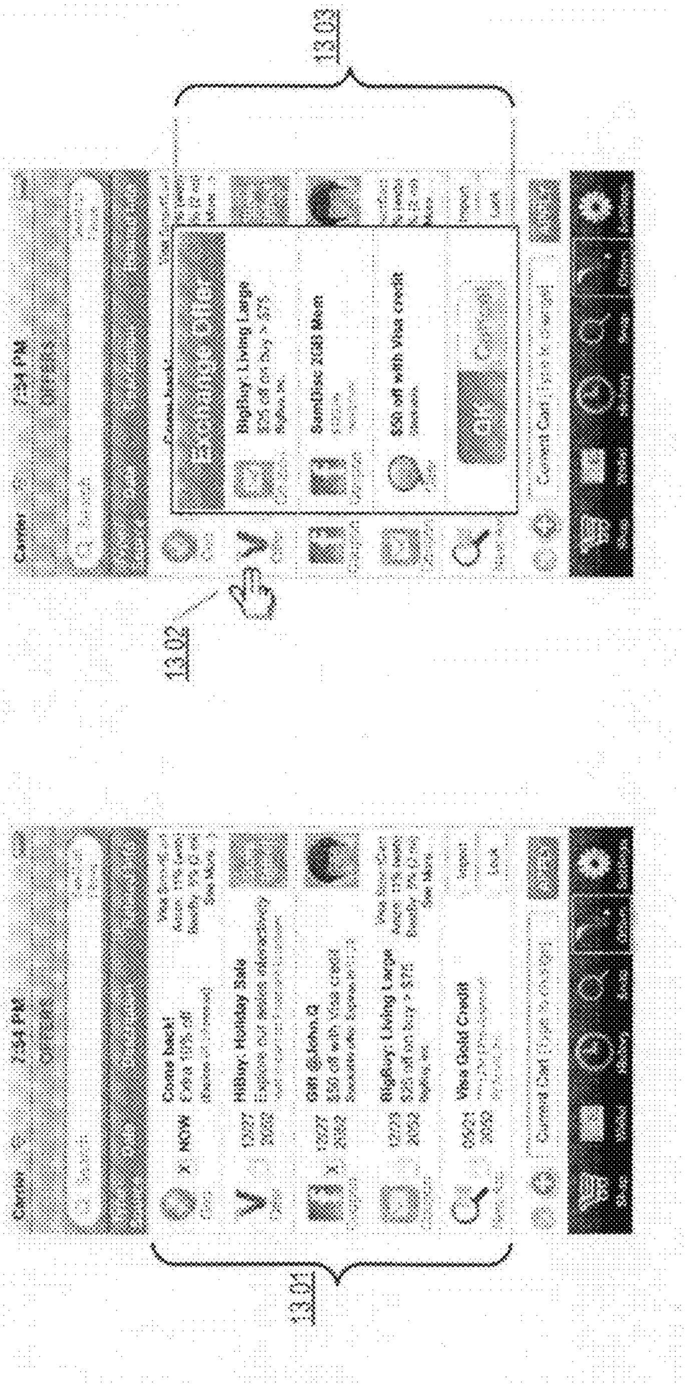
FIGS. 13A-B show user interface and logic flow diagrams illustrating example aspects of an offers mode of a virtual wallet application in some embodiments of the UEP.
Figure 13B:
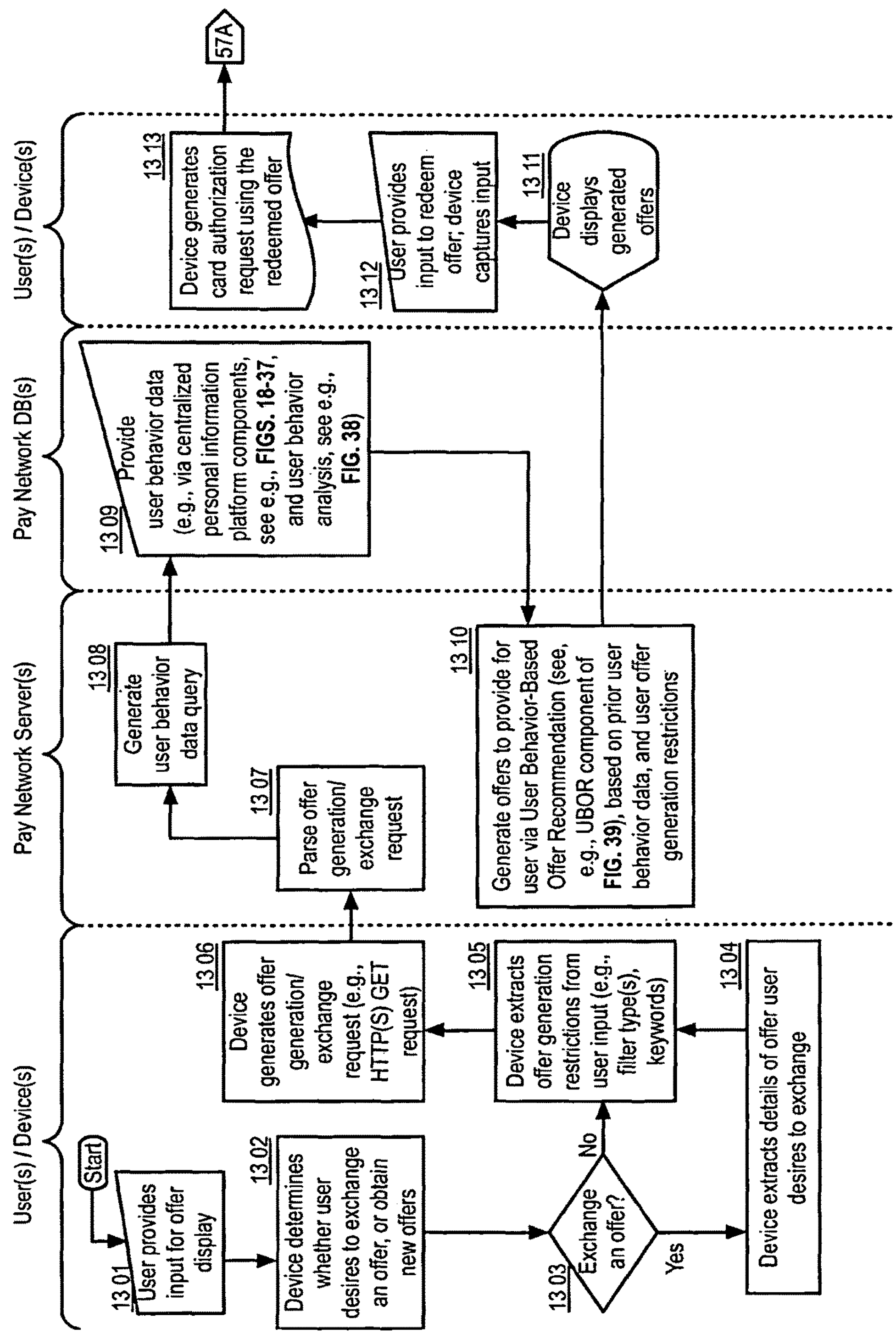

FIGS. 13A-B show user interface and logic flow diagrams illustrating example aspects of an offers mode of a virtual wallet application in some embodiments of the UEP. With reference to FIG. 13A, in some implementations, a user may desire to obtain new offers in the user's virtual wallet application, or may desire to exchange an existing offer for a new one (or a plurality of offers) (e.g., offers 1301 may be replaced at the user's command). For example, the user may provide an input indicating a desire to replace offer 1302. In response, the virtual wallet application may provide a set of replacement offers 1303, from which the user may choose one or more offers to replace the offer 1302.

FIG. 13B shows a logic flow diagram illustrating example aspects of generating and exchanging offer recommendations in some embodiments of the UEP, e.g., an Offer Recommendation and Exchange ("ORE") component 1310. In some implementations, a user may desire to obtain new offers in the user's virtual wallet application, or may desire to exchange an existing offer for a new one (or a plurality of offers). The user may provide an input for display of such offers, 1301. The user's device may obtain the user's input, and determine whether the user desires to obtain a new offer, or obtain offers in exchange for an offer currently stored within the user's virtual wallet application executing on the device, 1302. If the device determines that the user desires to exchange a pre-existing offer, e.g., 1303, option "Yes," the device may extract details of the offer that the user desires to exchange. For example, the device may correlate the position of the user's touchscreen input (e.g., where the device has a touchscreen interface) to an offer displayed on the screen. The device may also determine that the user utilized a gesture associated with the offer displayed on the screen that indicates the user's desire to exchange the offer with which the user gesture is associated. The device may query its database for an offer corresponding to the displayed offer, and may extract the details of the offer, 1304, by parsing the database-returned offer using a parser, such as the example parsers described below in the discussion with reference to FIG. 61. In some implementations, the device may extract any user-input offer generation restrictions (e.g., such as types of filters the user may have applied to offers the user desires, keywords related to the kinds of offers the user may desire, etc.) provided by the user as input, 1305. The device may generate an offer generation/exchange request for a pay network server using the extracted data on the offer to be exchanged (if any), and the user preferences for types of offers desired (if any), e.g., as a HTTP(S) POST request similar to the examples provided in the discussions below.

In some implemetations, the pay network server may parse the offer generation/exchange request, 1307, using parsers such as the example parser described a below in the discussion with reference to FIG. 61. The pay network server may generate a user behavior data query, 1308. For example, the server may utilize PHP/SQL commands to query a relational pay network database for user prior behavior data. For example, the pay network server may obain such data generated using centralized personal information platform components, such as those described in the discussion below with reference to FIGS. 18-37, as well as a user behavior analysis component, such as the example UBA component described below in the discussion with reference to FIG. 38. The database may provide such user behavior data and analysis thereof to the pay network server, 1309. Using the prior user behavior data and/or analysis thereof, and using the details of the exchanged offer and/or user offer generation restrictions, the pay network server may generate offers to provide for the user. For example, the pay network server may utilize a user behavior-based offer recommendation component such as the example UBOR component described in the discussion below with reference to FIG. 39. The server may provide the generated offers to the device, which may display the received offers to the user, 1311. In some implementations, the user may provide an input indicating a desire to redeem one of the offers provided by the pay network server, 1312. In response, the device may generate a card authorization request incorporating the details of the offer chosen for redemption by the user, 1313, and provide the generated card authorization request for purchase transaction processing (e.g., as an input to the example PTA component described below in the discussion with reference to FIGS. 57A-B).

Figure 14:
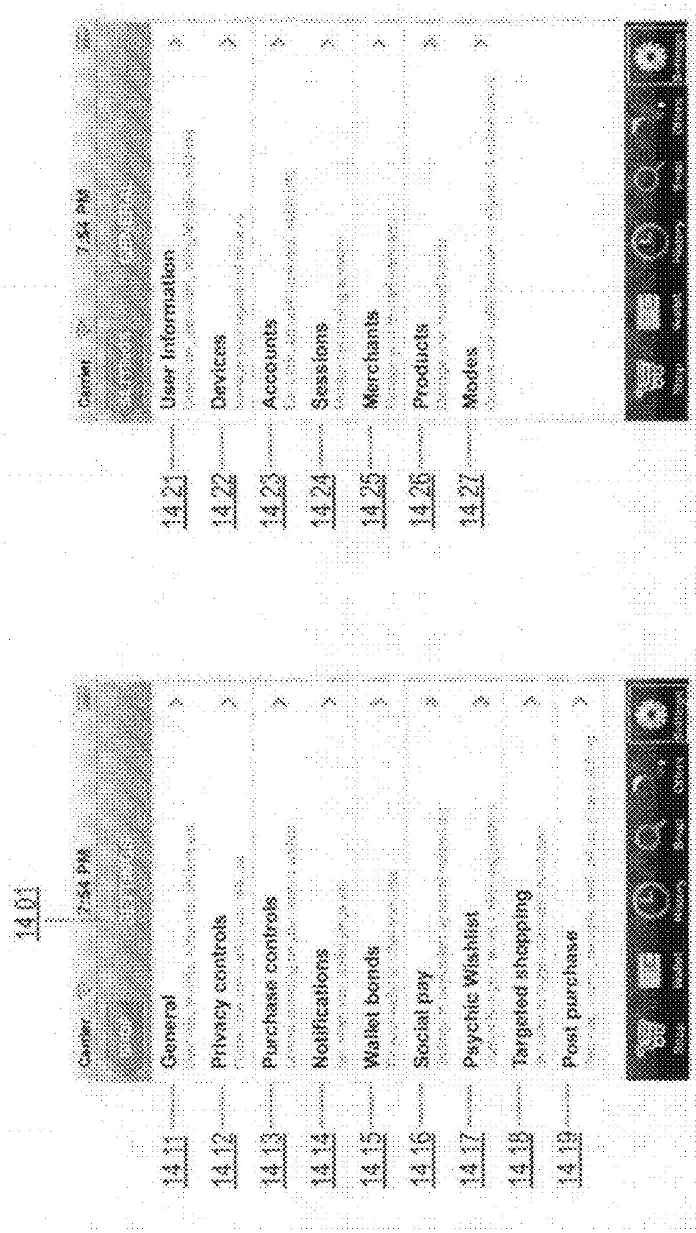
FIG. 14 shows user interface diagrams illustrating example aspects of a general settings mode of a virtual wallet application in some embodiments of the UEP.

FIG. 14 shows user interface diagrams illustrating example aspects of a general settings mode of a virtual wallet application in some embodiments of the UEP. In some implementations, the virtual wallet application may provide a user interace where the user can modify the settings of the wallet, 1401. For example, the user may modify settings such as, but not limited to: general settings 1411 (e.g., user information, wallet information, account information within the wallet, devices linked to the wallet, etc.); privacy controls 1412 (e.g., controlling information that is provided to merchants, payment networks, third-parties, etc.); purchase controls 1413 (e.g., placing specific spending restrictions, or proscribing particular type of transaction); notifications 1414; wallet bonds 1415 (e.g., relationship made with other virtual wallets, such that information, settings, (parental) controls, and/or funds may flow between the wallets seamlessly); 1416 social payment settings (see, e.g., FIGS. 40-47); psychic wishlists 1417 (e.g., controlling the type of user behaviors to consider in generating offers, recommendations—see, e.g., FIG. 39); targeted shopping 1418 (e.g., setting target prices at which buying of products is automatically triggered—see, e.g., FIGS. 11A, 12B-C); or post purchase settings 1419 (e.g., settings regarding refunds, returns, receipts, reallocation of expenses (e.g., to FSA or HAS accounts), price matching (e.g., if the price of the purchased item falls after the user buys it), etc.

In a category of general settings (1411), a user may be able to modify settings such as, but not limited to: user information 1421, user device 1422, user accounts 1423, shopping sessions 1424, merchants that are preferred 1425, preferrd products and brand names, preferred modes (e.g., settings regarding use of NFC, Bluetooth, and/or the like), etc.

Figure 15:
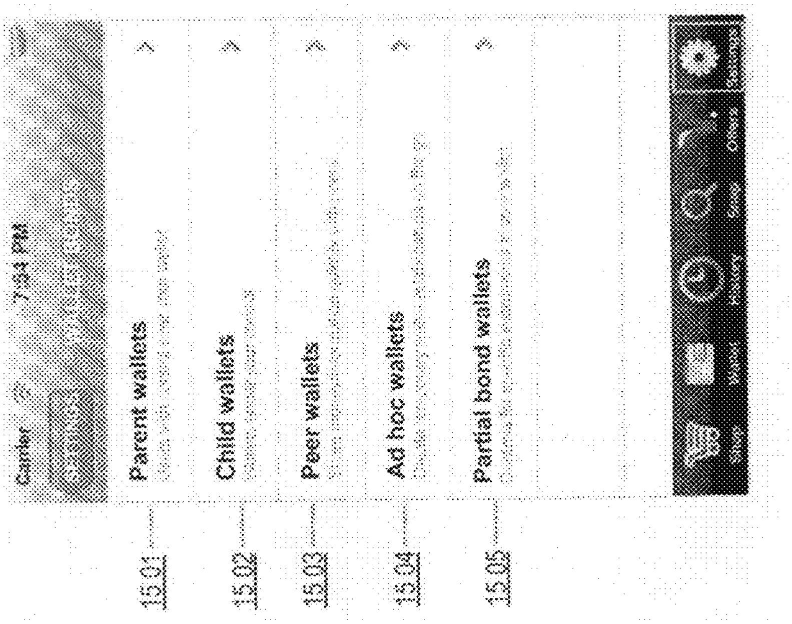
FIG. 15 shows a user interface diagram illustrating example aspects of a wallet bonds settings mode of a virtual wallet application in some embodiments of the UEP.

FIG. 15 shows a user interface diagram illustrating example aspects of a wallet bonds settings mode of a virtual wallet application in some embodiments of the a UEP. In a category of wallet bonds settings (see FIG. 14, 1415), a user may be able to modify settings such as, but not limited to, settings regarding: parent wallets 1501 (e.g., those that have authorization to place restriction on the user's wallet); child wallets 1502 (e.g., those wallets over which the user has authorization to place restrictions); peer wallets 1503 (e.g., those wallets that have a similar level of control and transparency); ad hoc wallets 1504 (e.g., those wallets that are connected temporarily in real-time, for example, for a one-time funds transfer); partial bond wallets (e.g., such as bonds between corporate employer virtual wallet and an employee's personal wallet, such that an employer wallet may provide limited funds with strings attached for the employee wallet to utilize for business purposes only), and/or the like.

Figure 16A:
FIGS. 16A-C show user interface diagrams illustrating example aspects of a purchase controls settings mode of a virtual wallet application in some embodiments of the UEP.
Figure 16B:
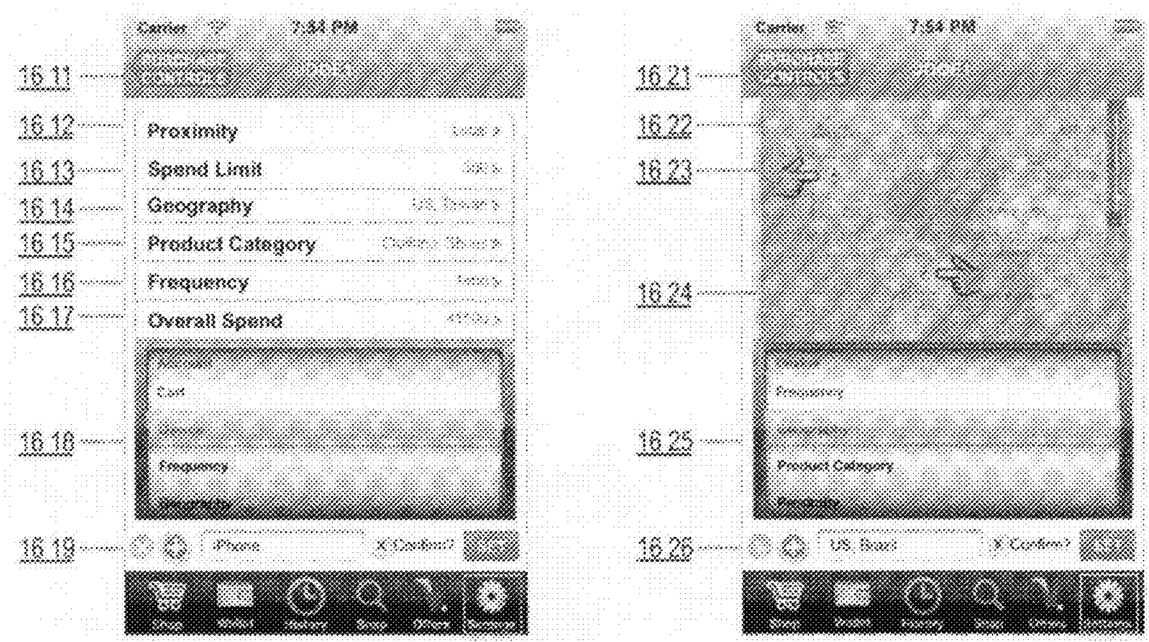
Figure 16C:
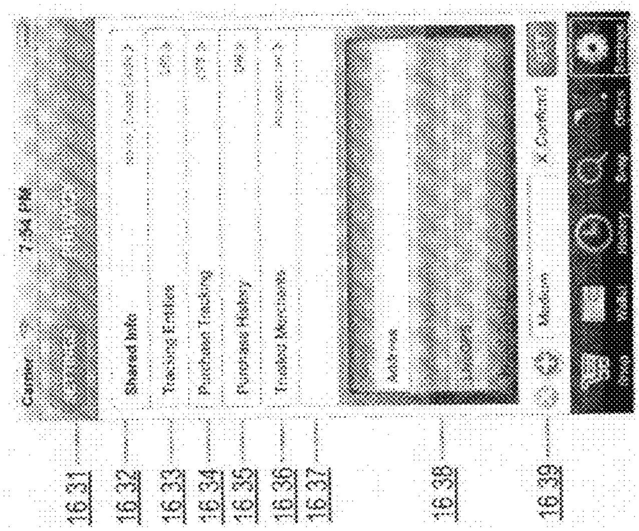

FIGS. 16A-C show user interface diagrams illustrating example aspects of a purchase controls settings mode of a virtual wallet application in some embodiments of the UEP. With reference to FIG. 16A, in some implementations, auser may be able to view and/or modify purchase controls that allow only transaction that satisfy the purcahse controls to be initiated from the wallet. In one implementation, a consumer may configure consumer-controlled fraud prevention parameters to restrict a purchase transaction via his electronic wallet, e.g., transaction time, maximum amount, type, number of transactions per day, and/or the like. For example, a consumer may enroll with an electronic wallet service (e.g., Visa V-Wallet) by creating an e-wallet account and adding a payment account to the e-wallet (e.g., a credit card, a debit card, a PayPal account, etc.). The consumer may configure parameters to restrict the wallet transactions. For example, the consumer may configure a maximum one-time transaction amount (e.g., $500.00, etc.). For another example, the consumer may a specify a time range of transactions to be questionable (e.g., all transactions occurring between 2 am-6 am, etc.). For another example, the consumer may specify the maximum number of transactions per day (e.g., 20 per day, etc.). For further examples, the consumer may specify names and/or IDs of merchants with whom the transactions may be questionable (e.g., Internet spam sites, etc.).

In one implementation, the consumer may configure the purchase control settings to detect and block all susceptible transactions. For example, when an attempted transaction of an amount that exceeds the maximum specified transaction amount occurs, the electronic wallet may be configured to reject the transaction and send an alert to the consumer. The transaction may be resumed once the consumer approves the transaction. In another implementation, if the UEP does not receive confirmation from the consumer to resume a susceptible transaction, the UEP may send a notification to the merchant to cancel the transaction. In one implementation, the consumer may configure the time period of clearance (e.g., 12 hours, etc.). In another implementation, UEP may determine a default maximum clearance period in compliance with regulatory requirements (e.g., 24 hours after soft posting, etc.).

In one implementation, the UEP may provide the consumer with a universal payment platform, wherein a user may associated one or more payment accounts with a universal payment platform and pay with the universal payment platform. Within embodiments, the consumer may create an electronic wallet service account and enroll with the electronic wallet (e.g., Visa V-Wallet, etc.) via UEP. In alternative embodiments, a consumer may associate a consumer bank account with an existing electronic wallet. For example, a consumer may provide payment information, a such as bank account number, bank routing number, user profile information, to an electronic wallet management consumer onboarding user interface, to associate an account with the electronic wallet. In another implementation, a consumer may enroll with the electronic wallet during online checkout. For example, a merchant site may provide an electronic wallet button at the checkout page (e.g., a Visa V-Wallet logo, etc.), and upon consumer selection of the electronic wallet button, the consumer may be prompted to enter bank account information (e.g., card number, etc.) to register a payment card (e.g., a credit card, a debit card, etc.) with the electronic wallet via a pop-up window.

In one implementation, upon receiving consumer enrollment bank account data, the UEP may generate an enrollment request to the electronic wallet platform (e.g., Visa V-Wallet payment network, etc.). In one implementation, an exemplary consumer enrollment data request in eXtensible Markup Language (XML). In further implementations, the consumer may be issued a UEP electronic wallet device upon enrollment, e.g., a mobile application, a magnetic card, etc.

In one implementation, a user may configure transaction restriction parameters via a consumer enrollment user interface. For example, in one implementation, an electronic wallet user may receive an invitation from UEP to sign up with UEP service, and following a link provided in the invitation (e.g., an email, etc.), the user may provide registration information in a registration form.

In one implementation, a user may configure payment methods and alerts with UEP. For example, the user may add a payment account to the wallet, and register a for timely alerts with transactions associated with the payment account. In one implementation, the user may establish customized rules for triggers of a transaction alert. For example, an alert message may be triggered when a susceptible transaction occurs as the transaction amount exceeds a maximum one time transaction amount (e.g., $500.00, etc.). For another example, an alert may be triggered when a transaction occurs within a susceptible time range (e.g., all transactions occurring between 2 am-6 am, etc.). For another example, an alert may be triggered when the frequency of transactions exceeds a maximum number of transactions per day (e.g., 20 per day, etc.). For further examples, an alert may be triggered when the transacting merchant is one of a consumer specified susceptible merchants (e.g., Internet spam sites, etc.). For another example, an alert may be triggered when the type of the transaction is a blocked transaction type (e.g., a user may forbid wallet transactions at a gas station for gas fill, etc.).

In one implementation, the user may subscribe to UEP alerts by selecting alert channels. For example, the user may providing his mobile number, email address, mailing address and/or the like to UEP, and subscribe to alerts via email, text messages, consumer service calls, mail, and/or the like. In one implementation, the user may configure rules and subscription channels for different payment account associated with the electronic wallet.

In one implementation, upon receiving user configured parameters via a user interface, UEP (e.g., a Visa Wallet network) may provide a (Secure) Hypertext Transfer Protocol ("HTTP(S)") PUT message including the user leash parameters in the form of data formatted according to the eXtensible Markup Language ("XML"). Below is an example HTTP(S) PUT message including an XML-formatted user leash parameters for storage in a database:

```
PUT /leash.php HTTP/1.1
Host: www.leash.com
Content-Type: Application/XML
Content-Length: 718
<?XML version = "1.0" encoding = "UTF-8"?>
<UserLeashRule>
  <UserID> JDoe <\UserID>
  <WalletID> JD0001 </WalletID>
  <Rule1>
    <RuleID> 00001 </RuleID>
    <CardNo> 0000 0000 0000 </CardNo>
    <MaxAmount> 500.00 </MaxAmount>
    <MaxPerDay> 20 </MaxPerDay>
    <Subscription> Mobile 000-000-0000 </Subscription>
    <Channel> SMS </Channel>
    ...
  </Rule1>
  <Rule2>
    <RuleID> 00002 </RuleID>
    <CardNo> 0000 0000 0002 </CardNo>
    <MaxAmount> 100.00 </MaxAmount>
```

-continued

```
    <MaxPerDay> 10 </MaxPerDay>
    </BlackListMerchants>
      <Merchant1> abc.com </Merchant1>
      <Merchant2> xyz </Merchant2>
      ...
    </BlacklistMerchants>
    ...
    <Subscription> Email </Subscription>
    <Channel> jdoe@email.com </Channel>
    ...
  </Rule2>
  ..
<\UserLeashRule>
```

In one implementation, upon configuring the leash parameters, when a consumer shops with a merchant (e.g., a shopping site, etc.), the payment processor network may forward the purchasing request to Visa network, which may apply the consumer's UEP enrollment with the electronic wallet (e.g., Visa wallet network, etc.). For example, in one implementation, the UEP may retrieve the user leash parameters, and inspect the transaction amount, transaction type, transaction frequency, and/or the like of the received transaction request based on the leash parameters.

In one implementation, if the proposed transaction triggers an alert, UEP may generate an alert message, e.g., by providing a (Secure) Hypertext Transfer Protocol ("HTTP(S)") PUT message including the alert content in the form of data formatted according to the XML. Below is an example H'ITP(S) PUT message including an XML-formatted alert:

```
PUT /alert.php HTTP/1.1
Host: www.leash.com
Content-Type: Application/XML
Content-Length: 718
<?XML version ="1.0" encoding = "UTF-8"?>
<Alert>
  <UserID> JDoe <\UserID>
  <WalletID> JD0001 </WalletID>
  <Time> 23:23:34 00-00-1900 <Time>
  <TransactionID> 000000 <TransactionID>
  <Trigger>
  MaxAmount>
  </Trigger>
  <AlertTemplateID> Tem00001 </AlertTemplateID>
  <Subscription> Email </Subscription>
  <Channel> jdoe@email.com </Channel>
  <Content>
    <Title> "Transaction Alert: $1000.00 from
    Amazon.com </Title>
    <Greeting> "Dear Joe" </Greeting>
    <Body> "We recently note that ..." </Body>
    ...
  </Content>
  ...
<\Alert>
```

In one implementation, the UEP may also generate a message and send it to the issuing bank, e.g., the user's bank that issues the payment account, etc., to alert the issuing bank not to credit funds to the merchant unless a clearance message is received subsequently.

With reference to FIG. 16B, in some implementations, the virtual wallet application may provide an interface via which user may efficiently set purchase controls for transactions. For example, the user may enter a purchase controls settings screen ("JDOE1") 1611, wherein the user may add restriction parameters to the purchase control setting. For example, the user interface on the left of FIG. 16B shows a purchase control that only allows in-person (see 1612) transactions below $50 (see 1613) to be made from US or Taiwan (see 1614), when made for clothes or shoes (see 1615), and not more than once a month (see 1616), and given that the user's overall spend for the time frame (1 mo) is less than $1500 (see 1617). Such parametric restrictions may be imposed using the user interface elements 1618 (e.g., to select a parameter) and 1619 (e.g., to enter a value corresponding to the parameter). In some situations, the virtual wallet may provide a graphical user interface component (e.g., 1622) to facilitate user input entry. For example, the virtual wallet may display a map of the world when the user wishes to place a geographic restriction on a purchase control, and the user may touch the map at the appropriate sport (e.g., 1623, 1624) to set the locations from which transaction may be allowed (or alternatively, blocked). In some implementations the virtual wallet may also allow the user to manually enter the value (see 1626), instead of utilizing the visual touch-based GUI component provided by the virtual wallet a application.

With reference to FIG. 16C, in some implementations, the virtual wallet application may allow a user to manage privacy settings 1631 associated with the users' use of the wallet. For example, the user may be able to specify the information (e.g., 1632-1637) about the user that may be shared during the course of a purchase transaction. For example, in the illustration, the user has allowed the virtual wallet application to share the user's name, and social circle (1632). The user has not yet set a preference for sharing the user's address; thus it may take a default value of medium (e.g., if the risk in the transaction is assessed by the UEP as being above medium, then the UEP may cloak the user's address during the transaction) depending on the type of transaction, in some implementations. The user has explicitly opted against sharing the user's account numbers (e.g., the user wishes for the payment network to cloak the user's account number during the transaction), and the user's live GPS location (see 1638).

Figure 17A:
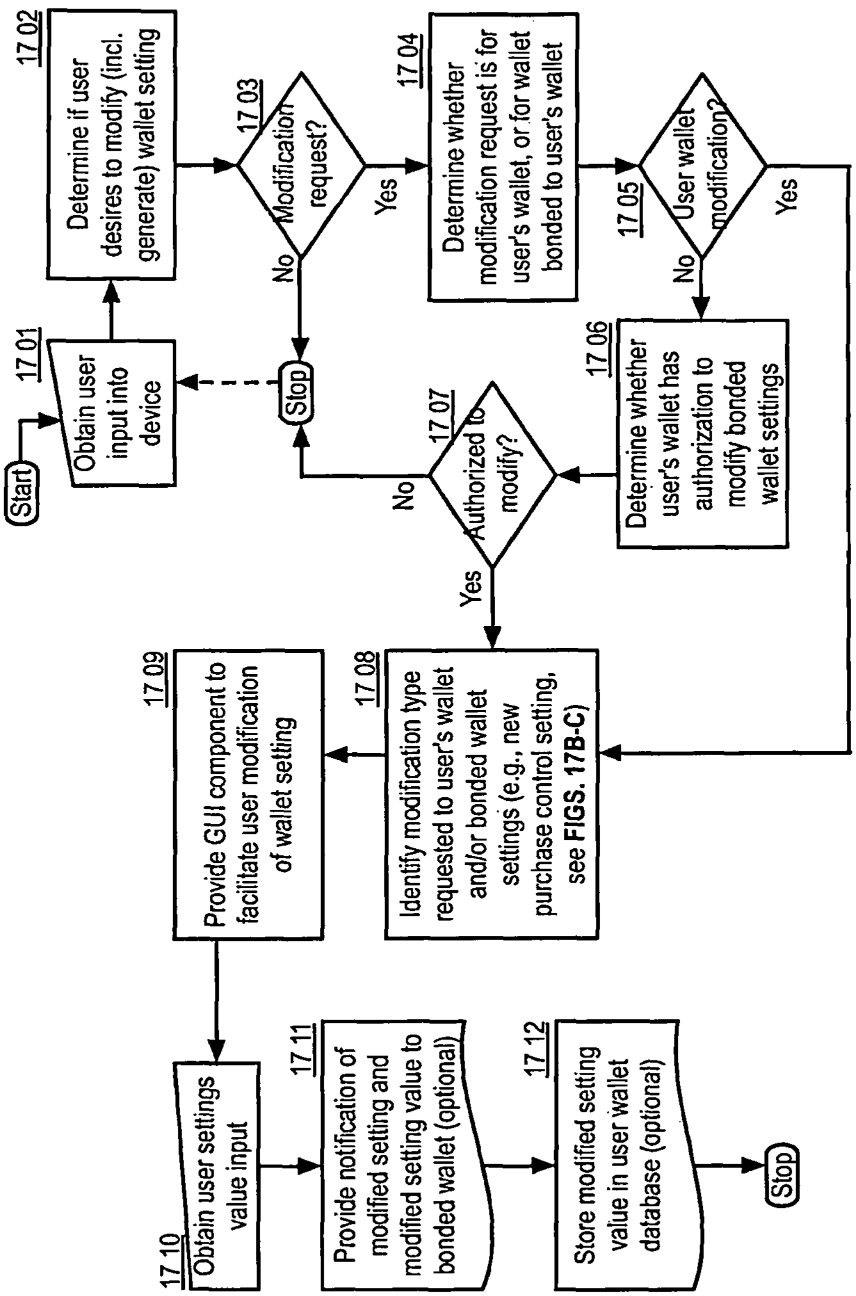
FIGS. 17A-C show logic flow diagrams illustrating example aspects of configuring virtual wallet application settings and implementing purchase controls settings in some embodiments of the UEP.

FIG. 17A shows a logic flow diagram illustrating example aspects of configuring virtual wallet application settings in some embodiments of the UEP, e.g., a Virtual Wallet Settings Configuration ("VWSC") component 1700. In some implementations, a user may desire to modify a setting within the user's virtual wallet application and/or within a virtual wallet application that has a relationship to the user's wallet (e.g., bonded wallet is a child wallet of the user's wallet). The user may provide input to a user device, 1701, indicating the desire to modify a wallet setting. Upon determining that the user desires to modify a wallet setting (see 1702-1703), the device may determine whether the user request is for modification of the user's wallet, or for modification of a wallet bonded to the user's wallet. In some implementations, the wallet application may require the user to enter a password or answer a challenge question successfully before allowing the user to modify a user setting. Further, in some implementations, the device may, if the user desires to modify the wallet settings of a bonded wallet (see 1705), the device may determine whether the user is authorized to do so, 1706. For example, the device may determine the type of relationship between the user's wallet and the bonded wallet; whether the bonded wallet (or its user) is required to provide permission before the wallet settings can be modified; and/or the like. In implementations requiring authorization from the bonded wallet user, the device may provide a request to a device of the bonded wallet user (e.g., via a server system storing network addresses for the devices of each user utilizing a virtual wallet). Upon determining that the user's wallet has authorization to modify the settings of the bonded wallet (see 1707), the device may identify a type of modification that the user desires to perform, 1708. In some implementations, whether the user is authorized to modify a wallet setting may depend on the wallet setting the user desires to modify, in which case the identification of the type of modification may be performed before determining whether the user is authorized to modify the wallet setting. Based on the type of modification requested by the user, the device may provide a graphical user interface (GUI) component (see, e.g., geographical map for marking countries from which transactions may be initiated for a particular purchase control setting, FIG. 16B [center]) to facilitate user entry of the modification to a wallet setting, 1709. The device may obtain the user setting value input via the GUI component, 1710. Where the modification involves a bonded wallet, the device may optionally provide a notification of modification of a setting involving the bonded wallet, 1711. The device may optionally a store the modification of the wallet setting in a database, e.g., in a local database or a cloud storage database, 1712.

Figure 17B:
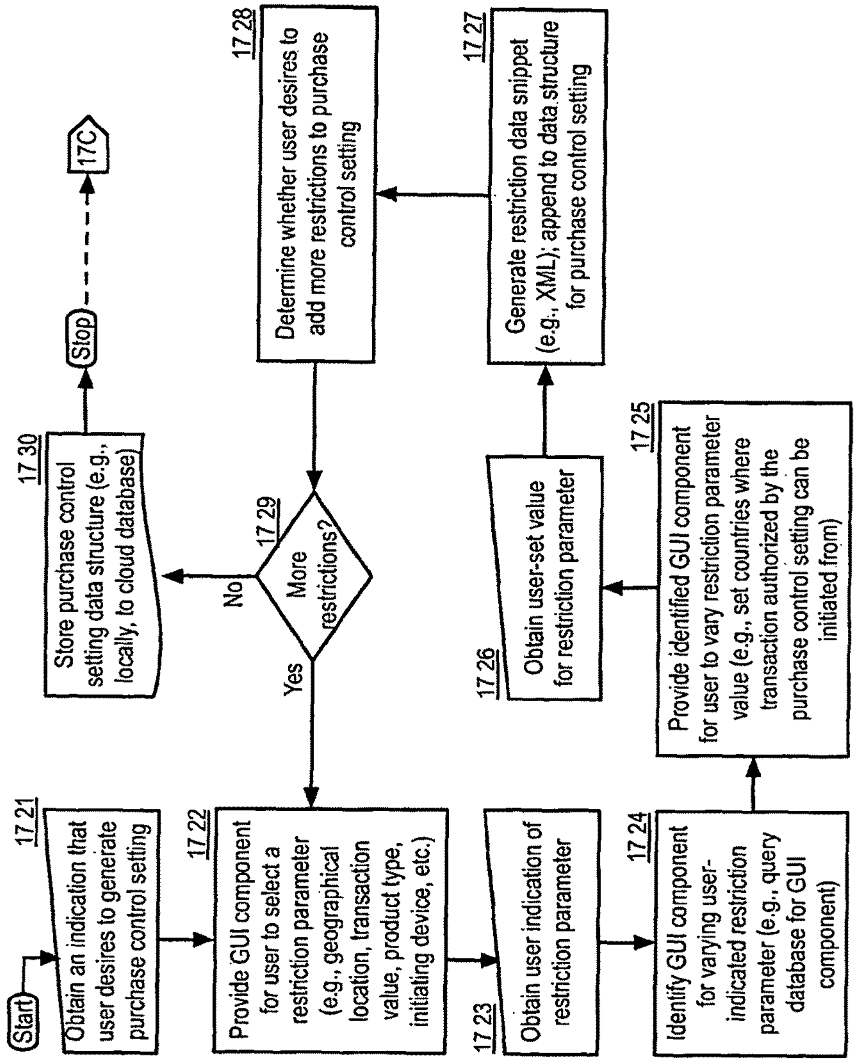
Figure 17C:
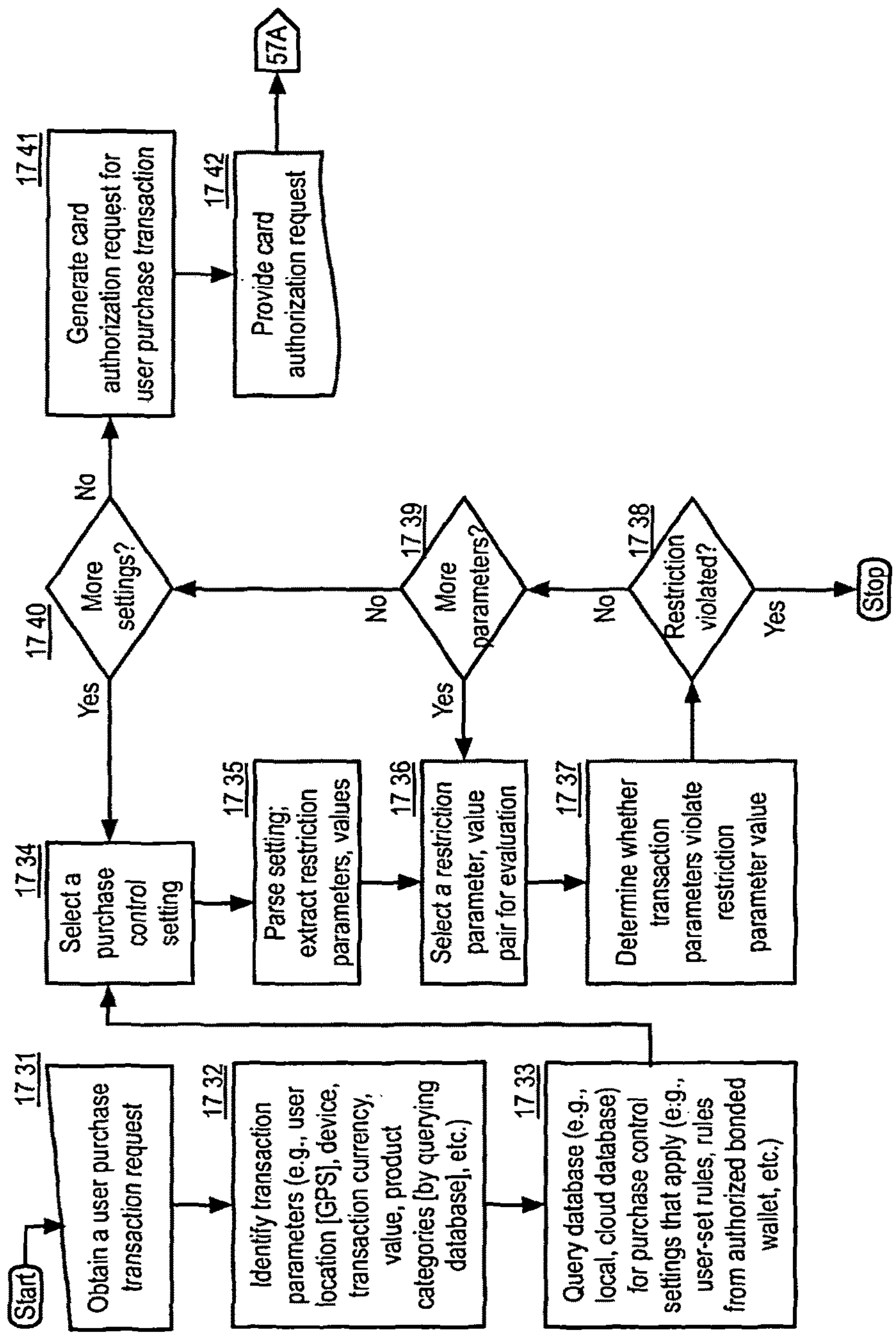

FIGS. 17B-C show logic flow diagrams illustrating example aspects of implementing purchase controls settings in some embodiments of the UEP, e.g., a Purchase Controls Settings ("PCS") component 1720. With reference to FIG. 17B, in some implementations, a user may desire to generate a purchase control setting to monitor and/or restrict transactions of a specific character from being processed by the UEP. The user may provide such an indication into a user device executing a virtual wallet application for the user, 1721. In response, the device may provide a GUI component for the user to select a parameter according to which to restrict transactions initiated from the virtual wallet of the user, 1722 (see, e.g., scroll wheels of FIG. 16B). The user may utilize the GUI component to select a restriction parameter, 1723. Based on the restriction parameter selected (e.g., geographical location, transaction value, transaction card, product category, time, date, currency, account balance(s), etc.), the device may identify, e.g., by querying a database, a GUI component to provide the user for facilitate the user providing a value associated with the restriction parameter (see, e.g., world map of FIG. 16B [center]), 1724. The device may provide the identified GUI component to the user, 1725. Using the GUI component, the user may provide a value for the restriction parameter, 1726. In response, the device may generate a data snippet including an identification of a restriction parameter, and an associated value for the restriction parameter, 1727. For example, the data snippnet may be formatted as an XML data structure. In some implementations, the data structure may also include an indication of whether the restriction parameter value represents an upper bound or lower bound of the range of allowed values for that a parameter. The device may append the data structure for the restriction parameter to a data structure for the overall purchase control setting, 1727. In some implementations, the device may determine whether the user desires to enter more such restriction parameters, and may facilitate the user entering such restriction parameters on top of any previously provided restriction parameters (see 1728-1729). Upon obtaining all restriction parameters for a given purchase control setting, the device may store the finalized purchase control setting to a database (e.g., a local database, a cloud storage database, etc.), 1730.

With reference to FIG. 17C, in some implementations, a user may desire to enter into a purchase transaction. The user may provide an input into user device executing a virtual wallet application indicative of the user's desire to enter into the purchase transaction, 1731. In response, the device may identify the parameters of the transaction (e.g., geographical location, transaction value, transaction card, product category, time, date, cart, wallet type [bonded, unbonded], currency, account balance(s) around the time of initiation of the transation, etc.), 1732. The device may query a database for purchase control settings that may apply to the purchase transaction request, 1733. For example, these could include rules set by a bonded wallet user who has authorization to set purchase controls on the user's wallet. The device may process each purchase control setting to ensure that no setting is violated. In alternative schemes, the device may process purchase control settings until at least one purchase control setting permits the purchase transaction to be performed (or the purchase transaction may be denied if no setting permits it), see 1734. The device may select a purchase control setting, and extract the restriction parameters and their associated value from the purchase control setting data structure. For example, the device may use a a parser similar to the example parsers described below in the discussion with reference a to FIG. 61. The device may select a restriction parameter-value pair, 1736, and determine whether the transaction parameters violate the restriction parameter value, 1737. If the restriction is violated (1738, option "Yes"), the device may deny the purchase transaction request. Otherwise, the device may check each restriction parameter in the purchase control setting (see 1739) in a similar procedure to that described above. If the purchase control setting does not restrict the transaction, the device may execute similar procedure for all the other purchase control settings, unless one of the settings is violated (or, in the alternative scheme, if at least one purchase control setting permits the purchase transaction) (see 1740). If the device determines that the purchase transaction is permitted by the purchase control settings of the user and/or bonded wallet users (1740, option "No"), the device may generate a card authorization request, 1741, and provide the card authorization request for purchase transaction authorization (see FIG. 57A).

Centralized Personal Information Platform

Figure 18:
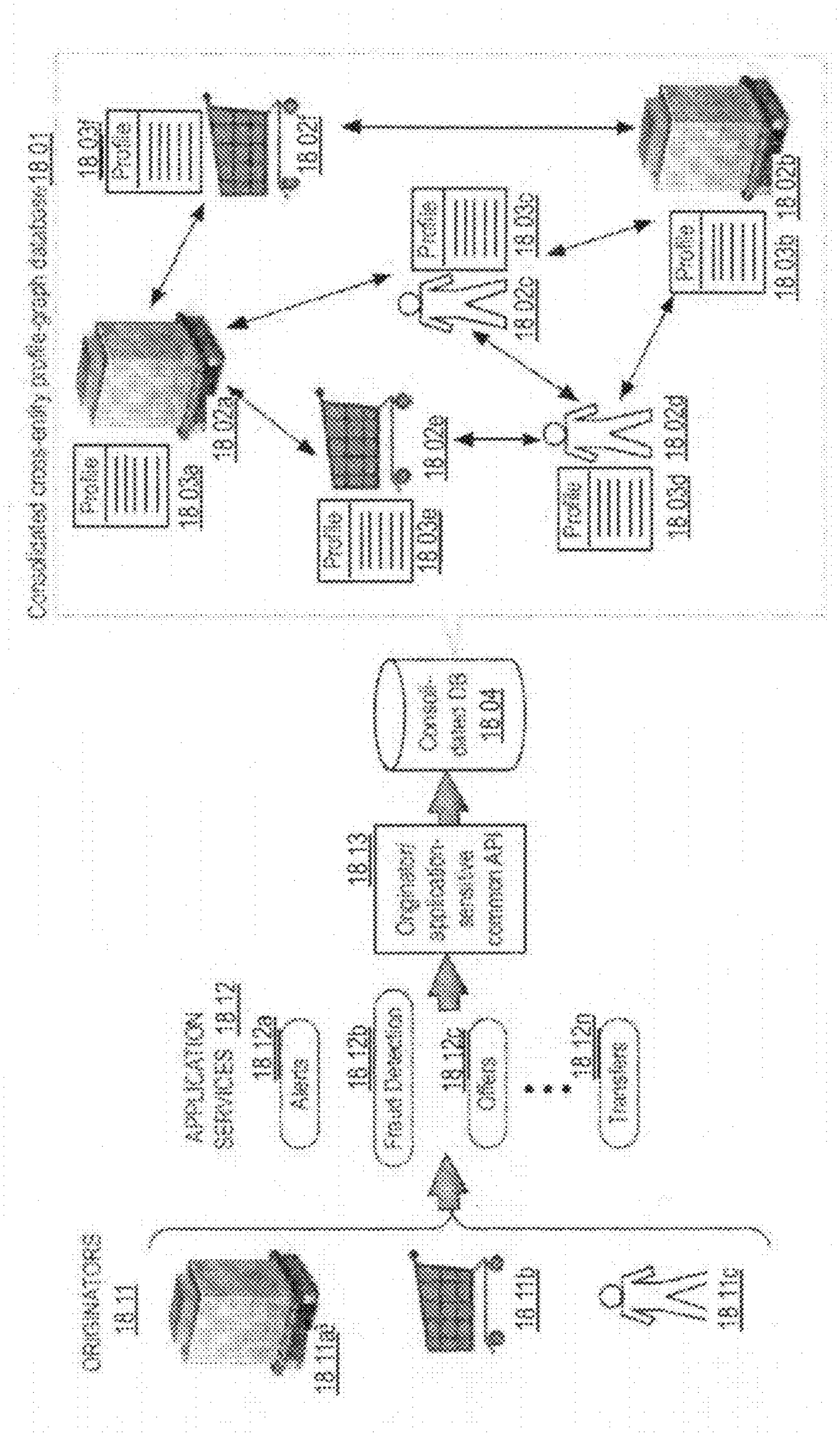
FIG. 18 shows a block diagram illustrating example aspects of a centralized personal information platform in some embodiments of the UEP.
Figure 19A:
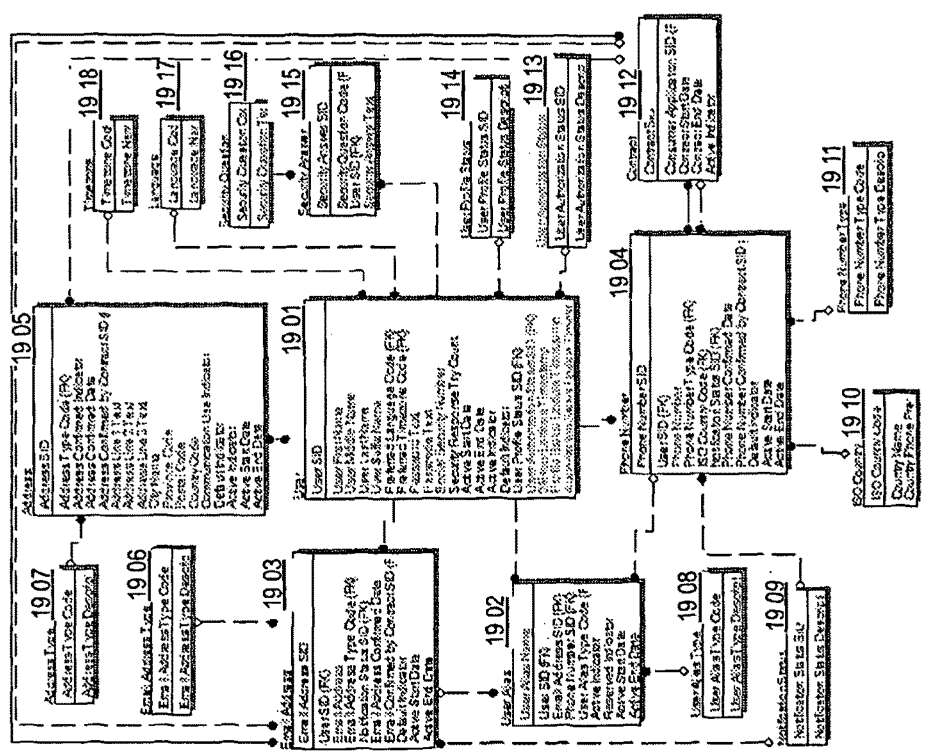
FIGS. 19A-F show block diagrams illustrating example aspects of data models within a centralized personal information platform in some embodiments of the UEP.
Figure 19B:
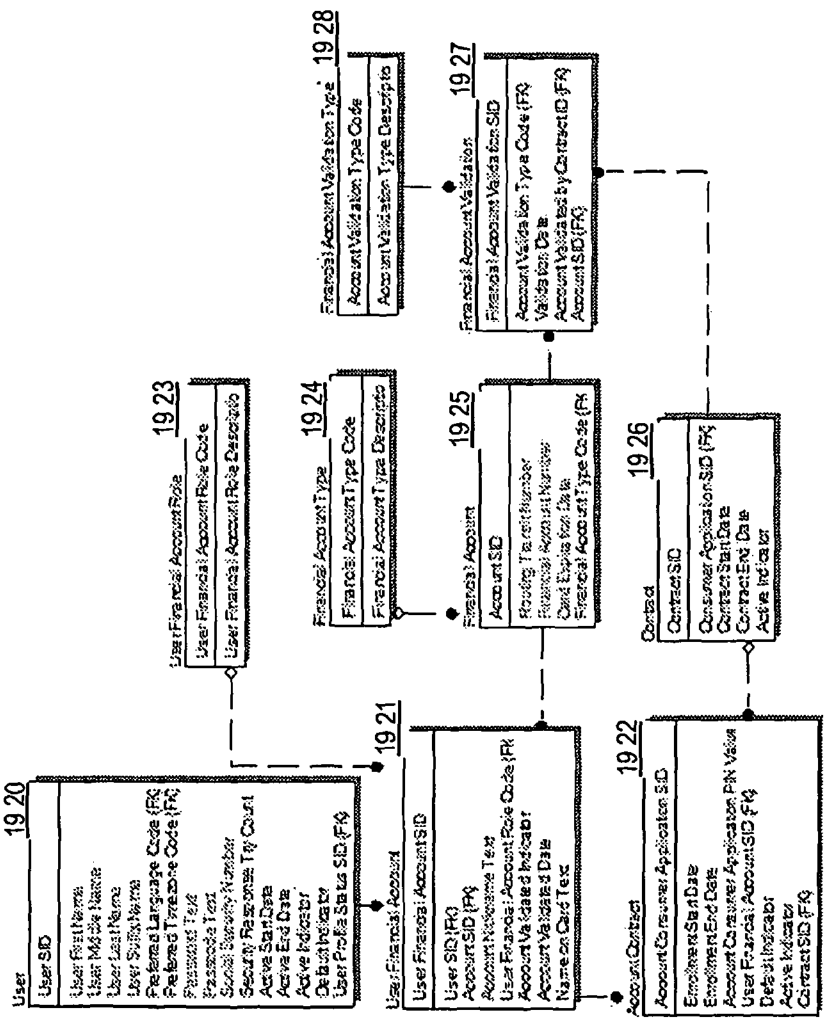
Figure 19C:
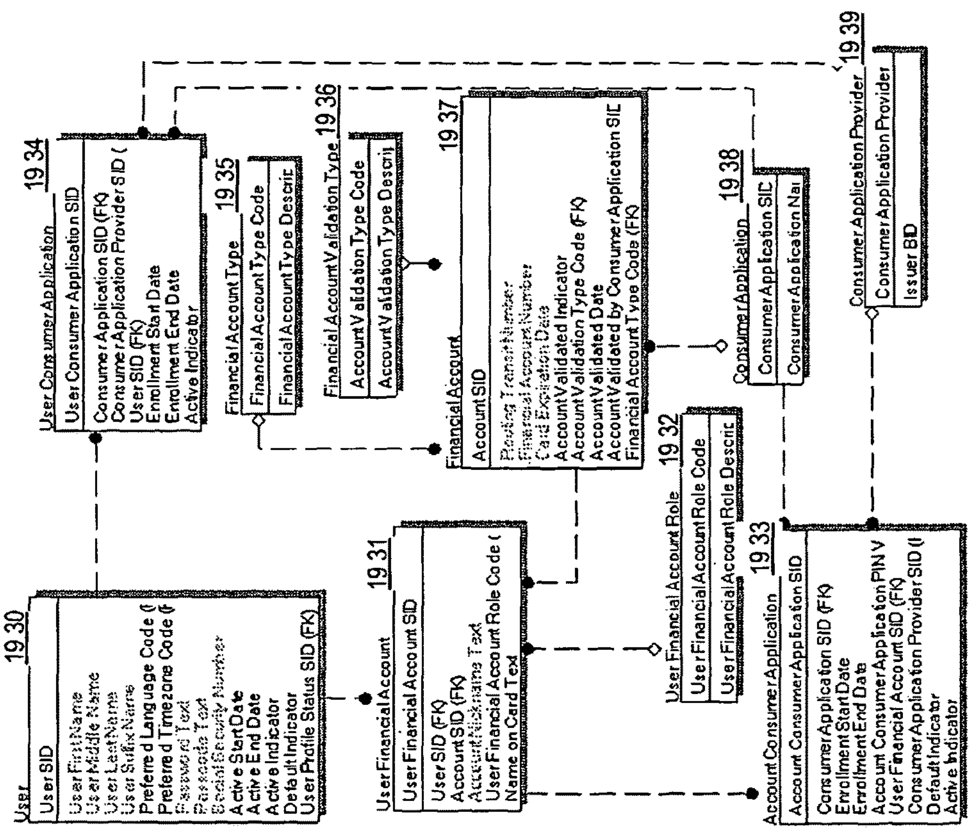
Figure 19D:
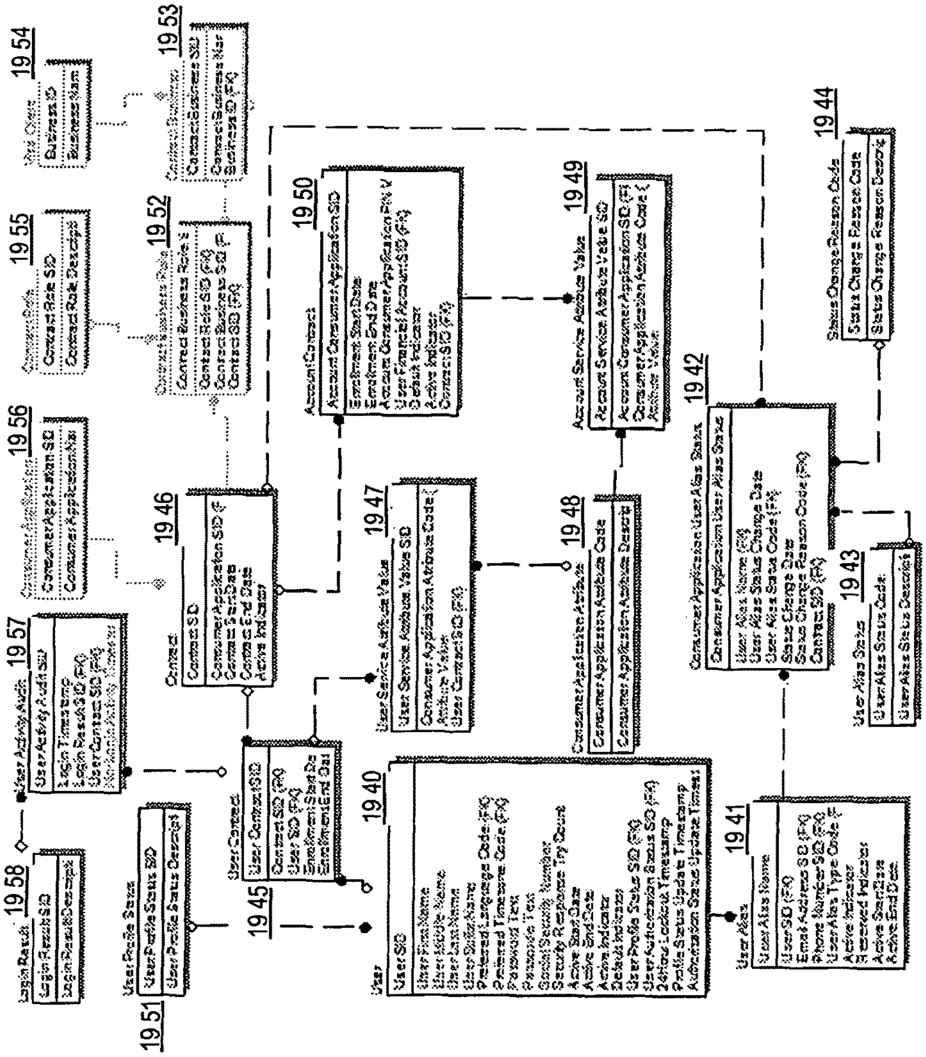
Figure 19E:
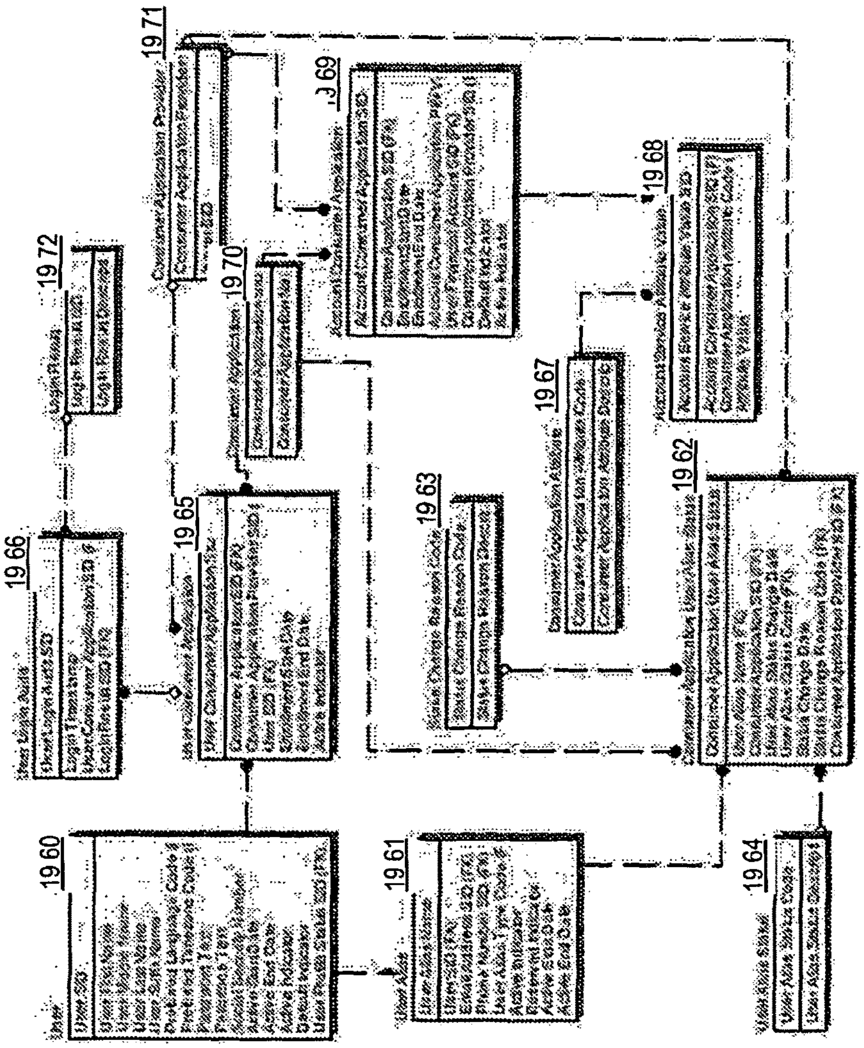
Figure 19F:
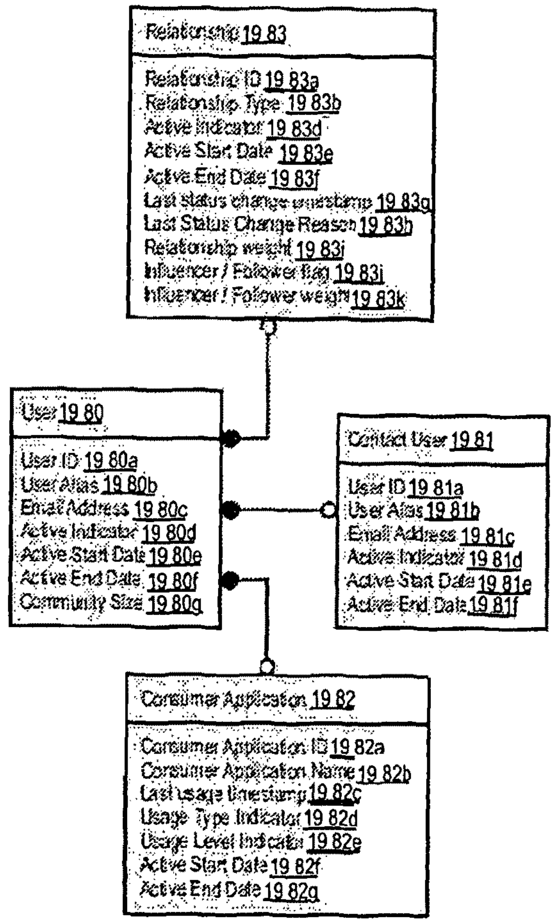

FIG. 18 shows a block diagram illustrating example aspects of a centralized personal information platform in some embodiments of the UEP. In various scenarios, originators 1811 such as merchants 1811*b*, consumers 1811*c*, account issuers, acquirers 1811*a*, and/or the like, desire to utilize information from payment network systems for enabling various features for consumers. Such features may include application services 1812 such as alerts 1812*a*, offers 1812*c*, money transfers 1812*n*, fraud detection 1812*b*, and/or the like. In some embodiments of the UEP, such originators may request data to enable application services from a common, secure, centralized information platform including a consolidated, cross-entity profile-graph database 1801. For example, the originators may submit complex queries to the UEP in a structure format, such as the example below. In this example, the query includes a query to determine a location (e.g., of a user), determine the weather associated with the location, perform analyses on the weather data, and provide an exploded graphical view of the results of the analysis:

```
<int
  Model_id ="1"
  environment_type="RT"
  meta_data="./fModels/robotExample.meta"
  tumblar_location="./fModels/robotExample.tumblar.location"
  input_format="JSON"
  pmmls="AUTONOMOUS_AGENTS.PMML"
  Model_type ="AUTONOMOUS_AGENTS"
>
<vault >
<door:LOCATION>
    <lock name="DETERMINE LOCATION"
      inkey="INPUT" inkeyname="lat"
      inkey2="INPUT" inkeyname2="long"
      function="ROUND"
      fnct1-prec="-2"
      function-1="JOIN"
      fnct2-delim=":"
      tumblar='LAT_LONG.key'
      outkey="TEMP" outkeyname="location"
      type="STRING"
    />
    <lock name="DETERMINE WEATHER"
      inkey="TEMP" inkeyname="location"
      mesh='MESHRT.RECENTWEATHER'
      mesh-query='HASH'
      outkey="TEMP" outkeyname="WEATHERDATA"
      type="ARRAY"
    />
    <lock name="EXPLODE DATA"
      inkey="TEMP" inkeyname="WEATHERDATA"
      function="EXPLODE"
      fnct-delim=":"
      outkey="MODELDATA" outkeystartindex=1
    />
    <lock name="USER SETTINGS"
      inkey="INPUT" inkeyname="USERID"
      mesh='MESHRT.AUTONOMOUSAGENT.SETTINGS'
      mesh-query='HASH'
      outkey="TEMP" outkeyname="USERSETTINGS"
      type="ARRAY"
    />
    <lock name="EXPLODE USER"
      inkey="TEMP" inkeyname="USERSETTINGS"
      function="EXPLODE"
      fnct-delim=":"
      outkey="USERDATA" outkeystartindex=1
    />
    <lock name="RUN MODELE"
      inkey="MODELDATA"
      inkey1="USERDATA"
      function="TREE"
      fnc-pmml="AUTONOMOUS_AGENTS.PMML"
      outkey="OUTPUT" outkeyname="WEATHER"
      type="NUMERIC"
    />
</door>
</vault>
```

A non-limiting, example listing of data that the UEP may return based on a query is provided below. In this example, a user may log into a website via a computing device. The computing device may provide a IP address, and a timestamp to the UEP. In response, the UEP may identify a profile of the user from its database, and based on the profile, return potential merchants for offers or coupons:

```
--------------------------------------------------
------------------ Use Case 3------------------
-- User log into a website
-- Only IP address, GMT and day of week is passed to Mesh
-- Mesh matches profile based on Affinity Group
```

-continued

```
-- Mesh returns potential Merchants for offers or coupons based on tempory
   model using suppression rules
-------------------------------------------------
-- Test case 1 IP:24:227:206 Hour:9 Day:3
-- Test case 2 IP:148:181:75 Hour:4 Day:5
-------------------------------------------------
-------   AffinityGroup Lookup------------
-------------------------------------------------
Look up test case 1
[OrderedDict([('ISACTIVE', 'True'), ('ENTITYKEY', '24:227:206:3:1'), ('XML',
   None), ('AFFINITYGROUPNAME', '24:227:206:3:1'), ('DESCRIPTION', None),
   ('TYPEOF', None), ('UUID', '5f8df970b9ff11e09ab9270cf67eca90')]),
   OrderedDict([('ISACTIVE', 'True'), ('BASEUUID',
   '4fbea327b9ff11e094f433b5d7c45677'), ('TOKENENTITYKEY',
   '4fbea327b9ff11e094f433b5d7c45677:TOKEN:349:F'), ('BASETYPE',
   'MODEL_002_001_00'), ('STATUS', 'ACTIVE'), ('ISSUEDDATE', None),
   ('WEIGHT', '349'), ('CATEGORY', 'F'), ('DOUBLELINKED', None), ('UUID',
   '6b6aab39b9ff11e08d850dc270e3ea06')]), OrderedDict([('ISACTIVE', 'True'),
   ('BASEUUID', '4fbea328b9ff11e0a5f833b5d7c45677'), ('TOKENENTITYKEY',
   '4fbea328b9ff11e0a5f833b5d7c45677:TOKEN:761:1'), ('BASETYPE',
   'MODEL_003_001_00'), ('STATUS', 'ACTIVE'), ('ISSUEDDATE', None),
   ('WEIGHT', '761'), ('CATEGORY', '1'), ('DOUBLELINKED', None), ('UUID',
   '68aaca40b9ff11e0ac799fd4e415d9de')]), OrderedDict([('ISACTIVE', 'True'),
   ('BASEUUID', '4fbea328b9ff11e0a5f833b5d7c45677'), ('TOKENENTITYKEY',
   '4fbea328b9ff11e0a5f833b5d7c45677:TOKEN:637:2'), ('BASETYPE',
   'MODEL_003_001_00'), ('STATUS', 'ACTIVE'), ('ISSUEDDATE', None),
   ('WEIGHT', '637'), ('CATEGORY', '2'), ('DOUBLELINKED', None), ('UUID',
   '6b6d1c38b9ff11e08ce10dc270e3ea06')]), OrderedDict([('ISACTIVE', 'True'),
   ('BASEUUID', '4fbea328b9ff11e0a5f833b5d7c45677'), ('TOKENENTITYKEY',
   '4fbea328b9ff11e0a5f833b5d7c45677:TOKEN:444:3'), ('BASETYPE',
   'MODEL003_001_00'), ('STATUS', 'ACTIVE'), ('ISSUEDDATE', None),
   ('WEIGHT', '444'), ('CATEGORY', '3'), ('DOUBLELINKED', None), ('UUID',
   '6342aa53b9ff11e0bcdb9fd4e415d9de')]), OrderedDict([('ISACTIVE', 'True'),
   ('BASEUUID', '4fbea328b9ff11e0a5f833b5d7c45677'), ('TOKENENTITYKEY',
   '4fbea328b9ff11e0a5f833b5d7c45677:TOKEN:333:4'), ('BASETYPE',
   'MODEL_003_001_00'), ('STATUS', 'ACTIVE'), ('ISSUEDDATE', None),
   ('WEIGHT', '333'), ('CATEGORY', '4'), ('DOUBLELINKED', None), ('UUID',
   '62bd26a2b9ff11e0bc239fd4e415d9de')]), OrderedDict([('ISACTIVE', 'True'),
   ('BASEUUID', '4fbea328b9ff11e0a5f833b5d7c45677'), ('TOKENENTITYKEY',
   '4fbea328b9ff11e0a5f833b5d7c45677:TOKEN:307:5'), ('BASETYPE',
   'MODEL_003_001_00'), ('STATUS', 'ACTIVE'), ('ISSUEDDATE', None),
   ('WEIGHT', '307'), ('CATEGORY', '5'), ('DOUBLELINKED', None), ('UUID',
   '6b6d1c39b9ff11e0986c0dc270e3ea06')]), OrderedDict([('ISACTIVE', 'True'),
   ('BASEUUID', '4fbea32db9ff11e09f3e33b5d7c45677'), ('TOKENENTITYKEY',
   '4fbea32db9ff11e09f3e33b5d7c45677:TOKEN:801:Spend'), ('BASETYPE',
   'MODEL_008_001_00'), ('STATUS', 'ACTIVE'), ('ISSUEDDATE', None),
   ('WEIGHT', '801'), ('CATEGORY', 'Spend'), ('DOUBLELINKED', None), ('UUID',
   '6b6d1c3ab9ff11e0a4ec0dc270e3ea06')]), OrderedDict([('ISACTIVE', 'True'),
   ('BASEUUID', '4fbea32eb9ff11e0b55133b5d7c45677'), ('TOKENENTITYKEY',
   '4fbea32eb9ff11e0b55133b5d7c45677:TOKEN:1:Volume'), ('BASETYPE',
   'MODEL_009_001_00'), ('STATUS', 'ACTIVE'), ('ISSUEDDATE', None),
   ('WEIGHT', '1'), ('CATEGORY', 'Volume'), ('DOUBLELINKED', None), ('UUID',
   '62a09df3b9ff11e090d79fd4e415d9de')])]
Found a direct match
148:181:75:1:2
-- Failed to find a direct match
-- Try again with only IP address and hour
[OrderedDict([('ISACTIVE', 'True'), ('ENTITYKEY', '148:181:75:1:1'), ('XML',
   None), ('AFFINITYGROUPNAME', '148:181:75:1:1'), ('DESCRIPTION', None),
   ('TYPEOF', None)])]
-- Found match for case 2
----------------------------------------------------------
----------------- Temporary model rules -----------
----------------------------------------------------------
{1: {'LOWER': 10, 'BASETYPE': ['MODEL_002_001_00', 'MODEL_003_001_00'],
   'attribute': 'WEIGHT', 'rule': 'NEAR', 'OP': 'PROX', 'type': 'TOKENENTITY',
   'HIGHER': 10}, 2: {'type': ['MERCHANT'], 'rule': 'FOLLOW'}, 3: {'rule':
   'RESTRICTSUBTYPE', 'BASETYPE': ['MODEL_002_001_00',
   'MODEL_003_001_00']}}
----------------------------------------------------------
----------------- Temporary Model Output---------
------------------ For Use Case 1    -----------------
----------------------------------------------------------
-- Number of Nodes:102
 ______________LIVRARIASICILIAN
  ______________________GDPCOLTD
 _________GOODWILLINDUSTRIES
  ___________________DISCOUNTDE
  ________________BARELANCHOE
```

-continued

_______________BLOOMINGDALES
____________PARCWORLDTENNIS
_____________STRIDERITEOUTLET
___________________PARCCEANOR
_____________________PONTOFRIO
_________________FNACPAULISTA
_____________________FINISHLINE
_____________WALMARTCENTRAL
____________BESNIINTERLARGOS
___________PARCLOJASCOLOMBO
________________SHOPTIMEINTER
______________BEDBATHBEYOND
____________________MACYSWEST
________PARCRIACHUELOFILIAL
_____________JCPENNEYCORPINC
___________PARCLOJASRENNERFL
_______PARCPAQUETAESPORTES
_______________________MARISALJ
_______PARCLEADERMAGAZINE
____________________INTERFLORA
____________________DECATHLON
____________PERNAMBUCANASFL
___________________KARSTADTDE
__________________PARCCEAMCO
_________________________CHAMPS
___________________ACCESSORIZE
__________BLOOMINGDALESDVRS
_______PARCLIVRARIACULTURA
__________________PARCCEALOJA
________________ARQUIBANCADA
__________________________KITBAG
___________FREDERICKSOFHLWD
______________________WALMART
________PARCLOJASINSINUANTE
_________WALMARTCONTAGEM
___________________FOOTLOCKER
______________PARCSANTALOLLA
_______________RICARDOELETRO
________________PARCPONTOFRIO
______________DOTPAYPLPOLSKA
_____________________CAMICADO
_____________________KARSTADT
_________________PARCRAMSONS
_________________PARCGREGORY
___________________GREMIOFBPA
___________________WALMARTSJC
________PRODIRECTSOCCERLTD
__________________LAVIEENROSE
_________________PARCMARISALJ
_________________________ORDERS
________PARCNSNNATALNORTE
______________LOJASINSINUANTE
________________________________B
___________________CITYCOUNTY
___________WALMARTPACAEMBU
____________________________SOHO
______________WALMARTOSASCO
______________FOSSILSTORESIINC
__________________MENARDSCLIO
_________________PARCPEQUENTE
__________________________BEALLS
________________THEHOMEDEPOT
__________________________VIAMIA
________PARCLOJASRIACHUELO
_____________PARCLOJASMILANO
____________________NORDSTROM
_______WAILANACOFFEEHOUSE
________________LANCHOEBELLA
___________________________PUKET
__________WALMARTSTORESINC
______PARCPERNAMBUCANASFL
________________SMARTSHOPPER
_______PARCMAGAZINELUIZASP
____COLUMBIASPORTSWEARCO
_____________BARELANCESTADA
__________________DONATEEBAY
_________PARCRICARDOELETRO
_______________PARCDISANTINNI
____________________SCHUHCOUK

-continued

```
______________________CEANOR
______________PARCCAMICADO
____________PARCCENTAUROCE
____________PARCMARLUIJOIAS
_____________________ALBADAH
_____________________MARTINEZ
__________MONEYBOOKERSLTD
_________________________MACYS
______________PARCRIOCENTER
_____________PARCCASASBAHIA
_________PARCSUBMARINOLOJA
_____________________________INC
______________SUBMARINOLOJA
______________LOJASRENNERFL
_____________RIACHUELOFILIAL
____________PARCSONHODOSPES
_____________________PINKBIJU
_________________PARCCEAMRB
------------------------------------------------------------
----------------- Temporary model Output ---------
------------------ For Use Case 2    -----------------
------------------------------------------------------------
-- Number of Nodes:3
______________________KITBAG
____COLUMBIASPORTSWEARCO
________________GREMIOFBPA
---------------------------------------------------------------
--------   End of ExampleUse Case            ---
---------------------------------------------------------------
```

In some embodiments, the UEP may provide access to information on a need-to-know basis to ensure the security of data of entities on which the UEP stores information. Thus, in some embodiments, access to information from the centralized platform may be restricted based on the originator as well as application services for which the data is requested. In some embodiments, the UEP may thus allow a variety of flexible application services to be built on a common database infrastructure, while preserving the integrity, security, and accuracy of entity data. In some implementations, the UEP may generate, update, maintain, store and/or provide profile information on entities, as well as a social graph that maintains and updates interrelationships between each of the entities stored within the UEP. For example, the a UEP may store profile information on an issuer bank 1802*a* (see profile 1803*a*), a acquirer bank 1802*b* (see profile 1803*b*), a consumer 1802*c* (see profile 1803*c*), a user 1802*d* (see profile 1803*d*), a merchant 1802*e* (see profile 1803*e*), a second merchant 1802*f* (see profile 18030. The UEP may also store relationships between such entities. For example, the UEP may store information on a relationship of the issuer bank 1802*a* to the consumer 1802*c* shopping at merchant 1802*e*, who in turn may be related to user 1802*d*, who might bank at the back 1802*b* that serves as acquirer for merchant 1802*f*.

FIGS. 19A-F show block diagrams illustrating example aspects of data models within a centralized personal information platform in some embodiments of the UEP. In various embodiments, the UEP may store a variety of attributes of entities according to various data models. A few non-limiting example data models are provided below. In some embodiments, the UEP may store user profile attributes. For example, a user profile model may store user identifying information 1901, user aliases 1902, email addresses 1903, phone numbers 1904, addresses 1905, email address types 1906, address types 1907, user alias types 1908, notification statuses 1909, ISO country 1910, phone number types 1911, contract information with the UEP 1912, user authorization status 1913, user profile status 1914, security answer 1915, security questions 1916, language 1917, time zone 1918, and/or the like, each of the above field types including one or more fields and field values. As another example, a user financial attributes model may store user identifying information 1920, user financial account information 1921, account contract information 1922, user financial account role 1923, financial account type 1924, financial account identifying information 1925, contract information 1926, financial account validation 1927, financial account validation type 1928, and/or the like. As another example, a user payment card attributes data model may include field types such s, but not limited to: user identifying information 1930, user financial account information 1931, user financial account role 1932, account consumer applications 1933, user consumer application 1934, financial account type 1935, financial account validation type 1936, financial account information 1937, consumer application information 1938, consumer application provider information 1939, and/or the like. As another example, a user services attributes data model may include field types such as, but not limited to: user identifying information 1940, user alias 1941, consumer application user alias status 1942, user alias status 1943, status change reason code 1944, user contract 1945, contract information 1946, user service attribute value 1947, consumer application attributes 1948, account service attribute value, account contract 1950, user profile status 1951, contract business role 1952, contract business 1953, client information 1954, contract role 1955, consumer application 1956, user activity audit 1957, login results 1958, and/or the like. As another example, a user services usage attributes data model may include field types such as, but not limited to: user identifying information 1960, user alias 1961, consumer application user alias status 1962, status change reason code 1963, user alias status 1964, user consumer application 1965, user login audit 1966, login result 1967, account service attribute value 1968, account consumer application 1969, consumer application 1970, consumer application provider 1971, login result 1972, and/or the like. As another example, a user graph attributes data model may include field types such as, but not limited to: user identifying information 1980, user contact 1981, consumer application user alias status 1982, relationship 1983, and/or the like. In some embodiments, the UEP may store each object (e.g., user, merchant, issuer, acquirer, IP address, household, etc.) as a node in graph database, and store data with respect to each node in a format such as the example format provided below:

```
<Nodes Data>
ID,Nodes,Label
2fdc7e3fbd1c11e0be645528b00e8d0e,2fdc7e3fbd1c11e0be645528b00e8d0e,AFFINITYGROUP
    NAME:49:95:0:3:1
32b1d53ebd1c11e094172557fb829fdf,32b1d53ebd1c11e094172557fb829fdf,TOKENENTITYKEY:
    2b8494f0bd1c11e09c856d888c43f7c2:TOKEN:0:F
2e6381e4bd1c11e0b9ffc929a54bb0fd,2e6381e4bd1c11e0b9ffc929a54bb0fd,MERCHANTNAME:
    ____________MERCHANT__ABC
2fdc7e3dbd1c11e0a22d5528b00e8d0e,2fdc7e3dbd1c11e0a22d5528b00e8d0e,AFFINITYGROUP
    NAME:49:95:0:1:1
2e6381e7bd1c11e091b7c929a54bb0fd,2e6381e7bd1c11e091b7c929a54bb0fd,MERCHANTNAME:
    ____________MERCHANT__XYZ
2cf8cbabbd1c11e0894a5de4f9281135,2cf8cbabbd1c11e0894a5de4f9281135,USERNAME:0000
    60FF6557F103
2e6381debd1c11e0b336c929a54bb0fd,2e6381debd1c11e0b336c929a54bb0fd,MERCHANTNAME:
    ____________MERCHANT__123
2e6381e0bd1c11e0b4e8c929a54bb0fd,2e6381e0bd1c11e0b4e8c929a54bb0fd,MERCHANTNAME:
    ____________MERCHANT__FGH
2cf681c1bd1c11e0b8815de4f9281135,2cf681c1bd1c11e0b8815de4f9281135,USERNAME:0000
    30C57080FFE8
2b8494f1bd1c11e0acbd6d888c43f7c2,2b8494f1bd1c11e0acbd6d888c43f7c2,MODELNAME:MODEL
    __003__001__00
32b44638bd1c11e0b01c2557fb829fdf,32b44638bd1c11e0b01c2557fb829fdf,TOKENENTITYKEY:
    2b8494f1bd1c11e0acbd6d888c43f7c2:TOKEN:1000:1
2fdc7e40bd1c11e094675528b00e8d0e,2fdc7e40bd1c11e094675528b00e8d0e,AFFINITYGROUP
    NAME:49:95:0:4:1
2b8494f0bd1c11e09c856d888c43f7c2,2b8494f0bd1c11e09c856d888c43f7c2,MODELNAME:MODEL
    __002__001__00
32b44639bd1c11e0b15b2557fb829fdf,32b44639bd1c11e0b15b2557fb829fdf,TOKENENTITYKEY:
    2b8494f1bd1c11e0acbd6d888c43f7c2:TOKEN:0:2
32ce84febd1c11e0b0112557fb829fdf,32ce84febd1c11e0b0112557fb829fdf,TOKENENTITYKEY:
    2b8494f1bd1c11e0acbd6d888c43f7c2:TOKEN:1000:4
2e6381e3bd1c11e095b1c929a54bb0fd,2e6381e3bd1c11e095b1c929a54bb0fd,MERCHANTNAME:
    ____________MERCHANT__789
34582a87bd1c11e080820167449bc60f,34582a87bd1c11e080820167449bc60f,TOKENENTITYKEY:
    2b8494f1bd1c11e0acbd6d888c43f7c2:TOKEN:778:5
2e6381e5bd1c11e0b62cc929a54bb0fd,2e6381e5bd1c11e0b62cc929a54bb0fd,MERCHANTNAME:
    ____________MERCHANT__456
2fdc7e3ebd1c11e088b55528b00e8d0e,2fdc7e3ebd1c11e088b55528b00e8d0e,AFFINITYGROUP
    NAME:49:95:0:2:1
32c4e80dbd1c11e09e442557fb829fdf,32c4e80dbd1c11e09e442557fb829fdf,TOKENENTITYKEY:
    2b8494f1bd1c11e0acbd6d888c43f7c2:TOKEN:774:5
2e6381e1bd1c11e0bf28c929a54bb0fd,2e6381e1bd1c11e0bf28c929a54bb0fd,MERCHANTNAME:
    ____________MERCHANT__WER
2cf681b8bd1c11e08be85de4f9281135,2cf681b8bd1c11e08be85de4f9281135,USERNAME:0000
    2552FC930FF8
2cf8cba8bd1c11e09fbc5de4f9281135,2cf8cba8bd1c11e09fbc5de4f9281135,USERNAME:0000
    570FF1B46A24
32b4463abd1c11e0bdaa2557fb829fdf,32b4463abd1c11e0bdaa2557fb829fdf,TOKENENTITYKEY:
    2b8494f1bd1c11e0acbd6d888c43f7c2:TOKEN:0:3
2cf8cbaebd1c11e0b6515de4f9281135,2cf8cbaebd1c11e0b6515de4f9281135,USERNAME:0000
    64A20FF962D4
2e6381e6bd1c11e08087c929a54bb0fd,2e6381e6bd1c11e08087c929a54bb0fd,MERCHANTNAME:
    ____________MERCHANT__496
2e6381e2bd1c11e0941dc929a54bb0fd,2e6381e2bd1c11e0941dc929a54bb0fd,MERCHANTNAME:
    ____________MERCHANT__SDF
<Edge Data>Source,Target,Type,label, Weight
32ce84febd1c11e0b0112557fb829fdf,2e6381e6bd1c11e08087c929a54bb0fd,MODEL__003__001
    __00,2b8494f1bd1c11e0acbd6d888c43f7c2:TOKEN:1000:4,1000
2fdc7e3ebd1c11e088b55528b00e8d0e,32ce84febd1c11e0b0112557fb829fdf,MODEL__003__001
    __00,2b8494f1bd1c11e0acbd6d888c43f7c2:TOKEN:1000:4,1000
2e6381e2bd1c11e0941dc929a54bb0fd,34582a87bd1c11e080820167449bc60f,MODEL__003__001
    __00,2b8494f1bd1c11e0acbd6d888c43f7c2:TOKEN:778:5,778
2b8494f1bd1c11e0acbd6d888c43f7c2,34582a87bd1c11e080820167449bc60f,MODEL__003__001
    __00,2b8494f1bd1c11e0acbd6d888c43f7c2:TOKEN:778:5,778
2e6381e1bd1c11e0bf28c929a54bb0fd,32b44639bd1c11e0b15b2557fb829fdf,MODEL__003__001
    __00,2b8494f1bd1c11e0acbd6d888c43f7c2:TOKEN:0:2,0
2e6381e0bd1c11e0b4e8c929a54bb0fd,32ce84febd1c11e0b0112557fb829fdf,MODEL__003__001
    __00,2b8494f1bd1c11e0acbd6d888c43f7c2:TOKEN:1000:4,1000
32b44639bd1c11e0b15b2557fb829fdf,2e6381e6bd1c11e08087c929a54bb0fd,MODEL__003__001
    __00,2b8494f1bd1c11e0acbd6d888c43f7c2:TOKEN:0:2,0
2e6381e1bd1c11e0bf28c929a54bb0fd,32ce84febd1c11e0b0112557fb829fdf,MODEL__003__001
    __00,2b8494f1bd1c11e0acbd6d888c43f7c2:TOKEN:1000:4,1000
2e6381debd1c11e0b336c929a54bb0fd,32ce84febd1c11e0b0112557fb829fdf,MODEL__003__001
    __00,2b8494f1bd1c11e0acbd6d888c43f7c2:TOKEN:1000:4,1000
```

2e6381e3bd1c11e095b1c929a54bb0fd,34582a87bd1c11e080820167449bc60f,MODEL__003__001__00,2b8494f1bd1c11e0acbd6d888c43f7c2:TOKEN:778:5,778
2fdc7e40bd1c11e094675528b00e8d0e,32b44639bd1c11e0b15b2557fb829fdf,MODEL__003__001__00,2b8494f1bd1c11e0acbd6d888c43f7c2:TOKEN:0:2,0
2b8494f1bd1c11e0acbd6d888c43f7c2,32b4463abd1c11e0bdaa2557fb829fdf,MODEL__003__001__00,2b8494f1bd1c11e0acbd6d888c43f7c2:TOKEN:0:3,0
2e6381e3bd1c11e095b1c929a54bb0fd,32b4463abd1c11e0bdaa2557fb829fdf,MODEL__003__001__00,2b8494f1bd1c11e0acbd6d888c43f7c2:TOKEN:0:3,0
2e6381e3bd1c11e095b1c929a54bb0fd,32b1d53ebd1c11e094172557fb829fdf,MODEL__002__001__00,2b8494f0bd1c11e09c856d888c43f7c2:TOKEN:0:F,0
2e6381e5bd1c11e0b62cc929a54bb0fd,34582a87bd1c11e080820167449bc60f,MODEL__003__001__00,2b8494f1bd1c11e0acbd6d888c43f7c2:TOKEN:778:5,778
2cf8cbabbd1c11e0894a5de4f9281135,32b44638bd1c11e0b01c2557fb829fdf,MODEL__003__001__00,2b8494f1bd1c11e0acbd6d888c43f7c2:TOKEN:1000:1,1000
2cf681b8bd1c11e08be85de4f9281135,32b1d53ebd1c11e094172557fb829fdf,MODEL__002__001__00,2b8494f0bd1c11e09c856d888c43f7c2:TOKEN:0:F,0
32b4463abd1c11e0bdaa2557fb829fdf,2e6381e6bd1c11e08087c929a54bb0fd,MODEL__003__001__00,2b8494f1bd1c11e0acbd6d888c43f7c2:TOKEN:0:3,0
2e6381debd1c11e0b336c929a54bb0fd,32b44639bd1c11e0b15b2557fb829fdf,MODEL__003__001__00,2b8494f1bd1c11e0acbd6d888c43f7c2:TOKEN:0:2,0
2e6381e1bd1c11e0bf28c929a54bb0fd,32b44638bd1c11e0b01c2557fb829fdf,MODEL__003__001__00,2b8494f1bd1c11e0acbd6d888c43f7c2:TOKEN:1000:1,1000
2e6381e5bd1c11e0b62cc929a54bb0fd,32ce84febd1c11e0b0112557fb829fdf,MODEL__003__001__00,2b8494f1bd1c11e0acbd6d888c43f7c2:TOKEN:1000:4,1000
2e6381e1bd1c11e0bf28c929a54bb0fd,32b4463abd1c11e0bdaa2557fb829fdf,MODEL__003__001__00,2b8494f1bd1c11e0acbd6d888c43f7c2:TOKEN:0:3,0
2e6381e2bd1c11e0941dc929a54bb0fd,32b44639bd1c11e0b15b2557fb829fdf,MODEL__003__001__00,2b8494f1bd1c11e0acbd6d888c43f7c2:TOKEN:0:2,0
2b8494f1bd1c11e0acbd6d888c43f7c2,32c4e80dbd1c11e09e442557fb829fdf,MODEL__003__001__00,2b8494f1bd1c11e0acbd6d888c43f7c2:TOKEN:774:5,774
2e6381e2bd1c11e0941dc929a54bb0fd,32b1d53ebd1c11e094172557fb829fdf,MODEL__002__001__00,2b8494f0bd1c11e09c856d888c43f7c2:TOKEN:0:F,0
2e6381e4bd1c11e0b9ffc929a54bb0fd,32b4463abd1c11e0bdaa2557fb829fdf,MODEL__003__001__00,2b8494f1bd1c11e0acbd6d888c43f7c2:TOKEN:0:3,0
2fdc7e3fbd1c11e0be645528b00e8d0e,32b4463abd1c11e0bdaa2557fb829fdf,MODEL__003__001__00,2b8494f1bd1c11e0acbd6d888c43f7c2:TOKEN:0:3,0
2e6381e1bd1c11e0bf28c929a54bb0fd,32b1d53ebd1c11e094172557fb829fdf,MODEL__002__001__00,2b8494f0bd1c11e09c856d888c43f7c2:TOKEN:0:F,0
2fdc7e40bd1c11e094675528b00e8d0e,32ce84febd1c11e0b0112557fb829fdf,MODEL__003__001__00,2b8494f1bd1c11e0acbd6d888c43f7c2:TOKEN:1000:4,1000
2cf8cba8bd1c11e09fbc5de4f9281135,32c4e80dbd1c11e09e442557fb829fdf,MODEL__003__001__00,2b8494f1bd1c11e0acbd6d888c43f7c2:TOKEN:774:5,774
2e6381e2bd1c11e0941dc929a54bb0fd,32b44638bd1c11e0b01c2557fb829fdf,MODEL__003__001__00,2b8494f1bd1c11e0acbd6d888c43f7c2:TOKEN:1000:1,1000
2e6381e4bd1c11e0b9ffc929a54bb0fd,32b1d53ebd1c11e094172557fb829fdf,MODEL__002__001__00,2b8494f0bd1c11e09c856d888c43f7c2:TOKEN:0:F,0
2e6381e5bd1c11e0b62cc929a54bb0fd,32b44639bd1c11e0b15b2557fb829fdf,MODEL__003__001__00,2b8494f1bd1c11e0acbd6d888c43f7c2:TOKEN:0:2,0
32b1d53ebd1c11e094172557fb829fdf,2e6381e6bd1c11e08087c929a54bb0fd,MODEL__002__001__00,2b8494f0bd1c11e09c856d888c43f7c2:TOKEN:0:F,0
2b8494f1bd1c11e0acbd6d888c43f7c2,32b44639bd1c11e0b15b2557fb829fdf,MODEL__003__001__00,2b8494f1bd1c11e0acbd6d888c43f7c2:TOKEN:0:2,0
2e6381e3bd1c11e095b1c929a54bb0fd,32b44638bd1c11e0b01c2557fb829fdf,MODEL__003__001__00,2b8494f1bd1c11e0acbd6d888c43f7c2:TOKEN:1000:1,1000
2fdc7e3dbd1c11e0a22d5528b00e8d0e,32ce84febd1c11e0b0112557fb829fdf,MODEL__003__001__00,2b8494f1bd1c11e0acbd6d888c43f7c2:TOKEN:1000:4,1000
2cf681c1bd1c11e0b8815de4f9281135,32b44638bd1c11e0b01c2557fb829fdf,MODEL__003__001__00,2b8494f1bd1c11e0acbd6d888c43f7c2:TOKEN:1000:1,1000
2cf681c1bd1c11e0b8815de4f9281135,32b1d53ebd1c11e094172557fb829fdf,MODEL__002__001__00,2b8494f0bd1c11e09c856d888c43f7c2:TOKEN:0:F,0
2e6381e3bd1c11e095b1c929a54bb0fd,32b44639bd1c11e0b15b2557fb829fdf,MODEL__003__001__00,2b8494f1bd1c11e0acbd6d888c43f7c2:TOKEN:0:2,0
2fdc7e3fbd1c11e0be645528b00e8d0e,32b1d53ebd1c11e094172557fb829fdf,MODEL__002__001__00,2b8494f0bd1c11e09c856d888c43f7c2:TOKEN:0:F,0
32b44638bd1c11e0b01c2557fb829fdf,2e6381e6bd1c11e08087c929a54bb0fd,MODEL__003__001__00,2b8494f1bd1c11e0acbd6d888c43f7c2:TOKEN:1000:1,1000
2cf8cbaebd1c11e0b6515de4f9281135,32ce84febd1c11e0b0112557fb829fdf,MODEL__003__001__00,2b8494f1bd1c11e0acbd6d888c43f7c2:TOKEN:1000:4,1000
2e6381e6bd1c11e08087c929a54bb0fd,32b1d53ebd1c11e094172557fb829fdf,MODEL__002__001__00,2b8494f0bd1c11e09c856d888c43f7c2:TOKEN:0:F,0
2e6381e7bd1c11e091b7c929a54bb0fd,34582a87bd1c11e080820167449bc60f,MODEL__003__001__00,2b8494f1bd1c11e0acbd6d888c43f7c2:TOKEN:778:5,778
2e6381e1bd1c11e0bf28c929a54bb0fd,34582a87bd1c11e080820167449bc60f,MODEL__003__001__00,2b8494f1bd1c11e0acbd6d888c43f7c2:TOKEN:778:5,778
2e6381e5bd1c11e0b62cc929a54bb0fd,32b1d53ebd1c11e094172557fb829fdf,MODEL__002__001__00,2b8494f0bd1c11e09c856d888c43f7c2:TOKEN:0:F,0
2b8494f0bd1c11e09c856d888c43f7c2,32b1d53ebd1c11e094172557fb829fdf,MODEL__002__001__00,2b8494f0bd1c11e09c856d888c43f7c2:TOKEN:0:F,0

-continued

2b8494f1bd1c11e0acbd6d888c43f7c2,32b44638bd1c11e0b01c2557fb829fdf,MODEL__003__001
__00,2b8494f1bd1c11e0acbd6d888c43f7c2:TOKEN:1000:1,1000
2e6381e6bd1c11e08087c929a54bb0fd,32b4463abd1c11e0bdaa2557fb829fdf,MODEL__003__001
__00,2b8494f1bd1c11e0acbd6d888c43f7c2:TOKEN:0:3,0
2b8494f1bd1c11e0acbd6d888c43f7c2,32ce84febd1c11e0b0112557fb829fdf,MODEL__003__001
__00,2b8494f1bd1c11e0acbd6d888c43f7c2:TOKEN:1000:4,1000
2cf681c1bd1c11e0b8815de4f9281135,32b44639bd1c11e0b15b2557fb829fdf,MODEL__003__001
__00,2b8494f1bd1c11e0acbd6d888c43f7c2:TOKEN:0:2,0
2cf681c1bd1c11e0b8815de4f9281135,32b4463abd1c11e0bdaa2557fb829fdf,MODEL__003__001
__00,2b8494f1bd1c11e0acbd6d888c43f7c2:TOKEN:0:3,0
2e6381e2bd1c11e0941dc929a54bb0fd,32b4463abd1c11e0bdaa2557fb829fdf,MODEL__003__001
__00,2b8494f1bd1c11e0acbd6d888c43f7c2:TOKEN:0:3,0
2e6381e3bd1c11e095b1c929a54bb0fd,32ce84febd1c11e0b0112557fb829fdf,MODEL__003__001
__00,2b8494f1bd1c11e0acbd6d888c43f7c2:TOKEN:1000:4,1000
2e6381e6bd1c11e08087c929a54bb0fd,32ce84febd1c11e0b0112557fb829fdf,MODEL__003__001
__00,2b8494f1bd1c11e0acbd6d888c43f7c2:TOKEN:1000:4,1000
2e6381e6bd1c11e08087c929a54bb0fd,34582a87bd1c11e080820167449bc60f,MODEL__003__001
__00,2b8494f1bd1c11e0acbd6d888c43f7c2:TOKEN:778:5,778
2e6381e6bd1c11e08087c929a54bb0fd,32b44638bd1c11e0b01c2557fb829fdf,MODEL__003__001
__00,2b8494f1bd1c11e0acbd6d888c43f7c2:TOKEN:1000:1,1000
2fdc7e3ebd1c11e088b55528b00e8d0e,32b44639bd1c11e0b15b2557fb829fdf,MODEL__003__001
__00,2b8494f1bd1c11e0acbd6d888c43f7c2:TOKEN:0:2,0
2e6381e5bd1c11e0b62cc929a54bb0fd,32b4463abd1c11e0bdaa2557fb829fdf,MODEL__003__001
__00,2b8494f1bd1c11e0acbd6d888c43f7c2:TOKEN:0:3,0
2e6381e4bd1c11e0b9ffc929a54bb0fd,34582a87bd1c11e080820167449bc60f,MODEL__003__001
__00,2b8494f1bd1c11e0acbd6d888c43f7c2:TOKEN:778:5,778
2e6381e4bd1c11e0b9ffc929a54bb0fd,32b44638bd1c11e0b01c2557fb829fdf,MODEL__003__001
__00,2b8494f1bd1c11e0acbd6d888c43f7c2:TOKEN:1000:1,1000
34582a87bd1c11e080820167449bc60f,2e6381e6bd1c11e08087c929a54bb0fd,MODEL__003__001
__00,2b8494f1bd1c11e0acbd6d888c43f7c2:TOKEN:778:5,778
2e6381e6bd1c11e08087c929a54bb0fd,32b44639bd1c11e0b15b2557fb829fdf,MODEL__003__001
__00,2b8494f1bd1c11e0acbd6d888c43f7c2:TOKEN:0:2,0
2e6381e5bd1c11e0b62cc929a54bb0fd,32b44638bd1c11e0b01c2557fb829fdf,MODEL__003__001
__00,2b8494f1bd1c11e0acbd6d888c43f7c2:TOKEN:1000:1,1000
2fdc7e3fbd1c11e0be645528b00e8d0e,32b44638bd1c11e0b01c2557fb829fdf,MODEL__003__001
__00,2b8494f1bd1c11e0acbd6d888c43f7c2:TOKEN:1000:1,1000
2cf681b8bd1c11e08be85de4f9281135,32b44639bd1c11e0b15b2557fb829fdf,MODEL__003__001
__00,2b8494f1bd1c11e0acbd6d888c43f7c2:TOKEN:0:2,0
2e6381e4bd1c11e0b9ffc929a54bb0fd,32b44639bd1c11e0b15b2557fb829fdf,MODEL__003__001
__00,2b8494f1bd1c11e0acbd6d888c43f7c2:TOKEN:0:2,0
2cf681b8bd1c11e08be85de4f9281135,32b4463abd1c11e0bdaa2557fb829fdf,MODEL__003__001
__00,2b8494f1bd1c11e0acbd6d888c43f7c2:TOKEN:0:3,0
2e6381e4bd1c11e0b9ffc929a54bb0fd,32ce84febd1c11e0b0112557fb829fdf,MODEL__003__001
__00,2b8494f1bd1c11e0acbd6d888c43f7c2:TOKEN:1000:4,1000
2e6381e2bd1c11e0941dc929a54bb0fd,32ce84febd1c11e0b0112557fb829fdf,MODEL__003__001
__00,2b8494f1bd1c11e0acbd6d888c43f7c2:TOKEN:1000:4,1000
2fdc7e3dbd1c11e0a22d5528b00e8d0e,32b44639bd1c11e0b15b2557fb829fdf,MODEL__003__001
__00,2b8494f1bd1c11e0acbd6d888c43f7c2:TOKEN:0:2,0
2cf681b8bd1c11e08be85de4f9281135,32b44638bd1c11e0b01c2557fb829fdf,MODEL__003__001
__00,2b8494f1bd1c11e0acbd6d888c43f7c2:TOKEN:1000:1,1000

In alternate examples, the UEP may store data in a JavaScript Object Notation ("JSON") format. The stored information may include data regarding the object, such as, but not limited to: commands, attributes, group information, payment information, account information, etc., such as in the example below:

{'MERCHANT': {'TYPEOFTYPES': ['MERCHANTS', 'SYNTHETICNETWORKS'], 'FUNCTIONS':
{'ENTITYCREATION': 'putNetwork'}
, 'UNIQUEATTIBUTES': ['MERCHANTNAME'], 'TOKENENTITIESRELATIONSHIPS': [ ],
'ATTRIBUTES': {'MERCHANT': (2, 'STRING', 0, 'VALUE'), 'MERCH_ZIP_CD': (7,
'STRING', 0, 'VALUE'), 'MERCH_NAME': (8, 'STRING', 0, 'VALUE'),
'MERCHANTNAME': (3, 'STRING', 0, 'VALUE'), 'ACQ_CTRY_NUM': (4, 'STRING', 0,
'VALUE'), 'ACQ_PCR': (6, 'STRING', 0, 'VALUE'), 'ACQ_REGION_NUM': (5,
'STRING', 0, 'VALUE'), 'ISACTIVE': (0, 'BOOL', 1, 'VALUE'), 'ENTITYKEY': (1,
'STRING', 0, 'VALUE')}
}
, 'AFFINITYGROUP': {'TYPEOFTYPES': ['AFFINITYGROUPS'], 'FUNCTIONS':
{'ENTITYCREATION': 'putNetwork'}
, 'UNIQUEATTIBUTES': ['AFFINITYGROUPNAME'], 'TOKENENTITIESRELATIONSHIPS': [ ],
'ATTRIBUTES': {'XML': (2, 'STRING', 0, 'VALUE'), 'DESCRIPTION': (4,
'STRING', 0, 'VALUE'), 'ENTITYKEY': (1, 'STRING', 0, 'VALUE'), 'TYPEOF': (5,
'STRING', 0, 'VALUE'), 'AFFINITYGROUPNAME': (3, 'STRING', 0, 'VALUE'),
'ISACTIVE': (0, 'BOOL', 1, 'VALUE')}
}
, 'CASCADINGPAYMENT': {'TYPEOFTYPES': ['CASCADINGPAYMENT'], 'FUNCTIONS':
{'ENTITYCREATION': 'putNetwork'}

-continued

, 'UNIQUEATTIBUTES': ['CASCADINGPAYMENTNAME'], 'TOKENENTITIESRELATIONSHIPS':
['GROUP'], 'ATTRIBUTES': {'STATUS': (2, 'STRING', 0, 'VALUE'), 'EXPDT': (6,
'DATETIME', 0, 'VALUE'), 'GROUP': (3, 'STRING', 0, 'VALUE'), 'RESTRICTIONS':
(7, 'DICT', 0, 'VALUE'), 'CASCADINGPAYMENTNAME': (4, 'STRING', 0, 'VALUE'),
'STARTDT': (5, 'DATETIME', 0, 'VALUE'), 'ISACTIVE': (0, 'BOOL', 1, 'VALUE'),
'ENTITYKEY': (1, 'STRING', 0, 'VALUE')}
}
, 'GROUP': {'TYPEOFTYPES': [ ], 'FUNCTIONS': {'ENTITYCREATION': 'putNetwork'}
, 'UNIQUEATTIBUTES': ['GROUPNAME'], 'TOKENENTITIESRELATIONSHIPS': { }
, 'ATTRIBUTES': {'GROUPNAME': (2, 'STRING', 0, 'VALUE'), 'DESCRIPTION': (2,
'STRING', 0, 'VALUE'), 'ISACTIVE': (0, 'BOOL', 1, 'VALUE'), 'ENTITYKEY': (1,
'STRING', 0, 'VALUE')}
}
, 'USERS': {'TYPEOFTYPES': [ ], 'FUNCTIONS': {'ENTITYCREATION': 'putNetwork'}
, 'UNIQUEATTIBUTES': ['USERSID'], 'TOKENENTITIESRELATIONSHIPS': { }
, 'ATTRIBUTES': {'USERSID': (2, 'STRING', 0, 'VALUE'), 'ISACTIVE': (0, 'BOOL',
1, 'VALUE'), 'ENTITYKEY': (1, 'STRING', 0, 'VALUE')}
}
, 'TWITTERUSER': {'TYPEOFTYPES': ['TOKENENTITY'], 'FUNCTIONS':
{'ENTITYCREATION': 'putWGTNetwork'}
, 'UNIQUEATTIBUTES': ['USERNAME'], 'TOKENENTITIESRELATIONSHIPS': ['USER'],
'ATTRIBUTES': {'USERNAME': (2, 'STRING', 0, 'VALUE'), 'CITY': (5, 'STRING',
0, 'VALUE'), 'ENTITYKEY': (1, 'STRING', 0, 'VALUE'), 'USERLINK': (6,
'STRING', 0, 'VALUE'), 'FULLNAME': (4, 'STRING', 0, 'VALUE'), 'USERTAG': (3,
'STRING', 0, 'VALUE'), 'ISACTIVE': (0, 'BOOL', 1, 'VALUE')}
}
, 'COUPON': {'TYPEOFTYPES': ['COUPON'], 'FUNCTIONS': {'ENTITYCREATION':
'putNetwork'}
, 'UNIQUEATTIBUTES': ['COUPONNAME'], 'TOKENENTITIESRELATIONSHIPS':
['MERCHANT'], 'ATTRIBUTES': {'STATUS': (2, 'STRING', 0, 'VALUE'),
'MERCHANT': (3, 'STRING', 0, 'VALUE'), 'TITLE': (5, 'STRING', 0, 'VALUE'),
'NOTES': (7, 'STRING', 0, 'VALUE'), 'UPDATEDBY': (11, 'STRING', 0, 'VALUE'),
'ENTITYKEY': (1, 'STRING', 0, 'VALUE'), 'DECRIPTION': (6, 'STRING', 0,
'VALUE'), 'CREATEDBY': (10, 'STRING', 0, 'VALUE'), 'LASTUPDATEDT': (9,
'DATETIME', 0, 'VALUE'), 'EXPDT': (13, 'DATETIME', 0, 'VALUE'),
'RESTRICTIONS': (14, 'DICT', 0, 'VALUE'), 'COUPONNAME': (4, 'STRING', 0,
'VALUE'), 'CREATIONDT': (8, 'DATETIME', 0, 'VALUE'), 'STARTDT': (12,
'DATETIME', 0, 'VALUE'), 'ISACTIVE': (0, 'BOOL', 1, 'VALUE')}
}
, 'MEMBERSHIP': {'TYPEOFTYPES': ['MEMBERSHIPS'], 'FUNCTIONS':
{'ENTITYCREATION': 'putNetwork'}
, 'UNIQUEATTIBUTES': ['MEMBERSHIPNAME'], 'TOKENENTITIESRELATIONSHIPS':
['MERCHANT'], 'ATTRIBUTES': {'STATUS': (2, 'STRING', 0, 'VALUE'),
'MERCHANT': (3, 'STRING', 0, 'VALUE'), 'RESTRICTIONS': (7, 'DICT', 0,
'VALUE'), 'MEMBERSHIPNAME': (4, 'STRING', 0, 'VALUE'), 'STARTDT': (5,
'DATETIME', 0, 'VALUE'), 'EXPDT': (6, 'DATETIME', 0, 'VALUE'), 'ISACTIVE':
(0, 'BOOL', 1, 'VALUE'), 'ENTITYKEY': (1, 'STRING', 0, 'VALUE')}
}
, 'USERSECURITY': {'TYPEOFTYPES': ['SECURITY'], 'FUNCTIONS': {'ENTITYCREATION':
'putNetwork'}
, 'UNIQUEATTIBUTES': ['USERSECURITYNAME'], 'TOKENENTITIESRELATIONSHIPS':
['USER'], 'ATTRIBUTES': {'STATUS': (2, 'STRING', 0, 'VALUE'), 'EXPDT': (6,
'DATETIME', 0, 'VALUE'), 'USERSECURITYNAME': (4, 'STRING', 0, 'VALUE'),
'USER': (3, 'STRING', 0, 'VALUE'), 'RESTRICTIONS': (7, 'DICT', 0, 'VALUE'),
'STARTDT': (5, 'DATETIME', 0, 'VALUE'), 'ISACTIVE': (0, 'BOOL', 1, 'VALUE'),
'ENTITYKEY': (1, 'STRING', 0, 'VALUE')}
}
, 'MCC': {'TYPEOFTYPES': ['MCC'], 'FUNCTIONS': {'ENTITYCREATION':
'putWGTNetwork'}
, 'UNIQUEATTIBUTES': ['MCCNAME', 'MCC'], 'TOKENENTITIESRELATIONSHIPS':
['MCCSEG'], 'ATTRIBUTES': {'MCCSEG': (4, 'STRING', 0, 'VALUE'), 'MCC': (2,
'STRING', 0, 'VALUE'), 'MCCNAME': (3, 'STRING', 0, 'VALUE'), 'ISACTIVE': (0,
'BOOL', 1, 'VALUE'), 'ENTITYKEY': (1, 'STRING', 0, 'VALUE')}
}
, 'ZIPCODE': {'TYPEOFTYPES': ['LOCATION'], 'FUNCTIONS': {'ENTITYCREATION':
'putNetwork'}
, 'UNIQUEATTIBUTES': ['ZIPCODE'], 'TOKENENTITIESRELATIONSHIPS': [ ],
'ATTRIBUTES': {'STATE': (4, 'STRING', 0, 'VALUE'), 'POPULATION': (3,
'STRING', 0, 'VALUE'), 'ZIPCODE': (2, 'STRING', 0, 'VALUE'), 'ISACTIVE': (0,
'BOOL', 1, 'VALUE'), 'ENTITYKEY': (1, 'STRING', 0, 'VALUE')}
}
, 'PAYMENTCARD': {'TYPEOFTYPES': ['PAYMENTCARDS'], 'FUNCTIONS':
{'ENTITYCREATION': 'putNetwork'}
, 'UNIQUEATTIBUTES': ['CARDNUMBER'], 'TOKENENTITIESRELATIONSHIPS': ['USER'],
'ATTRIBUTES': {'EXPDATE': (5, 'DATETIME', 0, 'VALUE'), 'ENTITYKEY': (1,
'STRING', 0, 'VALUE'), 'CARDTYPE': (4, 'STRING', 0, 'VALUE'), 'CARDNUMBER':
(2, 'STRING', 0, 'VALUE'), 'USER': (3, 'STRING', 0, 'VALUE'), 'ISACTIVE':
(0, 'BOOL', 1, 'VALUE')}
}

-continued

, 'GENERICTOKEN': {'TYPEOFTYPES': ['COUPON'], 'FUNCTIONS': {'ENTITYCREATION': 'putNetwork'}
, 'UNIQUEATTIBUTES': ['GENERICTOKENNAME'], 'TOKENENTITIESRELATIONSHIPS': ['MERCHANT'], 'ATTRIBUTES': {'STATUS': (2, 'STRING', 0, 'VALUE'), 'MERCHANT': (3, 'STRING', 0, 'VALUE'), 'TITLE': (5, 'STRING', 0, 'VALUE'), 'NOTES': (7, 'STRING', 0, 'VALUE'), 'UPDATEDBY': (11, 'STRING', 0, 'VALUE'), 'ENTITYKEY': (1, 'STRING', 0, 'VALUE'), 'DECRIPTION': (6, 'STRING', 0, 'VALUE'), 'CREATEDBY': (10, 'STRING', 0, 'VALUE'), 'LASTUPDATEDT': (9, 'DATETIME', 0, 'VALUE'), 'EXPDT': (13, 'DATETIME', 0, 'VALUE'), 'RESTRICTIONS': (14, 'DICT', 0, 'VALUE'), 'STARTDT': (12, 'DATETIME', 0, 'VALUE'), 'CREATIONDT': (8, 'DATETIME', 0, 'VALUE'), 'GENERICTOKENNAME': (4, 'STRING', 0, 'VALUE'), 'ISACTIVE': (0, 'BOOL', 1, 'VALUE')}
}
, 'USER': {'TYPEOFTYPES': ['USERS', 'SYNTHETICNETWORKS'], 'FUNCTIONS': {'ENTITYCREATION': 'putNetwork'}
, 'UNIQUEATTIBUTES': ['USERNAME'], 'TOKENENTITIESRELATIONSHIPS': ['USERS'], 'ATTRIBUTES': {'USERNAME': (5, 'STRING', 0, 'VALUE'), 'USERS': (2, 'STRING', 0, 'VALUE'), 'FIRSTNAME': (3, 'STRING', 0, 'VALUE'), 'LASTNAME': (4, 'STRING', 0, 'VALUE'), 'ENTITYKEY': (1, 'STRING', 0, 'VALUE'), 'ISACTIVE': (0, 'BOOL', 1, 'VALUE')}
}
, 'TWEETS': {'TYPEOFTYPES': ['TOKENENTITY'], 'FUNCTIONS': {'ENTITYCREATION': 'putWGTNetwork'}
, 'UNIQUEATTIBUTES': ['TWEETID'], 'TOKENENTITIESRELATIONSHIPS': ['TWITTERUSER'], 'ATTRIBUTES': {'Title': (4, 'STRING', 0, 'VALUE'), 'RawTweet': (5, 'STRING', 0, 'VALUE'), 'DATETIME': (3, 'STRING', 0, 'VALUE'), 'CLEANEDTWEET': (6, 'STRING', 0, 'VALUE'), 'ENTITYKEY': (1, 'STRING', 0, 'VALUE'), 'TWEETID': (2, 'STRING', 0, 'VALUE'), 'ISACTIVE': (0, 'BOOL', 1, 'VALUE')}
}
, 'MODEL': {'TYPEOFTYPES': ['MODELS'], 'FUNCTIONS': {'ENTITYCREATION': 'putNetwork'}
, 'UNIQUEATTIBUTES': ['MODELNAME'], 'TOKENENTITIESRELATIONSHIPS': ['USER', 'MERCHANT', 'PAYMENTCARD'], 'ATTRIBUTES': {'XML': (2, 'STRING', 0, 'VALUE'), 'MODELNAME': (3, 'STRING', 0, 'VALUE'), 'DESCRIPTION': (4, 'STRING', 0, 'VALUE'), 'ENTITYKEY': (1, 'STRING', 0, 'VALUE'), 'TYPEOF': (5, 'STRING', 0, 'VALUE'), 'ISACTIVE': (0, 'BOOL', 1, 'VALUE')}
}
, 'MCCSEG': {'TYPEOFTYPES': ['MCCSEG'], 'FUNCTIONS': {'ENTITYCREATION': 'putWGTNetwork'}
, 'UNIQUEATTIBUTES': ['MCCSEGID'], 'TOKENENTITIESRELATIONSHIPS': { }
, 'ATTRIBUTES': {'MCCSEGID': (2, 'STRING', 0, 'VALUE'), 'MCCSEGNAME': (3, 'STRING', 0, 'VALUE'), 'ISACTIVE': (0, 'BOOL', 1, 'VALUE'), 'ENTITYKEY': (1, 'STRING', 0, 'VALUE')}
}
, 'TOKENENTITY': {'TYPEOFTYPES': ['TOKENENTITY'], 'FUNCTIONS': {'ENTITYCREATION': 'putWGTNetwork'}
, 'UNIQUEATTIBUTES': ['TOKENENTITYKEY'], 'TOKENENTITIESRELATIONSHIPS': { }
, 'ATTRIBUTES': {'STATUS': (4, 'STRING', 0, 'VALUE'), 'ISSUEDDATE': (5, 'STRING', 0, 'VALUE'), 'DOUBLELINKED': (8, 'BOOL', 1, 'VALUE'), 'BASEUUID': (1, 'STRING', 0, 'VALUE'), 'WEIGHT': (6, 'STRING', 0, 'VALUE'), 'BASETYPE': (3, 'STRING', 0, 'VALUE'), 'CATEGORY': (7, 'STRING', 0, 'VALUE'), 'ISACTIVE': (0, 'BOOL', 1, 'VALUE'), 'TOKENENTITYKEY': (2, 'STRING', 0, 'VALUE')}
}
}

Figure 20:
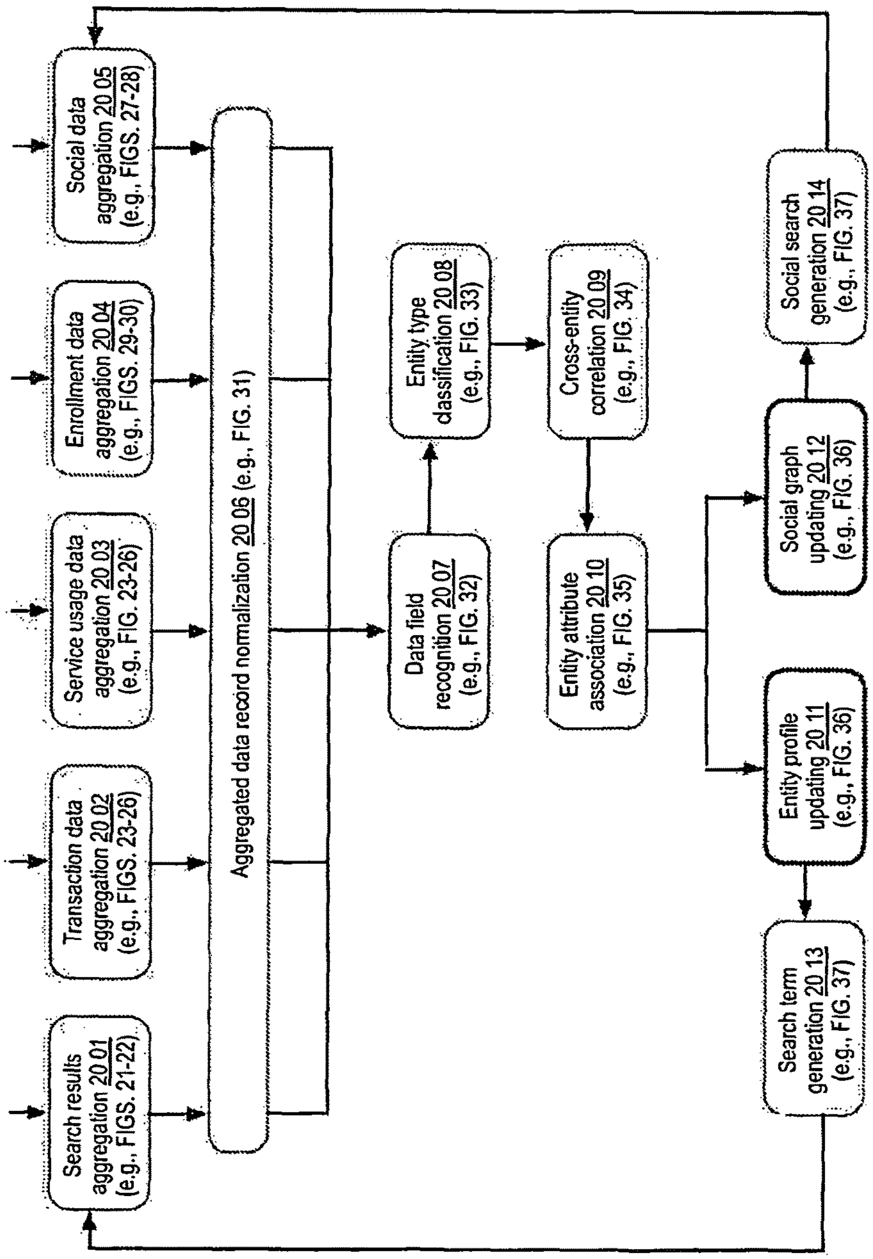
FIG. 20 shows a block diagram illustrating example UEP component configurations in some embodiments of the UEP.

FIG. 20 shows a block diagram illustrating example UEP component configurations in some embodiments of the UEP. In some embodiments, the UEP may aggregate data from a variety of sources to generate centralized personal information. The may also aggregate various types of data in order to generate the centralized personal information. For example, the UEP may utilize search results aggregation component(s) 2001 (e.g., such as described in FIGS. 21-22) to aggregate search results from across a wide range of computer networked systems, e.g., the Internet. As another example, the UEP may utilize transaction data aggregation component(s) 2002 (e.g., such as described in FIGS. 23-26) to aggregate transaction data, e.g., from transaction processing procedure by a payment network. As another example, the UEP may utilize service usage data aggregation component(s) 2003 (e.g., such as described in FIGS. 23-26) to aggregate data on user's usage of various services associated with the UEP. As another example, the UEP may utilize enrollment data component(s) 2004 (e.g., such as described in FIGS. 23-26) to aggregate data on user's enrollment into various services associated with the UEP. As another example, the UEP may utilize social data aggregation component(s) 2003 (e.g., such as described in FIGS. 27-28) to aggregate data on user's usage of various social networking services accessible by the UEP.

In some embodiments, the UEP may acquire the aggregated data, and normalize the data into formats that are suitable for uniform storage, indexing, maintenance, and/or further processing via data record normalization component(s) 2006 (e.g., such as described in FIG. 31). The UEP may extract data from the normalized data records, and recognize data fields, e.g., the UEP may identify the attributes of each field of data included in the normalized data records via data field recognition component(s) 2007 (e.g., such as described in FIG. 32). For example, the UEP may identify names, user ID(s), addresses, network addresses, comments and/or specific words within the comments, images, blog posts, video, content within the video, and/or the like from the aggregated data. In some embodiments, for each field of data, the UEP may classify entity types associated with the field of data, as well as entity identifiers associated with the field of data, e.g., via component(s) 2008 (e.g., such as described in FIG. 33). For example, the UEP may identify an Internet Protocol (IP) address data field to be associated with a user ID john.q.public (consumer entity type), a user John Q. Public (consumer entity type), a household (the Public household—a multi-consumer entity type/household entity type), a merchant entity type with identifier Acme Merchant Store, Inc. from which purchases are made from the IP address, an Issuer Bank type with identifier First National Bank associated with the purchases made from the IP address, and/or the like. In some embodiments, the UEP may utilize the entity types and entity identifiers to correlate entities across each other, e.g., via cross-entity correlation component(s) 2009 (e.g., such as described in FIG. 34). For example, the UEP may identify, from the aggregated data, that a household entity with identifier H123 may include a user entity with identifier John Q. Public and social identifier john.q.public@facebook.com, a second user entity with identifier Jane P. Doe with social identifier jpdoe@twitter.com, a computer entity with identifier IP address 192.168.4.5, a card account entity with identifier **1234, a bank issuer entity with identifier AB23145, a merchant entity with identifier Acme Stores, Inc. where the household sub-entities make purchases, and/or the like. In some embodiments, the UEP may utilize the entity identifiers, data associated with each entity and/or correlated entities to identify associations to other entities, e.g., via entity attribute association component(s) 2010 (e.g., such as described in FIG. 35). For example, the UEP may identify specific purchases made via purchase transactions by members of the household, and thereby identify attributes of members of the household on the basis of the purchases in the purchase transactions made by members of the household. Based on such correlations and associations, the UEP may update a profile for each entity identified from the aggregated data, as well as a social graph interrelating the entities identified in the aggregated data, e.g., via entity profile-graph updating component(s) 2011 (e.g., such as described in FIG. 36). In some embodiments, the updating of profile and/or social graphs for an entity may trigger a search for additional data that may be relevant to the newly identified correlations and associations for each entity, e.g., via search term generation component(s) 2013-2014 (e.g., such as described in FIG. 37**).

For example, the updating of a profile and/or social graph may trigger searches across the Internet, social networking websites, transaction data from payment networks, services enrolled into and/or utilized by the entities, and/or the like. In some embodiments, such updating of entity profiles and/or social graphs may be performed continuously, periodically, on-demand, and/or the like.

Figure 21:
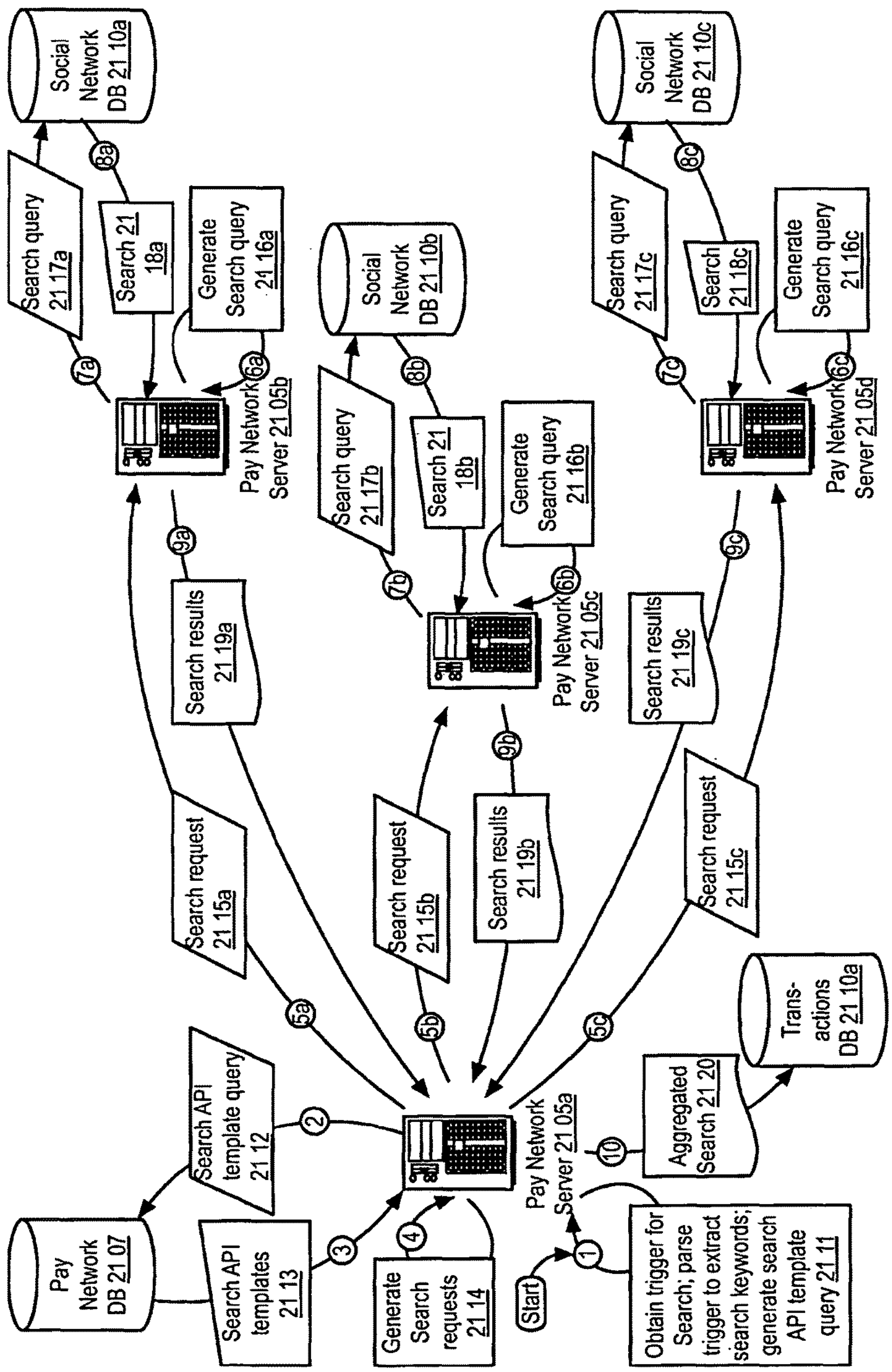
FIG. 21 shows a data flow diagram illustrating an example search result aggregation procedure in some embodiments of the UEP.

FIG. 21 shows a data flow diagram illustrating an example search result aggregation procedure in some embodiments of the UEP. In some implementations, the pay network server may obtain a trigger to perform a search. For example, the pay network server may periodically perform a search update of its aggregated search database, e.g., 2110, with new information available from a variety of sources, such as the Internet. As another example, a request for on-demand search update may be obtained as a result of a user wishing to enroll in a service, for which the pay network server may facilitate data entry by providing an automated web form filling system using information about the user obtained from the search update. In some implementations, the pay network server may parse the trigger to extract keywords using which to perform an aggregated search. The pay network server may generate a query for application programming interface (API) templates for various search engines (e.g., Google™, Bing®, AskJeeves, market data search engines, etc.) from which to collect data for aggregation. The pay network server may query, e.g., 2112, a pay network database, e.g., 2107, for search API templates for the search engines. For example, the pay network server may utilize PHP/SQL commands similar to the examples provided above. The database may provide, e.g., 2113, a list of API templates in response. Based on the list of API templates, the pay network server may generate search requests, e.g., 2114. The pay network server may issue the generated search requests, e.g., 2115*a-c*, to the search engine servers, e.g., 2101*a-c*. For example, the pay network server may issue PHP commands to request the search engine for search results. An example listing of commands to issue search requests 2115*a-c*, substantially in the form of PHP commands, is provided below:

```
<?PHP
// API URL with access key
$url = ["https://ajax.googleapis.com/ajax/services/search/web?v=1.0&"
    . "q=" $keywords "&key=1234567890987654&userip=
    datagraph.cpip.com"];
// Send Search Request
$ch = curl_init( );
curl_setopt($ch, CURLOPT_URL, $url);
curl_setopt($ch, CURLOPT_RETURNTRANSFER, 1);
curl_setopt($ch, CURLOPT_REFERER, "datagraph.cpip.com");
$body = curl_exec($ch);
curl_close($ch);
// Obtain, parse search results
$json = json_decode($body);
?>
```

In some embodiments, the search engine servers may query, e.g., 2117*a-c*, their search databases, e.g., 2102*a-c*, for search results falling within the scope of the search keywords. In response to the search queries, the search databases may provide search results, e.g., 2118*a-c*, to the search engine servers. The search engine servers may return the search results obtained from the search databases, e.g., 2119*a-c*, to the pay network server making the search requests. An example listing of search results 2119*a-c*, substantially in the form of JavaScript Object Notation (JSON)-formatted data, is e provided below:

```
{"responseData": {
 "results": [
  {
   "GsearchResultClass": "GwebSearch",
   "unescapedUrl": "http://en.wikipedia.org/wiki/John_Q_Public",
   "url": "http://en.wikipedia.org/wiki/John_Q_Public",
   "visibleUrl": "en.wikipedia.org",
   "cacheUrl":
   "http://www.google.com/search?
   q\u003dcache:TwrPfhd22hYJ:en.wikipedia.org",
   "title": "\u003cb\u003eJohn Q. Public\u003c/b\u003e - Wikipedia, the
   free encyclopedia",
   "titleNoFormatting": "John Q. Public - Wikipedia, the free
   encyclopedia",
   "content": "\[1\] In 2006, he served as Chief Technology Officer..."
  },
  {
```

-continued

```
    "GsearchResultClass": "GwebSearch",
    "unescapedUrl": "http://www.imdb.com/name/nm0385296/",
    "url": "http://www.imdb.com/name/nm0385296/",
    "visibleUrl": "www.imdb.com",
    "cacheUrl":
    "http://www.google.com/search?
    q\u003dcache:1i34KkqnsooJ:www.imdb.com",
    "title": "\u003cb\u003eJohn Q. Public\u003c/b\u003e",
    "titleNoFormatting": "John Q. Public",
    "content": "Self: Zoolander. Socialite \u003cb\u003eJohn Q.
    Public\u003c/b\u003e..."
   },
   ...
  ],
  "cursor": {
   "pages": [
    { "start": "0", "label": 1 },
    { "start": "4", "label": 2 },
    { "start": "8", "label": 3 },
    { "start": "12","label": 4 }
   ],
   "estimatedResultCount": "59600000",
   "currentPageIndex": 0,
   "moreResultsUrl":
    "http://www.google.com/search?oe\u003dutf8\u0026ie\u003dutf8..."
  }
 }
, "responseDetails": null, "responseStatus": 200}
```

In some embodiments, the pay network server may store the aggregated search results, e.g., 2120, in an aggregated search database, e.g., 2110.

Figure 22:
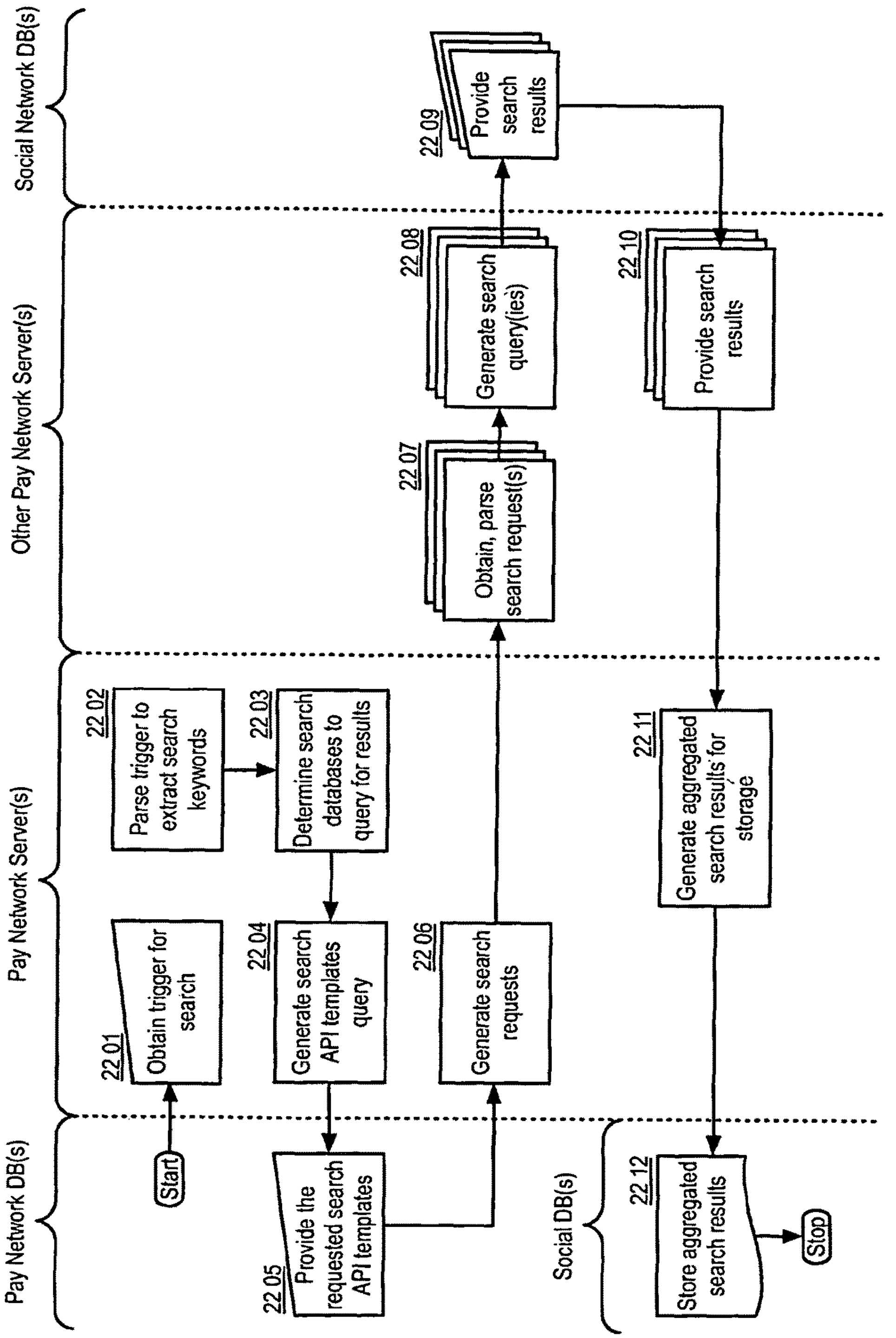
FIG. 22 shows a logic flow diagram illustrating example aspects of aggregating search results in some embodiments of the UEP, e.g., a Search Results Aggregation ("SRA") component 2200.

FIG. 22 shows a logic flow diagram illustrating example aspects of aggregating search results in some embodiments of the UEP, e.g., a Search Results Aggregation ("SRA") component 2200. In some implementations, the pay network erver may obtain a trigger to perform a search, e.g., 2201. For example, the pay network server may periodically perform a search update of its aggregated search database with new information available from a variety of sources, such as the Internet. As another example, a request for on-demand search update may be obtained as a result of a user wishing to enroll in a service, for which the pay network server may facilitate data entry by providing an automated web form filling system using information about the user obtained from the search update. In some implementations, the pay network server may parse the trigger, e.g., 2202, to extract keywords using which to perform an aggregated search. The pay network server may determine the search engines to search, e.g., 2203, using the extracted keywords. Then, the pay network server may generate a query for application programming interface (API) templates for the various search a engines (e.g., Google™, Bing®, AskJeeves, market data search engines, etc.) from which to collect data for aggregation, e.g., 2204. The pay network server may query, e.g., 2205, a pay network database for search API templates for the search engines. For example, the pay network server may utilize PHP/SQL commands similar to the examples provided above. The database may provide, e.g., 2205, a list of API templates in response. Based on the list of API templates, the pay network server may generate search requests, e.g., 2206. The pay network server may issue the generated search requests to the search engine servers. The search engine servers may parse the obtained search results(s), e.g., 2207, and query, e.g., 2208, their search databases for search results falling within the scope of the search keywords. In response to the search queries, the search databases may provide search results, e.g., 2209, to the search engine servers. The search engine servers may return the search results obtained from the search databases, e.g., 2210, to the pay network server making the search requests. The pay network server may generate, e.g., 2211, and store the aggregated search results, e.g., 2212, in an aggregated search database.

FIGS. 23A-D show data flow diagrams illustrating an example card-based transaction execution procedure in some embodiments of the UEP. In some implementations, a user, e.g., 2301, may desire to purchase a product, service, offering, and/or the like ("product"), from a merchant. The user may communicate with a merchant server, e.g., 2303, via a client such as, but not limited to: a personal computer, mobile device, television, point-of-sale terminal, kiosk, ATM, and/or the like (e.g., 2302). For example, the user may provide user input, e.g., purchase input 2311, into the client indicating the user's desire to purchase the product. In various implementations, the user input may include, but not be limited to: keyboard entry, card swipe, activating a a RFID/NFC enabled hardware device (e.g., electronic card having multiple accounts, smartphone, tablet, etc.), mouse clicks, depressing buttons on a joystick/game console, voice commands, single/multi-touch gestures on a touch-sensitive interface, touching user interface elements on a touch-sensitive display, and/or the like. For example, the user may direct a browser application executing on the client device to a website of the merchant, and may select a product from the website via clicking on a hyperlink presented to the user via the website. As another example, the client may obtain track 1 data from the user's card (e.g., credit card, debit card, prepaid card, charge card, etc.), such as the example track 1 data provided below:

```
%B123456789012345^PUBLIC/
J.Q.^99011200000000000000**901******?*
(wherein '123456789012345' is the card number of 'J.Q. Public' and has
   a CVV number of 901. '990112' is a service code, and *** represents
   decimal digits which change randomly each time the card is used.)
```

In some implementations, the client may generate a purchase order message, e.g., 2312, and provide, e.g., 2313, the generated purchase order message to the merchant server. For example, a browser application executing on the client may provide, on behalf of the user, a (Secure) Hypertext Transfer Protocol ("HTTP(S)") GET message including the product order details for the merchant server in the form of data formatted according to the eXtensible Markup Language ("XML"). Below is an example HTTP(S) GET message including an XML-formatted purchase order message for the merchant server:

```
GET /purchase.php HTTP/1.1
Host: www.merchant.com
Content-Type: Application/XML
Content-Length: 1306
<?XML version = "1.0" encoding = "UTF-8"?>
<purchase_order>
    <order_ID>4NFU4RG94</order_ID>
    <timestamp>2011-02-22 15:22:43</timestamp>
    <user_ID>john.q.public@gmail.com</user_ID>
    <client_details>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
    </client_details>
    <purchase_details>
        <num_products>1</num_products>
        <product>
```

-continued

```
                <product_type>book</product_type>
                <product_params>
                        <product_title>XML for
                        dummies</product_title>
                        <ISBN>938-2-14-168710-0</ISBN>
                        <edition>2nd ed.</edition>
                        <cover>hardbound</cover>
                        <seller>bestbuybooks</seller>
                </product_params>
                <quantity>1</quantity>
        </product>
    </purchase_details>
    <account_params>
        <account_name>John Q. Public</account_name>
        <account_type>credit</account_type>
        <account_num>123456789012345</account_num>
        <billing_address>123 Green St., Norman,
        OK 98765</billing_address>
        <phone>123-456-7809</phone>
        <sign>/jqp/</sign>
        <confirm_type>email</confirm_type>
        <contact_info>john.q.public@gmail.com</contact_info>
    </account_params>
    <shipping_info>
        <shipping_adress>same as billing</shipping_address>
        <ship_type>expedited</ship_type>
        <ship_carrier>FedEx</ship_carrier>
        <ship_account>123-45-678</ship_account>
        <tracking_flag>true</tracking_flag>
        <sign_flag>false</sign_flag>
    </shipping_info>
</purchase_order>
```

In some implementations, the merchant server may obtain the purchase order message from the client, and may parse the purchase order message to extract details of the purchase order from the user. The merchant server may generate a card query request, e.g., 2314 to determine whether the transaction can be processed. For example, the merchant server may attempt to determine whether the user has sufficient funds to pay for the purchase in a card account provided with the purchase order. The merchant server may provide the generated card query request, e.g., 2315, to an acquirer server, e.g., 2304. For example, the acquirer server may be a server of an acquirer financial institution ("acquirer") maintaining an account of the merchant. For example, the proceeds of transactions processed by the merchant may be deposited into an account maintained by the acquirer. In some implementations, the card query request may include details such as, but not limited to: the costs to the user involved in the transaction, card account details of the user, user billing and/or shipping information, and/or the like. For example, the merchant server may provide a HTTP(S) POST message including an XML-formatted card query request similar to the example listing provided below:

```
POST /cardquery.php HTTP/1.1
Host: www.acquirer.com
Content-Type: Application/XML
Content-Length: 624
<?XML version = "1.0" encoding = "UTF-8"?>
<card_query_request>
    <query_ID>VNEI39FK</query_ID>
    <timestamp>2011-02-22 15:22:44</timestamp>
    <purchase_summary>
            <num_products>1</num_products>
            <product>
                    <product_summary>Book - XML for
                    dummies</product_summary>
                    <product_quantity>1</product_quantity?
```

-continued

```
            </product>
    </purchase_summary>
    <transaction_cost>$34.78</transaction_cost>
    <account_params>
            <account_name>John Q. Public</account_name>
            <account_type>credit</account_type>
            <account_num>123456789012345</account_num>
            <billing_address>123 Green St., Norman,
            OK 98765</billing_address>
            <phone>123-456-7809</phone>
            <sign>/jqp/</sign>
    </account_params>
    <merchant_params>
            <merchant_id>3FBCR4INC</merchant_id>
            <merchant_name>Books & Things, Inc.</merchant_name>
            <merchant_auth_key>1NNF484MCP59CHB27365
            </merchant_auth_key>
    </merchant_params>
</card_query_request>
```

In some implementations, the acquirer server may generate a card authorization request, e.g., 2316, using the obtained card query request, and provide the card authorization request, e.g., 2317, to a pay network server, e.g., 2305. For example, the acquirer server may redirect the HTTP(S) POST message in the example above from the merchant server to the pay network server.

In some implementations, the pay network server may determine whether the user has enrolled in value-added user services. For example, the pay network server may query 2318 a database, e.g., pay network database 2307, for user service enrollment data. For example, the server may utilize PHP/SQL commands similar to the example provided above to query the pay network database. In some implementations, the a database may provide the user service enrollment data, e.g., 2319. The user enrollment data may include a flag indicating whether the user is enrolled or not, as well as instructions, data, login URL, login API call template and/or the like for facilitating access of the user-enrolled services. For example, in some implementations, the pay network server may redirect the client to a value-add server (e.g., such as a social network server where the value-add service is related to social networking) by providing a HTTP(S) REDIRECT 300 message, similar to the example below:

```
HTTP/1.1 300 Multiple Choices
Location:
    https://www.facebook.com/dialog/oauth?client_id=
    snpa_app_ID&redirect_uri=www.paynetwork.com/purchase.php
<html>
    <head><title>300 Multiple Choices</title></head>
    <body><h1>Multiple Choices</h1></body>
</html>
```

In some implementations, the pay network server may provide payment information extracted from the card authorization request to the value-add server as part of a value add service request, e.g., 2320. For example, the pay network server may provide a HTTP(S) POST message to the value-add server, similar to the example below:

```
POST /valueservices.php HTTP/1.1
Host: www.valueadd.com
Content-Type: Application/XML
Content-Length: 1306
<?XML version = "1.0" encoding = "UTF-8"?>
<service_request>
```

-continued

```
    <request_ID>4NFU4RG94</order_ID>
    <timestamp>2011-02-22 15:22:43</timestamp>
    <user_ID>john.q.public@gmail.com</user_ID>
    <client_details>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
    </client_details>
    <account_params>
        <account_name>John Q. Public</account_name>
        <account_type>credit</account_type>
        <account_num>123456789012345</account_num>
        <billing_address>123 Green St., Norman,
        OK 98765</billing_address>
        <phone>123-456-7809</phone>
        <sign>/jqp/</sign>
        <confirm_type>email</confirm_type>
        <contact_info>john.q.public@gmail.com</contact_info>
    </account_params>
    <!--optional-->
    <merchant>
        <merchant_id>CQN3Y42N</merchant_id>
        <merchant_name>Acme Tech, Inc.</merchant_name>
        <user_name>john.q.public</user_name>
        <cardlist> www.acme.com/user/
        john.q.public/cclist.xml<cardlist>
        <user_account_preference>1 3 2 4
        7 6 5<user_account_preference>
    </merchant>
</service_request>
```

In some implementations, the value-add server may provide a service input request, e.g., 2321, to the client. For example, the value-add server may provide a HTML input/login form to the client. The client may display, e.g., 2322, the login form for the user. In some implementations, the user may provide login input into the client, e.g., 2323, and the client may generate a service input response, e.g., 2324, for the value-add server. In some implementations, the value-add server may provide value-add services according to user value-add service enrollment data, user profile, etc., stored on the value-add server, and based on the user service input. Based on the provision of value-add services, the value-add server may generate a value-add service response, e.g., 2326, and provide the response to the pay network server. For example, the value-add server may provide a HTTP(S) POST message similar to the example below:

```
POST /serviceresponse.php HTTP/1.1
Host: www.paynet.com
Content-Type: Application/XML
Content-Length: 1306
<?XML version = "1.0" encoding = "UTF-8"?>
<service_response>
    <request_ID>4NFU4RG94</order_ID>
    <timestamp>2011-02-22 15:22:43</timestamp>
    <result>serviced</result>
    <servcode>943528976302-45569-003829-04</servcode>
</service_response>
```

In some implementations, upon receiving the value-add service response from the value-add server, the pay network server may extract the enrollment service data from the response for addition to a transaction data record. In some implementations, the pay network server may forward the card authorization request to an appropriate pay network server, e.g., 2328, which may parse the card authorization request to extract details of the request. Using the extracted fields and field values, the pay network server may generate a query, e.g., 2329, for an issuer server corresponding to the user's card account. For example, the user's card account, the details of which the user may have provided via the client-generated purchase order message, may be linked to an issuer financial institution ("issuer"), such as a banking institution, which issued the card account for the user. An issuer server, e.g., 2308*a-n*, of the issuer may maintain details of the user's card account. In some implementations, a database, e.g., pay network database 2307, may store details of the issuer servers and card account numbers associated with the issuer servers. For example, the database may be a relational database responsive to Structured Query Language ("SQL") commands. The pay network server may execute a hypertext preprocessor ("PHP") script including SQL commands to query the database for details of the issuer server. An example PHP/SQL command listing, illustrating substantive aspects of querying the database, is provided

```
<?PHP
header('Content-Type: text/plain');
mysql_connect("254.93.179.112",$DBserver,$password); // access
database server
mysql_select_db("ISSUERS.SQL"); // select database table to search
//create query for issuer server data
$query = "SELECT issuer_name issuer_address issuer_id ip_address
    mac_address auth_key port_num security_settings_list
    FROM IssuerTable WHERE account_num LIKE '%'
    $accountnum";
$result = mysql_query($query); // perform the search query
mysql_close("ISSUERS.SQL"); // close database access
?>
```

In response to obtaining the issuer server query, e.g., 2329, the pay network database may provide, e.g., 2330, the requested issuer server data to the pay network server. In some implementations, the pay network server may utilize the issuer server data to generate a forwarding card authorization request, e.g., 2331, to redirect the card authorization request from the acquirer server to the issuer server. The pay network server may provide the card authorization request, e.g., 2332*a-n*, to the issuer server. In some implementations, the issuer server, e.g., 2308*a-n*, may parse the card authorization request, and based on the request details may query 2333*a-n* database, e.g., user profile database 2309*a-n*, for data of the user's card account. For example, the

```
<?PHP
header('Content-Type: text/plain');
mysql_connect("254.93.179.112",$DBserver,$password); // access
database server
mysql_select_db("USERS.SQL"); // select database table to search
//create query for user data
$query = "SELECT user_id user_name user_balance account_type
FROM UserTable
    WHERE account_num LIKE '%' $accountnum";
$result = mysql_query($query); // perform the search query
mysql_close("USERS.SQL"); // close database access
?>
```

In some implementations, on obtaining the user data, e.g., 2334*a-n*, the issuer server may determine whether the user can pay for the transaction using funds available in the account, e.g., 2335*a-n*. For example, the issuer server may determine whether the user has a sufficient balance remaining in the account, sufficient credit associated with the account, and/or the like. If the issuer server determines that the user can pay for the transaction using the funds available in the account, the server may provide an authorization message, e.g., 2336*a-n*, to the pay network server. For example, the server may provide a HTTP(S) POST message similar to the examples above.

In some implementations, the pay network server may obtain the authorization message, and parse the message to extract authorization details. Upon determining that the user possesses sufficient funds for the transaction, the pay network server may generate a transaction data record from the card authorization request it received, and store, e.g., 2339, the details of the transaction and authorization relating to the transaction in a database, e.g., pay network database 2307. For example, the pay network server may issue PHP/SQL commands similar to the example listing below to store the transaction data in a database:

```
<?PHP
header('Content-Type: text/plain');
mysql_connect("254.92.185.103",$DBserver,$password); // access
database server
mysql_select("TRANSACTIONS.SQL"); // select database to append
mysql_query("INSERT INTO PurchasesTable (timestamp,
purchase_summary_list,
    num_products, product_summary, product_quantity,
    account_params_list, account_name, account_type, account_num,
    transaction_cost, billing_addres, zipcode, phone, sign,
    merchant_params_list, merchant_id,
    merchant_name, merchant_auth_key)
VALUES (time( ), $purchase_summary_list, $num_products,
    $product_summary, $product_quantity, $transaction_cost,
    $account_params_list, $account_name, $account_type,
    $account_num, $billing_addres, $zipcode, $phone, $sign,
    $merchant_params_list, $merchant_id, $merchant_name,
    $merchant_auth_key)");
    // add data to table in database
mysql_close("TRANSACTIONS.SQL"); // close connection to database
?>
```

In some implementations, the pay network server may forward the authorization message, e.g., 2340, to the acquirer server, which may in turn forward the authorization message, e.g., 2340, to the merchant server. The merchant may obtain the authorization message, and determine from it that the user possesses sufficient funds in the card account to conduct the transaction. The merchant server may add a record of the transaction for the user to a batch of transaction data relating to authorized transactions. For example, the merchant may append the XML data pertaining to the user transaction to an XML data file comprising XML data for transactions that have been authorized for various users, e.g., 2341, and store the XML data file, e.g., 2342, in a database, e.g., merchant database 2304. For example, a batch XML data file may be structured similar to the example XML data structure template provided below:

```
<?XML version = "1.0" encoding = "UTF-8"?>
<merchant_data>
    <merchant_id>3FBCR4INC</merchant_id>
    <merchant_name>Books & Things, Inc.</merchant_name>
    <merchant_auth_key>1NNF484MCP59CHB27365
    </merchant_auth_key>
    <account_number>123456789</account_number>
</merchant_data>
<transaction_data>
    <transaction 1>
        ...
    </transaction 1>
    <transaction 2>
        ...
    </transaction 2>
        .
        .
```

-continued

```
        .
    <transaction n>
        ...
    </transaction n>
</transaction_data>
```

In some implementations, the server may also generate a purchase receipt, e.g., 2343, and provide the purchase receipt to the client. The client may render and display, e.g., 2344, the purchase receipt for the user. For example, the client may render a webpage, electronic message, text/SMS message, buffer a voicemail, emit a ring tone, and/or play an audio message, etc., and provide output including, but not limited to: sounds, music, audio, video, images, tactile feedback, vibration alerts (e.g., on vibration-capable client devices such as a smartphone etc.), and/or the like.

Figure 23A:
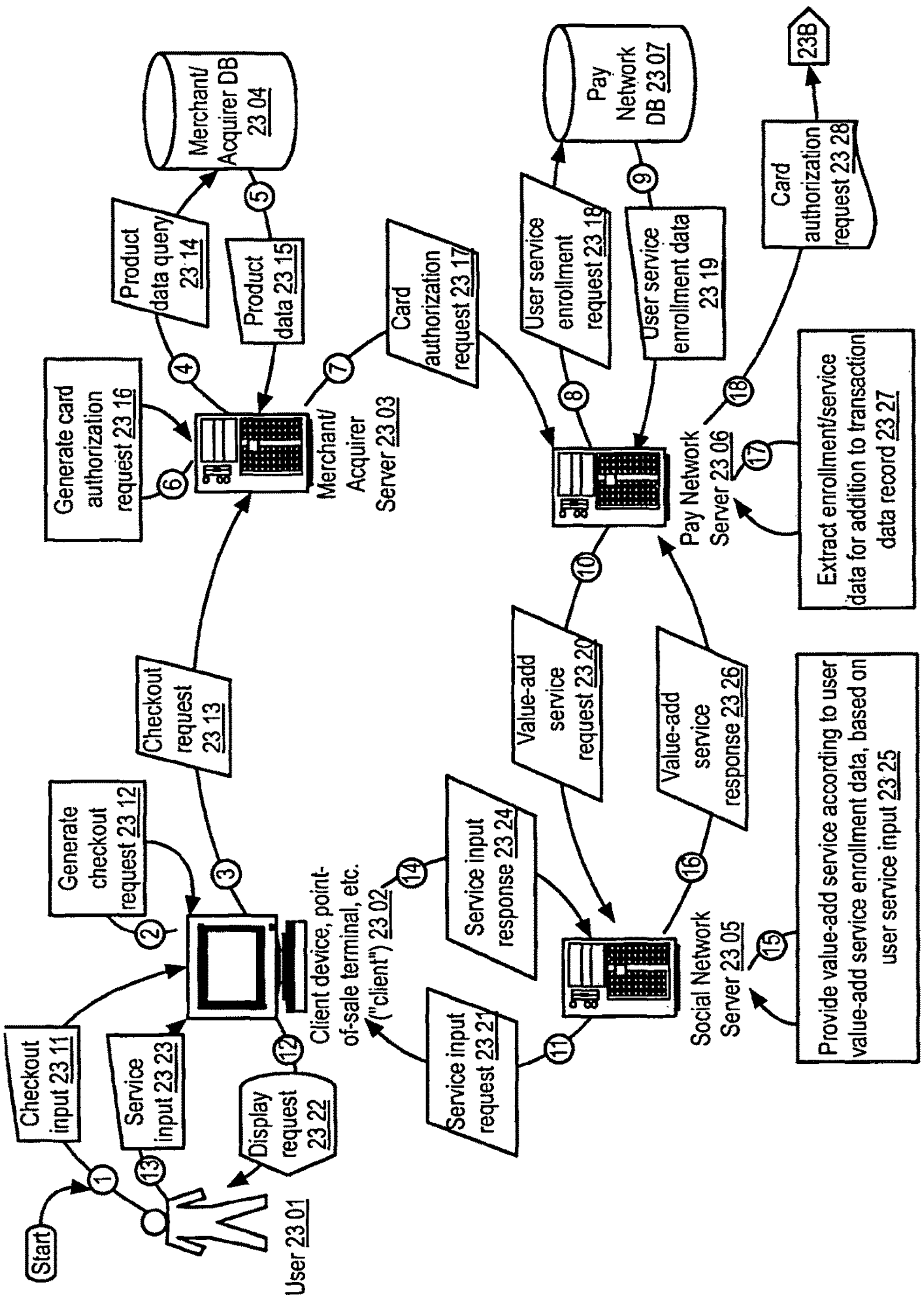
FIGS. 23A-D show data flow diagrams illustrating an example card-based transaction execution procedure in some embodiments of the UEP.
Figure 23B:
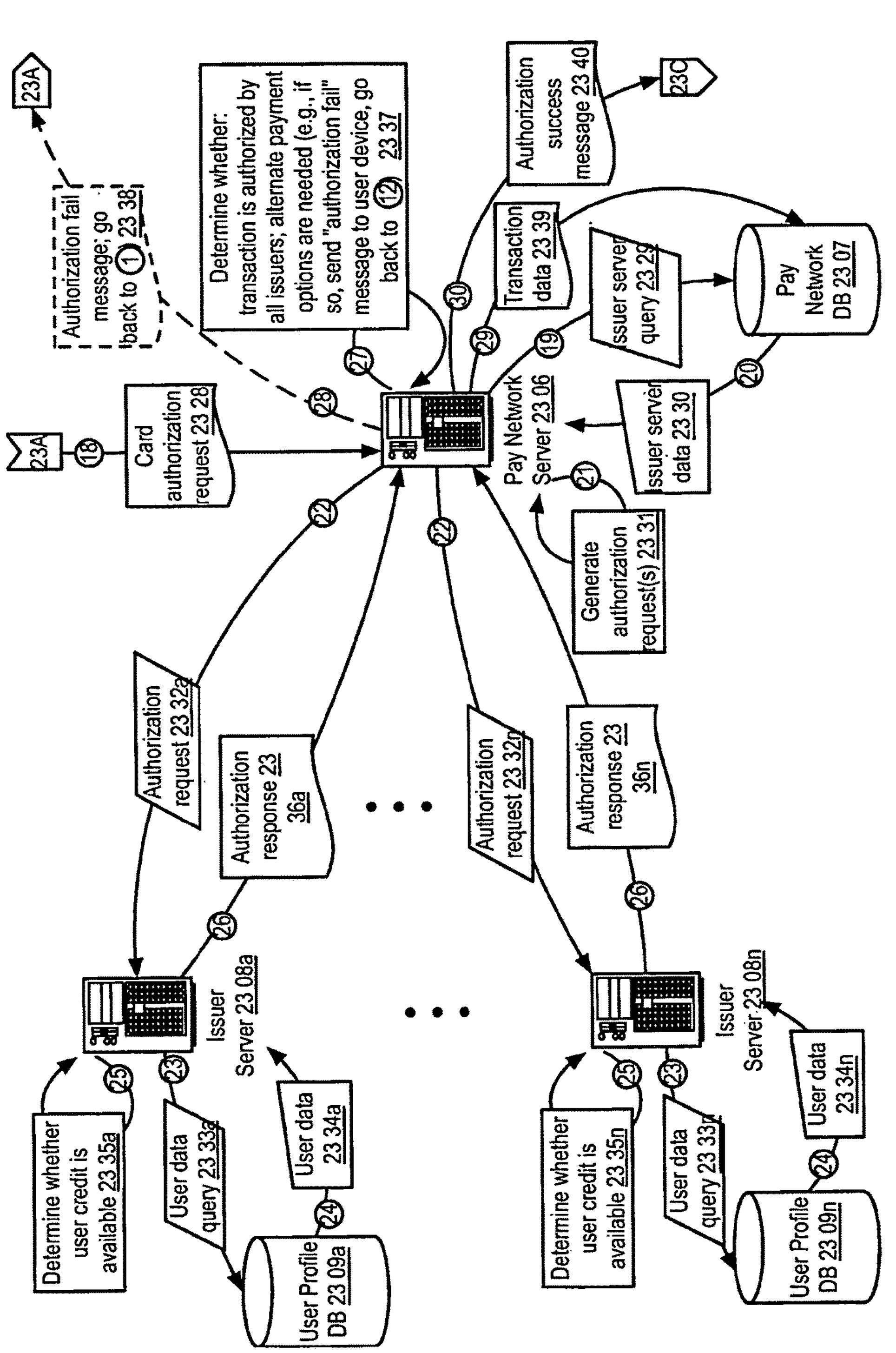
Figure 23C:
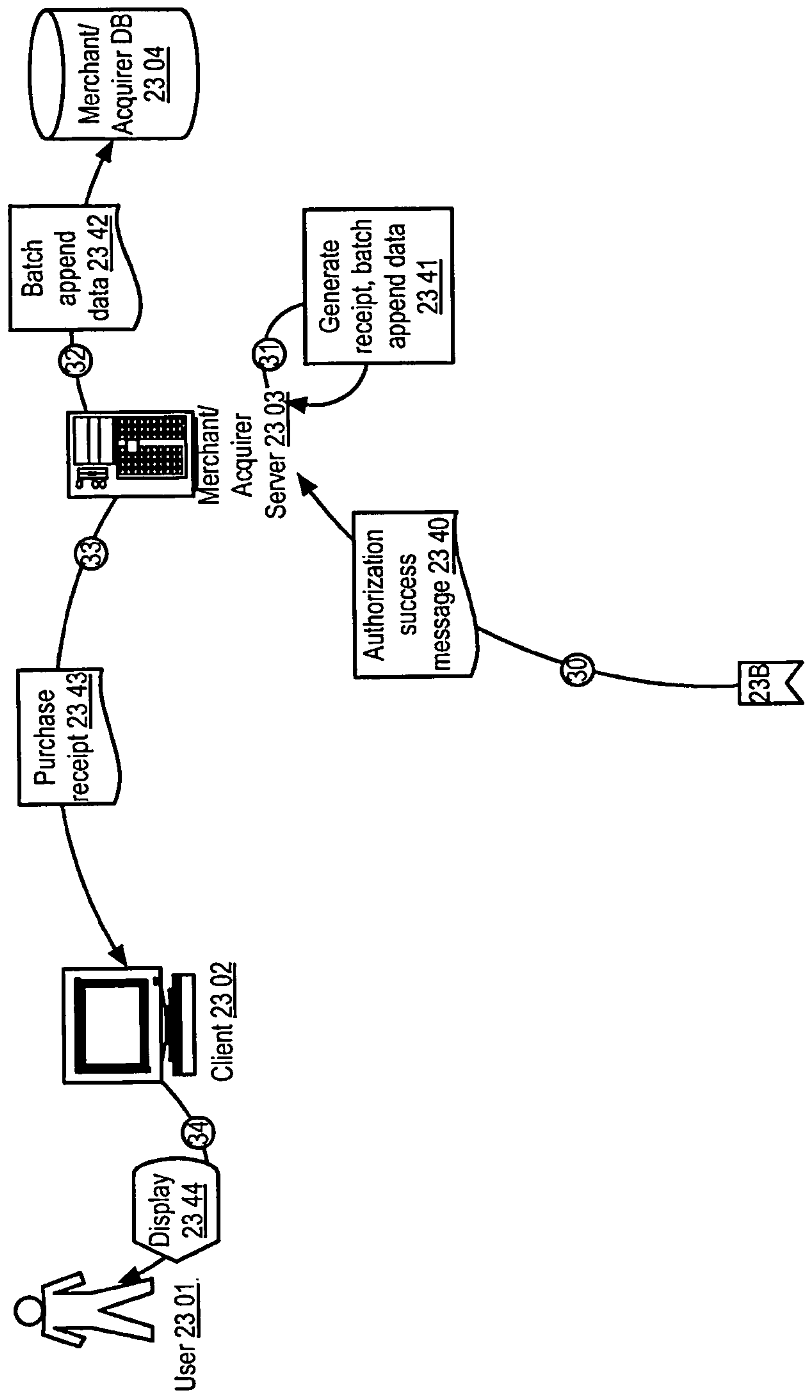
Figure 23D:
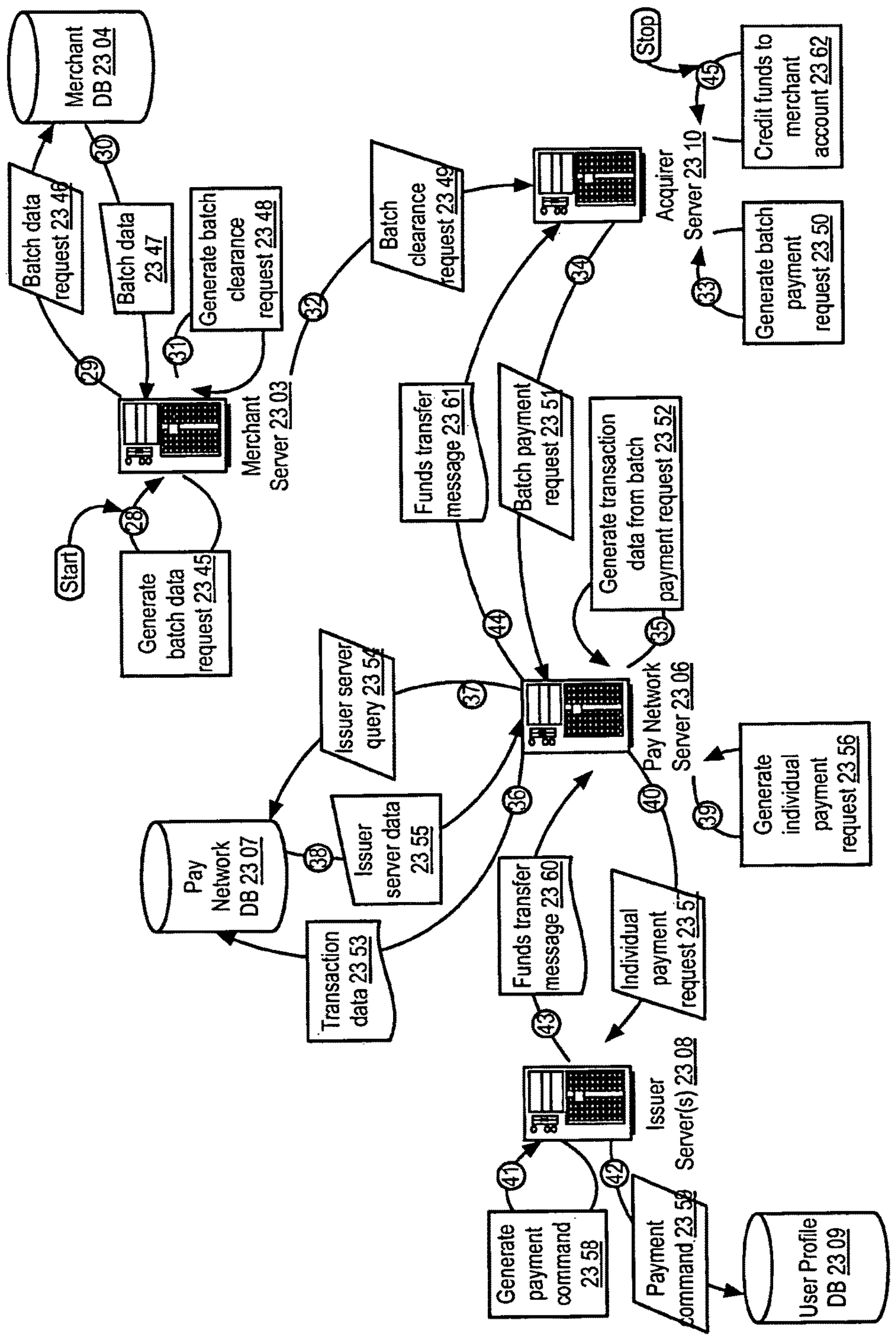

With reference to FIG. 23C, in some implementations, the merchant server may initiate clearance of a batch of authorized transactions. For example, the merchant server may generate a batch data request, e.g., 2345, and provide the request, e.g., 2346, to a database, e.g., merchant database 2304. For example, the merchant server may utilize PHP/SQL commands similar to the examples provided above to query a relational database. In response to the batch data request, the database may provide the requested batch data, e.g., 2347. The server may generate a batch clearance request, a e.g., 2348, using the batch data obtained from the database, and provide, e.g., 2341, the batch clearance request to an acquirer server, e.g., 2310. For example, the merchant server may provide a HTTP(S) POST message including XML-formatted batch data in the message body for the acquirer server. The acquirer server may generate, e.g., 2350, a batch payment request using the obtained batch clearance request, and provide the batch payment request to the pay network server, e.g., 2351. The pay network server may parse the batch payment request, and extract the transaction data for each transaction stored in the batch payment request, e.g., 2352. The pay network server may store the transaction data, e.g., 2353, for each transaction in a database, e.g., pay network database 2307. For each extracted transaction, the pay network server may query, e.g., 2354-2355, a database, e.g., pay network database 2307, for an address of an issuer server. For example, the pay network server may utilize PHP/SQL commands similar to the examples provided above. The pay network server may generate an individual payment request, e.g., 2356, for each transaction for which it has extracted transaction data, and provide the individual payment request, e.g., 2357, to the issuer server, e.g., 2308. For example, the pay network server may provide a HTTP(S) POST request similar to the example below:

```
POST /requestpay.php HTTP/1.1
Host: www.issuer.com
Content-Type: Application/XML
Content-Length: 788
<?XML version = "1.0" encoding = "UTF-8"?>
<pay_request>
    <request_ID>CNI4ICNW2</request_ID>
    <timestamp>2011-02-22 17:00:01</timestamp>
    <pay_amount>$34.78</pay_amount>
    <account_params>
            <account_name>John Q. Public</account_name>
            <account_type>credit</account_type>
            <account_num>123456789012345</account_num>
            <billing_address>123 Green St., Norman,
```

-continued

```
            OK 98765</billing_address>
            <phone>123-456-7809</phone>
            <sign>/jqp/</sign>
    </account_params>
    <merchant_params>
            <merchant_id>3FBCR4INC</merchant_id>
            <merchant_name>Books & Things, Inc.
            </merchant_name>
            <merchant_auth_key>1NNF484MCP59CHB27365
            </merchant_auth_key>
    </merchant_params>
    <purchase_summary>
            <num_products>1</num_products>
            <product>
                    <product_summary
                    >Book - XML for dummies</product_summary>
                    <product_quantity>1
                    </product_quantity?
            </product>
    </purchase_summary>
</pay_request>
```

In some implementations, the issuer server may generate a payment command, e.g., 2358. For example, the issuer server may issue a command to deduct funds from the user's account (or add a charge to the user's credit card account). The issuer server may issue a payment command, e.g., 2359, to a database storing the user's account information, e.g., user profile database 2308. The issuer server may provide a funds transfer message, e.g., 2360, to the pay network server, which may forward, e.g., 2361, the funds transfer message to the acquirer server. An example HTTP(S) POST funds transfer message is provided below:

```
POST /clearance.php HTTP/1.1
Host: www.acquirer.com
Content-Type: Application/XML
Content-Length: 206
<?XML version = "1.0" encoding = "UTF-8"?>
<deposit_ack>
    <request_ID>CNI4ICNW2</request_ID>
    <clear_flag>true</clear_flag>
    <timestamp>2011-02-22 17:00:02</timestamp>
    <deposit_amount>$34.78</deposit_amount>
</deposit_ack>
```

In some implementations, the acquirer server may parse the funds transfer message, and correlate the transaction (e.g., using the request_ID field in the example above) to the merchant. The acquirer server may then transfer the funds specified in the funds transfer message to an account of the merchant, e.g., 2362.

FIGS. 24A-E show logic flow diagrams illustrating example aspects of card-based transaction execution, resulting in generation of card-based transaction data and service usage data, in some embodiments of the UEP, e.g., a Card-Based Transaction Execution ("CTE") component 2400. In some implementations, a user may provide user input, e.g., 2401, into a client indicating the user's desire to purchase a product from a merchant. The client may generate a purchase order message, e.g., 2402, and provide the generated purchase order message to the merchant server. In some implementations, the merchant server may obtain, e.g., 2403, the purchase order message from the client, and may parse the purchase order message to extract details of the purchase order from the user. Example parsers that the merchant client may utilize are discussed further below with reference to FIG. 61. The merchant may generate a product data query, e.g., 2404, for a merchant database, which may in response provide the requested product data, e.g., 2405. The merchant server may generate a card query request using the product data, e.g., 2404, to determine whether the transaction can be processed. For example, the merchant server may process the transaction only if the user has sufficient funds to pay for the purchase in a card account provided with the purchase order. The merchant server may optionally provide the generated card query a request to an acquirer server. The acquirer server may generate a card authorization request using the obtained card query request, and provide the card authorization request to a pay network server.

In some implementations, the pay network server may determine whether the user has enrolled in value-added user services. For example, the pay network server may query a database, e.g., 2407, for user service enrollment data. For example, the server may utilize PHP/SQL commands similar to the example provided above to query the pay network database. In some implementations, the database may provide the user service enrollment data, e.g., 2408. The user enrollment data may include a flag indicating whether the user is enrolled or not, as well as instructions, data, login URL, login API call template and/or the like for facilitating access of the user-enrolled services. For example, in some implementations, the pay network server may redirect the client to a value-add server (e.g., such as a social network server where the value-add service is related to social networking) by providing a HTTP(S) REDIRECT 300 message. In some implementations, the pay network server may provide payment information extracted from the card authorization request to the value-add server as part of a value add service request, e.g., 2410.

In some implementations, the value-add server may provide a service input request, e.g., 2411, to the client. The client may display, e.g., 2412, the input request for the user. In some implementations, the user may provide input into the client, e.g., 2413, and the client may generate a service input response for the value-add server. In some implementations, the value-add server may provide value-add services according to user value-add service enrollment data, user profile, etc., stored on the value-add server, and based on the user service input. Based on the provision of value-add services, the value-add server may generate a value-add service response, e.g., 2417, and provide the response to the pay network server. In some implementations, upon receiving the value-add service response from the value-add server, the pay network server may extract the enrollment service data from the response for addition to a transaction data record, e.g., 2419-2420.

Figure 24A:
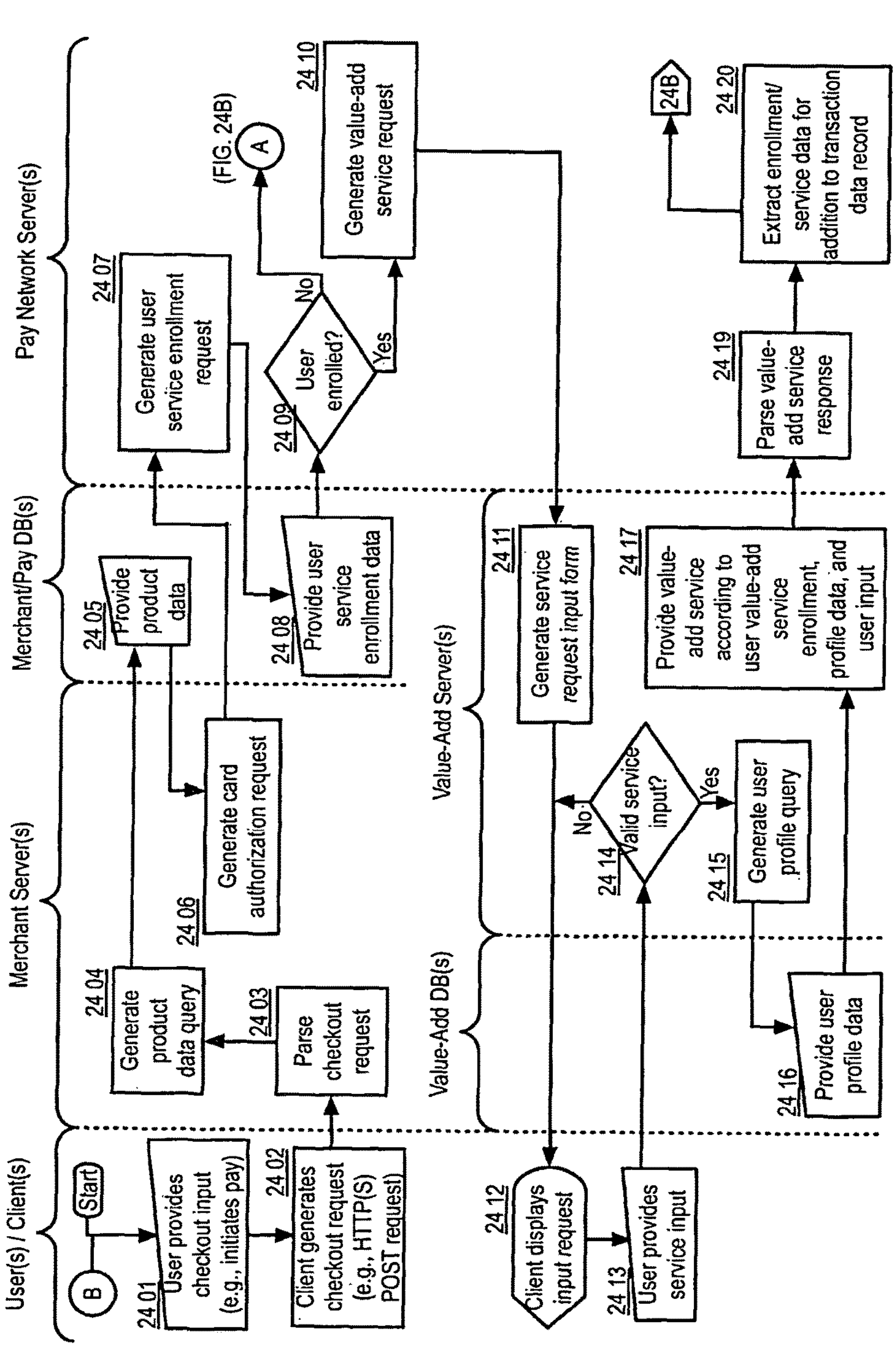
FIGS. 24A-E show logic flow diagrams illustrating example aspects of card-based transaction execution, resulting in generation of card-based transaction data and service usage data, in some embodiments of the UEP, e.g., a Card-Based Transaction Execution ("CTE") component 2400.
Figure 24B:
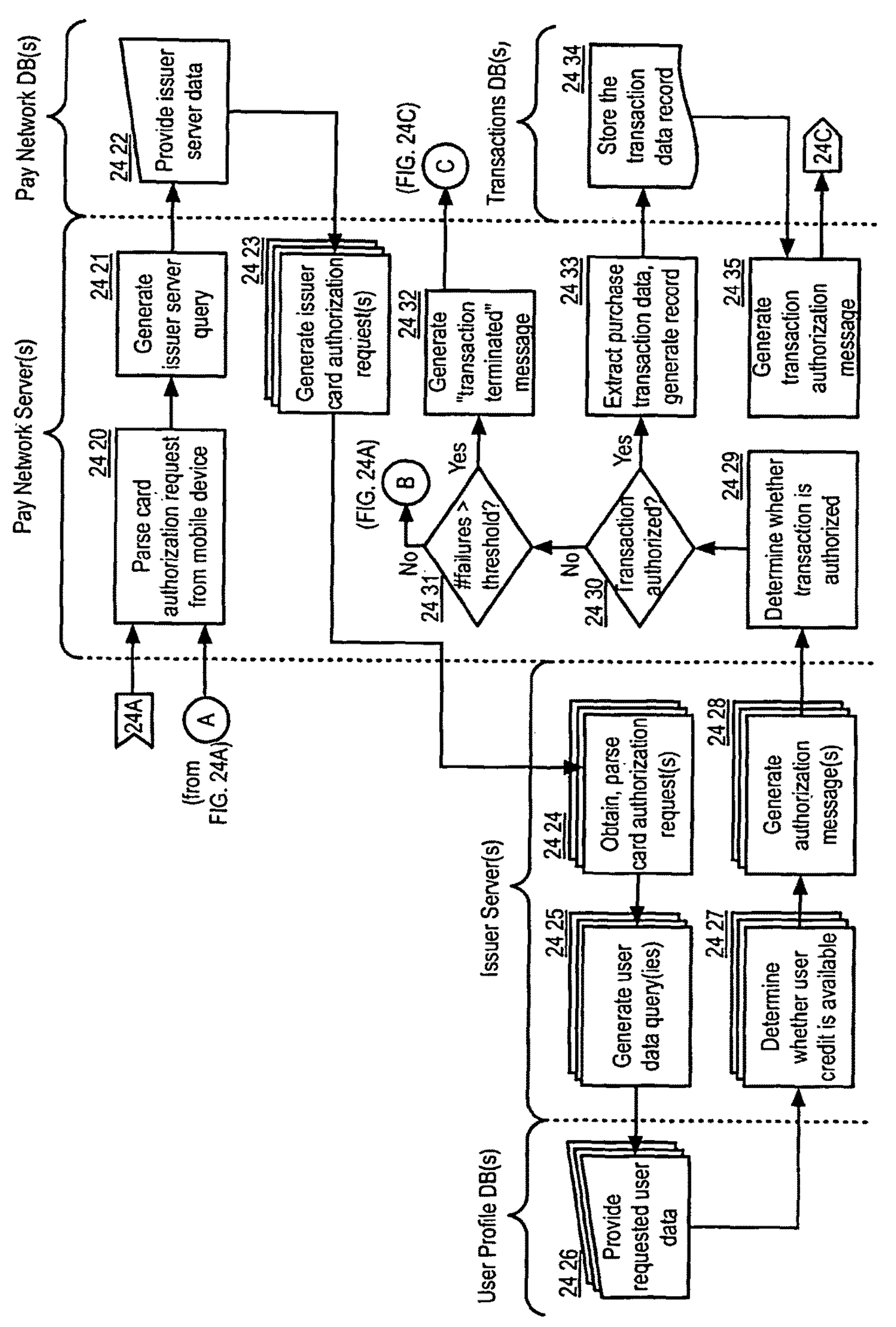
Figure 24C:
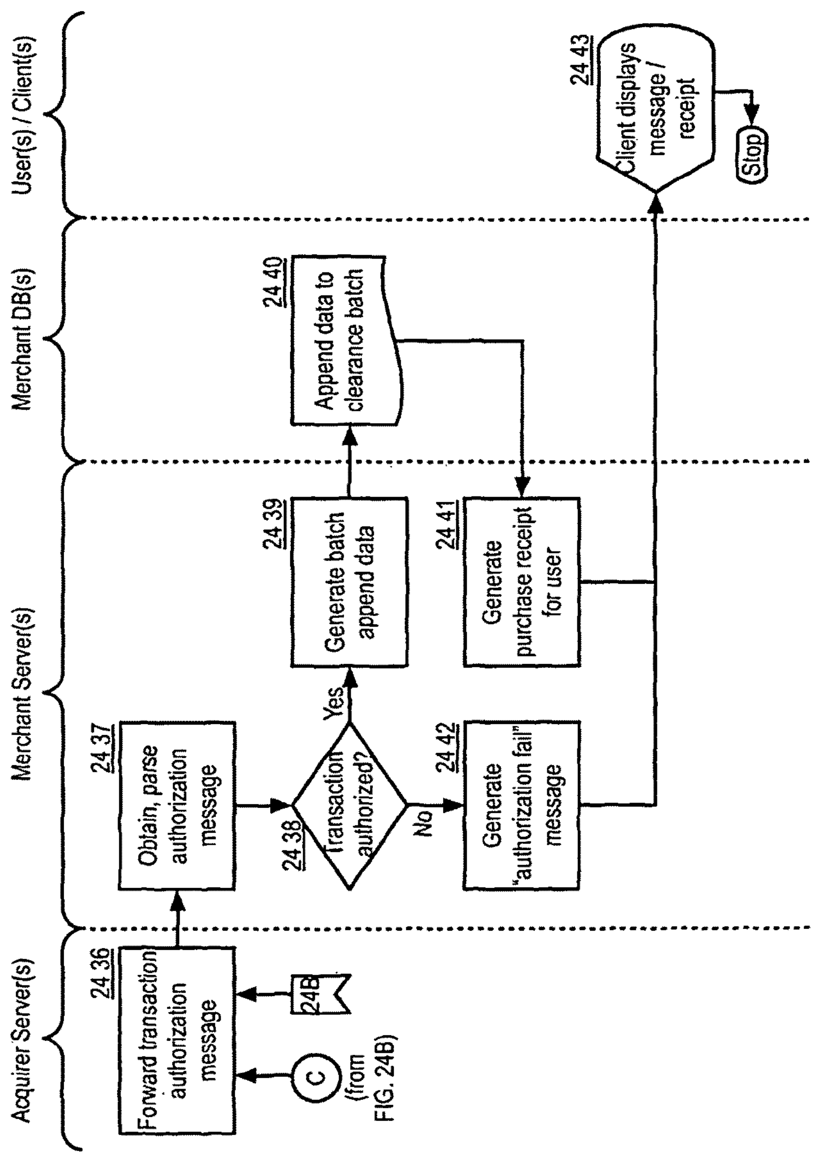
Figure 24D:
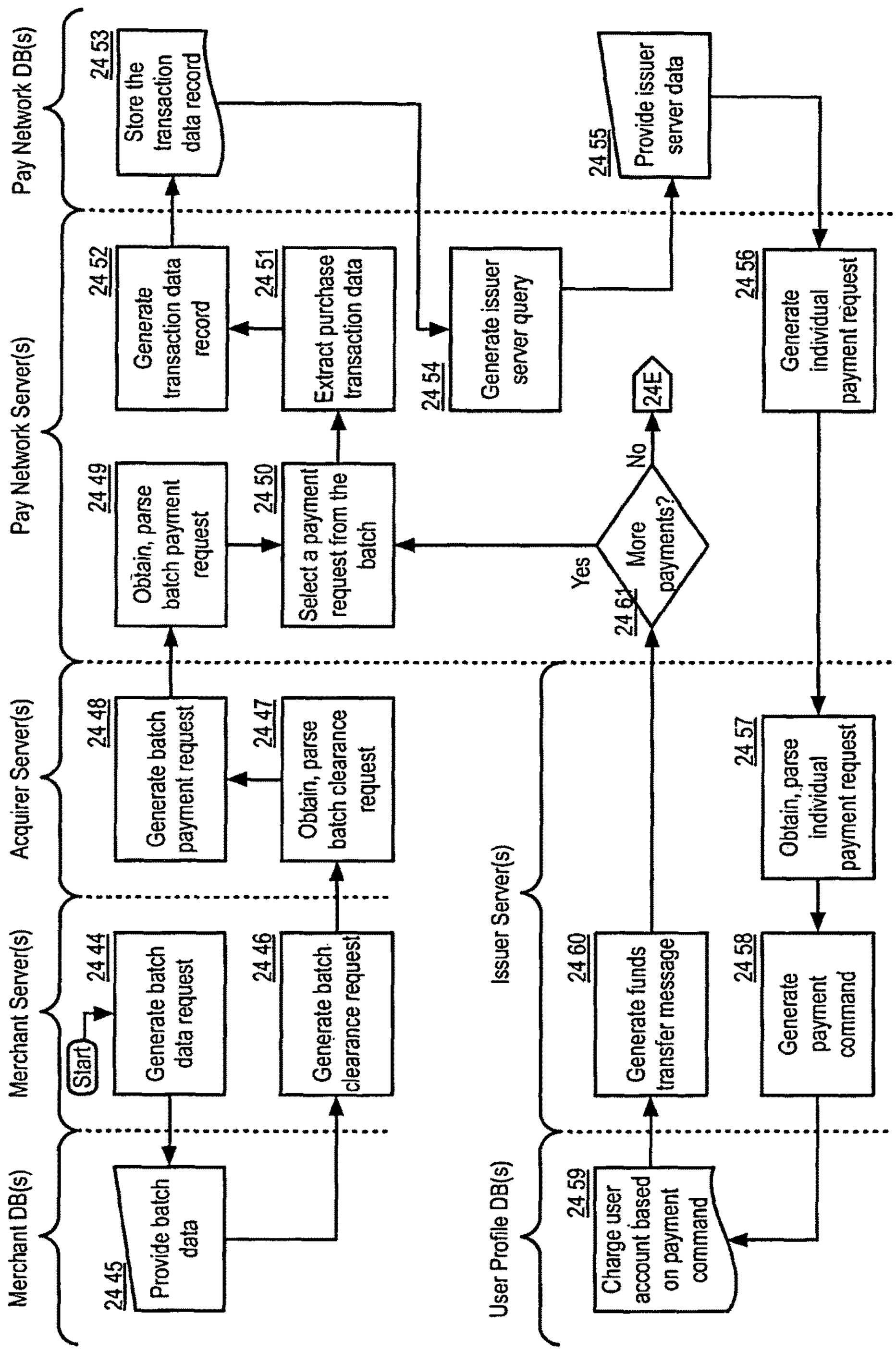
Figure 24E:
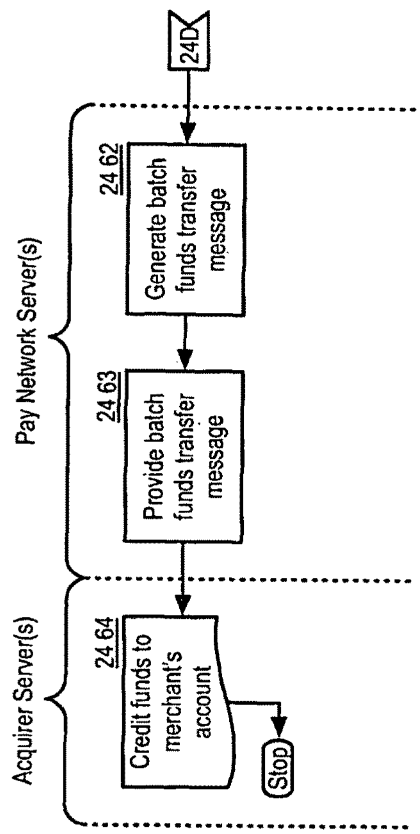

With reference to FIG. 24B, in some implementations, the pay network server may obtain the card authorization request from the acquirer server, and may parse the card authorization request to extract details of the request, e.g., 2420. Using the extracted fields and field values, the pay network server may generate a query, e.g., 2421-2422, for an issuer server corresponding to the user's card account. In response to obtaining the issuer server query the pay network database may provide, e.g., 2422, the requested issuer server data to the pay network server. In some implementations, the pay network server may utilize the issuer server data to generate a forwarding card authorization request, e.g., 2423, to redirect the card authorization request from the acquirer server to the issuer server. The pay network server may provide the card authorization request to the issuer server. In some implementations, the issuer server may parse, e.g., 2424, the card authorization request, and based on the request details may query a database, e.g., 2425, for data of the user's card account. In response, the database may provide the requested user data. On obtaining the user data, the issuer server may determine whether the user can pay for the transaction using funds available in the account, e.g., 2426. For example, the issuer server may determine whether the user has a sufficient balance remaining in the account, sufficient credit associated with the account, and/or the like, but comparing the data from the database with the transaction cost obtained from the card authorization request. If the issuer a server determines that the user can pay for the transaction using the funds available in the account, the server may provide an authorization message, e.g., 2427, to the pay network server.

In some implementations, the pay network server may obtain the authorization message, and parse the message to extract authorization details. Upon determining that the user possesses sufficient funds for the transaction (e.g., 2430, option "Yes"), the pay network server may extract the transaction card from the authorization message and/or card authorization request, e.g., 2433, and generate a transaction data record using the card transaction details. The pay network server may provide the transaction data record for storage, e.g., 2434, to a database. In some implementations, the pay network server may forward the authorization message, e.g., 2435, to the acquirer server, which may in turn forward the authorization message, e.g., 2436, to the merchant server. The merchant may obtain the authorization message, and parse the authorization message o extract its contents, e.g., 2437. The merchant server may determine whether the user possesses sufficient funds in the card account to conduct the transaction. If the merchant server determines that the user possess sufficient funds, e.g., 2438, option "Yes," the merchant server may add the record of the transaction for the user to a batch of transaction data relating to authorized transactions, e.g., 2439-2440. The merchant server may also generate a purchase receipt, e.g., 2441, for the user. If the merchant server determines that the user does not possess sufficient funds, e.g., 2438, option "No," the merchant server may generate an "authorization fail" message, e.g., 2442. The merchant server may provide the purchase receipt or the "authorization fail" message to the client. The client may render and display, e.g., 2443, the purchase receipt for the user.

In some implementations, the merchant server may initiate clearance of a batch of authorized transactions by generating a batch data request, e.g., 2444, and providing the request to a database. In response to the batch data request, the database may provide the requested batch data, e.g., 2445, to the merchant server. The server may generate a batch clearance request, e.g., 2446, using the batch data obtained from the database, and provide the batch clearance request to an acquirer server. The acquirer server may generate, e.g., 2448, a batch payment request using the obtained batch clearance request, and provide the batch payment request to a pay network server. The pay network server may parse, e.g., 2449, the batch payment request, select a transaction stored within the batch data, e.g., 2450, and extract the transaction data for the transaction stored in the batch payment request, e.g., 2451. The pay network server may generate a transaction data record, e.g., 2452, and store the transaction data, e.g., 2453, the transaction in a database. For the extracted transaction, the pay network server may generate an issuer server query, e.g., 2454, for an address of an issuer server maintaining the account of the user requesting the transaction. The pay network server may provide the query to a database. In response, the database may provide the issuer server data requested by the pay network server, e.g., 2455. The pay network server may generate an individual payment request, e.g., 2456, for the transaction for which it has extracted transaction data, and provide the individual payment request to the issuer server using the issuer server data from the database.

In some implementations, the issuer server may obtain the individual payment request, and parse, e.g., 2457, the individual payment request to extract details of the request. Based on the extracted data, the issuer server may generate a payment command, e.g., 2458. For example, the issuer server may issue a command to deduct a funds from the user's account (or add a charge to the user's credit card account). The issuer server may issue a payment command, e.g., 2459, to a database storing the user's account information. In response, the database may update a data record corresponding to the user's account to reflect the debit/charge made to the user's account. The issuer server may provide a funds transfer message, e.g., 2460, to the pay network server after the payment command has been executed by the database.

In some implementations, the pay network server may check whether there are additional transactions in the batch that need to be cleared and funded. If there are additional transactions, e.g., 2461, option "Yes," the pay network server may process each transaction according to the procedure described above. The pay network server may generate, e.g., 2462, an aggregated funds transfer message reflecting transfer of all transactions in the batch, and provide, e.g., 2463, the funds transfer message to the acquirer server. The acquirer server may, in response, transfer the funds specified in the funds transfer message to an account of the merchant, e.g., 2464.

Figure 25:
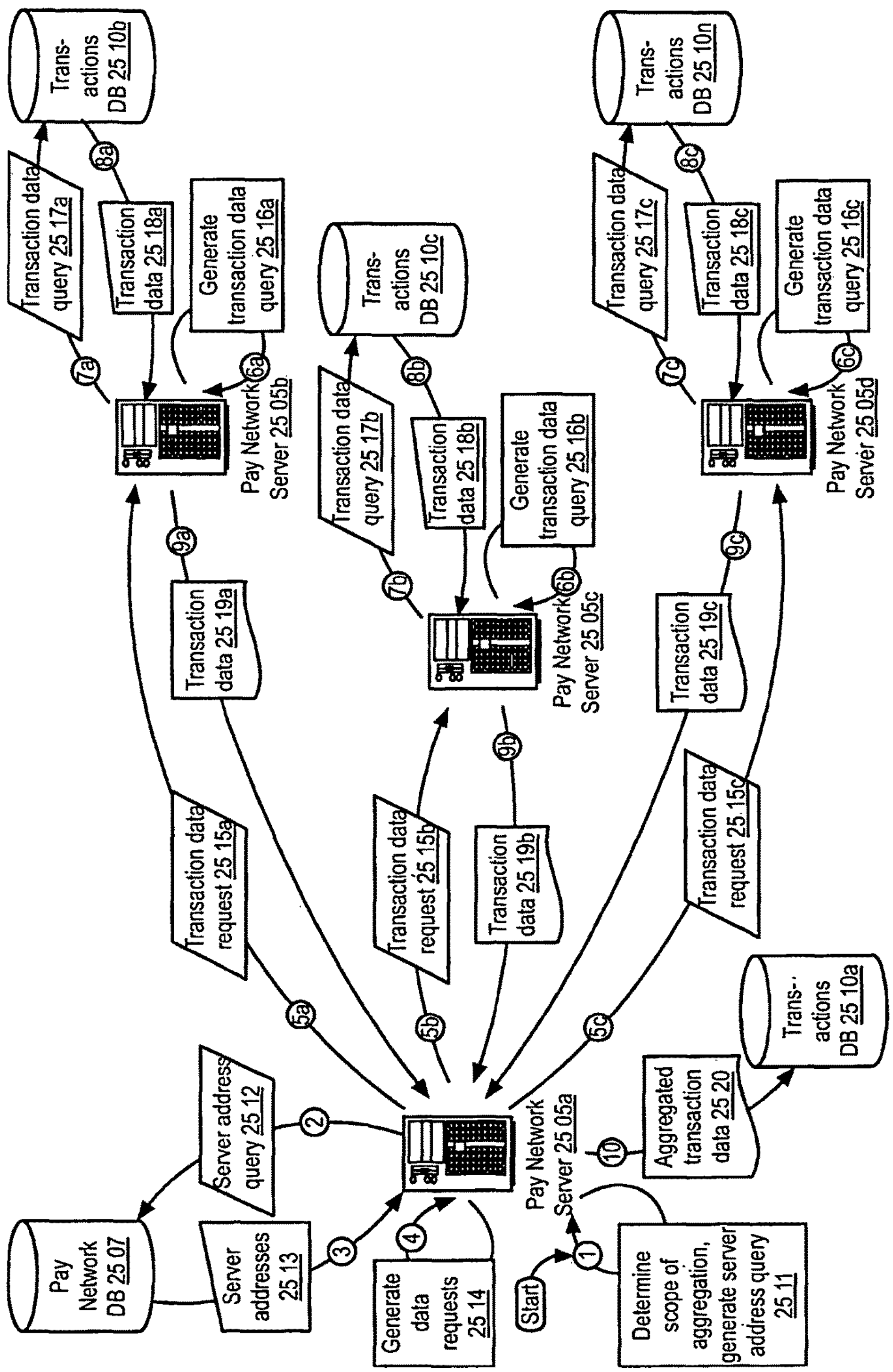
FIG. 25 shows a data flow diagram illustrating an example procedure to aggregate card-based transaction data in some embodiments of the UEP.

FIG. 25 shows a data flow diagram illustrating an example procedure to aggregate card-based transaction data in some embodiments of the UEP. In some implementations, the pay network server may determine a scope of data aggregation required to perform the analysis, e.g., 2511. The pay network server may initiate data aggregation based on the determined scope. The pay network server may generate a query for addresses of server storing transaction data within the determined scope. The pay network server may query, e.g., 2512, a pay network database, e.g., 2507*a*, for addresses of pay network servers that may have stored transaction data within the determined scope of the data aggregation. For example, the pay network server may a utilize PHP/SQL commands similar to the examples provided above. The database may provide, e.g., 2513, a list of server addresses in response to the pay network server's query. Based on the list of server addresses, the pay network server may generate transaction data requests, e.g., 2514. The pay network server may issue the generated transaction data requests, e.g., 2515*a*-*c*, to the other pay network servers, e.g., 2505*b*-*d*. The other pay network servers may query, e.g., 2517*a*-*c*, their pay network database, e.g., 2507*a*-*d*, for transaction data falling within the scope of the transaction data requests. In response to the transaction data queries, the pay network databases may provide transaction data, e.g., 2518*a*-*c*, to the other pay network servers. The other pay network servers may return the transaction data obtained from the pay network databases, e.g., 2519*a*-*c*, to the pay network server making the transaction data requests, e.g., 2505*a*. The pay network server, e.g., 2505*a*, may store the aggregated transaction data, e.g., 2520, in an aggregated transactions database, e.g., 2510*a*.

Figure 26:
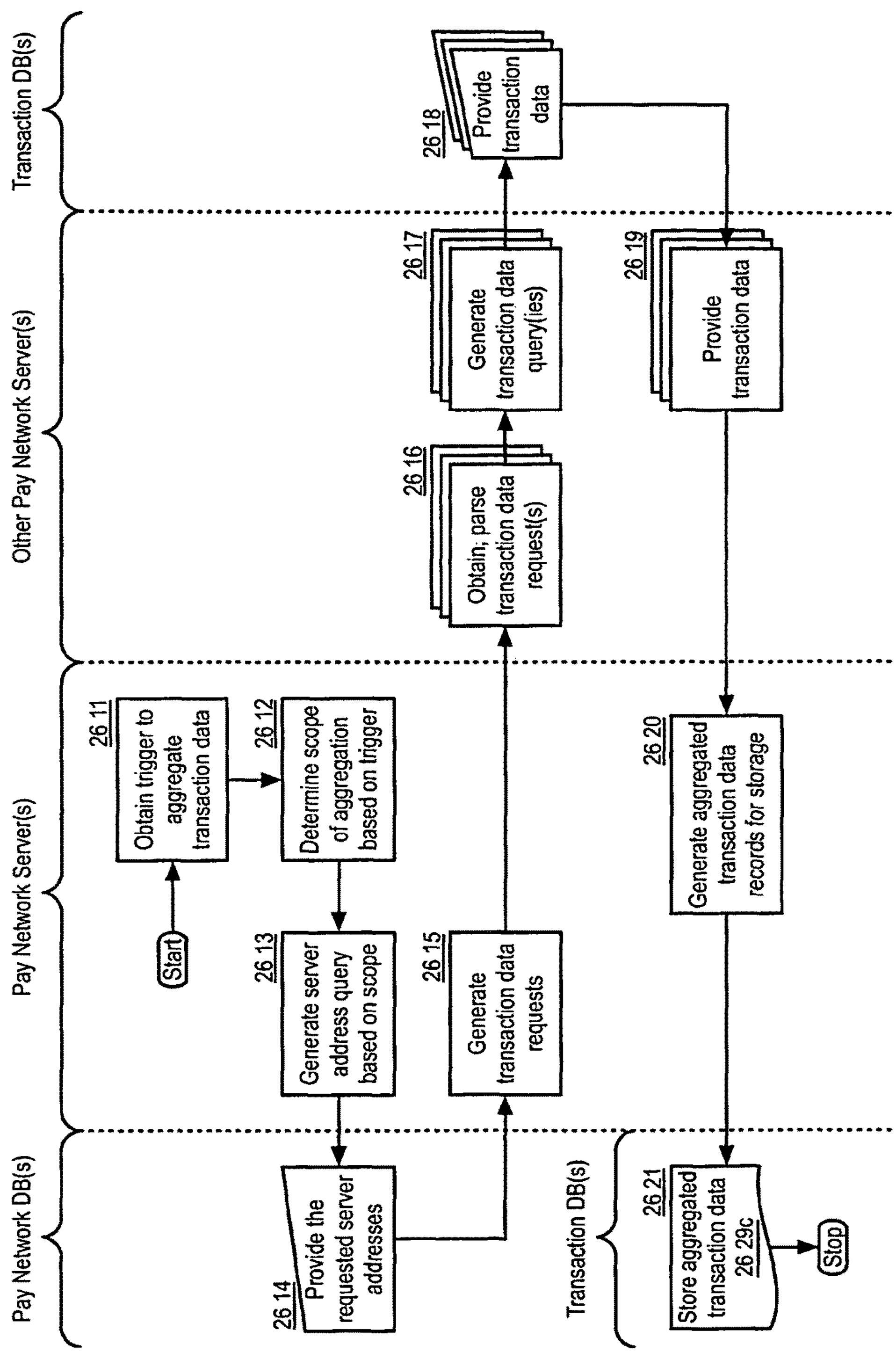
FIG. 26 shows a logic flow diagram illustrating example aspects of aggregating card-based transaction data in some embodiments of the UEP, e.g., a Transaction Data Aggregation ("TDA") component 2600.

FIG. 26 shows a logic flow diagram illustrating example aspects of aggregating card-based transaction data in some embodiments of the UEP, e.g., a Transaction Data Aggregation ("TDA") component 2600. In some implementations, a pay network server may obtain a trigger to aggregate transaction data, e.g., 2601. For example, the server may be configured to initiate transaction data aggregation on a regular, periodic, basis (e.g., hourly, daily, weekly, monthly, quarterly, semi-annually, annually, etc.). As another example, the server may be configured to initiate transaction data aggregation on obtaining information that the U.S. Government (e.g., Department of Commerce, Office of Management and Budget, etc) has released new statistical data related to the U.S. business economy. As another example, the server may be configured to initiate transaction data aggregation on-demand, upon obtaining a user a investment strategy analysis request for processing. The pay network server may determine a scope of data aggregation required to perform the analysis, e.g., 2602. For example, the scope of data aggregation may be pre-determined. As another example, the scope of data aggregation may be determined based on a received user investment strategy analysis request. The pay network server may initiate data aggregation based on the determined scope. The pay network server may generate a query for addresses of server storing transaction data within the determined scope, e.g., 2603. The pay network server may query a database for addresses of pay network servers that may have stored transaction data within the determined scope of the data aggregation. The database may provide, e.g., 2604, a list of server addresses in response to the pay network server's query. Based on the list of server addresses, the pay network server may generate transaction data requests, e.g., 2605. The pay network server may issue the generated transaction data requests to the other pay network servers. The other pay network servers may obtain and parse the transaction data requests, e.g., 2606. Based on parsing the data requests, the other pay network servers may generate transaction data queries, e.g., 2607, and provide the transaction data queries to their pay network databases. In response to the transaction data queries, the pay network databases may provide transaction data, e.g., 2608, to the other pay network servers. The other pay network servers may return, e.g., 2609, the transaction data obtained from the pay network databases to the pay network server making the transaction data requests. The pay network server may generate aggregated transaction data records from the transaction data received from the other pay network servers, e.g., 2610, and store the aggregated transaction data in a database, e.g., 2611.

Figure 27:
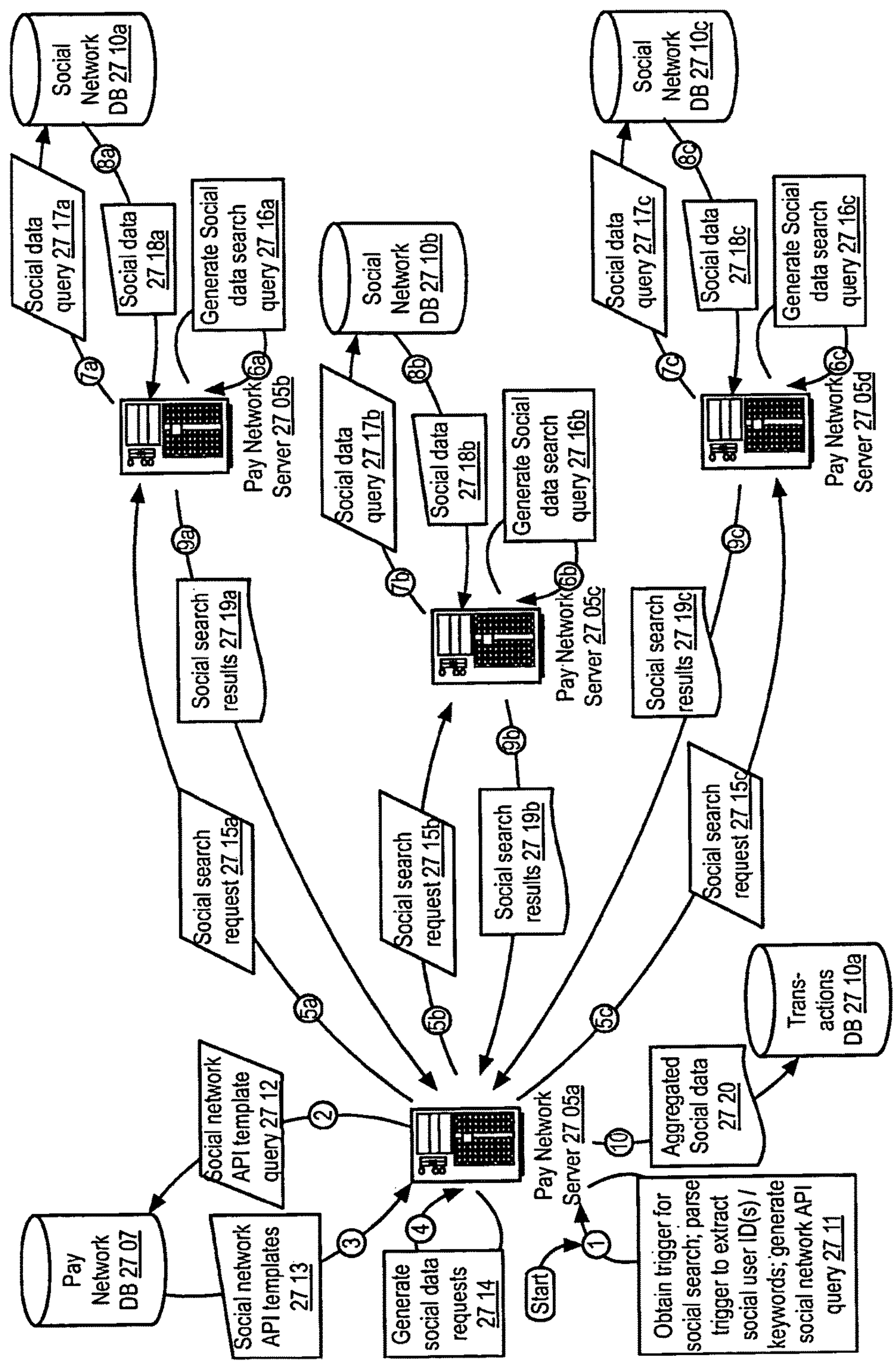
FIG. 27 shows a data flow diagram illustrating an example social data aggregation procedure in some embodiments of the UEP.

FIG. 27 shows a data flow diagram illustrating an example social data a aggregation procedure in some embodiments of the UEP. In some implementations, the pay network server may obtain a trigger to perform a social data search. For example, the pay network server may periodically perform an update of its aggregated social database, e.g., 2710, with new information available from a variety of sources, such as the social networking services operating on the Internet. As another example, a request for on-demand social data update may be obtained as a result of a user wishing to enroll in a service, for which the pay network server may facilitate data entry by providing an automated web form filling system using information about the user obtained from the social data update. In some implementations, the pay network server may parse the trigger to extract keywords using which to perform an aggregated social data update. The pay network server may generate a query for application programming interface (API) templates for various social networking services (e.g., Facebook®, Twitter™, etc.) from which to collect social data for aggregation. The pay network server may query, e.g., 2712, a pay network database, e.g., 2707, for social network API templates for the social networking services. For example, the pay network server may utilize PHP/SQL commands similar to the examples provided above. The database may provide, e.g., 2713, a list of API templates in response. Based on the list of API templates, the pay network server may generate social data requests, e.g., 2714. The pay network server may issue the generated social data requests, e.g., 2715a-c, to the social network servers, e.g., 2701a-c. For example, the pay network server may issue PHP commands to request the social network servers for social data. An example listing of commands to issue social data requests 2715a-c, substantially in the form of PHP commands, is provided below:

```
<?PHP
header('Content-Type: text/plain');
// Obtain user ID(s) of friends of the logged-in user
$friends =
    json__decode(file__get__contents('https://graph.facebook.com/me/friends?access
    token='$cookie['oauth__access__token']), true);
$friend__ids = array__keys($friends);
// Obtain message feed associated with the profile of the logged-in user
$feed =
    json__decode(file__get__contents('https:llgraph.facebook.com/me/feed?access__token
    ='$cookie['oauth__access__token']), true);
// Obtain messages by the user's friends
$result = mysql__query('SELECT * FROM content WHERE uid IN ('
    .implode($friend__ids, ',') . ')');
$friend__content = array( );
while ($row = mysql__fetch__assoc($result))
$friend__content [ ] $row;
?>
```

In some embodiments, the social network servers may query, e.g., 2717a-c, their databases, e.g., 2702a-c, for social data results falling within the scope of the social keywords. In response to the queries, the databases may provide social data, e.g., 2718a-c, to the search engine servers. The social network servers may return the social data obtained from the databases, e.g., 2719a-c, to the pay network server making the social data requests. An example listing of social data 2719a-c, substantially in the form of JavaScript Object Notation (JSON)-formatted data, is provided below:

```
[ "data":   [
            {     "name": "Tabatha Orloff",
                  "id": "483722"},
            {     "name": "Darren Kinnaman",
                  "id": "86S743"},
```

-continued

```
                { "name": "Sharron Jutras",
                  "id": "O91274"}
    ] }
```

In some embodiments, the pay network server may store the aggregated search results, e.g., 2720, in an aggregated search database, e.g., 2710.

Figure 28:
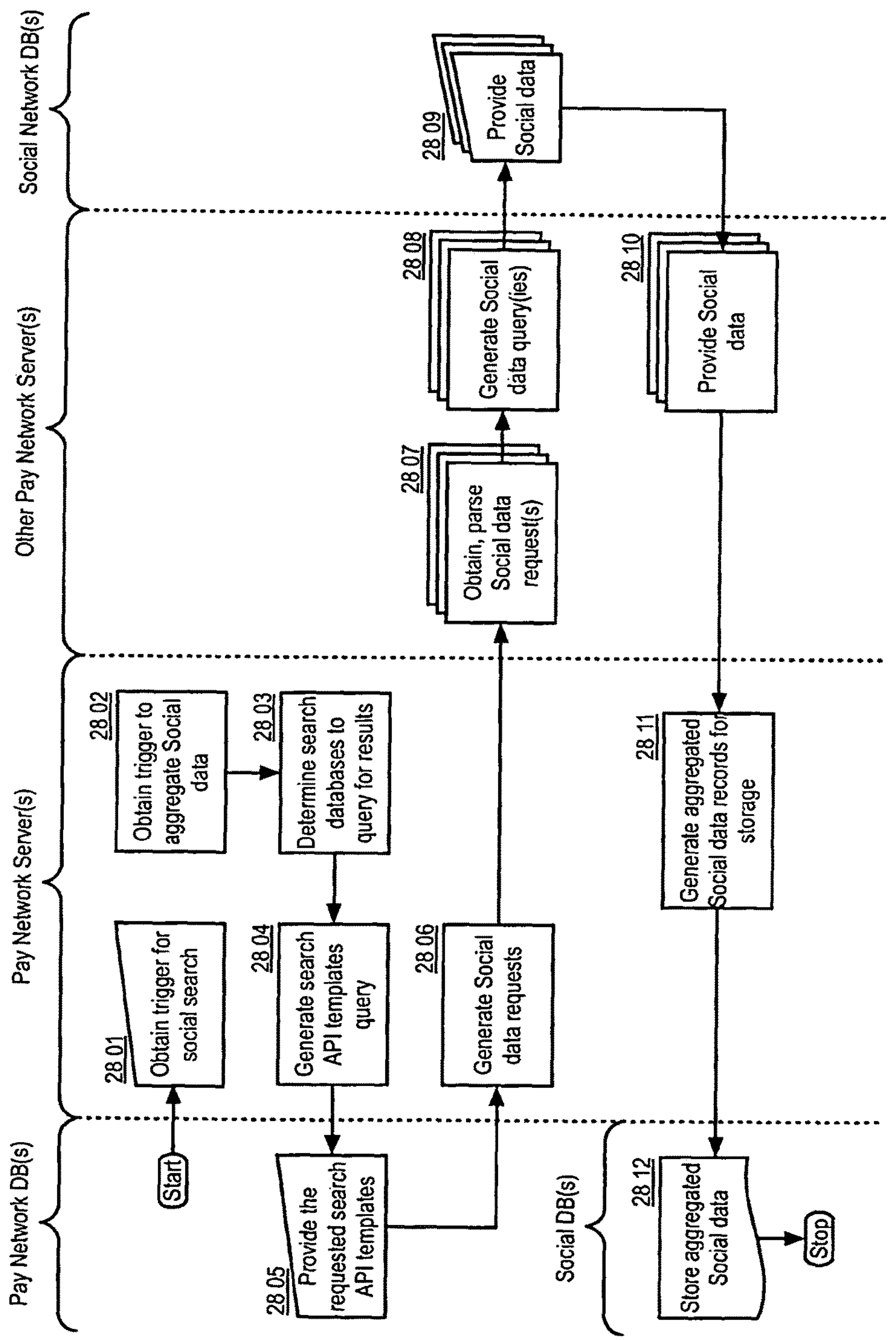
FIG. 28 shows a logic flow diagram illustrating example aspects of aggregating social data in some embodiments of the UEP, e.g., a Social Data Aggregation ("SDA") component 2800.

FIG. 28 shows a logic flow diagram illustrating example aspects of aggregating social data in some embodiments of the UEP, e.g., a Social Data Aggregation ("SDA") component 2800. In some implementations, the pay network server may obtain a trigger to perform a social search, e.g., 2801. For example, the pay network server may periodically perform an update of its aggregated social database with new information available from a variety of sources, such as the Internet. As another example, a request for on-demand social data update may be obtained as a result of a user wishing to enroll in a service, for which the pay network server may facilitate data entry by providing an automated web form filling system using information about the user obtained from the social data update. In some implementations, the pay network server may parse the trigger, e.g., 2802, to extract keywords and/or user ID(s) using which to perform an aggregated search for social data. The pay network server may determine the social networking services to search, e.g., 2803, using the extracted keywords and/or user ID(s). Then, the pay network server may generate a query for application programming interface (API) templates for the various social networking services (e.g., Facebook®, Twitter™, etc.) from which to collect social data for aggregation, e.g., 2804. The pay network server may query, e.g., 2805, a pay network database for search API templates for the social networking services. For example, the pay network server may utilize PHP/SQL commands similar to the examples provided above. The database may provide, e.g., 2805, a list of API templates in response. Based a on the list of API templates, the pay network server may generate social data requests, e.g., 2806. The pay network server may issue the generated social data requests to the social networking services. The social network servers may parse the obtained search results(s), e.g., 2807, and query, e.g., 2808, their databases for social data falling within the scope of the search keywords. In response to the social data queries, the databases may provide social data, e.g., 2809, to the social networking servers. The social networking servers may return the social data obtained from the databases, e.g., 2810, to the pay network server making the social data requests. The pay network server may generate, e.g., 2811, and store the aggregated social data, e.g., 2812, in an aggregated social database.

Figure 29:
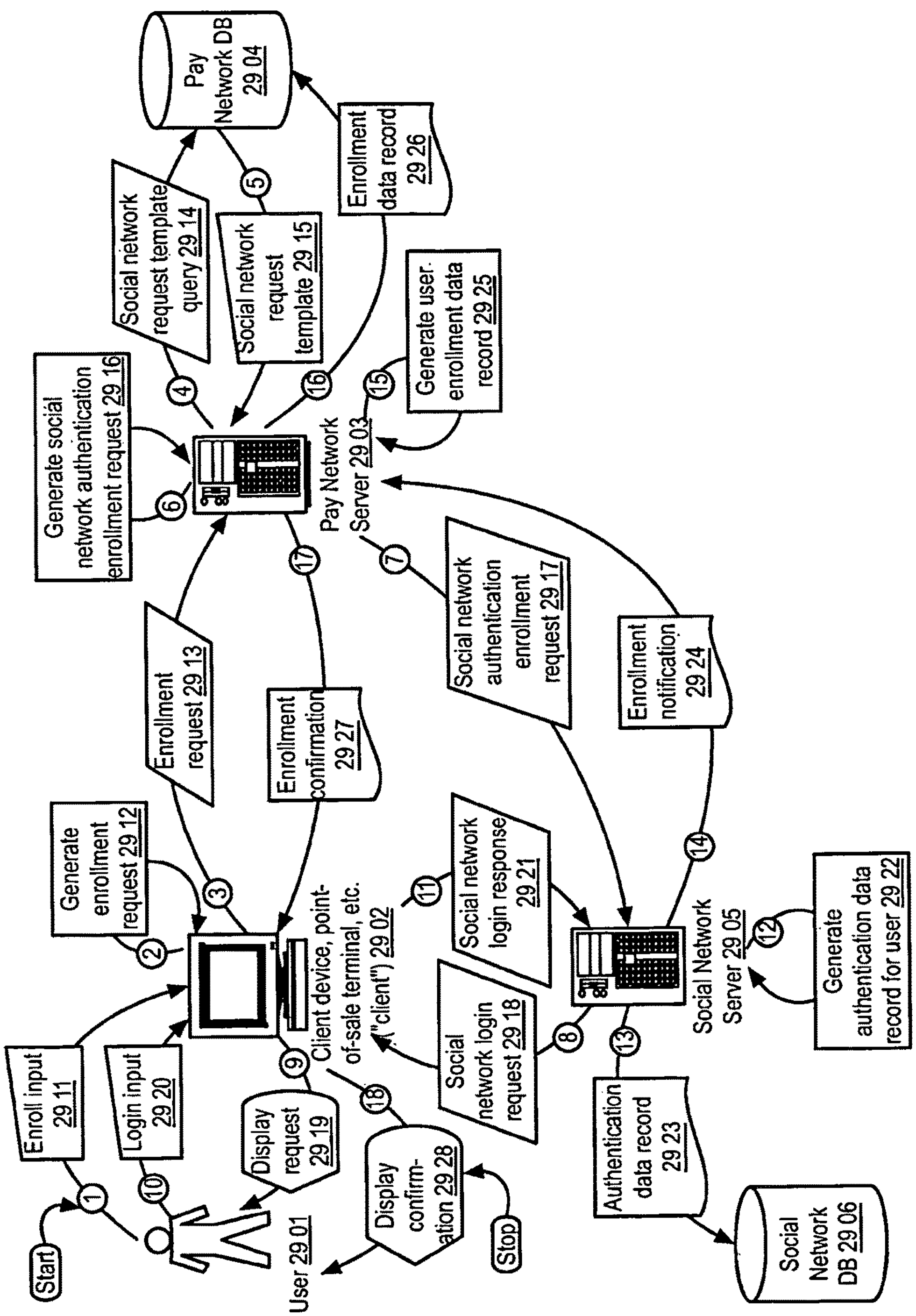
FIG. 29 shows a data flow diagram illustrating an example procedure for enrollment in value-add services in some embodiments of the UEP.

FIG. 29 shows a data flow diagram illustrating an example procedure for enrollment in value-add services in some embodiments of the UEP. In some implementations, a user, e.g., 2901, may desire to enroll in a value-added service. Let us consider an example wherein the user desires to enroll in social network authenticated purchase payment as a value-added service. It is to be understood that any other value-added service may take the place of the below-described value-added service. The user may communicate with a pay network server, e.g., 2903, via a client such as, but not limited to: a personal computer, mobile device, television, point-of-sale terminal, kiosk, ATM, and/or the like (e.g., 2902). For example, the user may provide user input, e.g., enroll input 2911, into the client indicating the user's desire to enroll in social network authenticated purchase payment. In various implementations, the user input may include, but not be limited to: a single tap (e.g., a one-tap mobile app purchasing embodiment) of a touchscreen interface, keyboard entry, card swipe, activating a RFID/NFC enabled hardware device (e.g., electronic card having multiple accounts, a smartphone, tablet, etc.) within the user device, mouse clicks, depressing buttons on a joystick/game console, voice commands, single/multi-touch gestures on a touch-sensitive interface, touching user interface elements on a touch-sensitive display, and/or the like. For example, the user may swipe a payment card at the client 2902. In some implementations, the client may obtain track 1 data from the user's card as enroll input 2911 (e.g., credit card, debit card, prepaid card, charge card, etc.), such as the example track 1 data provided below:

```
%B123456789012345^PUBLIC/
J.Q.^99011200000000000000**901******?*
(wherein '123456789012345' is the card number of 'J.Q. Public'
and has a CVV
    number of 901. '990112' is a service code, and *** represents
    decimal digits which change randomly each time the card is used.)
```

In some implementations, using the user's input, the client may generate an enrollment request, e.g., 2912, and provide the enrollment request, e.g., 2913, to the pay network server. For example, the client may provide a (Secure) Hypertext Transfer Protocol ("HTTP(S)") POST message including data formatted according to the eXtensible Markup Language ("XML"). Below is an example HTTP(S) POST message including an XML-formatted enrollment request for the pay network server:

```
POST /enroll.php HTTP/1.1
Host: www.merchant.com
Content-Type: Application/XML
Content-Length: 718
<?XML version = "1.0" encoding = "UTF-8"?>
<enrollment__request>
    <cart__ID>4NFU4RG94</order__ID>
    <timestamp>2011-02-22 15:22:43</timestamp>
    <user__ID>john.q.public@gmail.com</user__ID>
    <client__details>
        <client__IP>192.168.23.126</client__IP>
        <client__type>smartphone</client__type>
        <client__model>HTC Hero</client__model>
        <OS>Android 2.2</OS>
        <app__installed__flag>true</app__installed__flag>
    </client__details>
    <!--account__params> <optional>
        <account__name>John Q. Public</account__name>
```

-continued

```
            <account__type>credit</account__type>
            <account__num>123456789012345</account__num>
            <billing__address>123 Green St., Norman, OK 98765</billing__address>
            <phone>123-456-7809</phone>
            <sign>/jqp/</sign>
            <confirm__type>email</confirm__type>
            <contact__info>john.q.public@gmail.com</contact__info>
    </account__params-->
    <checkout__purchase__details>
            <num__products>1</num__products>
            <product>
                    <product__type>book</product__type>
                    <product__params>
                            <product__title>XML for dummies</product__title>
                            <ISBN>938-2-14-168710-0</ISBN>
                            <edition>2nd ed.</edition>
                            <cover>hardbound</cover>
                            <seller>bestbuybooks</seller>
                    </product__params>
                    <quantity>1</quantity>
            </product>
    </checkout__purchase__details>
</enrollment__request>
```

In some implementations, the pay network server may obtain the enrollment request from the client, and extract the user's payment detail (e.g., XML data) from the enrollment request. For example, the pay network server may utilize a parser such as the example parsers described below in the discussion with reference to FIG. 61. In some implementations, the pay network server may query, e.g., 2914, a pay network database, e.g., 2904, to obtain a social network request template, e.g., 2915, a to process the enrollment request. The social network request template may include instructions, data, login URL, login API call template and/or the like for facilitating social network authentication. For example, the database may be a relational database responsive to Structured Query Language ("SQL") commands. The merchant server may execute a hypertext preprocessor ("PHP") script including SQL commands to query the database for product data. An example PHP/SQL command listing, illustrating substantive aspects of querying the database, e.g., 2914-2915, is provided below:

```
<?PHP
header('Content-Type: text/plain');
mysql__connect("254.93.179.112",$DBserver,$password); // access
database server
mysql__select__db("SOCIALAUTH.SQL"); // select database table
to search //create query
$query = "SELECT template FROM EnrollTable WHERE network
```

-continued

```
LIKE '%' $socialnet";
$result = mysql__query($query); // perform the search query
mysql__close("SOCIALAUTH.SQL"); // close database access
?>
```

In some implementations, the pay network server may redirect the client to a social network server by providing a HTTP(S) REDIRECT 300 message, similar to the example below:

```
HTTP/1.1 300 Multiple Choices
Location:
    https://www.facebook.com/dialog/oauth?client__id=
    snpa__app__ID&redirect__uri=www.paynetwork.com/enroll.php
<html>
    <head><title>300 Multiple Choices</title></head>
    <body><h1>Multiple Choices</h1></body>
</html>
```

In some implementations, the pay network server may provide payment information extracted from the card authorization request to the social network server as part of a social network authentication enrollment request, e.g., 2917. For example, the pay network server may provide a HTIP(S) POST message to the social network server, similar to the example below:

```
POST /authenticate__enroll.php HTTP/1.1
Host: www.socialnet.com
Content-Type: Application/XML
Content-Length: 1306
<?XML version = "1.0" encoding = "UTF-8"?>
<authenticate__enrollment__request>
    <request__ID>4NFU4RG94</order__ID>
    <timestamp>2011-02-22 15:22:43</timestamp>
    <user__ID>john.q.public@gmail.com</user__ID>
    <client__details>
            <client__IP>192.168.23.126</client__IP>
            <client__type>smartphone</client__type>
            <client__model>HTC Hero</client__model>
            <OS>Android 2.2</OS>
            <app__installed__flag>true</app__installed__flag>
    </client__details>
    <account__params>
```

-continued

```
            <account_name>John Q. Public</account_name>
            <account_type>credit</account_type>
            <account_num>123456789012345</account_num>
            <billing_address>123 Green St., Norman, OK 98765</billing_address>
            <phone>123-456-7809</phone>
            <sign>/jqp/</sign>
            <confirm_type>email</confirm_type>
            <contact_info>john.q.public@gmail.com</contact_info>
    </account_params>
</authenticate_enrollment_request>
```

In some implementations, the social network server may provide a social network login request, e.g., 2918, to the client. For example, the social network server a may provide a HTML input form to the client. The client may display, e.g., 2919, the login form for the user. In some implementations, the user may provide login input into the client, e.g., 2920, and the client may generate a social network login response, e.g., 2921, for the social network server. In some implementations, the social network server may authenticate the login credentials of the user, and access payment account information of the user stored within the social network, e.g., in a social network database. Upon authentication, the social network server may generate an authentication data record for the user, e.g., 2922, and provide an enrollment notification, e.g., 2924, to the pay network server. For example, the social network server may provide a HTTP(S) POST message similar to the example below:

```
POST /enrollnotification.php HTTP/1.1
Host: www.paynet.com
Content-Type: Application/XML
Content-Length: 1306
<?XML version = "1.0" encoding = "UTF-8"?>
<enroll_notification>
    <request_ID>4NFU4RG94</order_ID>
    <timestamp>2011-02-22 15:22:43</timestamp>
    <result>enrolled</result>
</enroll_notification>
```

Upon receiving notification of enrollment from the social network server, the pay network server may generate, e.g., 2925, a user enrollment data record, and store the enrollment data record in a pay network database, e.g., 2926, to complete enrollment. In some implementations, the enrollment data record may include the information from the enrollment notification 2924.

Figure 30:
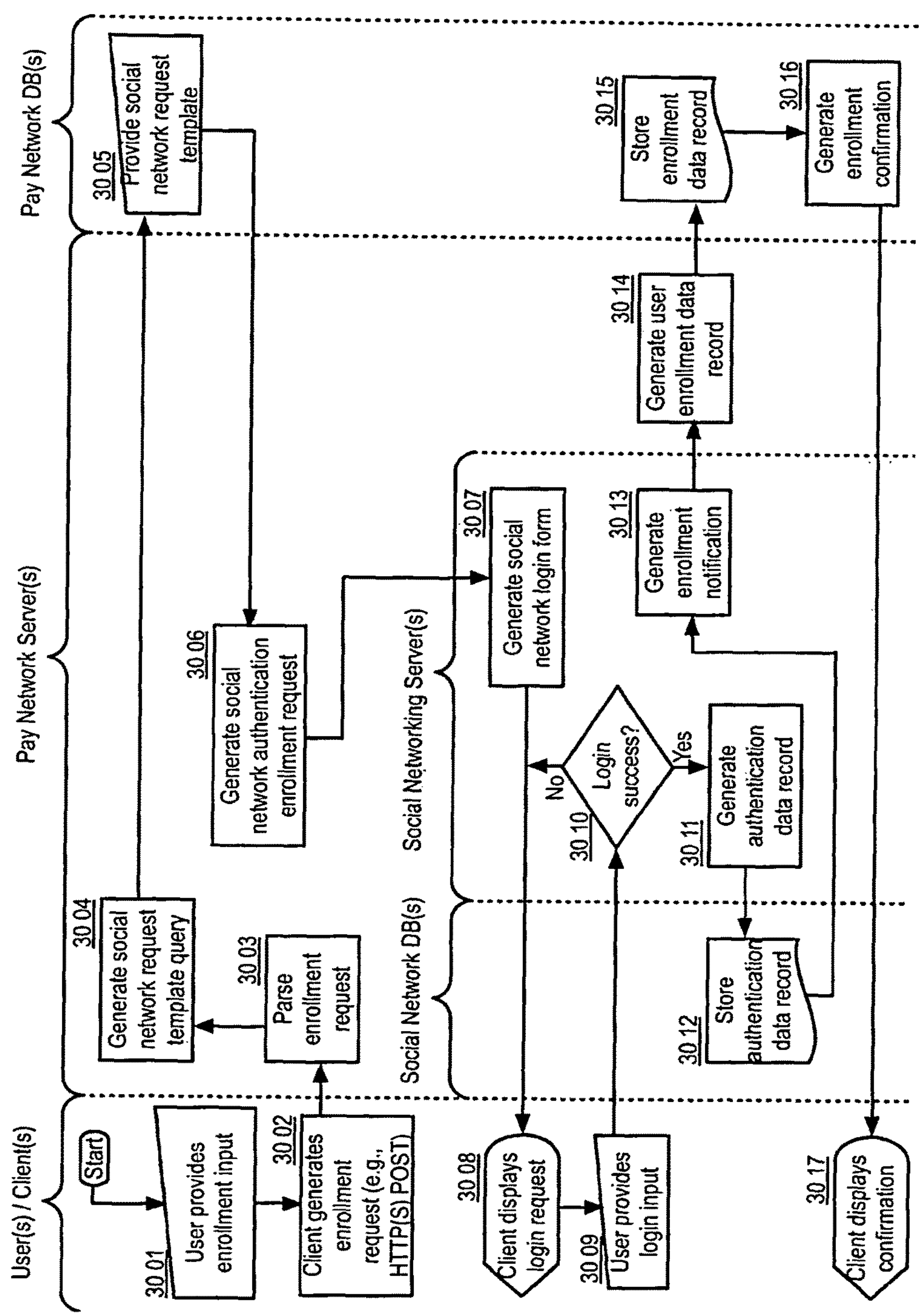
FIG. 30 shows a logic flow diagram illustrating example aspects of social network payment authentication enrollment in some embodiments of the UEP, a e.g., a Value-Add Service Enrollment ("VASE") component 3000.

FIG. 30 shows a logic flow diagram illustrating example aspects of enrollment in a value-added service in some embodiments of the UEP, e.g., a Value-Add Service Enrollment ("VASE") component 3000. In some implementations, a user, e.g., 2901, may desire to enroll in a value-added service. Let us consider an example wherein a the user desires to enroll in social network authenticated purchase payment as a value-added service. It is to be understood that any other value-added service may take the place of the below-described value-added service. The user may communicate with a pay network server via a client. For example, the user may provide user input, e.g., 3001, into the client indicating the user's desire to enroll in social network authenticated purchase payment. In various implementations, the user input may include, but not be limited to: a single tap (e.g., a one-tap mobile app purchasing embodiment) of a touchscreen interface, keyboard entry, card swipe, activating a RFID/NFC enabled hardware device (e.g., electronic card having multiple accounts, smartphone, tablet, etc.) within the user device, mouse clicks, depressing buttons on a joystick/game console, voice commands, single/multi-touch gestures on a touch-sensitive interface, touching user interface elements on a touch-sensitive display, and/or the like. In some implementations, using the user's input, the client may generate an enrollment request, e.g., 3002, and provide the enrollment request to the pay network server. In some implementations, the SNPA may provide an enrollment button that may take the user to an enrollment webpage where account info may be entered into web form fields. In some implementations, the pay network server may obtain the enrollment request from the client, and extract the user's payment detail from the enrollment request. For example, the pay network server may utilize a parser such as the example parsers described below in the discussion with reference to FIG. 61. In some implementations, the pay network server may query, e.g., 3004, a pay network database to obtain a social network request template, e.g., 3005, to process the enrollment request. The social network request template may include instructions, data, login URL, login API call template and/or the like for facilitating social network authentication. In a some implementations, the pay network server may provide payment information extracted from the card authorization request to the social network server as part of a social network authentication enrollment request, e.g., 3006. In some implementations, the social network server may provide a social network login request, e.g., 3007, to the client. For example, the social network server may provide a HTML input form to the client. The client may display, e.g., 3008, the login form for the user. In some implementations, the user may provide login input into the client, e.g., 3009, and the client may generate a social network login response for the social network server. In some implementations, the social network server may authenticate the login credentials of the user, and access payment account information of the user stored within the social network, e.g., in a social network database. Upon authentication, the social network server may generate an authentication data record for the user, e.g., 3011, and provide an enrollment notification to the pay network server, e.g., 3013. Upon receiving notification of enrollment from the social network server, the pay network server may generate, e.g., 3014, a user enrollment data record, and store the enrollment data record in a pay network database, e.g., 3015, to complete enrollment. The pay network server may provide an enrollment confirmation, and provide the enrollment confirmation to the client, which may display, e.g., 3017, the confirmation for the user.

Figure 31A:
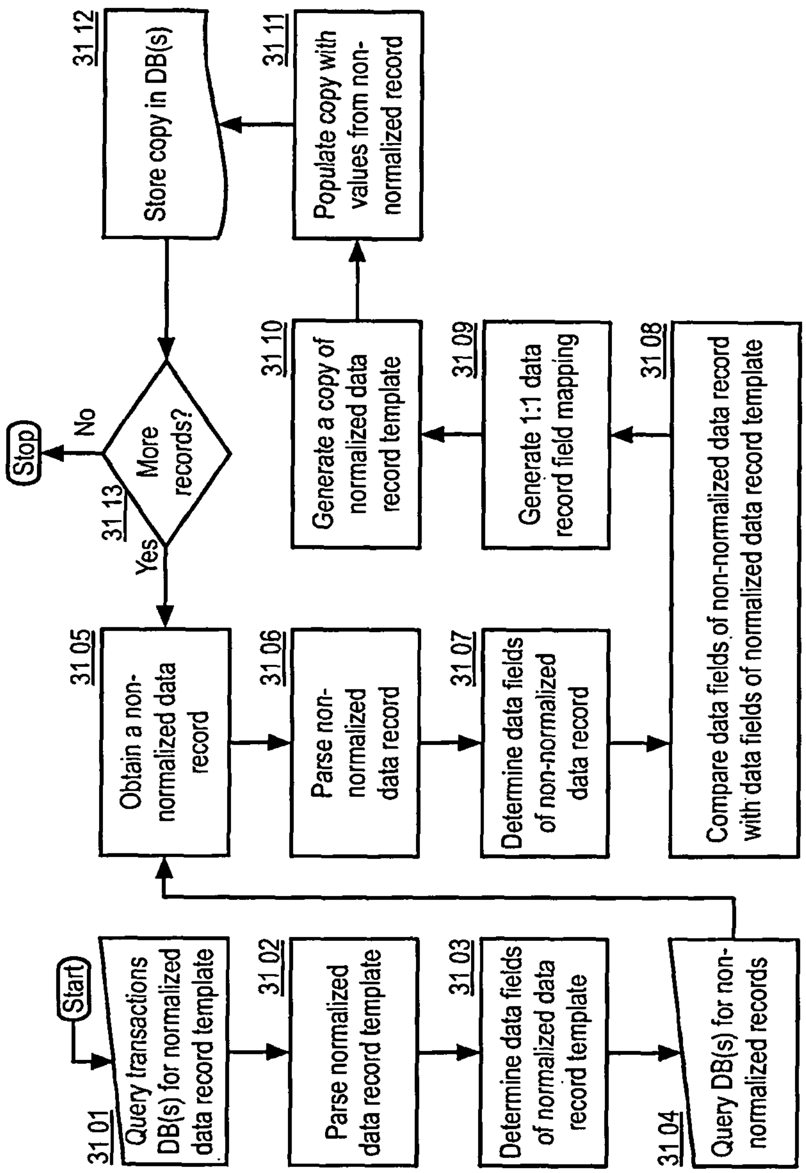
FIGS. 31A-B show flow diagrams illustrating example aspects of normalizing aggregated search, enrolled, service usage, transaction and/or other aggregated data into a standardized data format in some embodiments of the UEP, e.g., a Aggregated Data Record Normalization ("ADRN") component 3100.
Figure 31B:
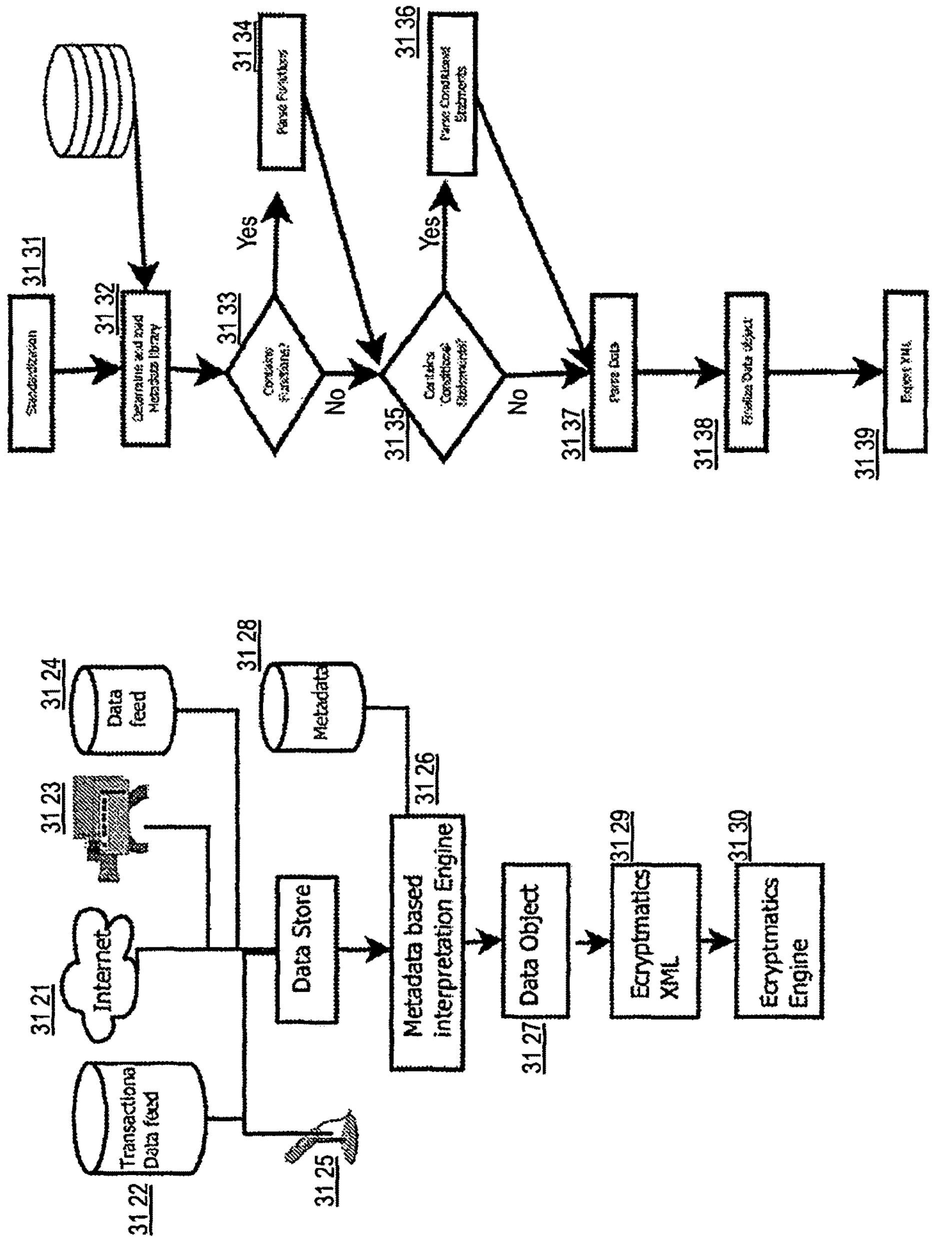

FIGS. 31A-B show flow diagrams illustrating example aspects of normalizing aggregated search, enrolled, service usage, transaction and/or other aggregated data into a standardized data format in some embodiments of the UEP, e.g., a Aggregated Data Record Normalization ("ADRN") component 3100. With reference to FIG. 31A, in some implementations, a pay network server ("server") may attempt to a convert any aggregated data records stored in an aggregated records database it has access to in a normalized data format. For example, the database may have a transaction data record template with predetermined, standard fields that may store data in pre-defined formats (e.g., long integer/double float/4 digits of precision, etc.) in a pre-determined data structure. A sample XML transaction data record template is provided below:

```
<?XML version = "1.0" encoding = "UTF-8"?>
<transaction_record>
    <record_ID>00000000</record_ID>
    <norm_flag>false</norm_flag>
    <timestamp>yyyy-mm-dd hh:mm:ss</timestamp>
    <transaction_cost>$0,000,000,00</transaction_cost>
    <merchant_params>
        <merchant_id>00000000</merchant_id>
        <merchant_name>TBD</merchant_name>
        <merchant_auth_key>0000000000000000</merchant_auth_key>
    </merchant_params>
    <merchant_products>
        <num_products>000</num_products>
        <product>
            <product_type>TBD</product_type>
            <product_name>TBD</product_name>
            <class_labels_list>TBD<class_labels_list>
            <product_quantity>000</product_quantity>
            <unit_value>$0,000,000.00</unit_value>
            <sub_total>$0,000,000.00</sub_total>
            <comment>normalized transaction data record template</comment>
        </product>
      </merchant_products>
      <user_account_params>
        <account_name>JTBD</account_name>
        <account_type>TBD</account_type>
        <account_num>0000000000000000</account_num>
        <billing_line1>TBD</billing_line1>
        <billing_line2>TBD</billing_line2>
        <zipcode>TBD</zipcode>
        <state>TBD</state>
        <country>TBD</country>
        <phone>00-00-000-000-0000</phone>
        <sign>TBD</sign>
    </user_account_params>
</transaction_record>
```

In some implementations, the server may query a database for a normalized data record template, e.g., 3101. The server may parse the normalized data record template, e.g., 3102. Based on parsing the normalized data record template, the server may determine the data fields included in the normalized data record template, and the format of the data stored in the fields of the data record template, e.g., 3103. The server may obtain transaction data records for normalization. The server may query a database, e.g., 3104, for non-normalized records. For example, the server may issue PHP/SQL commands to retrieve records that do not have the 'norm_flag' field from the example template above, or those where the value of the 'norm_flag' field is 'false'. Upon obtaining the non-normalized transaction data records, the server may select one of the non-normalized transaction data records, e.g., 3105. The server may parse the non-normalized transaction data record, e.g., 3106, and determine the fields present in the non-normalized transaction data record, e.g., 3107. For example, the server may utilize a procedure similar to one described below with reference to FIG. 32. The server may compare the fields from the non-normalized transaction data record with the fields extracted from the normalized transaction data record template. For example, the server may determine whether the field identifiers of fields in the non-normalized transaction data record match those of the normalized transaction data record template, (e.g., via a dictionary, thesaurus, etc.), are identical, are synonymous, are related, and/or the like. Based on the comparison, the server may generate a 1:1 a mapping between fields of the non-normalized transaction data record match those of the normalized transaction data record template, e.g., 3109. The server may generate a copy of the normalized transaction data record template, e.g., 3110, and populate the fields of the template using values from the non-normalized transaction data record, e.g., 3111. The server may also change the value of the 'norm_flag' field to 'true' in the example above. The server may store the populated record in a database (for example, replacing the original version), e.g., 3112. The server may repeat the above procedure for each non-normalized transaction data record (see e.g., 3113), until all the non-normalized transaction data records have been normalized.

With reference to FIG. 31B, in some embodiments, the server may utilize metadata (e.g., easily configurable data) to drive an analytics and rule engine that may convert any structured data into a standardized XML format ("encryptmatics" XML). The encryptmatics XML may then be processed by an encryptmatics engine that is capable of parsing, transforming and analyzing data to generate decisions based on the results of the analysis. Accordingly, in some embodiments, the server may implement a metadata-based interpretation engine that parses structured data, including, but not limited to: web content (see e.g., 3121), graph databases (see e.g., 3122), micro blogs, images or software code (see e.g., 3124), and converts the structured data into commands in the encryptmatics XML file format. For example, the structured data may include, without limitation, software code, images, free text, relational database queries, graph queries, sensory inputs (see e.g., 3123, 3125), and/or the like. A metadata based interpretation engine engine, e.g., 3126, may populate a data/command object, e.g., 3127, based on a given record using configurable metadata, e.g., 3128. The configurable metadata may define an action for a given glyph or keyword contained a within a data record. The engine may then process the object to export its data structure as a collection of encryptmatics vaults in a standard encryptmatics XML file format, e.g., 3129. The encryptmatics XML file may then be processed to provide various features by an encryptmatics engine, e.g., 3130.

In some embodiments, the server may obtain the structured data, and perform a standardization routine using the structured data as input (e.g., including script commands, for illustration). For example, the server may remove extra line breaks, spaces, tab spaces, etc. from the structured data, e.g. 3131. The server may determine and load a metadata library, e.g., 3132, using which the server may parse subroutines or functions within the script, based on the metadata, e.g., 3133-3134. In some embodiments, the server may pre-parse conditional statements based on the metadata, e.g., 3135-3136. The server may also parse data 3137 to populate a data/command object based on the metadata and prior parsing, e.g., 3138. Upon finalizing the data/command object, the server may export 3139 the data/command object as XML in standardized encryptmatics format.

Figure 32:
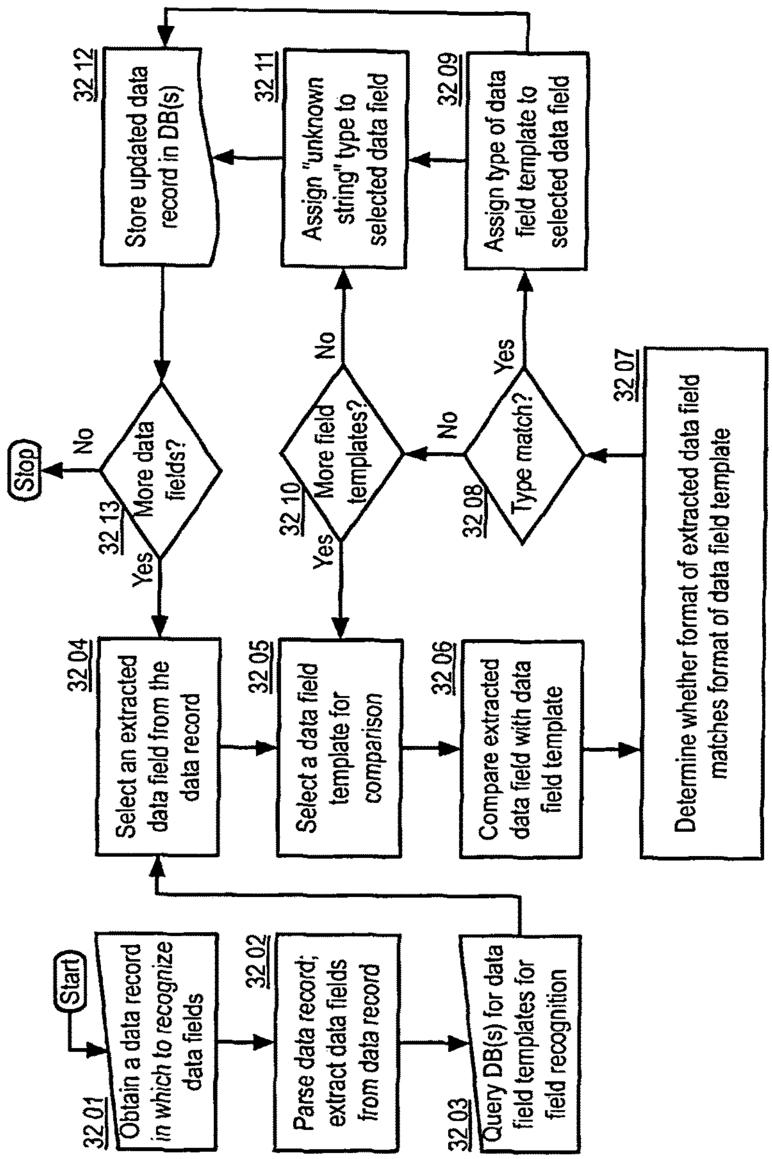
FIG. 32 shows a logic flow diagram illustrating example aspects of recognizing data fields in normalized aggregated data records in some embodiments of the UEP, e.g., a Data Field Recognition ("DFR") component 3200.

FIG. 32 shows a logic flow diagram illustrating example aspects of recognizing data fields in normalized aggregated data records in some embodiments of the UEP, e.g., a Data Field Recognition ("DFR") component 3200. In some implementations, a server may recognize the type of data fields included in a data record, e.g, date, address, zipcode, name, user ID, email address, payment account number (PAN), CVV2 numbers, and/or the like. The server may select an unprocessed data record for processing, e.g., 3201. The server may parse the data record rule, and a extract data fields from the data record, e.g., 3202. The server may query a database for data field templates, e.g., 3203. For example, the server may compare the format of the fields from the data record to the data record templates to identify a match between one of the data field templates and each field within the data record, thus identifying the type of each field within the data record. The server may thus select an extracted data field from the data record, e.g., 3204. The server may select a data field template for comparison with the selected data field, e.g., 3205, and compare the data field template with the selected data field, e.g., 3206, to determine whether format of extracted data field matches format of data field template, e.g., 3207. If the format of the selected extracted data field matches the format of the data field template, e.g., 3208, option "Yes," the server may assign the type of data field template to the selected data field, e.g., 3209. If the format of the extracted data field does not match the format of the data field template, e.g., 3208, option "No," the server may try another data field template until no more data field templates are available for comparison, see e.g., 3210. If no match is found, the server may assign "unknown" string as the type of the data field, e.g., 3211. The server may store the updated data record in the database, e.g., 3212. The server may perform such data field recognition for each data field in the data record (and also for each data record in the database), see e.g., 3213.

Figure 33:
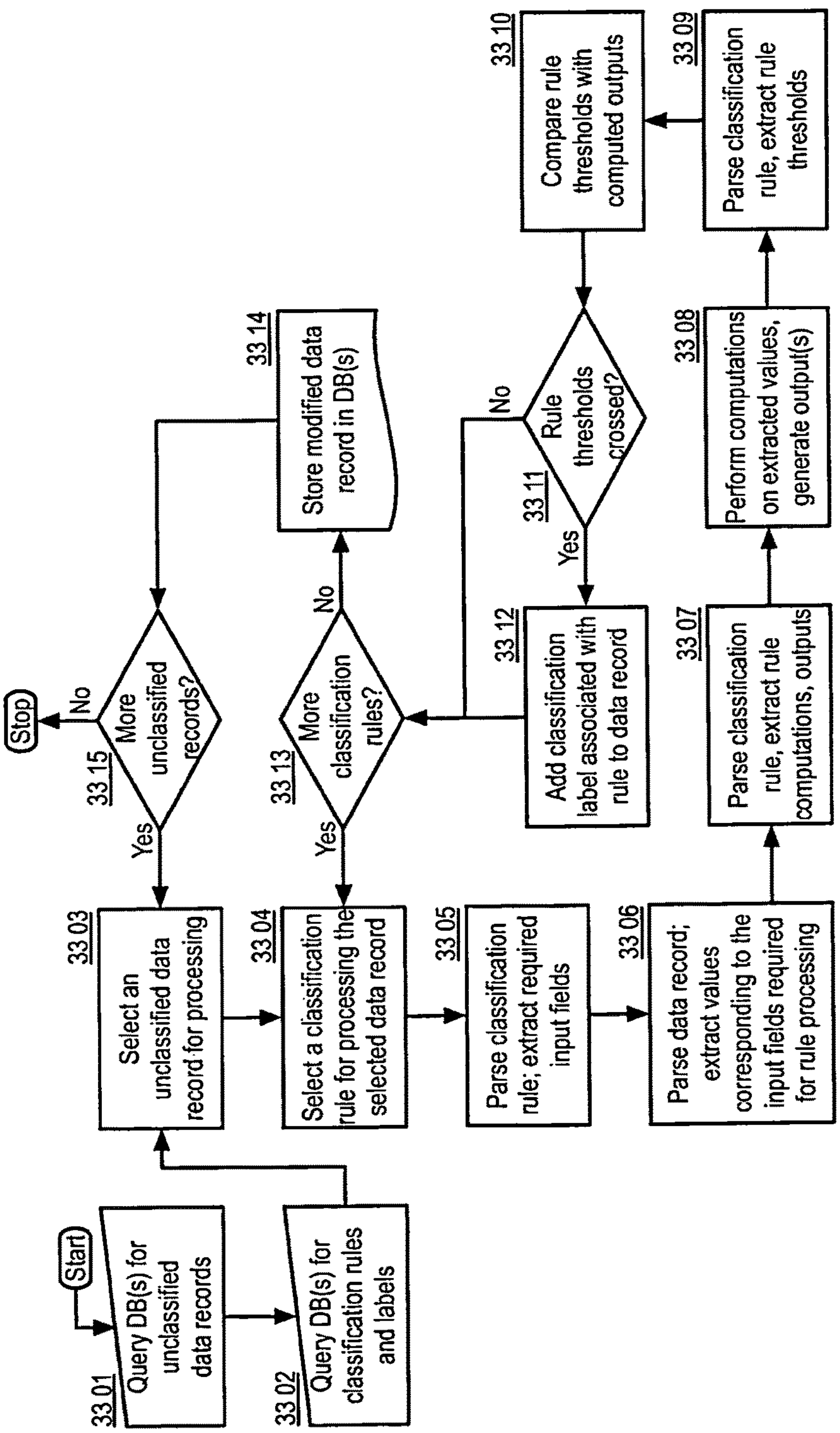
FIG. 33 shows a logic flow diagram illustrating example aspects of classifying entity types in some embodiments of the UEP, e.g., an Entity Type Classification ("ETC") component 3300.

FIG. 33 shows a logic flow diagram illustrating example aspects of classifying entity types in some embodiments of the UEP, e.g., an Entity Type Classification ("ETC") component 3300. In some implementations, a server may apply one or more classification labels to each of the data records. For example, the server may classify the data records according to entity type, according to criteria such as, but a not limited to: geo-political area, number of items purchased, and/or the like. The server may obtain transactions from a database that are unclassified, e.g., 3301, and obtain rules and labels for classifying the records, e.g., 3302. For example, the database may store classification rules, such as the exemplary illustrative XML-encoded classification rule provided below:

```
<rule>
    <id>PURCHASE_44_45</id>
    <name>Number of purchasers</name>
    <inputs>num_purchasers</inputs>
    <operations>
        <1>label = 'null'</1>
        <2>IF (num_purchasers > 1) label = 'household'</2>
    </operations>
    <outputs>label</outputs>
</rule>
```

The server may select an unclassified data record for processing, e.g., 3303. The server may also select a classification rule for processing the unclassified data record, e.g., 3304. The server may parse the classification rule, and determine the inputs required for the rule, e.g., 3305. Based on parsing the classification rule, the server may parse the normalized data record template, e.g., 3306, and extract the values for the fields required to be provided as inputs to the classification rule. The server may parse the classification rule, and extract the operations to be performed on the inputs provided for the rule processing, e.g., 3307. Upon determining the operations to be performed, the server may perform the rule-specified operations on the inputs provided for the classification rule, e.g., 3308. In some implementations, the rule may provide threshold values. For example, the rule may specify that if the number of products in the transaction, total value of the transaction, average luxury rating of the products sold a in the transaction, etc. may need to cross a threshold in order for the label(s) associated with the rule to be applied to the transaction data record. The server may parse the classification rule to extract any threshold values required for the rule to apply, e.g., 3309. The server may compare the computed values with the rule thresholds, e.g., 3310. If the rule threshold(s) is crossed, e.g., 3311, option "Yes," the server may apply one or more labels to the transaction data record as specified by the classification rule, e.g., 3312. For example, the server may apply a classification rule to an individual product within the transaction, and/or to the transaction as a whole. In some implementations, the server may process the transaction data record using each rule (see, e.g., 3313). Once all classification rules have been processed for the transaction record, e.g., 3313, option "No," the server may store the transaction data record in a database, e.g., 3314. The server may perform such processing for each transaction data record until all transaction data records have been classified (see, e.g., 3315).

Figure 34:
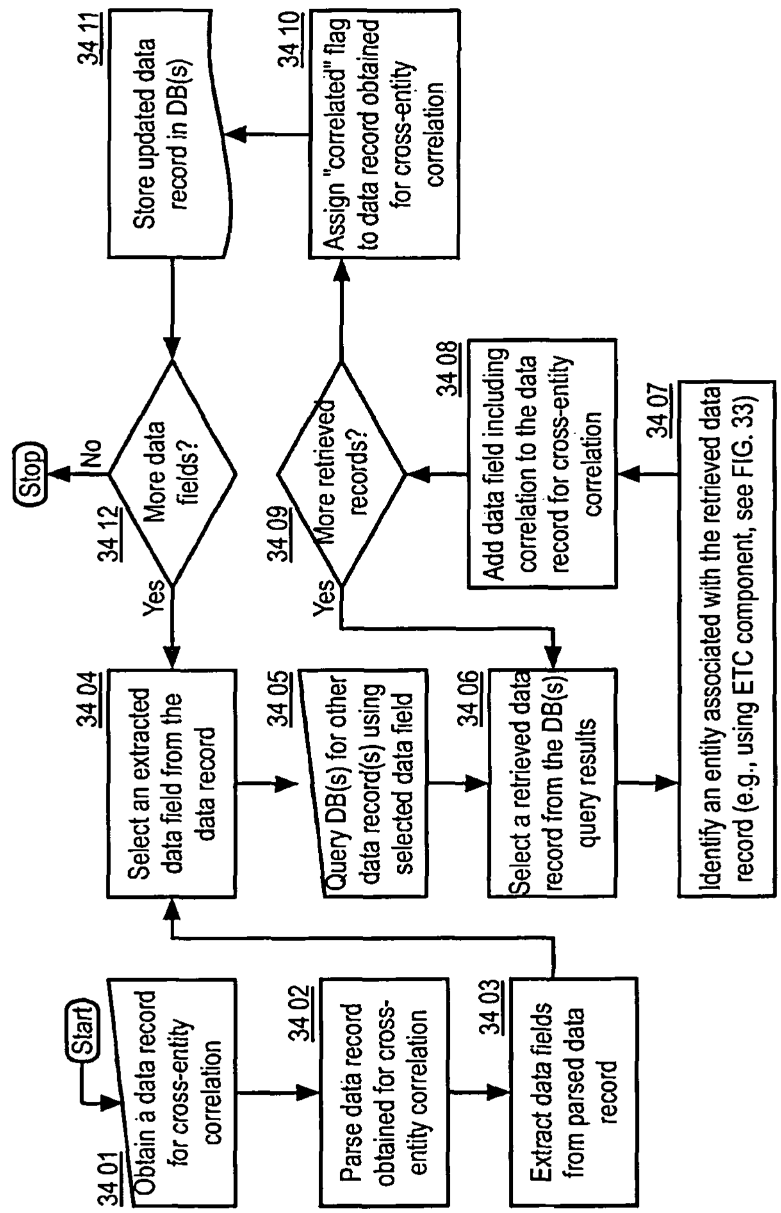
FIG. 34 shows a logic flow diagram illustrating example aspects of identifying cross-entity correlation in some embodiments of the UEP, e.g., a Cross-Entity Correlation ("CEC") component 3400.

FIG. 34 shows a logic flow diagram illustrating example aspects of identifying cross-entity correlation in some embodiments of the UEP, e.g., a Cross-Entity Correlation ("CEC") component 3400. In some implementations, a server may recognize that two entites in the UEP share common or related data fields, e.g, date, address, zipcode, name, user ID, email address, payment account number (PAN), CVV2 numbers, and/or the like, and thus identify the entities as being correlated. The server may select a data record for cross-entity correlation, e.g., 3401. The server may parse the data record rule, and extract data fields from the data record, e.g., 3402-3403. The server may select an extracted data field from the data record, e.g., 3404, and query a database for other data records having the same data field as the extracted data field, e.g., 3405. From the list of retrieved data records from the database query, the server a may select a record for further analysis. The server may identify, e.g., 3407, an entity associated with the retrieved data record, e.g., using the ETC 3300 component discussed above in the description with reference to FIG. 33. The server may add a data field to the data record obtained for cross-entity correlation specifying the correlation to the retrieved selected data record, e.g., 3408. In some embodiments, the server may utilize each data field in the data record obtained for cross-entity correlation to identify correlated entities, see e.g., 3409. The server may add, once complete, a "correlated" flag to the data record obtained for cross-entity correlation, e.g., 3410, e.g., along with as timestamp specifying the time at which the cross-entity correlation was performed. For example, such a timestamp may be used to determine at a later time whether the data record should be processed again for cross-entity correlation. The server may store the updated data record in a database.

Figure 35:
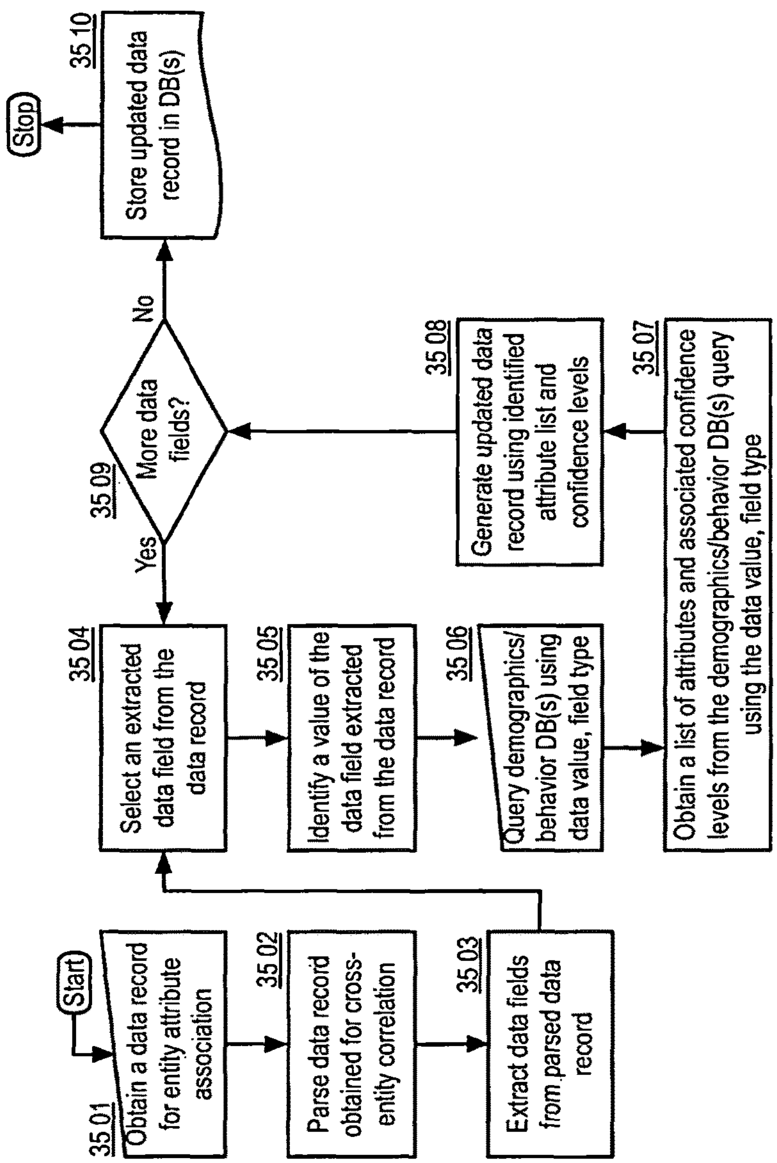
FIG. 35 shows a logic flow diagram illustrating example aspects of associating attributes to entities in some embodiments of the UEP, e.g., an Entity Attribute Association ("EAA") component 3500.

FIG. 35 shows a logic flow diagram illustrating example aspects of associating attributes to entities in some embodiments of the UEP, e.g., an Entity Attribute Association ("EAA") component 3500. In some implementations, a server may associate attributes to an entity, e.g., if the entity id a person, the server may identify a demographic (e.g., male/female), a spend character, a purchase preferences list, a merchants preference list, and/or the like, based on field values of data fields in data records that are related to the entity. In some implementations, a server may obtain a data record for entity attribute association, e.g., 3501. The server may parse the data record rule, and extract data fields from the data record, e.g., 3502-3503. The server may select an extracted data field from the data record, e.g., 3504, and identify a field value for the selected extracted data field from the data record, e.g., 3505. The server may query a database for demographic data, behavioral data, and/or the like, e.g., 3506, using the field value and field type. In response, the database may provide a list of potential attributes, as well as a confidence level in those attribute associations to the entity, see e.g., 3507. The server may add data fields to the data record obtained for entity attribute association specifying the potentially associated attributes and their associated confidence levels, e.g., 3508. In some embodiments, the server may utilize each data field in the data record obtained for cross-entity correlation to identify correlated entities, see e.g., 3509. The server may store the updated data record in a database, e.g., 3510.

Figure 36:
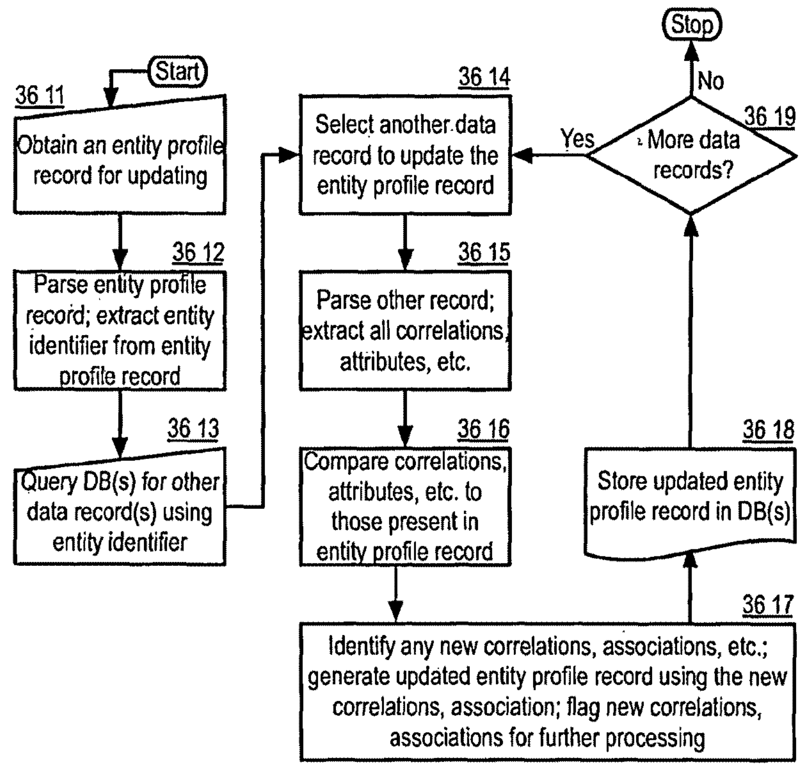
FIG. 36 shows a logic flow diagram illustrating example aspects of updating entity profile-graphs in some embodiments of the UEP, e.g., an Entity Profile-Graph Updating ("EPGU") component 3600.

FIG. 36 shows a logic flow diagram illustrating example aspects of updating entity profile-graphs in some embodiments of the UEP, e.g., an Entity Profile-Graph Updating ("EPGU") component 3600. In some implementations, a server may generate/update a profile for an entity whose data is stored within the UEP. The server may obtain an entity profile record for updating, e.g., 3601. The server may parse the entity profile record, and extract an entity identifier data field from the data record, e.g., 3602. The server may query a database for other data records that are related to the same entity, e.g., 3603, using the value for the entity identifier data field. In response, the database may provide a list of other data records for further processing. The server may select one of the other data records to update the entity profile record, e.g., 3604. The server may parse the data record, and extract all correlations, associations, and new data from the other record, e.g., 3605. The server may compare the correlations, attributes, associations, etc., from the other data record with the correlations, associations and attributes from the entity profile. Based on this comparison, the server may identify any new correlations, associations, etc., and generate an updated entity profile record using the new correlations, associations; flag new correlations, a associations for further processing, e.g., 3607. In some embodiments, the server may utilize each data record obtained for updating the entity profile record as well as its social graph (e.g., as given by the correlations and associations for the entity), see e.g., 3609. The server may store the updated entity profile record in a database, e.g., 3608.

Figure 37:
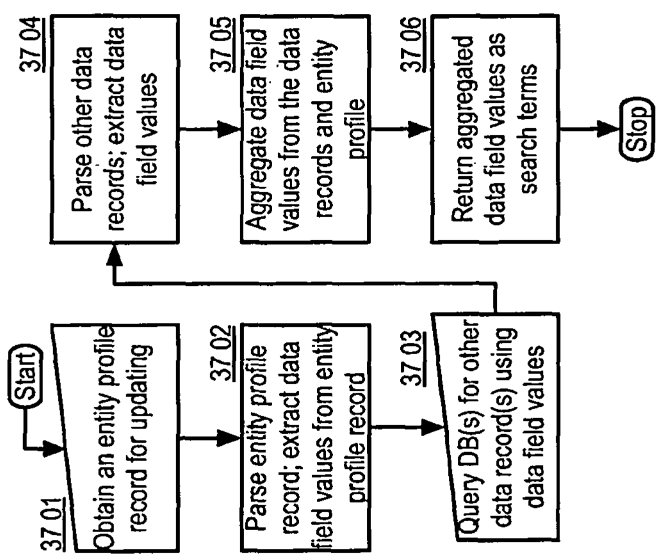
FIG. 37 shows a logic flow diagram illustrating example aspects of a generating search terms for profile-graph updating in some embodiments of the UEP, a e.g., a Search Term Generation ("STG") component 3700.

FIG. 37 shows a logic flow diagram illustrating example aspects of generating search terms for profile-graph updating in some embodiments of the UEP, e.g., a Search Term Generation ("STG") component 3700. In some implementations, a server may generate/update a profile for an entity whose data is stored within the UEP, by performing search for new data, e.g., across the Internet and social networking services. The server may obtain an entity profile record for updating, e.g., 3701. The server may parse the entity profile record, and extract data field types and field values from the entity profile record, e.g., 3702. The server may query a database for other data records that are related to the same entity, e.g., 3703, using the values for the extracted data fields. In response, the database may provide a list of other data records for further processing. The server may parse the data records, and extract all correlations, associations, and data from the data records, e.g., 3704. The server may aggregate all the data values from all the records and the entity profile record, e.g., 3705. Based on this, the server may return the aggregated data values as search terms to trigger search processes (see e.g., FIG. 20, 2001-2005), e.g., 3706.

User Behavior-Based Recommendation

Figure 38:
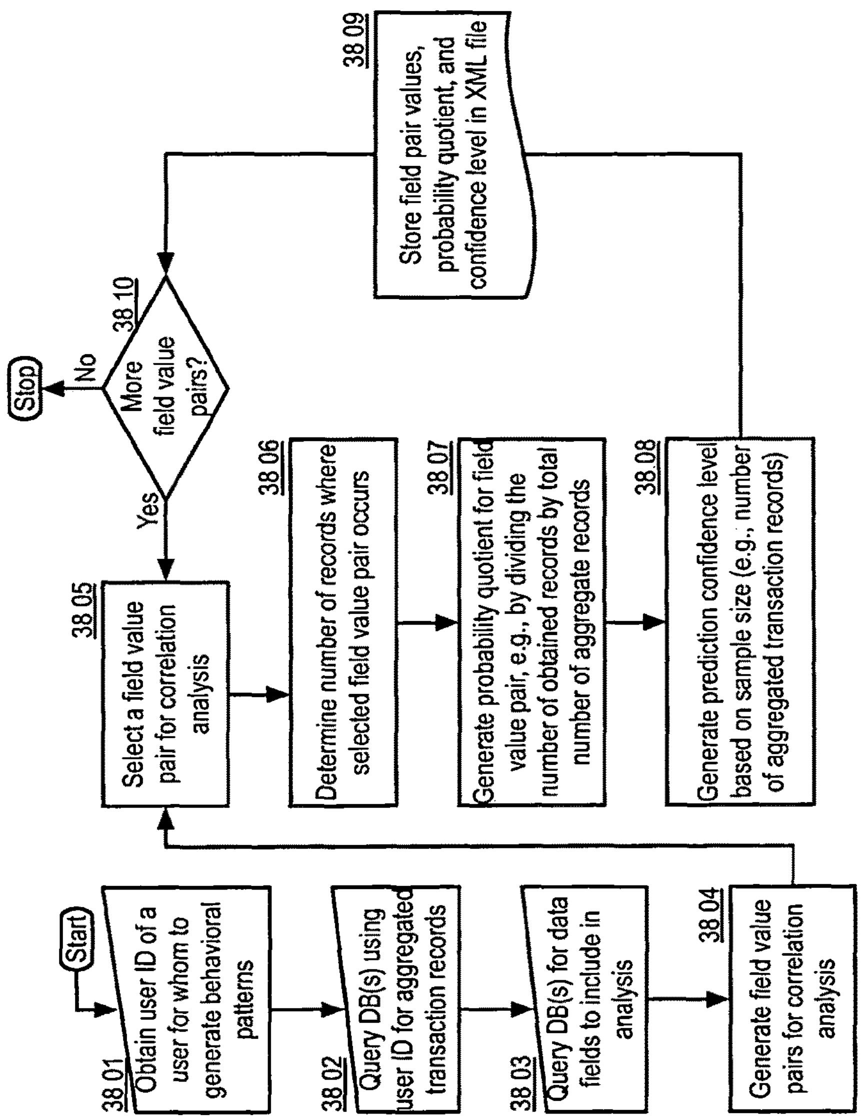
FIG. 38 shows a logic flow diagram illustrating example aspects of analyzing a user's behavior based on aggregated purchase transaction data in some embodiments of the UEP, e.g., a User Behavior Analysis ("UBA") component 3800.

FIG. 38 shows a logic flow diagram illustrating example aspects of analyzing a user's behavior based on aggregated purchase transaction data in some embodiments of the UEP, e.g., a User Behavior Analysis ("UBA") component 3800. In some implementations, a pay network server ("server") may obtain a user ID of a user a for whom the server is required to generate user behavioral patterns, e.g., 3801. The server may query a database, e.g., a pay network database, for aggregated card transaction data records of the user, e.g., 3802. The server may also query, e.g., 3803, the pay network database for all possible field value that can be taken by each of the field values (e.g., AM/PM, zipcode, merchant_ID, merchant_name, transaction cost brackets, etc.). Using the field values of all the fields in the transaction data records, the server may generate field value pairs, for performing a correlation analysis on the field value pairs, e.g., 3804. An example field value pair is: 'time' is 'AM' and 'merchant' is 'Walmart'. The server may then generate probability estimates for each field value pair occurring in the aggregated transaction data records. For example, the server may select a field value pair, e.g., 3805. The server may determine the number of records within the aggregated transaction data records where the field value pair occurs, e.g., 3806. The server may then calculate a probability quotient for the field value pair by dividing the number determined for the occurrences of the field value pair by the total number of aggregate transaction data records, e.g., 3807. The server may also assign a confidence level for the probability quotient based on the sample size, e.g., total number of records in the aggregated transaction data records, e.g., 3808. The server may generate and store an XML snippet, including the field value pair, the probability quotient, and the confidence level associated with the probability quotient, e.g., 3809. The server may perform such a computation for each field value pair (see 3810) generated in 3804.

Figure 39:
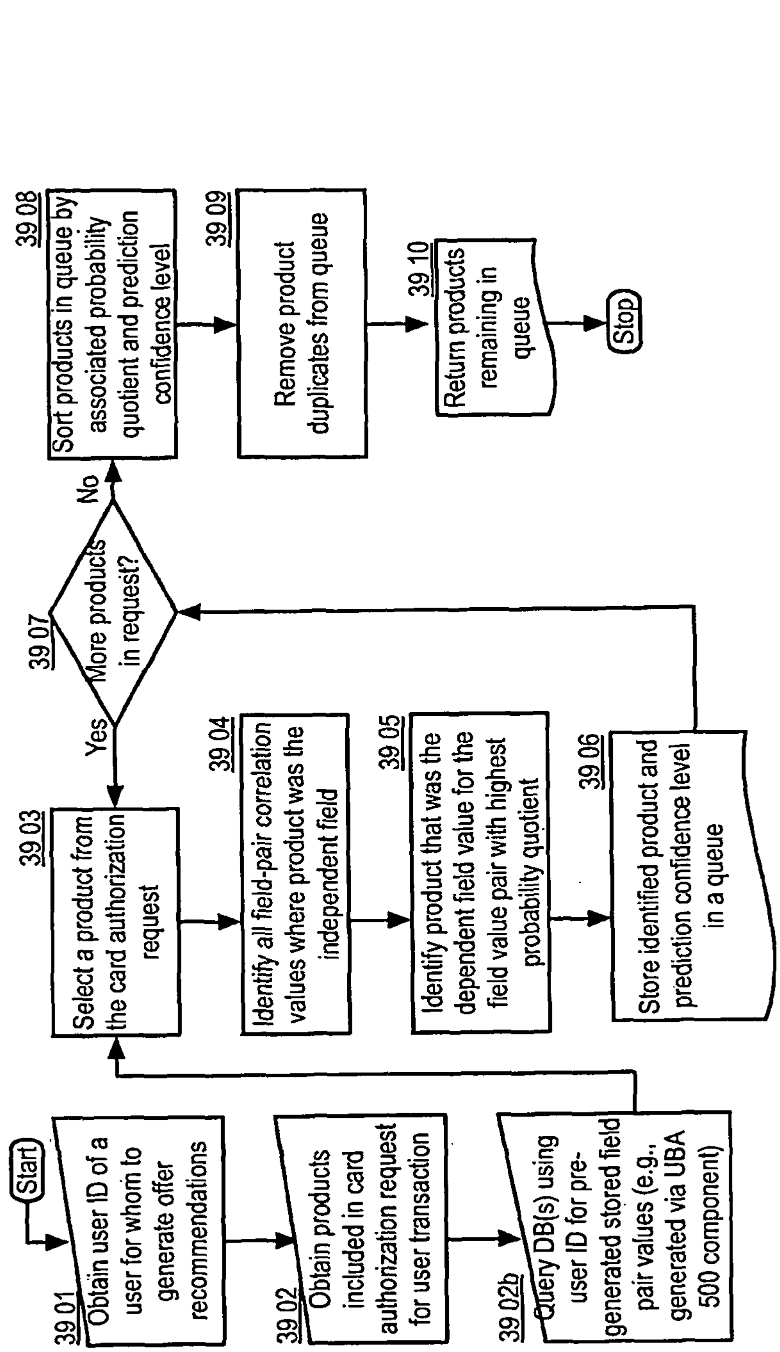
FIG. 39 shows a logic flow diagram illustrating example aspects of generating recommendations for a user based on the user's prior aggregate purchase transaction behavior in some embodiments of the UEP, e.g., a User Behavior-Based Offer Recommendations ("UBOR") component 3900.

FIG. 39 shows a logic flow diagram illustrating example aspects of generating recommendations for a user based on the user's prior aggregate purchase a transaction behavior in some embodiments of the UEP, e.g., a User Behavior-Based Offer Recommendations ("UBOR") component 3900. In some implementations, a pay network server ("server") may obtain a user ID of a user for whom the server is required to generate offer recommendations, e.g., 3901. The server may obtain a list of products included in a card authorization request for processing the purchase transaction for the user, e.g., 3902. The server may also query a database for pre-generated pair-wise correlations of various user transaction-related variables, e.g., 3902*b*, such as those generated by the UBA 3800 component described above with reference to FIG. 38. The server may select a product from the list of products included in the card authorization request, e.g., 3903. The server may identify all field pair-correlation values where the selected product was the independent field into the field-pair correlation, e.g., 3904. The server may, e.g., 3905, from among the identified field-pair values, identify the product that was the dependent field value for the field value pair having the highest probability quotient (e.g., product most likely to be bought together with the product selected from the product list included in the card authorization request). The server may store the identified product, along with its associated prediction confidence level, in a queue of products for recommendation, e.g., 3906. The server may perform the analysis for each product included in the product list from the card authorization request, see e.g., 3907.

In some implementations, upon completing such an analysis for all the products in the card authorization request, the server may sort the queue according to their associated probability quotient and prediction confidence level, e.g., 3908. For example, if the prediction confidence level of a product is higher than a threshold, then it may be retained in the queue, but not if the prediction confidence level is lower than the threshold. Also, the retained products may be sorted in descending order of their associated probability quotients. In some implementations, the server may eliminate any duplicated products form the queue, e.g., 3909. The server may return the sorted queue of products for product offer recommendation, e.g., 3910.

Social Payment Platform

Figure 40:
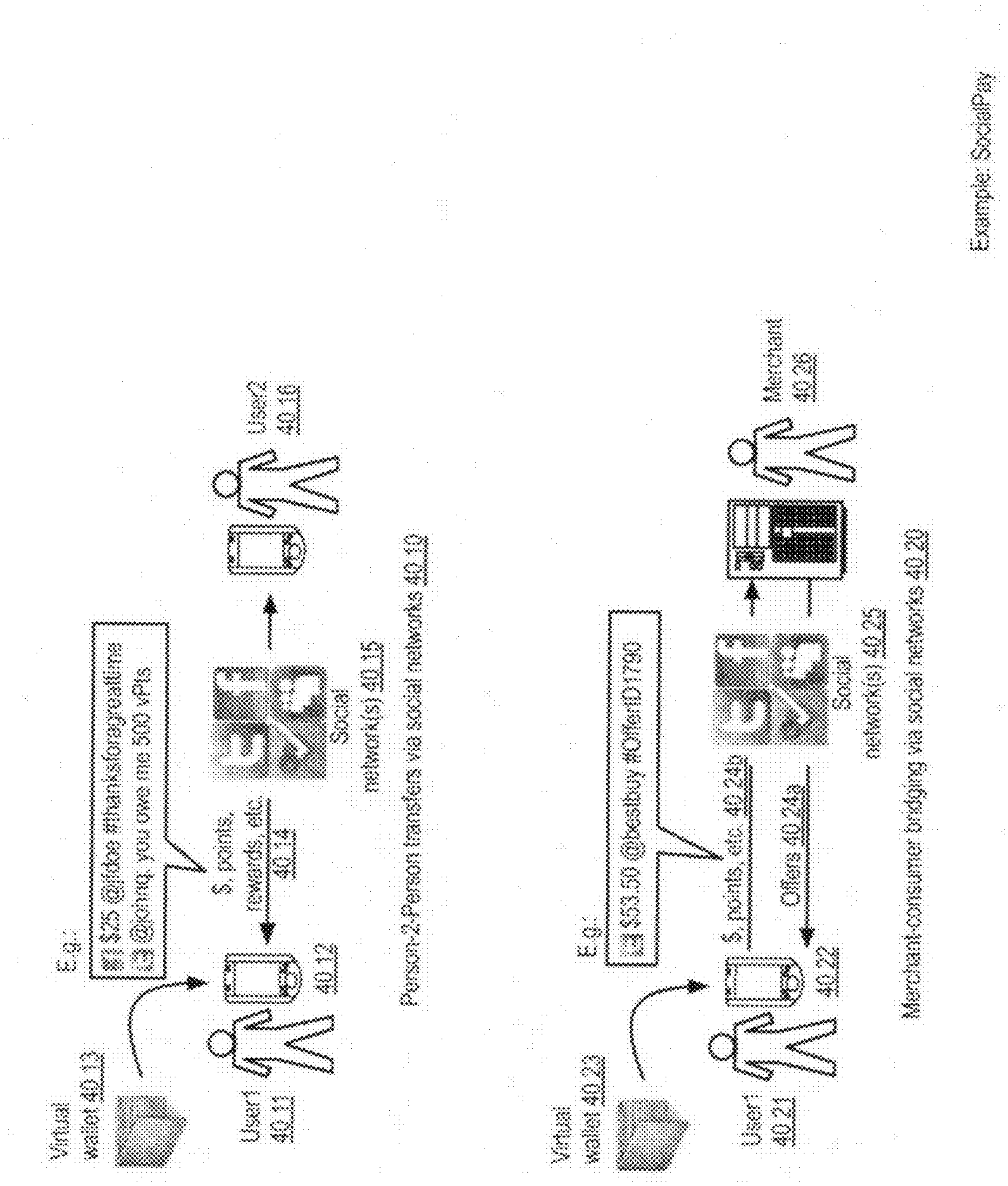
FIG. 40 shows a block diagram illustrating example aspects of payment transactions via social networks in some embodiments of the UEP.

FIG. 40 shows a block diagram illustrating example aspects of payment transactions via social networks in some embodiments of the UEP. In some embodiments, the UEP may facilitate per-2-person transfers 4010 of money via social networks. For example, a user (user1 4011) may wish to provide funds (dollars, rewards, points, miles, etc. 4014) to another user (user2 4016). The user may utilize a virtual wallet to provide a source of funds. In some embodiments, the user may utilize a device 4012 (such as a smartphone, mobile device, laptop computer, desktop computer, and/or the like) to send a social post message via the social network 4015. In some embodiments, the social post message may include information on an amount of funds to be transferred and an identity of another user to whom the funds should be transferred. The UEP may intercept the message before it is sent to the social networking service, or it may obtain the message from the social networking service. Using the social post message, the UEP may resolve the identities of a payor and payee in the transaction. The UEP may identify accounts of the payor and payee to/from which funds need be credited or debited, and an amount of credit/debit to apply to each of the accounts. The UEP may, on the basis of resolving this information, execute a transaction to transfer funds from the payor to the payee. For example, the UEP may allow a payor, by sending a tweet on Twitter™ such as "$25@jfdoe #ackpls" to transfer a funds to a payee (user ID jfdoe), and request an acknowledgement from UEP of receipt of funds. In another example, the UEP may allow a potential payee to request funds from another user by sending a tweet on Twitter™ such as "@johnq, you owe me 50000 Visa rewards points #id1234"; the UEP may automatically provide an alert within a virtual wallet application of the user with user ID johnq to provide the funds to the potential payee user. The user johnq may respond by sending a tweet in response, referencing the id (#id1234), such as "50000 vpts @jfdoe #id1234"; the UEP may transfer the funds and recognize transaction request #id1234 as being fulfilled. In some embodiments, the UEP may generate transaction/request ID numbers for the users to prevent coinciding transaction/request ID numbers for different transaction/requests.

In some embodiments, the UEP may utilize one or more social networking services (e.g., Facebook®, Twitter™, MySpace™, etc.). In some embodiments, the UEP may allow users across different social networks to transact with each other. For example, a user may make a request for payment on one social network. As an example, a Twitter™ user may tweet "johnq@facebook.com, you owe me 500 vpts #ID7890"). The UEP may provide an alert to the user with ID john@facebook.com either via the other social networking or via the user's virtual wallet. In response, the payee may social post to Facebook® a message "@jfdoe: here's your 500 vpts #ID7890", and the UEP may facilitate the payment transaction and provide a receipt/acknowledgment to the two users on their respective social networks or virtual wallets.

In some embodiments, the UEP may facilitate transfers of funds to more than one payee by a payor via a single social post message. In some embodiments, the UEP may facilitate use of more than one source of funds of a payee to fund payment of funds to one or more payors via a single post message. For example, the UEP may a utilize default settings or customized rules, stored within a virtual wallet of a payor, to determine which funding sources to utilize to fund a payment transaction to one or more payees via a social post message.

In some implementations, the UEP may facilitate merchants to make offers of products and/or services to consumers via social networks 4020. For example, a merchant 4026 may sign up to participate in the UEP. The UEP may aggregate transactions of a user, and determine any products or services that may relevant for offering to the user. The UEP may determine whether any participating merchants are available to provide the products or services for the users. If so, the UEP may provide social post messages via a social network 4025 on behalf of the merchants (or, alternatively, inform the merchants who may then send social post messages to the users) providing the offers 4024*a* to the user 4021. An example of an offer to the followers of a merchant on may be "amazon offers the new Kindle™ at only $149.99-click here to buy." In such an example, the offer posted on the social networking site may have a link embedded (e.g., "here") that users can click to make the purchase (which may be automatically performed with one-click if they are currently logged into their virtual wallet accounts 4023). Another example of a merchant offer may be "amazon offers the new Kindle™ at only $149.99—reply with #offerID123456 to buy." In such an example, the hash tag value serves as an identifier of the offer, which the users can reference when making their purchase via their social post messages (e.g., "buy from amazon #offerID123456"). In some embodiments, merchants may provide two or more offers via a single social post message. In some embodiments, users may reference two or more offers in the same social post message.

In some implementations, users and/or merchants may utilize alternate messaging modes. For example, a user may be able to utilize electronic mail, SMS messages, phone calls, etc., to communicate with the UEP and the social networks. For example, a merchant may provide a social post message offer such as "amazon offers the new Kindle™ at only $149.99—text #offerID123456 to buy". When a user utilize a mobile phone to send a text message to redeem the offer, the UEP may utilize a user profile of the user store on the social networking service to identify an identifying attribute of the user's mobile phone (e.g., a phone number), using which the UEP may correlate the text message to a particular user. Thus, the UEP may be able to process a transaction with the merchant on behalf of the user, using user information from the user's virtual wallet. In some embodiments where a social network is incapable of handling a particular mode of communication, the UEP may serve as an intermediary translator to convert the message to a form that can be utilized by the social network.

Figure 41:
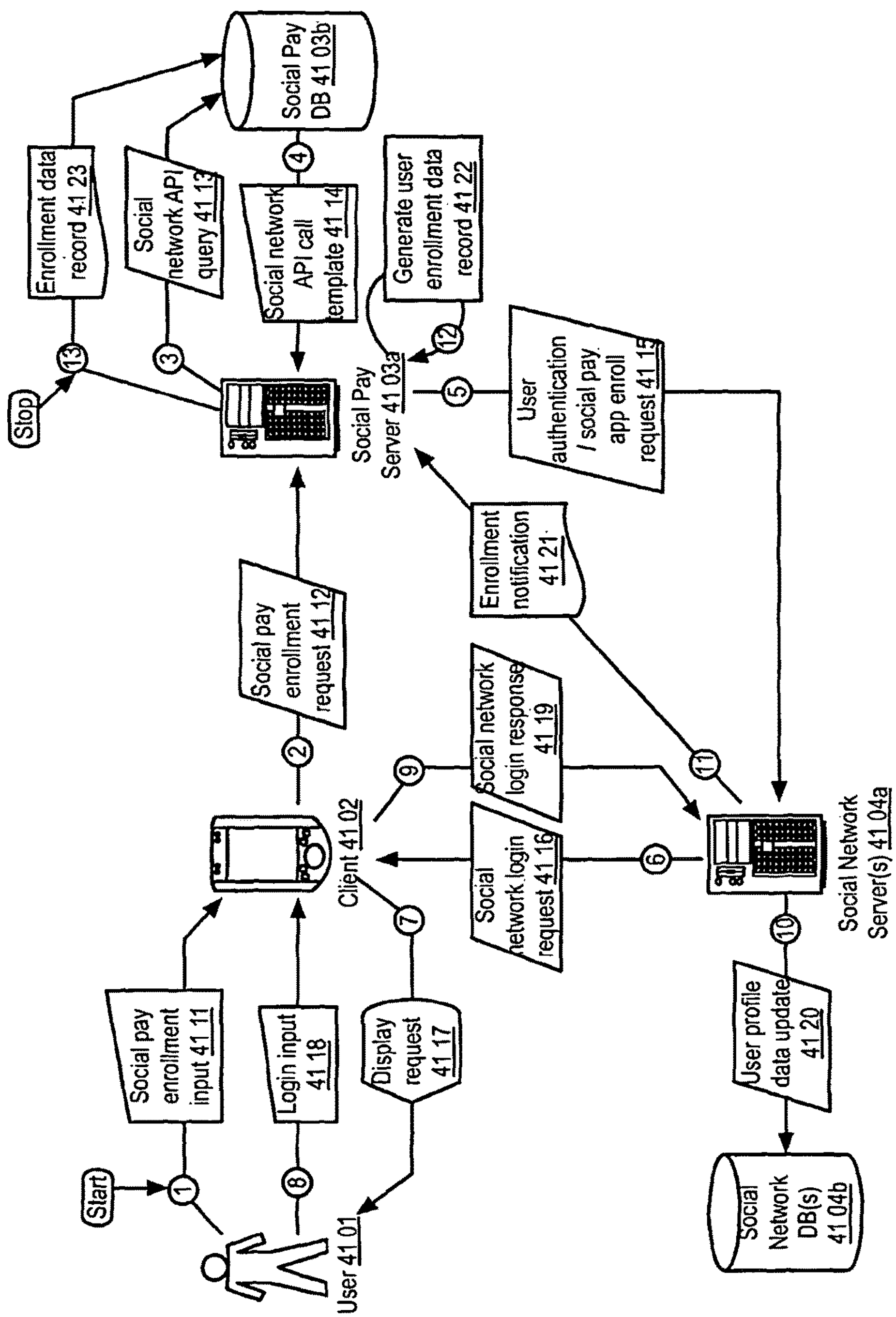
FIG. 41 shows a data flow diagram illustrating an example social pay enrollment procedure in some embodiments of the UEP.

FIG. 41 shows a data flow diagram illustrating an example social pay enrollment procedure in some embodiments of the UEP. In some embodiments, a user, e.g., 4101, may desire to enroll in UEP. The user may communicate with a social pay server, e.g., 4103*a*, via a client such as, but not limited to: a personal computer, mobile device, television, point-of-sale terminal, kiosk, ATM, and/or the like (e.g., 4102). For example, the user may provide user input, e.g., social pay enrollment input 4111, into the client indicating the user's desire to enroll in social network authenticated purchase payment. In various implementations, the user input may include, but not be limited to: a single tap (e.g., a one-tap mobile app purchasing embodiment) of a touch-screen interface, keyboard entry, card swipe, activating a RFID/NFC enabled hardware device a (e.g., electronic card having multiple accounts, smartphone, tablet, etc.) within the user a device, mouse clicks, depressing buttons on a joystick/game console, voice commands, single/multi-touch gestures on a touch-sensitive interface, touching user interface elements on a touch-sensitive display, and/or the like.

In some implementations, using the user's input, the client may generate a social pay enrollment request, e.g., 4112, and provide the enrollment request to the social pay server 4103*a*. For example, the client may provide a (Secure) Hypertext Transfer Protocol ("HTTP(S)") POST message including data formatted according to the eXtensible Markup Language ("XML"). Below is an example HTTP(S) POST message including an XML-formatted enrollment request for the social pay server:

```
POST /enroll.php HTTP/1.1
Host: www.socialpay.com
Content-Type: Application/XML
Content-Length: 484
<?XML version = "1.0" encoding = "UTF-8"?>
```

-continued

```
<enrollment_request>
    <request_ID>4NFU4RG94</request_ID>
    <timestamp>2011-02-22 15:22:43</timestamp>
    <user_ID>john.q.public@facebook.com</user_ID>
    <wallet_account_ID>7865493028712345</wallet_account_ID>
    <client_details>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
    </client_details>
</enrollment_request>
```

In some embodiments, the social pay server may obtain the enrollment request from the client, and extract the user's payment detail (e.g., XML data) from the enrollment request. For example, the social pay server may utilize a parser such as the example parsers described below in the discussion with reference to FIG. 61. In some implementations, the social pay server may query, e.g., 4113, a social pay database, e.g., 4103*b*, to obtain a social network request template, e.g., 4114, to process the enrollment request. The social network request template may include instructions, data, login URL, login API call template and/or the like for facilitating social network authentication. For example, the database may be a relational database responsive to Structured Query Language ("SQL") commands. The merchant server may execute a hypertext preprocessor ("PHP") script including SQL commands to query the database for product data. An example PHP/SQL command listing, illustrating substantive aspects of querying the database, e.g., 4114-4115, is provided below:

```
<?PHP
header('Content-Type: text/plain');
mysql_connect("254.93.179.112",$DBserver,$password); // access
database server
mysql_select_db("SOCIALPAY.SQL"); // select database table to search
//create query
$query = "SELECT template FROM EnrollTable WHERE network
LIKE '%' $socialnet";
$result = mysql_query($query); // perform the search query
mysql_close("SOCIALAUTH.SQL"); // close database access
?>
```

In some implementations, the social pay server may redirect the client to a social network server, e.g., 4104*a*, by providing a HTTP(S) REDIRECT 300 message, similar to the example below:

```
HTTP/1.1 300 Multiple Choices
Location:
    https://www.facebook.com/dialog/oauth?client_id=
    snpa_app_ID&redirect_uri=
    www.paynetwork.com/enroll.php
<html>
    <head><title>300 Multiple Choices</title></head>
    <body><h1>Multiple Choices</h1></body>
</html>
```

In some implementations, the social pay server may provide information extracted from the social pay enrollment request to the social network server as part of a user authentication/social pay app enroll request, e.g., 4115. For example, the social pay server may provide a HTTP(S) POST message to the social network server, similar to the example below:

```
POST /authenticate_enroll.php HTTP/1.1
Host: www.socialnet.com
Content-Type: Application/XML
Content-Length: 484
<?XML version = "1.0" encoding = "UTF-8"?>
<enrollment_request>
    <request_ID>4NFU4RG94</request_ID>
    <timestamp>2011-02-22 15:22:43</timestamp>
    <user_ID>john.q.public@facebook.com</user_ID>
    <wallet_account_ID>7865493028712345</wallet_account_ID>
    <client_details>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
    </client_details>
</enrollment_request>
```

In some implementations, the social network server may provide a social network login request, e.g., 4116, to the client. For example, the social network server may provide a HTML input form to the client. The client may display, e.g., 4117, the a login form for the user. In some implementations, the user may provide login input into the client, e.g., 4118, and the client may generate a social network login response, e.g., 4119, for the social network server. In some implementations, the social network server may authenticate the login credentials of the user, and upon doing so, update the profile of the user to indicate the user's enrollment in the social pay system. For example, in a social networking service such as Facebook®, the social network server may provide permission to a social pay third-party developer app to access the user's information stored within the social network. In some embodiments, such enrollment may allow a virtual wallet application installed on a user device of to access the user's social profile information stored within the social network. Upon authentication, the social network 1*e* server may generate an updated data record for the user, e.g., 4120, and provide an enrollment notification, e.g., 4121, to the social pay server. For example, the social network server may provide a HTTP(S) POST message similar to the example below:

```
POST /enrollnotification.php HTTP/1.1
Host: www.socialpay.com
Content-Type: Application/XML
Content-Length: 1306
<?XML version = "1.0" encoding = "UTF-8"?>
<enroll_notification>
    <request_ID>4NFU4RG94</order_ID>
    <timestamp>2011-02-22 15:22:43</timestamp>
    <result>enrolled</result>
</enroll_notification>
```

Upon receiving notification of enrollment from the social network server, the social pay server may generate, e.g., 4122, a user enrollment data record, and store the enrollment data record in a social pay database, e.g., 4123, to complete enrollment. In some implementations, the enrollment data record may include the information from the enrollment notification 4121.

Figure 42:
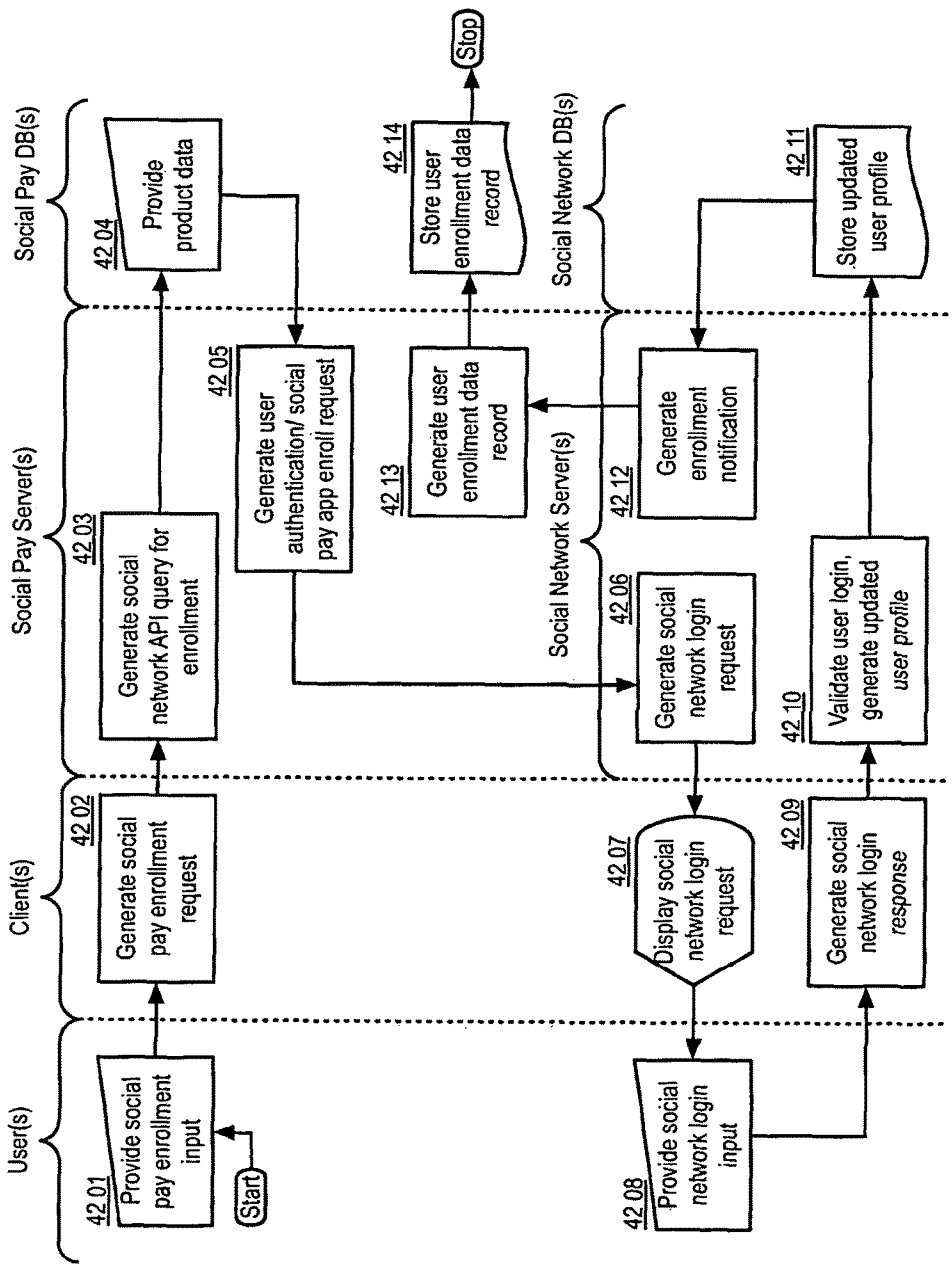
FIG. 42 shows a logic flow diagram illustrating example aspects of social pay enrollment in some embodiments of the UEP, e.g., a Social Pay Enrollment ("SPE") component 4200.

FIG. 42 shows a logic flow diagram illustrating example aspects of social pay enrollment in some embodiments of the UEP, e.g., a Social Pay Enrollment ("SPE") component 4200. In some embodiments, a user may desire to enroll in UEP. The user may provide user input, e.g., social pay enrollment input 4201, into the client indicating the user's desire to enroll in social network authenticated purchase payment. In some implementations, using the user's input, the client may generate a social pay enrollment request, e.g., 4202, and provide the enrollment request to the social pay server. In some embodiments, the social pay server may obtain the enrollment request from the client, and extract the user's payment detail (e.g., XML data) from the enrollment request. For example, the social pay server may utilize a parser such as the example parsers described below in the discussion with reference to FIG. 61. In some implementations, the social pay server may query, e.g., 4203, a social pay database to obtain a social network request template to process the enrollment request. The social network request template may include instructions, data, login URL, login API call template and/or the like for facilitating social network authentication. In some implementations, the social pay server may redirect the client to a social network server. In some implementations, the social pay server may provide information extracted from the social pay enrollment request to the social network server as part of a user authentication/social pay app enroll request, e.g., 4205. In some implementations, the social network server may provide a social network login request, e.g., 4206, to the client. For example, the social network server may provide a HTML input form to the client. The client may display, e.g., 4207, the login form for the user. In some implementations, the user may provide login input into the client, e.g., 4208, and the client may generate a social network login response, e.g., 4209, for the social network a server. In some implementations, the social network server may authenticate the login credentials of the user, and upon doing so, update the profile of the user to indicate the user's enrollment in the social pay system. For example, in a social networking service such as Facebook®, the social network server may provide permission to a social pay third-party developer app to access the user's information stored within the social network. In some embodiments, such enrollment may allow a virtual wallet application installed on a user device of to access the user's social profile information stored within the social network. Upon authentication, the social network server may generate an updated data record for the user, e.g., 4210-4211, and provide an enrollment notification, e.g., 4212 to the social pay server. Upon receiving notification of enrollment from the social network server, the social pay server may generate, e.g., 4213, a user enrollment data record, and store the enrollment data record in a social pay database, e.g., 314, to complete enrollment. In some implementations, the enrollment data record may include the information from the enrollment notification.

Figure 43A:
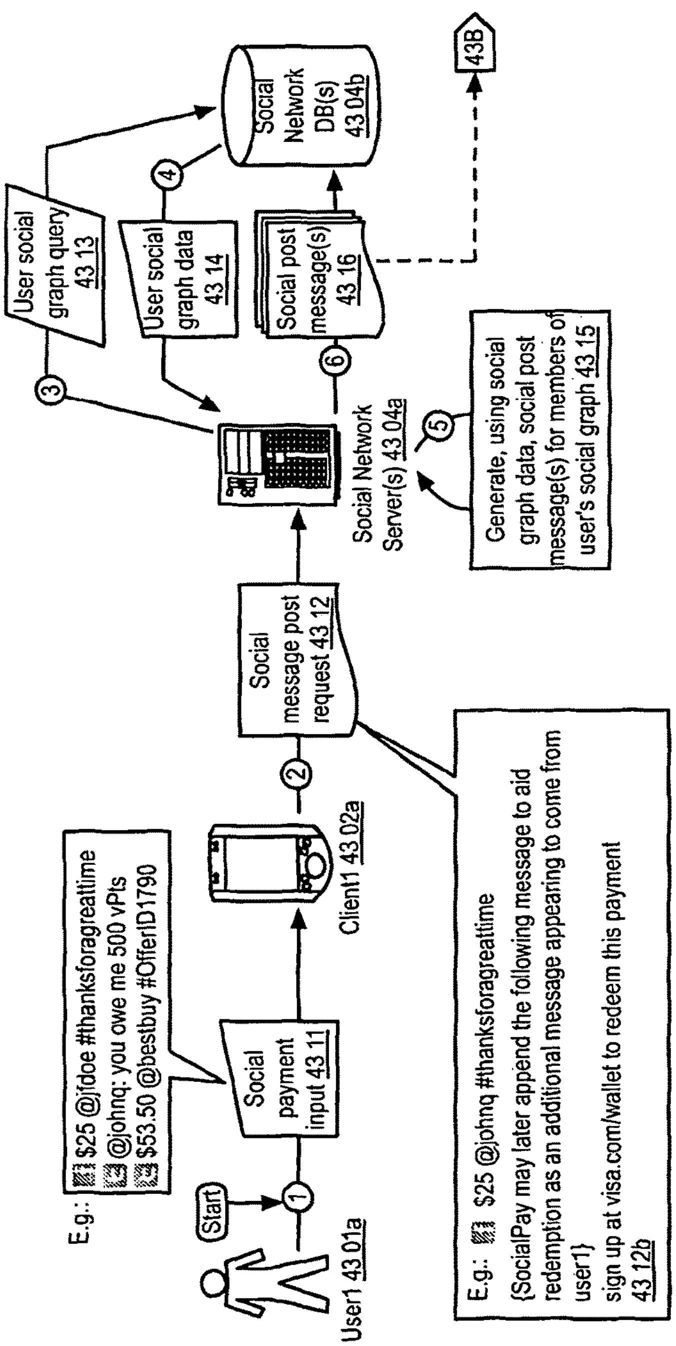
FIGS. 43A-C show data flow diagrams illustrating an example social payment triggering procedure in some embodiments of the UEP.
Figure 43B:
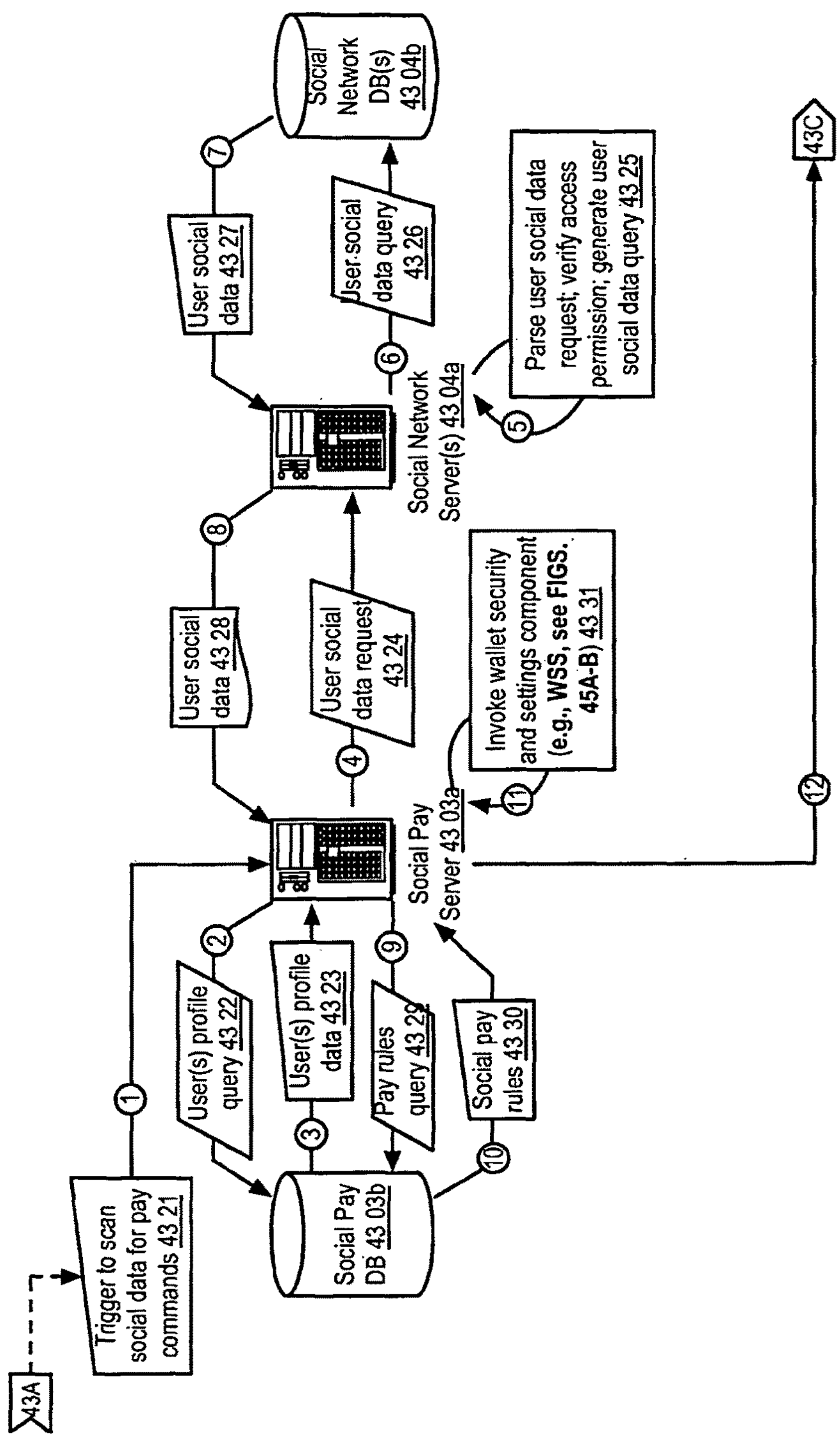
Figure 43C:
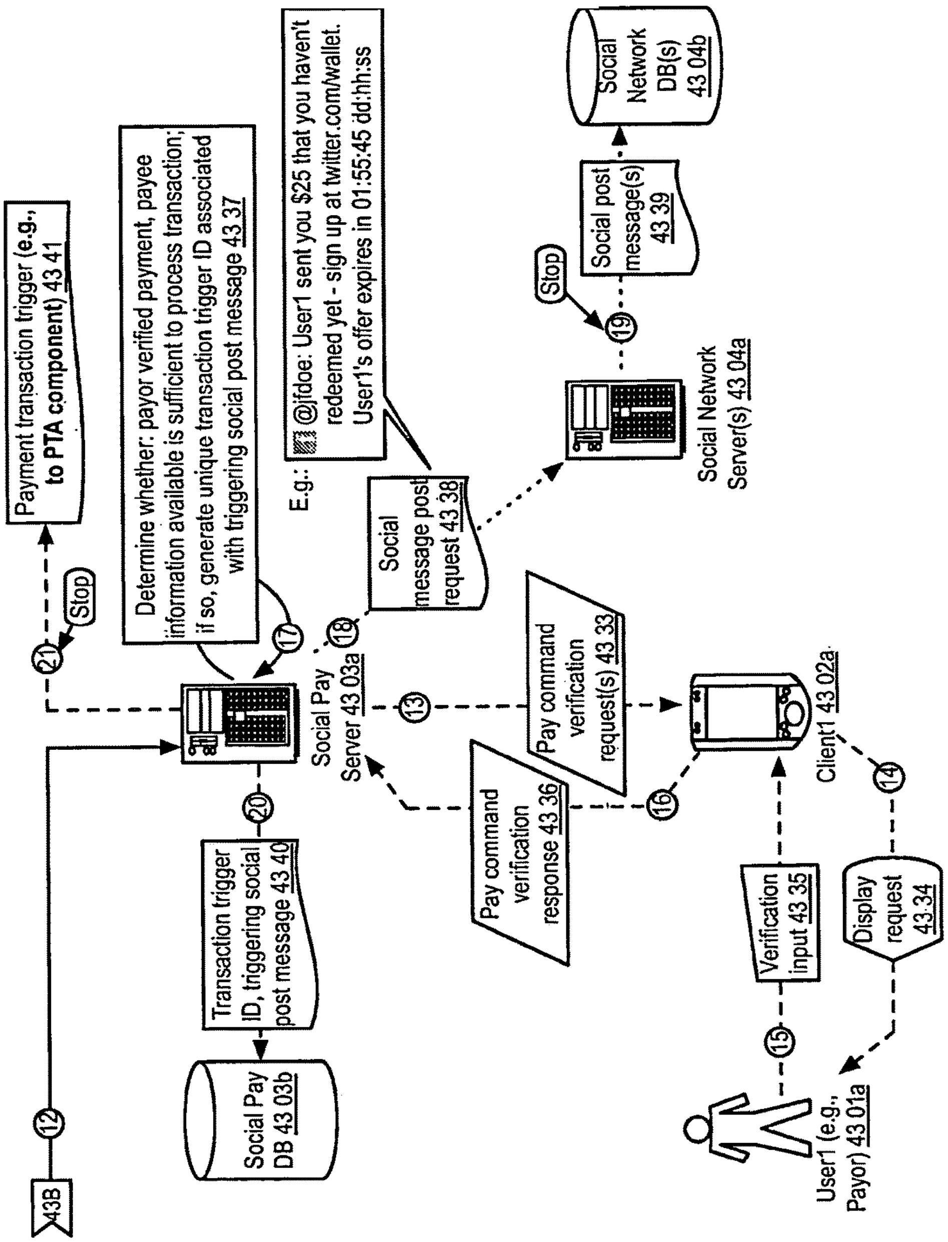

FIGS. 43A-C show data flow diagrams illustrating an example social payment triggering procedure in some embodiments of the UEP. With reference to FIG. 43A, in some embodiments, a user, e.g., user1 4301*a*, may desire to provide or request funds from another (e.g., a user, a participating merchant, etc.). The user may communicate with a social network server, e.g., 4303*a*, via a client (clienti 4302*a*) such as, but not limited to: a personal computer, mobile device, television, point-of-sale terminal, kiosk, ATM, and/or the like. For example, the user may provide social payment input 4311, into the client indicating the user's desire to provide or request funds from another. In various embodiments, the user input may include, but not be limited to: a single tap (e.g., a one-tap mobile app purchasing embodiment) of a a touchscreen interface, keyboard entry, card swipe, activating a RFID/NFC enabled hardware device (e.g., electronic card having multiple accounts, smartphone, tablet, etc.) within the user device, mouse clicks, depressing buttons on a joystick/game console, voice commands, single/multi-touch gestures on a touch-sensitive interface, touching user interface elements on a touch-sensitive display, and/or the like. In response, the client may provide a social message post request 4312 to the social network server. In some implementations, a virtual wallet application executing on the client may provide the user with an easy-to-use interface to generate and send the social message post request. In alternate implementations, the user may utilize other applications to provide the social message post request. For example, the client may provide a social message post request to the social network server server as a HTTP(S) POST message including XML-formatted data. An example listing of a social message post request 4312, substantially in the form of a HTTP(S) POST message including XML-formatted data, is provided below:

```
POST /socialpost.php HTTP/1.1
Host: www.socialnetwork.com
Content-Type: Application/XML
Content-Length: 310
<?XML version = "1.0" encoding = "UTF-8"?>
<message_post_request>
    <request_ID>value</request_ID>
    <timestamp>2011-02-02 03:04:05</timestamp>
    <sender_id>jfdoe@facebook.com</sender_id>
    <receiver_id>johnqp@facebook.com</receiver_id>
    <message>$25 @johnqp #thanksforagreattimelastnite</message>
</message_post_request>
```

In some embodiments, the social network server 4304*a* may query its social network database for a social graph of the user, e.g., 4313. For example, the social network server may issue PHP/SQL commands to query a database table (such as FIG. 61, Social Graph 6119*p*) for social graph data associated with the user. An example user social graph query 4313, substantially in the form of PHP/SQL commands, is provided below:

```
<?PHP
header('Content-Type: text/plain');
mysql_connect("254.93.179.112",$DBserver,$password); // access
database server
mysql_select_db("UEP_DB.SQL"); // select database table to search
//create query
$query = "SELECT friend_name friend_type friend_weight
  message_params_list messaging_restrictions
  FROM SocialGraphTable WHERE user LIKE '%' $user_id";
$result = mysql_query($query); // perform the search query
mysql_close("UEP_DB.SQL"); // close database access
?>
```

In some embodiments, the social network database may provide the requested social graph data in response, e.g., 4314. Using the social graph data, the social network server may generate message(s) as appropriate for the user and/or members of the user's social graph, e.g., 4315, and store the messages 4316 for the user and/or social graph members.

With reference to FIG. 43B, in some embodiments, such posting of social messages may trigger UEP actions. For example, a social pay server 4303*a* may be triggered to scan the social data for pay commands. In embodiments where every social post message originates from the virtual wallet application of a user, the UEP may optionally obtain the pay commands from the virtual wallet applications, and skip scanning the social networks for pay commands associated with the user. In embodiments where a user is allowed to issue pay commands from any device (even those not linked to the user's virtual wallet), the UEP may periodically, or even continuously scan the social networks for pay commands, e.g., 4321. In embodiments where the UEP scans the social networks, the social pay server may query a social pay database for a profile of the user. For example, the social pay server may request a user ID and password for the social networks that the user provided to the social pay server during the enrollment phase (see, e.g., FIGS. 41-42). For example, the social pay server server may issue PHP/SQL commands to query a database table (such as FIG. 61, Users 6119*a*) for user profile data. An example user profile data query 4322, substantially in the form of PHP/SQL commands, is provided below:

```
<?PHP
header('Content-Type: text/plain');
mysql_connect("254.93.179.112",$DBserver,$password); // access
database server
mysql_select_db("UEP_DB.SQL"); // select database table to search
//create query
$query = "SELECT network_id network_name
     network_api user_login user_pass FROM UsersTable
     WHERE userid LIKE '%' $user_id";
$result = mysql_query($query); // perform the search query
mysql_close("UEP_DB.SQL"); // close database access
?>
```

In response, the social pay database may provide the requested information, e.g., 4323. In some embodiments, the social pay server may provide a user social data request 4324 to the social network server. An example listing of commands to issue a user social data request 4324, substantially in the form of PHP commands, is

```
<?PHP
header('Content-Type: text/plain');
// Obtain user ID(s) of friends of the logged-in user
$friends =
     json_decode(file_get_contents('https://graph.facebook.com/me/
     friends?access token='$cookie['oauth_access_token']), true);
$friend_ids = array_keys($friends);
// Obtain message feed associated with the profile of the logged-in user
$feed =
     json_decode(file_get_contents('https:llgraph.facebook.com/
     me/feed?access_token='$cookie['oauth_access_token']), true);
// Obtain messages by the user's friends
$result = mysql_query('SELECT * FROM content WHERE uid IN ('
     .implode($friend_ids, ',') . ')');
$friend_content = array( );
while ($row = mysql_fetch_assoc($result))
$friend_content [ ] $row;
?>
```

In some embodiments, the social network server may query, e.g., 4326, it social network database 4304*b* for social data results falling within the scope of the request. In response to the query, the database may provide social data, e.g., 4327. The social network server may return the social data obtained from the databases, e.g., 4328, to the social pay server. An example listing of user social data 4328, substantially in the form of JavaScript Object Notation (JSON)-formatted data, is provided below:

```
[ "data":   [
            {       "name": "Tabatha Orloff",
                    "id": "483722"},
            {       "name": "Darren Kinnaman",
                    "id": "86S743"},
            {       "name": "Sharron Jutras",
                    "id": "O91274"}
] }
```

In some embodiments, the social pay server may query the social pay database for social pay rules, e.g., 4329. For example, the social pay server may issue PHP/SQL commands to query a database table (such as FIG. 61, Social Pay Rules 6119*q*) for the social pay rules 4330. An example pay rules query 4329, substantially in the form of PHP/SQL commands, is provided below:

```
<?PHP
header('Content-Type: text/plain');
mysql_connect("254.93.179.112",$DBserver,$password); // access
database server
mysql_select_db("UEP_DB.SQL"); // select database table to search
//create query
$query = "SELECT rule_id rule_type rule_description
    rule_priority rule_source FROM SocialPayRulesTable
    WHERE rule_type LIKE pay_rules";
$result = mysql_query($query); // perform the search query
mysql_close("UEP_DB.SQL"); // close database access
?>
```

In some embodiments, the social pay server may process the user social data using the social pay rules to identify pay commands, pay requests, merchant offers, and/or like content of the user social data. In some embodiments, rules may be provided by the UEP to ensure the privacy and security of the user's social data and virtual wallet. As another example, the rules may include procedures to detect fraudulent transaction attempts, and request user verification before proceeding, or cancel the transaction request entirely. In some embodiments, the social pay server may utilize a wallet security and settings component, such as the example WSS 4500 component described further below in the discussion with reference to FIGS. 45A-B.

With reference to FIG. 43C, in some embodiments, the social pay server may optionally determine that, based on processing of the rules, user verification is needed to process a transaction indicated in a pay command. For example, if the rules processing indicated that there is a probability of the pay command being an attempt at a fraudulent transaction attempt, the social pay server may determine that the user must be contacted for payment verification before the transaction can be processed. In such scenarios, the social pay server may provide a pay command verification request 4333 to the client, which the client may display, e.g., 4334, to the user. For example, the social pay server may provide a pay command verification request to the client 4302*a* as a HTTP(S) POST message including XML-formatted data. An example listing of a pay command verification request 4333, substantially in the form of a HTTP(S) POST

```
POST /verifyrequest.php HTTP/1.1
Host: www.client.com
Content-Type: Application/XML
Content-Length: 256
<?XML version = "1.0" encoding = "UTF-8"?>
<verify_request>
    <transaction_ID>AE1234</transaction_ID>
    <timestamp>2011-02-02 03:04:05</timestamp>
    <amount>50000 vpts</amount>
    <message_string>5000000 vpts @jfdoe #thx</message_string>
</verify_request>
```

In some embodiments, the user may provide a verification input 4335 into the client, which may provide a pay command verification response to the social pay server. The social pay server may determine whether the payor verified payment, whether payee information available is sufficient to process the transaction, and/or the like. In scenarios where sufficient payee information is unavailable, the social pay server may optionally provide a social post message 4338 to a social networking service associated with the potential payee requesting the payee to enroll in social pay service a (e.g., using the SPE 4200 component described above in the discussion with reference to FIGS. 41-42), which the social network server may post 4339 for the payee. If all the requirements are met for processing the transaction, the social pay server may generate a unique transaction trigger associated with the triggering social post message, e.g., 4337, and store a transaction trigger ID, triggering social post message, etc., for recordkeeping or analytics purposes, e.g., 43400. The social pay server may provide the transaction trigger to trigger a purchase transaction 4341, e.g., via a purchase transaction authorization such as the example PTA component described below in the discussion with reference to FIG. 58.

Figure 44A:
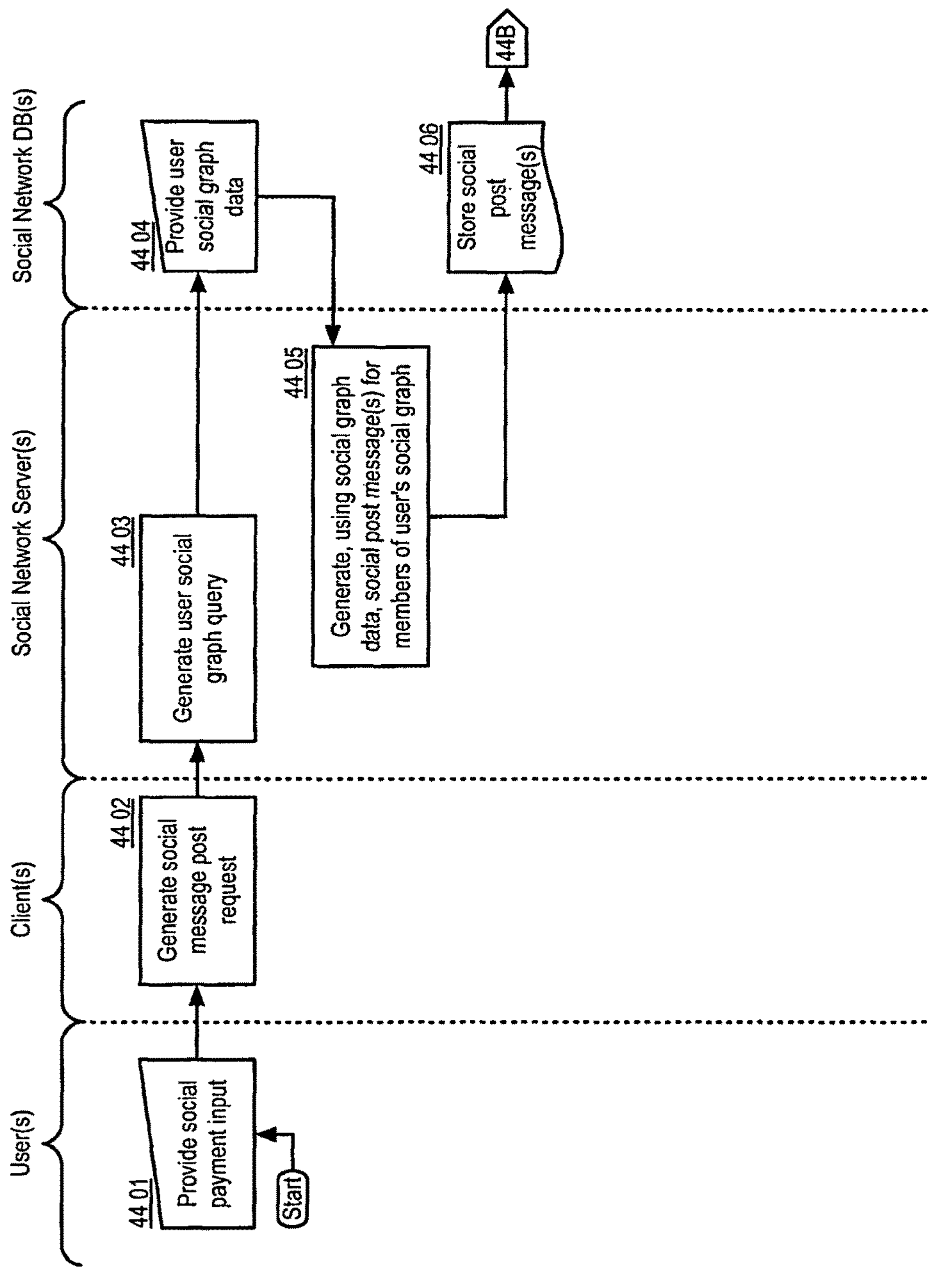
FIGS. 44A-C show logic flow diagrams illustrating example aspects of social payment triggering in some embodiments of the UEP, e.g., a Social Payment a Triggering ("SPT") component 4400.
Figure 44B:
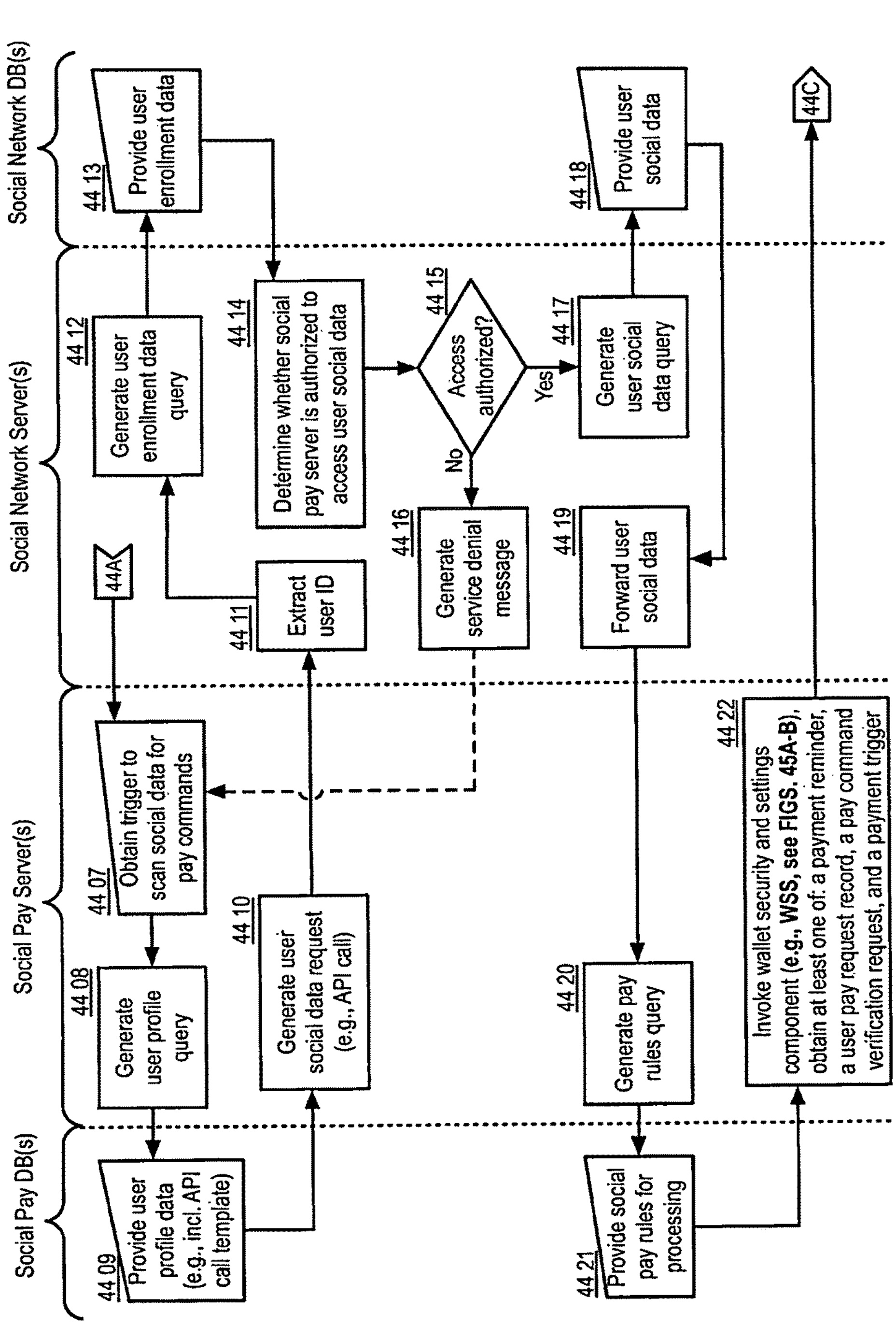
Figure 44C:
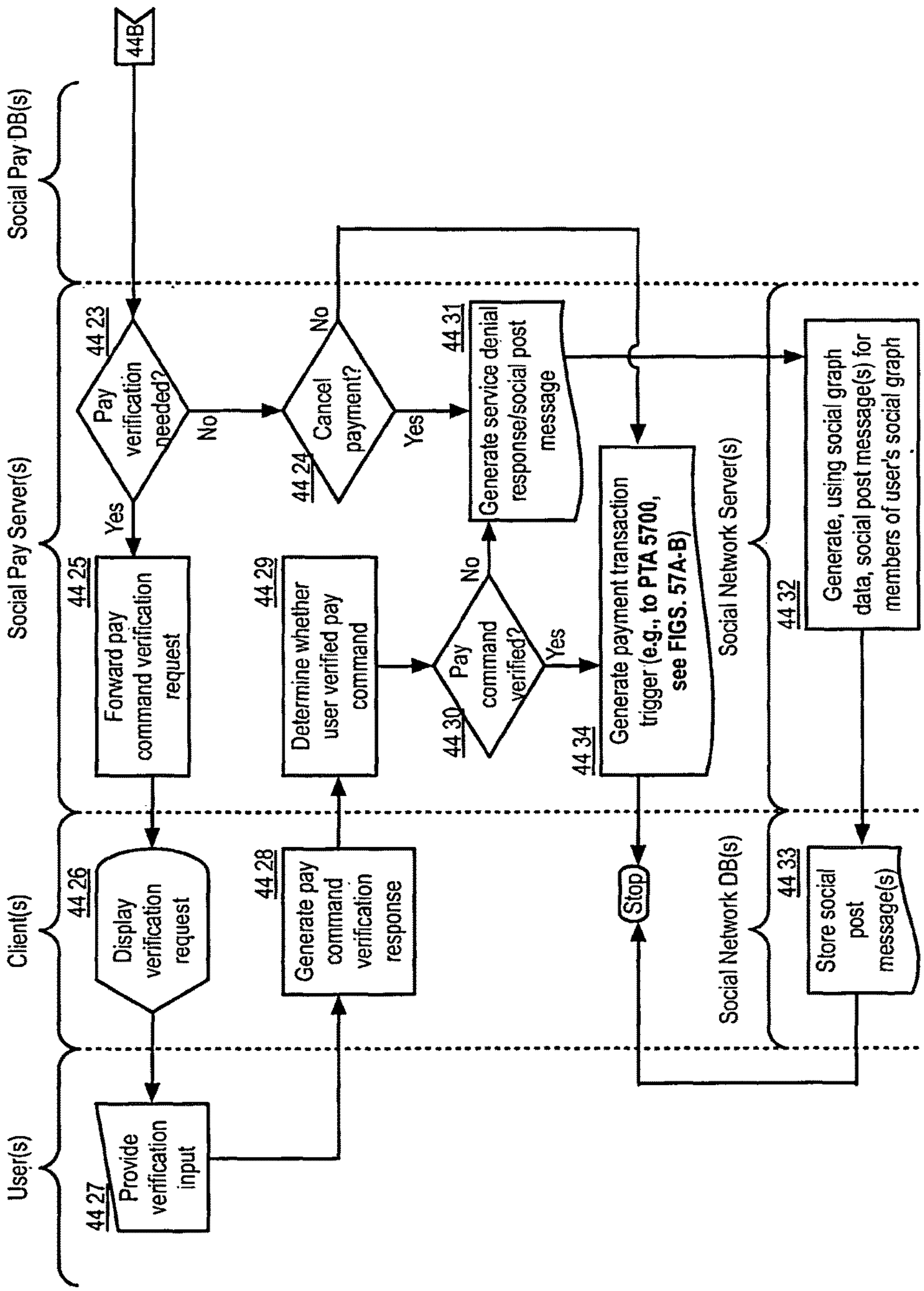

FIGS. 44A-C show logic flow diagrams illustrating example aspects of social payment triggering in some embodiments of the UEP, e.g., a Social Payment Triggering ("SPT") component 4400. With reference to FIG. 44A, in some embodiments, a user may desire to provide or request funds from another (e.g., a user, a participating merchant, etc.). The user may communicate with a social network server via a client. For example, the user may provide social payment input 4401, into the client indicating the user's desire to provide or request funds from another. In response, the client may generate and provide a social message post request 4402 to the social network server. In some implementations, a virtual wallet application executing on the client may provide the user with an easy-to-use interface to generate and send the social message post request. In alternate implementations, the user may utilize other applications to provide the social message post request. In some embodiments, the social network server may query its social network database for a social graph of the user, e.g., 4403. In response, the social network database may provide the requested social graph data, e.g., 4404. Using the social graph data, the social network server may a generate message(s) as appropriate for the user and/or members of the user's social graph, e.g., 4405, and store the messages 4406 for the user and/or social graph members.

With reference to FIG. 44B, in some embodiments, such posting of social messages may trigger UEP actions. For example, a social pay server may be triggered to scan the social data for pay commands, e.g., 4407. In embodiments where every social post message originates from the virtual wallet application of a user, the UEP may optionally obtain the pay commands from the virtual wallet applications, and skip scanning the social networks for pay commands associated with the user. In embodiments where a user is allowed to issue pay commands from any device (even those not linked to the user's virtual wallet), the UEP may periodically, or even continuously scan the social networks for pay commands. In embodiments where the UEP scans the social networks, the social pay server may query a social pay database for a profile of the user, 4408. For example, the social pay server may request a user ID and password for the social networks that the user provided to the social pay server during the enrollment phase (see, e.g., FIGS. 41-42). In response, the social pay database may provide the requested information, e.g., 4409. In some embodiments, the social pay server may generate provide a user social data request 4410 to the social network server.

In some embodiments, the social network server may extract a user ID from the user social data request, e.g., 4411.

The social network server may query, e.g., 4412, it social network database to determine whether the user is enrolled in UEP with the social network (e.g., "did the user allow the UEP Facebook® app to access user data?"). In response, the social network database may provide user enrollment data a relating to UEP. The social network server may determine whether the user is enrolled, and thus whether the social pay server is authorized to access the user social data, 4414. If the social network server determines that the social pay server is not authorized, 4415, option "No," it may generate a service denial message, 4416, and provide the message to the social pay server. If the social network server determines that the social pay server is authorized to access the user social data, 4415, option "Yes," the social network server may generate a user social data query 4417, and provide it to the social network database. In response, the social network database may provide the user social data requested, 4418. The social network server may provide the user social data 4419 to the social pay server.

In some embodiments, the social pay server may query the social pay database for social pay rules, e.g., 4420-4421. In some embodiments, the social pay server may process the user social data using the social pay rules to identify pay commands, pay requests, merchant offers, and/or like content of the user social data, 4422. In some embodiments, rules may be provided by the UEP to ensure the privacy and security of the user's social data and virtual wallet. As another example, the rules may include procedures to detect fraudulent transaction attempts, and request user verification before proceeding, or cancel the transaction request entirely. In some embodiments, the social pay server may utilize a wallet security and settings component, such as the example WSS 4500 component described further below in the discussion with reference to FIGS. 45A-B.

With reference to FIG. 44C, in some embodiments, the social pay server may optionally determine that, based on processing of the rules, user verification is needed to process a transaction indicated in a pay command, 4423, option "Yes." For example, if the rules processing indicated that there is a probability of the pay command being an attempt at a fraudulent transaction attempt, the social pay server may determine that the user must be contacted for payment verification before the transaction can be processed. In such scenarios, the social pay server may provide a pay command verification request 4425 to the client, which the client may display, e.g., 4426, to the user. In some embodiments, the user may provide a verification input 4427 into the client, which may provide a pay command verification response to the social pay server, 4428. The social pay server may determine whether the payor verified payment, whether payee information available is sufficient to process the transaction, and/or the like, 4429. In scenarios where sufficient payee information is unavailable or the payor needs to be contacted for payment verification, 4430, option "No," the social pay server may optionally provide a social post message 4431 to a social networking service associated with the potential payee/payor requesting the payee to enroll in social pay service (e.g., using the SPE 4200 component described above in the discussion with reference to FIGS. 41-42) or provide verification, which the social network server may post 4432-4433 for the payee. If all the requirements are met for processing the transaction, 4430, option "Yes," the social pay server may generate a unique transaction trigger associated with the triggering social post message, e.g., 4434, and may optionally store a transaction trigger ID, triggering social post message, etc., for recordkeeping or analytics purposes. The social pay server may provide the transaction trigger to trigger a purchase transaction, e.g., via a purchase transaction authorization component.

Figure 45A:
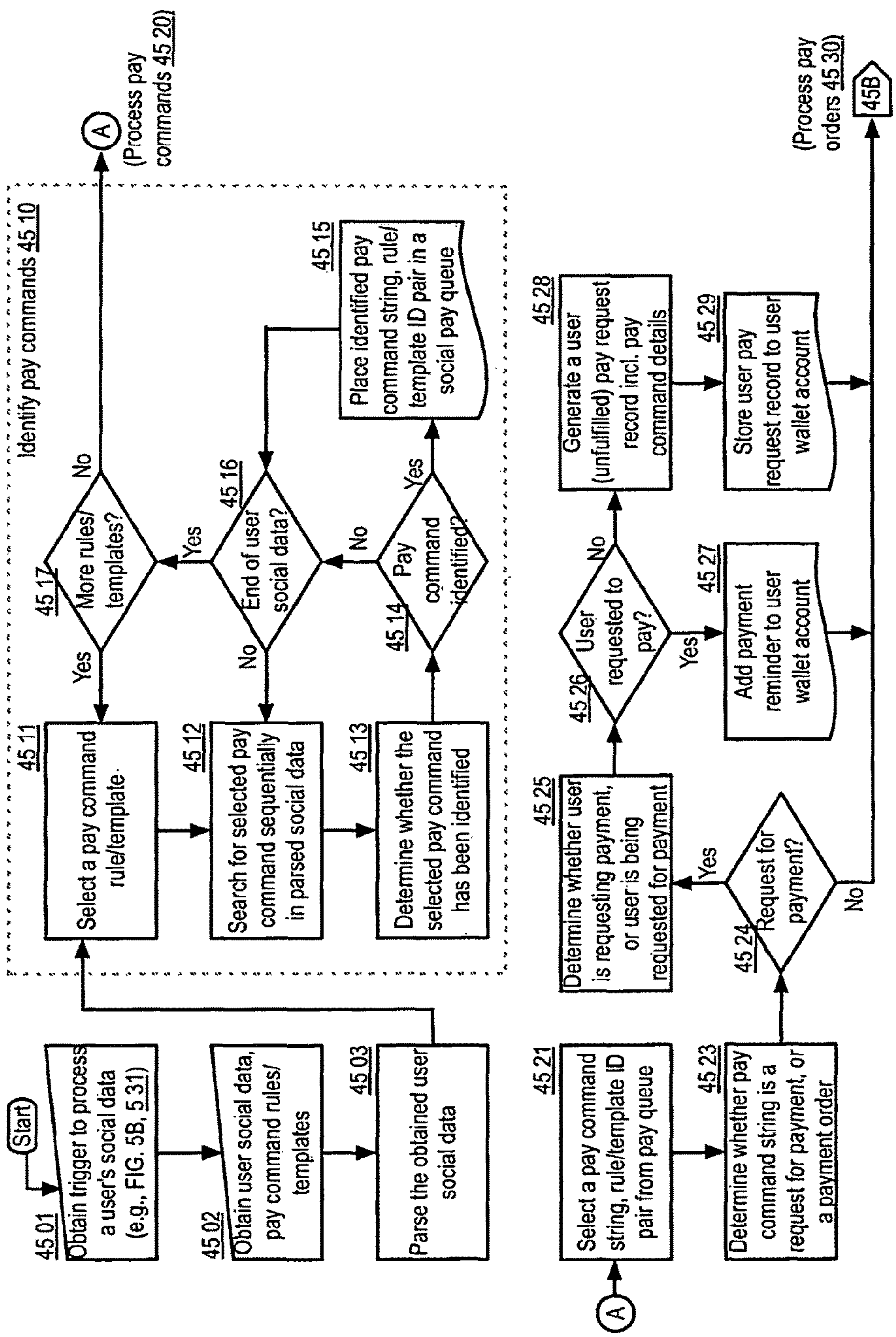
FIGS. 45A-B show logic flow diagrams illustrating example aspects of implementing wallet security and settings in some embodiments of the UEP, e.g., a Something ("WSS") component 4500.
Figure 45B:
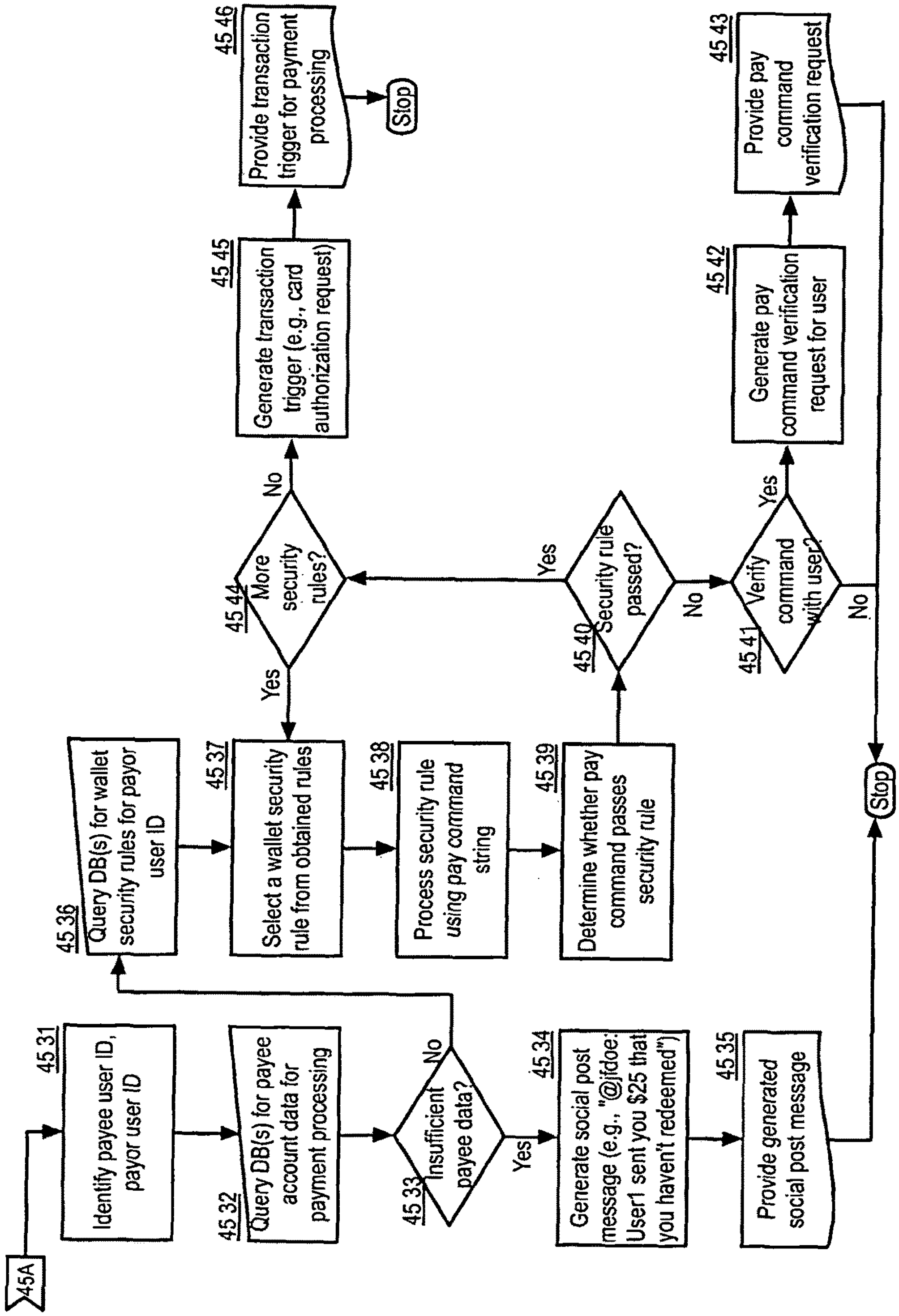

FIGS. 45A-B show logic flow diagrams illustrating example aspects of implementing wallet security and settings in some embodiments of the UEP, e.g., a Something ("WSS") component 4500. In some embodiments, the social pay server may process the user social data using the social pay rules to identify pay commands, pay requests, merchant offers, and/or like content of the user social data. In some embodiments, rules may be provided by the UEP to ensure the privacy and security of the user's social data and virtual wallet. As another example, the rules may include procedures to detect fraudulent transaction attempts, and request user verification before proceeding, or cancel the transaction request entirely.

Accordingly, with reference to FIG. 45A, in some embodiments, the UEP may obtain a trigger to process a user's social data (e.g., from FIG. 44B, element 4431), 4501. The UEP may obtain user and/or user social graph member social data, as well as pay command rules and templates (e.g., for identifying standard pay commands), 4502. The UEP may parse the obtained user social data in preparation for rules processing, 4503. For example, the UEP may utilize parsers such as the example parsers described below in the discussion with reference to FIG. 61. The UEP may select a pay command rule/template for processing. The UEP may search through the parsed user social data, e.g., in a sequential manner, for the selected pay command, 4512, and determine whether the pay command is present in the user social data, 4513. If the pay command is identified, 4514, option "Yes," the UEP may place the identified pay command string, an identification of the rule/template, the actual listing of the rule/template, and/or the like in a queue for further processing, 4515. The UEP may perform such a procedure until the entirety of the user's social data has been searched through (see 4516). In some embodiments, the UEP may perform the above procedure for all available rules/templates, to identify all the pay command strings included in the a user social data (see 4517).

In some embodiments, the UEP may process each pay command identified from the user social data, 4520. For example, the UEP may select a pay command string from the queue and its associated template/identification rule, 4521. Using the rule/template and pay command string, the UEP may determine whether the string represents a request for payment, or an order to pay, 4523. If the pay command string represents a request for payment (e.g., "hey @jfdoe, you owe me 25 bucks #cashflowblues"), 4524, option "Yes," the UEP may determine whether the user for whom the WSS component is executing is the requested payor, or the payee, 4525. If the user has been requested to pay, 4526, option "Yes," the UEP may add a payment reminder to the user wallet account, 4527. Otherwise, the UEP may generate a user pay request record including the pay command details, 4528, and store the pay request record in the user's wallet account for recordkeeping purposes or future analytics processing, 4529.

With reference to FIG. 45B, in some embodiments, the UEP may extract an identification of a payor and payee in the transaction, 4531. The UEP may query a database for payee account data for payment processing, 4532. If the payee data available is insufficient, 4533, option "Yes," the UEP may generate a social post message to the payee's social network account 4534, requesting that the payee either enroll in the UEP (if not already), or provide additional information so that the UEP may process the transaction. The UEP may provide 4535 the social post message to the social networking service associated with the payee. If sufficient payee information is available, 4533, option "No," the UEP may query the payor's wallet account for security a rules associated with utilizing the virtual wallet account, 4536. The UEP may select a wallet security rule, 4537, and process the security rule using the pay command string as input data, 4538. Based on the processing, the UEP may determine whether the pay command passes the security rule, or instead poses a security risk to the user wallet. If the security rule is not passed, 4540, option "No," the UEP may determine whether verification from the user can salvage the pay command string, 4541. If the UEP determines that the risk is too great, the UEP may directly terminate the transaction and is remove the pay command string from the processing queue. Otherwise (4541, option "Yes"), the UEP may generate a pay command verification request for the user, 4542, and provide the pay command verification request as an output of the component, 4543. If all security rules are passed for the pay command string, 4544, option "No," the UEP may generate a transaction trigger with a trigger ID (such as a card authorization request), and provide the transaction trigger for payment processing.

Figure 46:
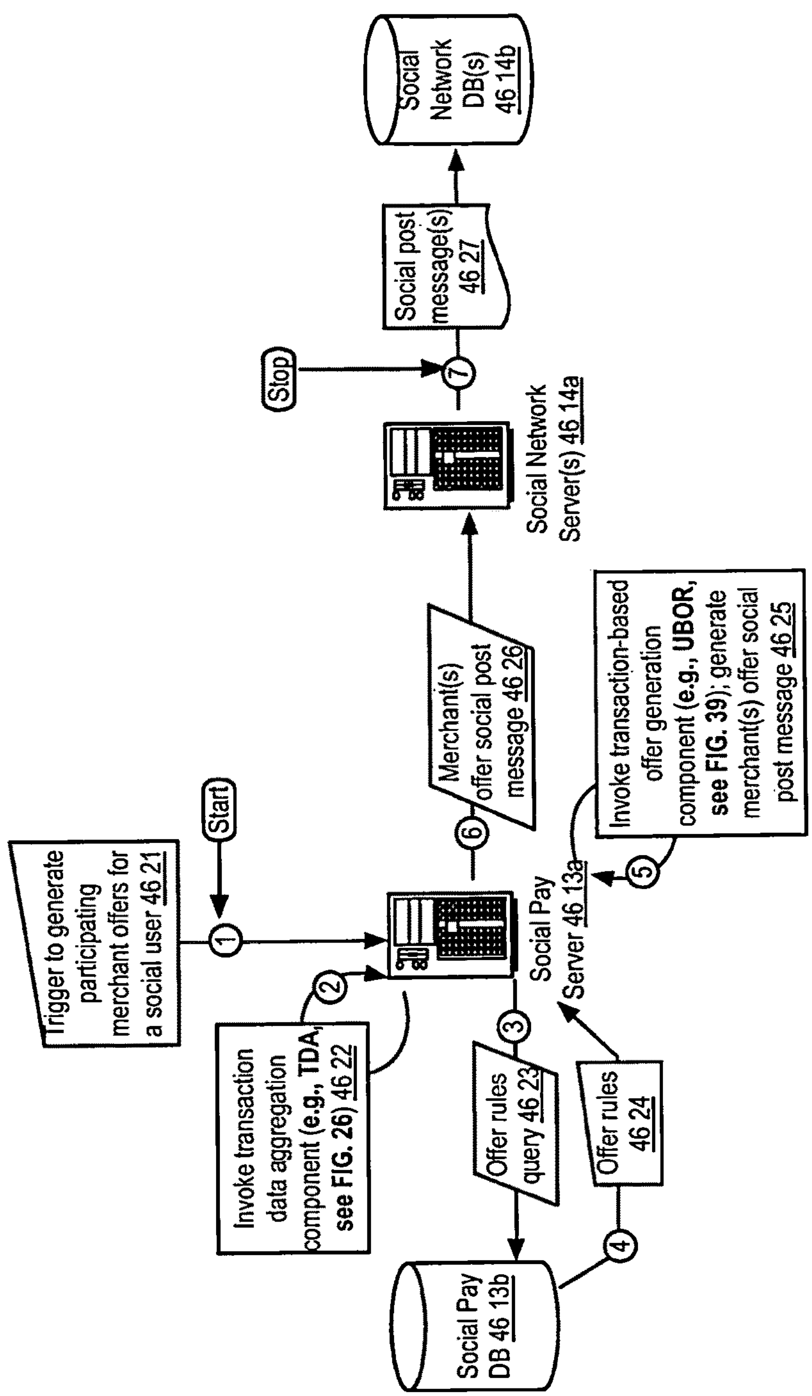
FIG. 46 shows a data flow diagram illustrating an example social merchant consumer bridging procedure in some embodiments of the UEP.

FIG. 46 shows a data flow diagram illustrating an example social merchant consumer bridging procedure in some embodiments of the UEP. In some implementations, a social pay server 4613*a* may be triggered, e.g., 4621, to provide services that bridge consumers and merchants over social networks. For example, the social pay server may identify a consumer in need of offers for products or services, and may identify merchants participating in UEP that can provide the needed products or services. The social pay server may generate offers on behalf of the participating merchants, and provide the offers to consumers via social networks. In some embodiments, the social pay server may periodically initiate merchant-consumer bridging services for a user. In alternate embodiments, the social pay server may initiate merchant-consumer bridging upon notification of a consumer engaging in a a transaction (e.g., a consumer may request checkout for a purchase via the user's virtual wallet; for illustration, see the example User Purchase Checkout (UPC) component 5600 described further below in the discussion with reference to FIG. 56), or when a authorization is requested for a purchase transaction (see the example Purchase Transaction Authorization (PTA) component 5800 described further below in the discussion with reference to FIG. 58). Upon obtaining a trigger to perform merchant-consumer bridging, the social pay server may invoke 4622 a transaction data aggregation component, e.g., the TDA component 2600 described further below in the discussion with reference to FIG. 26. The social pay server may query a social pay database 4603*b* for offer generation rules, e.g., 4623. For example, the social pay server may utilize PHP/SQL commands similar to the other examples described herein. In response, the database may provide the requested offer generation rules, e.g., 4624. Using the aggregated transaction data and the offer generation rules, the social pay server may generate merchant(s) offer social post messages for posting to profiles of the user on social networks, e.g., 4625. For example, the social pay server may invoke a transaction-based offer generation component, such as the example UBOR 3900 component described further below in the discussion with reference to FIG. 39. The social pay server may provide the generated social post messages 4626 to a social network server 4614*a*. The social network server may store the social post messages 4627 to a social network database 4614*b* for distribution to the user (e.g., when the user logs onto the social networking service provided by the social network server).

Figure 47:
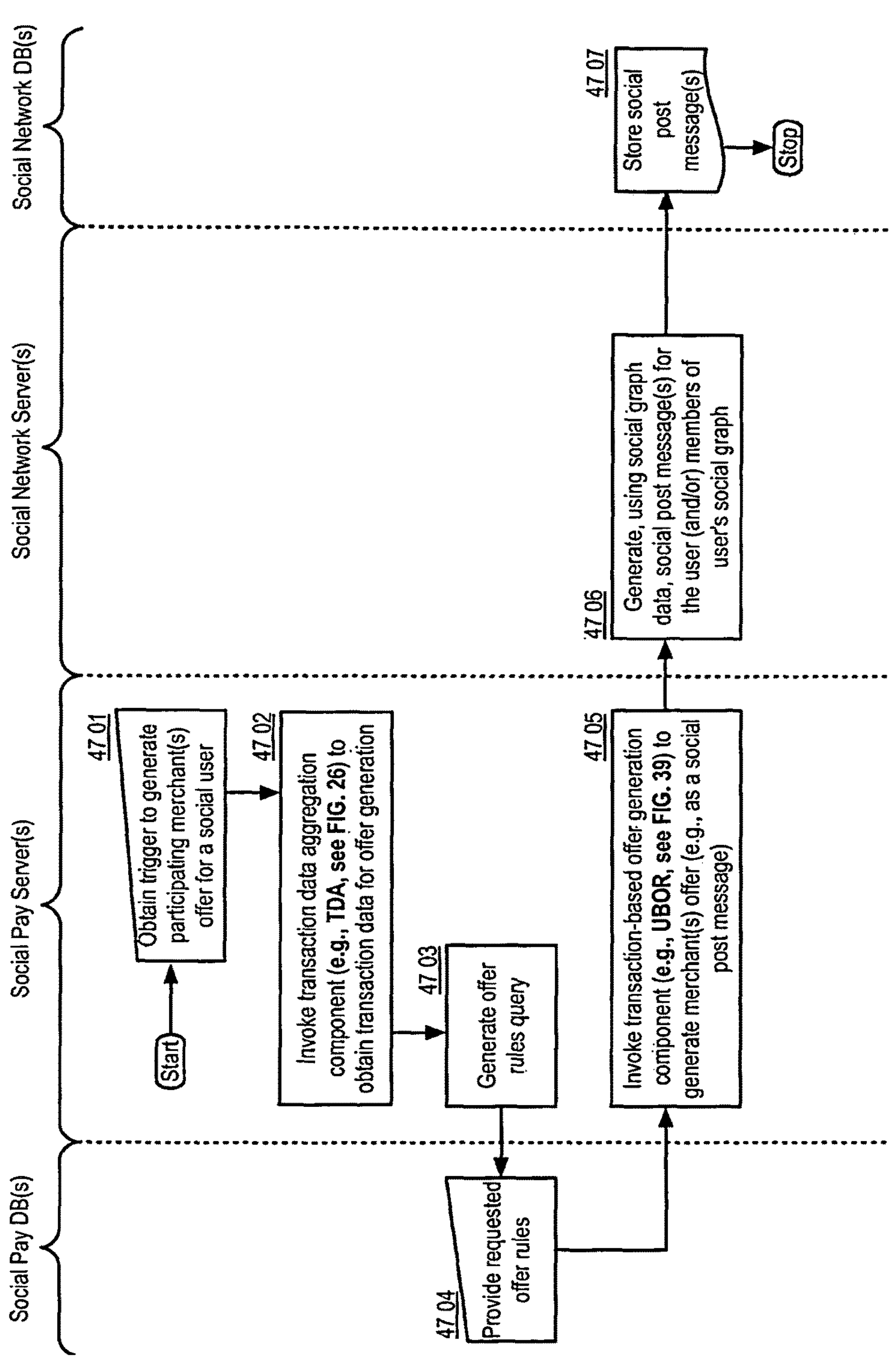
FIG. 47 shows a logic flow diagram illustrating example aspects of social merchant consumer bridging in some embodiments of the UEP, e.g., a Social Merchant Consumer Bridging ("SMCB") component 4700.

FIG. 47 shows a logic flow diagram illustrating example aspects of social merchant consumer bridging in some embodiments of the UEP, e.g., a Social Merchant Consumer Bridging ("SMCB") component 4700. In some implementations, a a social pay server may be triggered to provide services that bridge consumers and merchants over social networks, e.g., 4701. Upon obtaining a trigger to perform merchant-consumer bridging, the social pay server may invoke a transaction data aggregation component such as the TDA component 2600 described further below in the discussion with reference to FIG. 26, e.g., 4702. The social pay server may query a social pay database for offer generation rules, e.g., 4703. For example, the social pay server may utilize PHP/SQL commands similar to the other examples described herein. In response, the database may provide the requested offer generation rules, e.g., 4704. Using the aggregated transaction data and the offer generation rules, the social pay server may generate merchant(s) offer social post messages for posting to profiles of the user on social networks, e.g., 4705. For example, the social pay server may invoke a transaction-based offer generation component, such as the example UBOR 3900 component described further below in the discussion with reference to FIG. 39. The social pay server may provide the generated social post messages to a social network server. The social network server may store the social post messages to a social network database for distribution to the user (e.g., when the user logs onto the social networking service provided by the social network server). In some embodiments, the social network server may generate, using social graph data of the user, social post messages for the user and/or members of the user's social graph, e.g., 4706, and store the social post message in a social network database for posting to their profiles, e.g., 4707.

Virtual Wallet UI Embodiments

Figure 48:
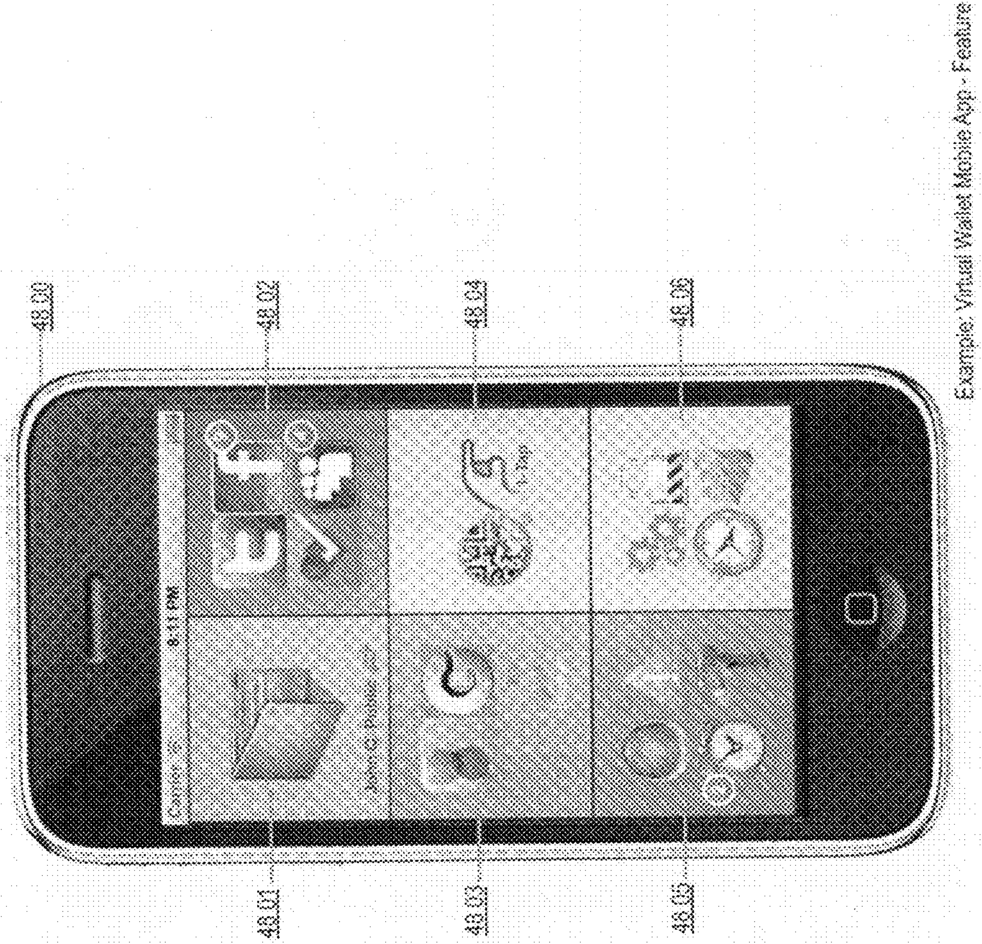
FIG. 48 shows a user interface diagram illustrating an overview of example features of virtual wallet applications in some embodiments of the UEP.

FIG. 48 shows a user interface diagram illustrating an overview of example features of virtual wallet applications in some embodiments of the UEP. FIG. 48 shows an illustration of various exemplary features of a virtual wallet a mobile application 4800. Some of the features displayed include a wallet 4801, social integration via TWITER, FACEBOOK, etc., offers and loyalty 4803, snap mobile purchase 4804, alerts 4805 and security, setting and analytics 4896. These features are explored in further detail below.

Figure 49A:
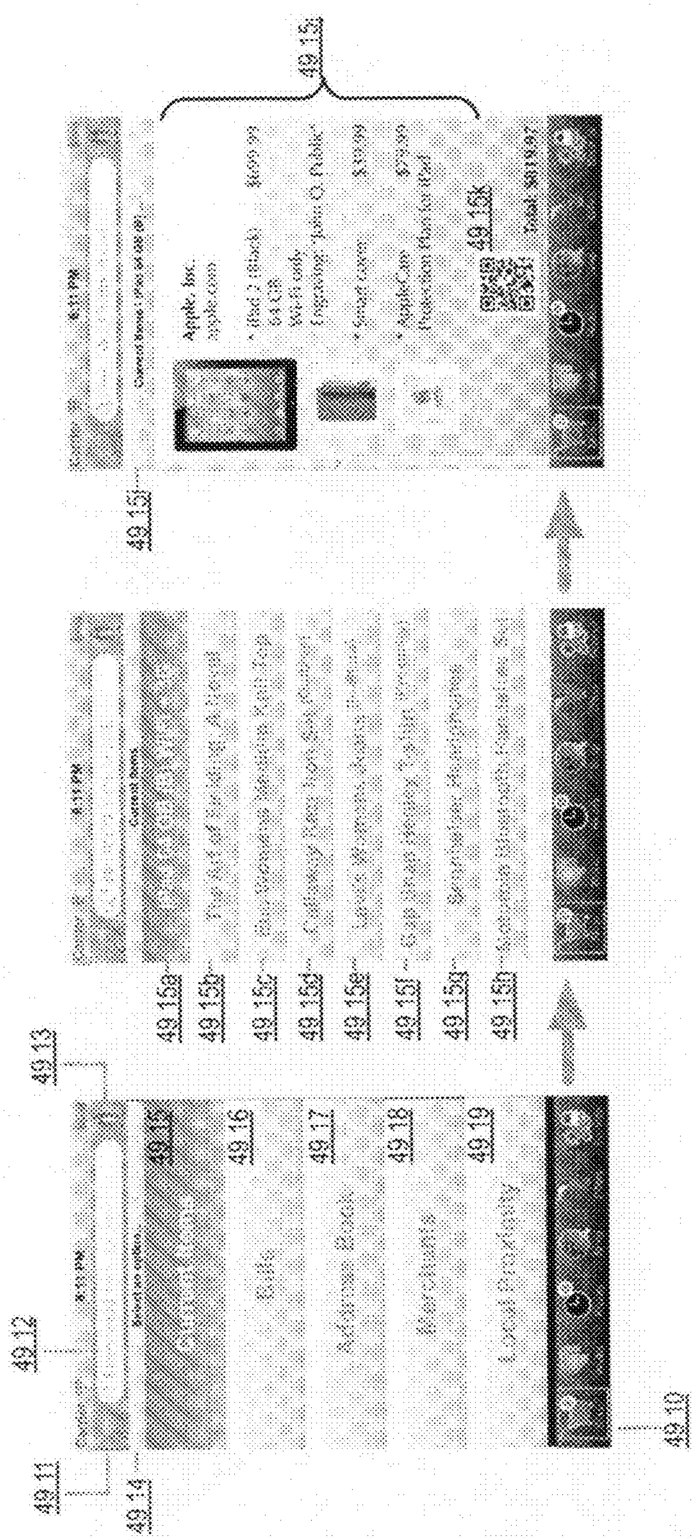
FIGS. 49A-G show user interface diagrams illustrating example features of virtual wallet applications in a shopping mode, in some embodiments of the UEP.

FIGS. 49A-G show user interface diagrams illustrating example features of virtual wallet applications in a shopping mode, in some embodiments of the UEP. With reference to FIG. 49A, some embodiments of the virtual wallet mobile app facilitate and greatly enhance the shopping experience of consumers. A variety of shopping modes, as shown in FIG. 49A, may be available for a consumer to peruse. In one implementation, for example, a user may launch the shopping mode by selecting the shop icon 4910 at the bottom of the user interface. A user may type in an item in the search field 4912 to search and/or add an item to a cart 4911. A user may also use a voice activated shopping mode by saying the name or description of an item to be searched and/or added to the cart into a microphone 4913. In a further implementation, a user may also select other shopping options 4914 such as current items 4915, bills 4916, address book 4917, merchants 4918 and local proximity 4919.

In one embodiment, for example, a user may select the option current items 4915, as shown in the left most user interface of FIG. 49A. When the current items 4915 option is selected, the middle user interface may be displayed. As shown, the middle user interface may provide a current list of items 4915*a-h* in a user's shopping cart 4911. A user may select an item, for example item 4915*a*, to view product description 4915*j* of the selected item and/or other items from the same merchant. The price and total payable information may also be displayed, along with a QR code 4915*k* that a captures the information necessary to effect a snap mobile purchase transaction.

Figure 49B:
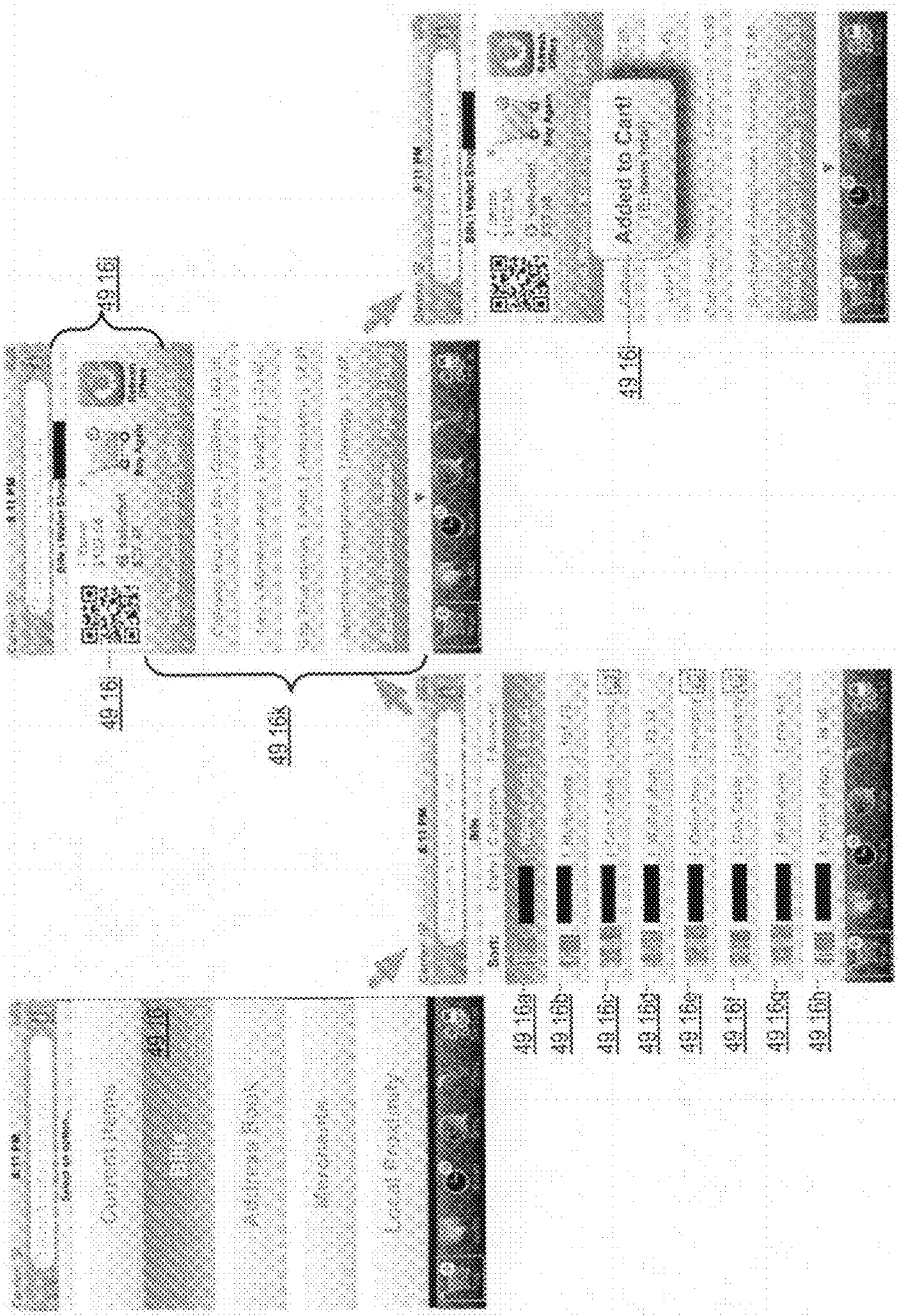

With reference to FIG. 49B, in another embodiment, a user may select the bills 4916 option. Upon selecting the bills 4916 option, the user interface may display a list of bills and/or receipts 4916*a-h* from one or more merchants. Next to each of the bills, additional information such as date of visit, whether items from multiple stores are present, last bill payment date, auto-payment, number of items, and/or the like may be displayed. In one example, the wallet shop bill 4916*a* dated Jan. 20, 2011 may be selected. The wallet shop bill selection may display a user interface that provides a variety of information regarding the selected bill. For example, the user interface may display a list of items 4916*k* purchased, <<4916*i*>>, a total number of items and the corresponding value. For example, 7 items worth $102.54 were in the selected wallet shop bill. A user may now select any of the items and select buy again to add purchase the items. The user may also refresh offers 4916*j* to clear any invalid offers from last time and/or search for new offers that may be applicable for the current purchase. As shown in FIG. 49B, a user may select two items for repeat purchase. Upon addition, a message 4916*l* may be displayed to confirm the addition of the two items, which makes the total number of items in the cart 14.

Figure 49C:
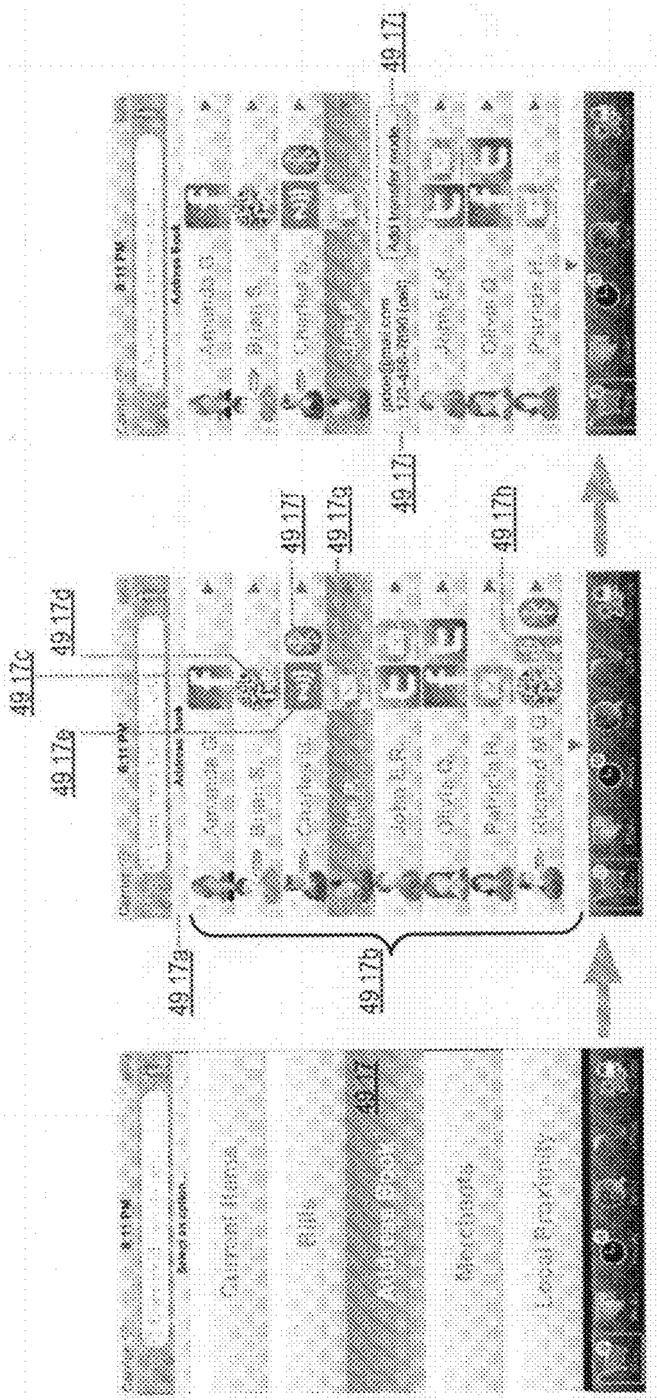

With reference to FIG. 49C, in yet another embodiment, a user may select the address book option 4917 to view the address book 4917*a* which includes a list of contacts 4917*b* and make any money transfers or payments. In one embodiment, the address book may identify each contact using their names and available and/or preferred modes of payment. For example, a contact Amanda G. may be paid via social pay (e.g., via FACEBOOK) as indicated by the icon 4917*c*. In another example, money may be transferred to Brian S. via QR code as indicated by the QR code icon 4917*d*. In a yet another example, Charles B. may accept payment via near field communication 4917*e*, Bluetooth 4917*f* and email 4917*g*. Payment may also be made via USB 4917*h* (e.g., by physically connecting two mobile devices) as well as other social channels such as TWITTER.

Figure 49D:
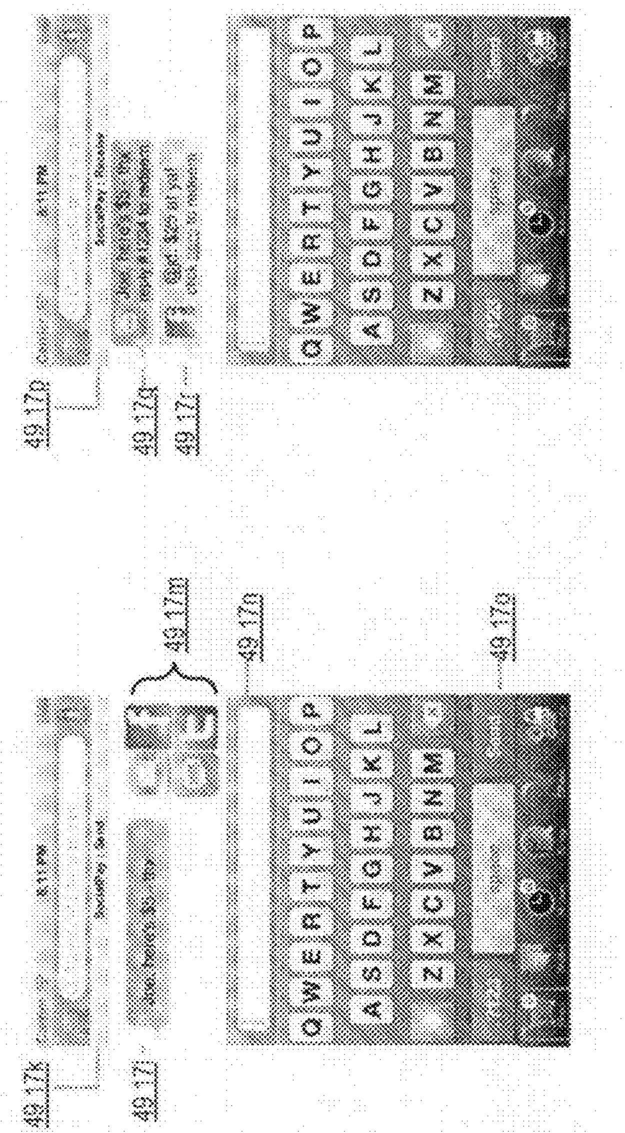

In one implementation, a user may select Joe P. for payment. Joe P., as shown in the user interface, has an email icon 4917*g* next to his name indicating that Joe P. accepts payment via email. When his name is selected, the user interface may display his contact information such as email, phone, etc. If a user wishes to make a payment to Joe P. by a method other than email, the user may add another transfer mode 4917*j* to his contact information and make a payment transfer. With reference to FIG. 49D, the user may be provided with a screen 4917*k* where the user can enter an amount to send Joe, as well as add other text to provide Joe with context for the payment transaction 49171. The user can choose modes (e.g., SMS, email, social networking) via which Joe may be contacted via graphical user interface elements, 4917*m*. As the user types, the text entered may be provided for review within a GUI element 4917*n*. When the user has completed entering in the necessary information, the user can press the send button 49170 to send the social message to Joe. If Joe also has a virtual wallet application, Joe may be able to review 4917*p* social pay message within the app, or directly at the website of the social network (e.g., for Twitter™, Facebook®, etc.). Messages may be aggregated from the various social networks and other sources (e.g., SMS, email). The method of redemption appropriate for each messaging mode may be indicated along with the social pay message. In the illustration in FIG. 49D, the SMS 4917*q* Joe received indicates that Joe can redeem the $5 obtained via SMS by replying to the SMS and entering the hash tag value '#1234'. In the same illustration, a Joe has also received a message 4917*r* via Facebook®, which includes a URL link that Joe can activate to initiate redemption of the $25 payment.

Figure 49E:
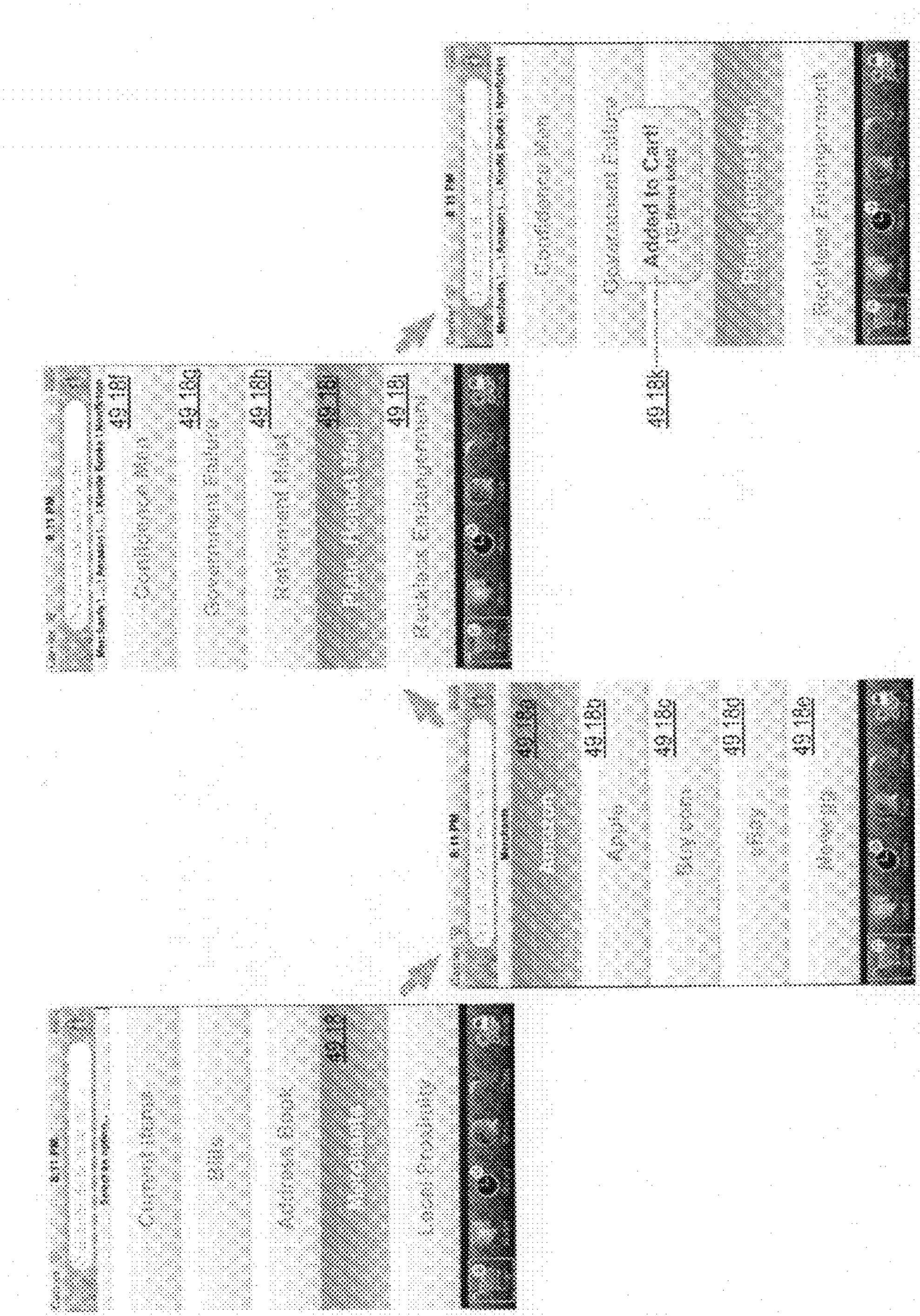

With reference to FIG. 49E, in some other embodiments, a user may select merchants 4918 from the list of options in the shopping mode to view a select list of merchants 4918*a-e*. In one implementation, the merchants in the list may be affiliated to the wallet, or have affinity relationship with the wallet. In another implementation, the merchants may include a list of merchants meeting a user-defined or other criteria. For example, the list may be one that is curated by the user, merchants where the user most frequently shops or spends more than an x amount of sum or shopped for three consecutive months, and/or the like. In one implementation, the user may further select one of the merchants, Amazon 4918*a* for example. The user may then navigate through the merchant's listings to find items of interest such as 4918*f-j*. Directly through the wallet and without visiting the merchant site from a separate page, the user may make a selection of an item 4918*j* from the catalog of Amazon 4918*a*. As shown in the right most user interface of FIG. 49D, the selected item may then be added to cart. The message 4918*k* indicates that the selected item has been added to the cart, and updated number of items in the cart is now 13.

Figure 49F:
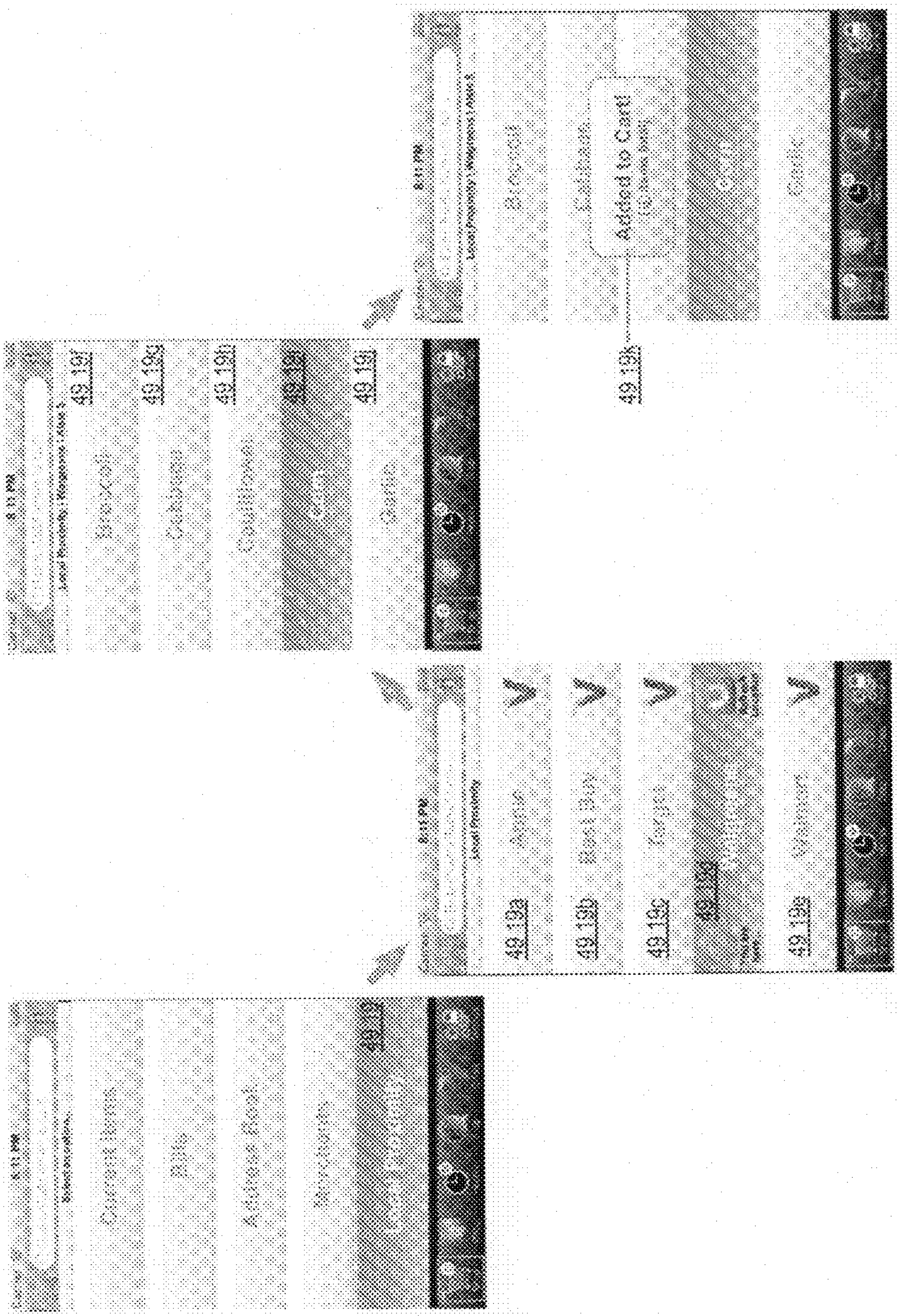

With reference to FIG. 49F, in one embodiment, there may be a local proximity option 4919 which may be selected by a user to view a list of merchants that are geographically in close proximity to the user. For example, the list of merchants 4919*a-e* may be the merchants that are located close to the user. In one implementation, the mobile application may further identify when the user in a store based on the user's location. For example, position icon 4919*d* may be displayed next to a store (e.g., Walgreens) when the user is in close proximity to the store. In one implementation, the mobile application may refresh its location periodically in case the user moved away from the store (e.g., Walgreens). In a further implementation, the user may navigate the offerings of the selected Walgreens store through the mobile application. For example, the user may navigate, using the mobile application, to items 4919*f-j* available on aisle 5 of Walgreens. In one implementation, the user may select corn 4919*i* from his or her mobile application to add to cart 4919*k*.

Figure 49G:
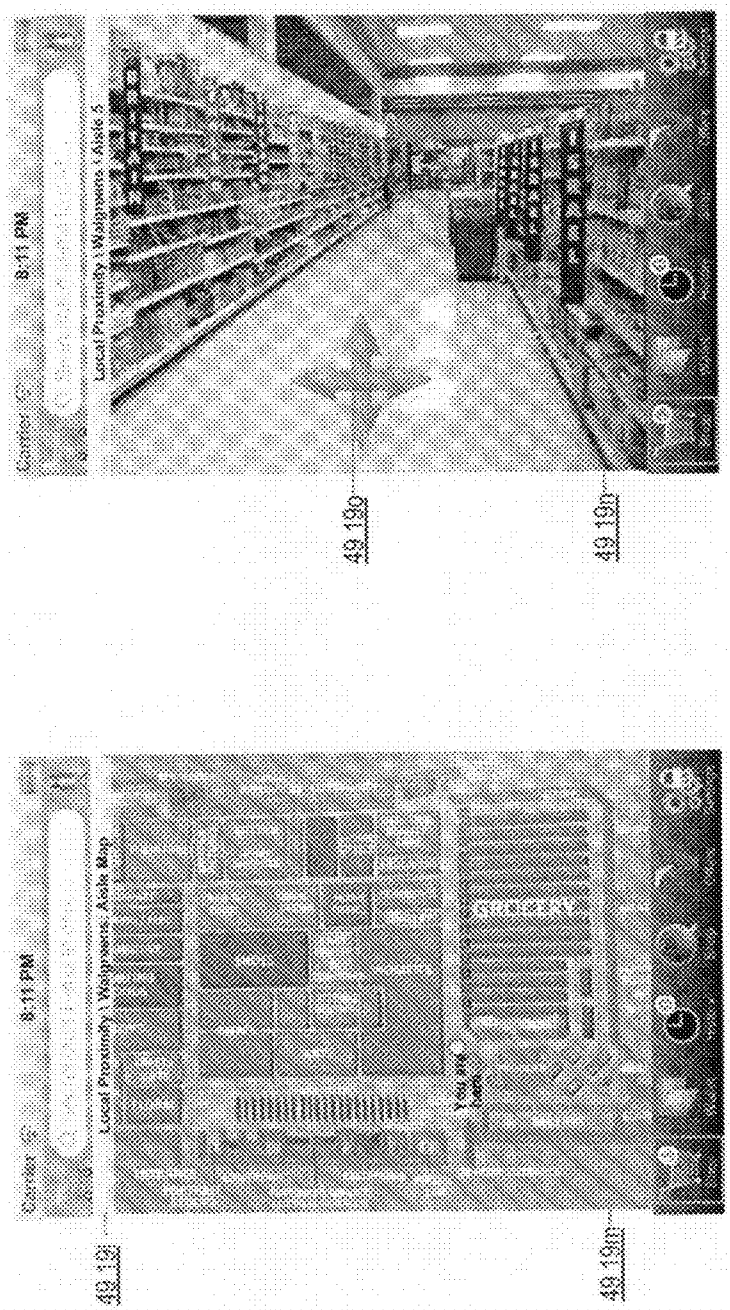
Figure 50A:
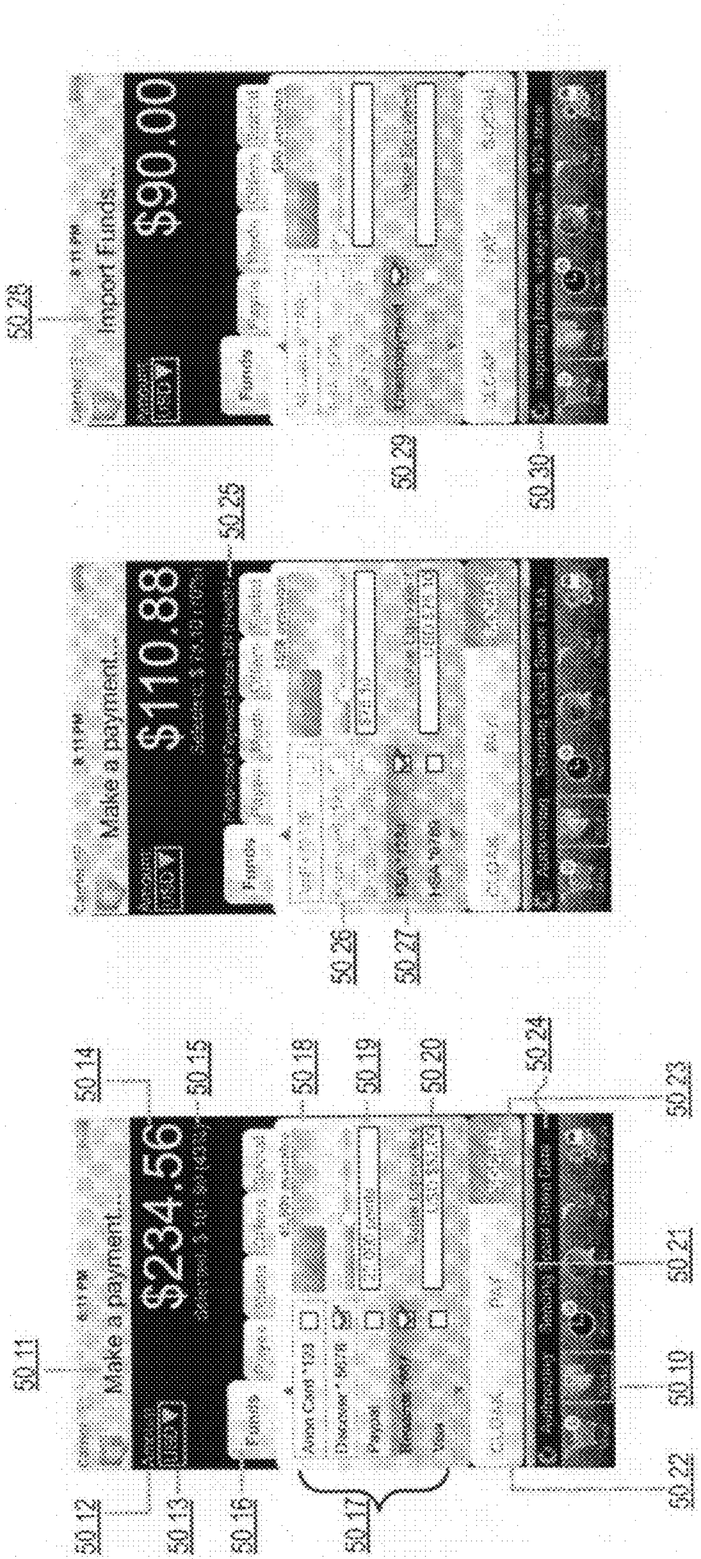
FIGS. 50A-F show user interface diagrams illustrating example features of virtual wallet applications in a payment mode, in some embodiments of the UEP.

With reference to FIG. 49G, in another embodiment, the local proximity option 4919 may include a store map and a real time map features among others. For example, upon selecting the Walgreens store, the user may launch an aisle map 4919*l* which displays a map 4919*m* showing the organization of the store and the position of the user (indicated by a yellow circle). In one implementation, the user may easily configure the map to add one or more other users (e.g., user's kids) to share each other's location within the store. In another implementation, the user may have the option to launch a "store view" similar to street views in maps. The store view 4919*n* may display images/video of the user's surrounding. For example, if the user is about to enter aisle 5, the store view map may show the view of aisle 5. Further the user may manipulate the orientation of the map using the navigation tool 49190 to move the store view forwards, backwards, right, left as well clockwise and counterclockwise rotation FIGS. 50A-F show user interface diagrams illustrating example features of virtual wallet applications in a payment mode, in some embodiments of the UEP. With reference to FIG. 50A, in one embodiment, the wallet mobile application may provide a user with a number of options for paying for a transaction via the wallet mode 5010. In one implementation, an example user interface 5011 for making a payment is shown. The user interface may clearly identify the amount 5012 and the currency 5013 for the transaction. The amount may be the amount payable and the currency may include real currencies such as dollars and euros, as well as virtual currencies such as reward points. The amount of the transaction 5014 may also be prominently displayed on the user interface. The user may select the funds tab 5016 to select one or more forms of payment 5017, which may include various credit, debit, gift, rewards and/or prepaid cards. The user may also have the option of paying, wholly or in part, with reward points. For example, the graphical indicator 5018 on the user interface is shows the number of points available, the graphical indicator 5019 shows the number of points to be used towards the amount due 234.56 and the equivalent 5020 of the number of points in a selected currency (USD, for example).

In one implementation, the user may combine funds from multiple sources to pay for the transaction. The amount 5015 displayed on the user interface may provide an indication of the amount of total funds covered so far by the selected forms of payment (e.g., Discover card and rewards points). The user may choose another form of payment or adjust the amount to be debited from one or more forms of payment until the amount 5015 matches the amount payable 5014. Once the amounts to be debited from one or more forms of payment are finalized by the user, payment authorization may begin.

In one implementation, the user may select a secure authorization of the transaction by selecting the cloak button 5022 to effectively cloak or anonymize some (e.g., preconfigured) or all identifying information such that when the user selects pay button 5021, the transaction authorization is conducted in a secure and anonymous a manner. In another implementation, the user may select the pay button 5021 which may a use standard authorization techniques for transaction processing. In yet another implementation, when the user selects the social button 5023, a message regarding the transaction may be communicated to one of more social networks (set up by the user) which may post or announce the purchase transaction in a social forum such as a wall post or a tweet. In one implementation, the user may select a social payment processing option 5023. The indicator 5024 may show the authorizing and sending social share data in progress.

In another implementation, a restricted payment mode 5025 may be activated for certain purchase activities such as prescription purchases. The mode may be activated in accordance with rules defined by issuers, insurers, merchants, payment processor and/or other entities to facilitate processing of specialized goods and services. In this mode, the user may scroll down the list of forms of payments 5026 under the funds tab to select specialized accounts such as a flexible spending account (FSA) 5027, health savings account (HAS), and/or the like and amounts to be debited to the selected accounts. In one implementation, such restricted payment mode 5025 processing may disable social sharing of purchase information.

In one embodiment, the wallet mobile application may facilitate importing of funds via the import funds user interface 5028. For example, a user who is unemployed may obtain unemployment benefit fund 5029 via the wallet mobile application. In one implementation, the entity providing the funds may also configure rules for using the fund as shown by the processing indicator message 5030. The wallet may read and apply the rules prior, and may reject any purchases with the unemployment funds that fail to meet the criteria set by the rules. Example criteria may include, for example, merchant category code (MCC), time of transaction, location of transaction, and/or the like. As an example, a transaction with a grocery merchant having MCC 5411 may be approved, while a transaction with a bar merchant having an MCC 5813 may be refused.

Figure 50B:
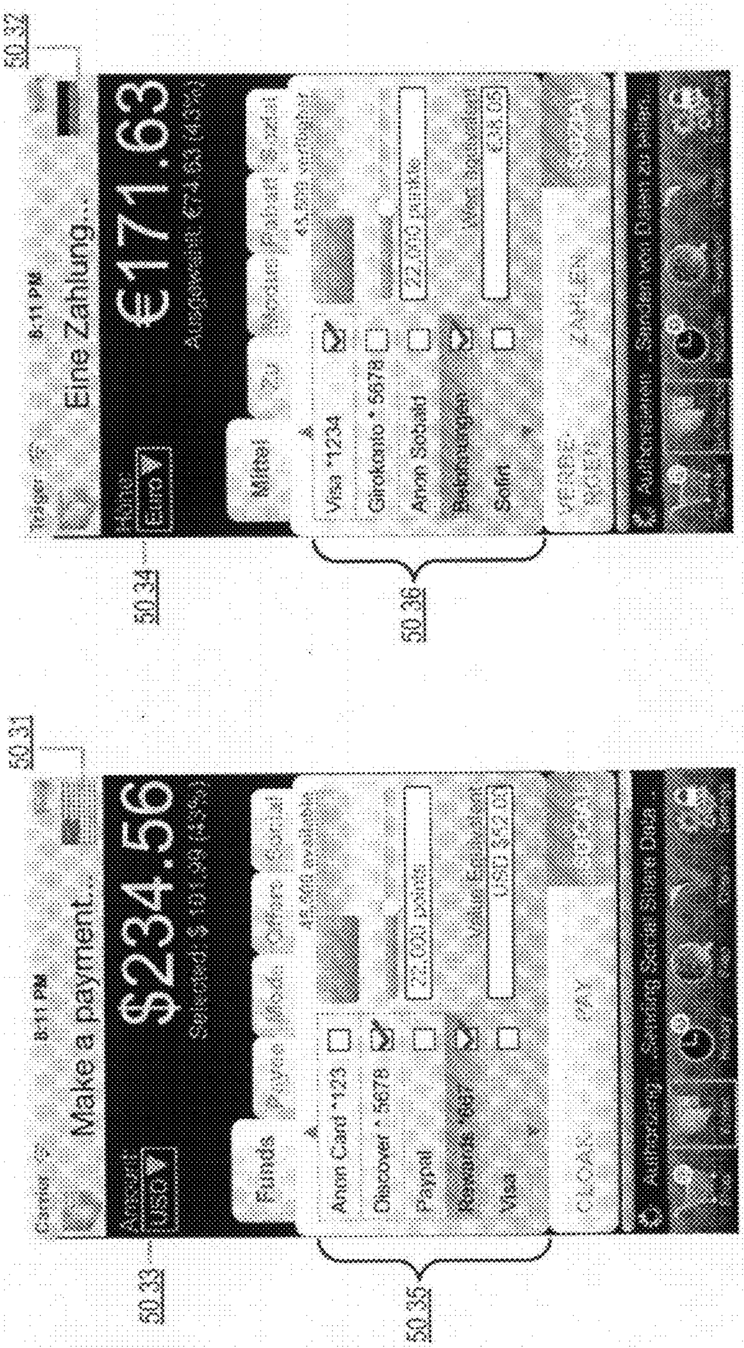

With reference to FIG. 50B, in one embodiment, the wallet mobile application may facilitate dynamic payment optimization based on factors such as user location, preferences and currency value preferences among others. For example, when a user is in the United States, the country indicator 5031 may display a flag of the United States and may set the currency 5033 to the United States. In a further implementation, the wallet mobile application may automatically rearrange the order in which the forms of payments 5035 are listed to reflect the popularity or acceptability of various forms of payment. In one implementation, the arrangement may reflect the user's preference, which may not be changed by the wallet mobile application.

Similarly, when a German user operates a wallet in Germany, the mobile wallet application user interface may be dynamically updated to reflect the country of operation 5032 and the currency 5034. In a further implementation, the wallet application may rearrange the order in which different forms of payment 5036 are listed based on their acceptance level in that country. Of course, the order of these forms of payments may be modified by the user to suit his or her own preferences.

Figure 50C:
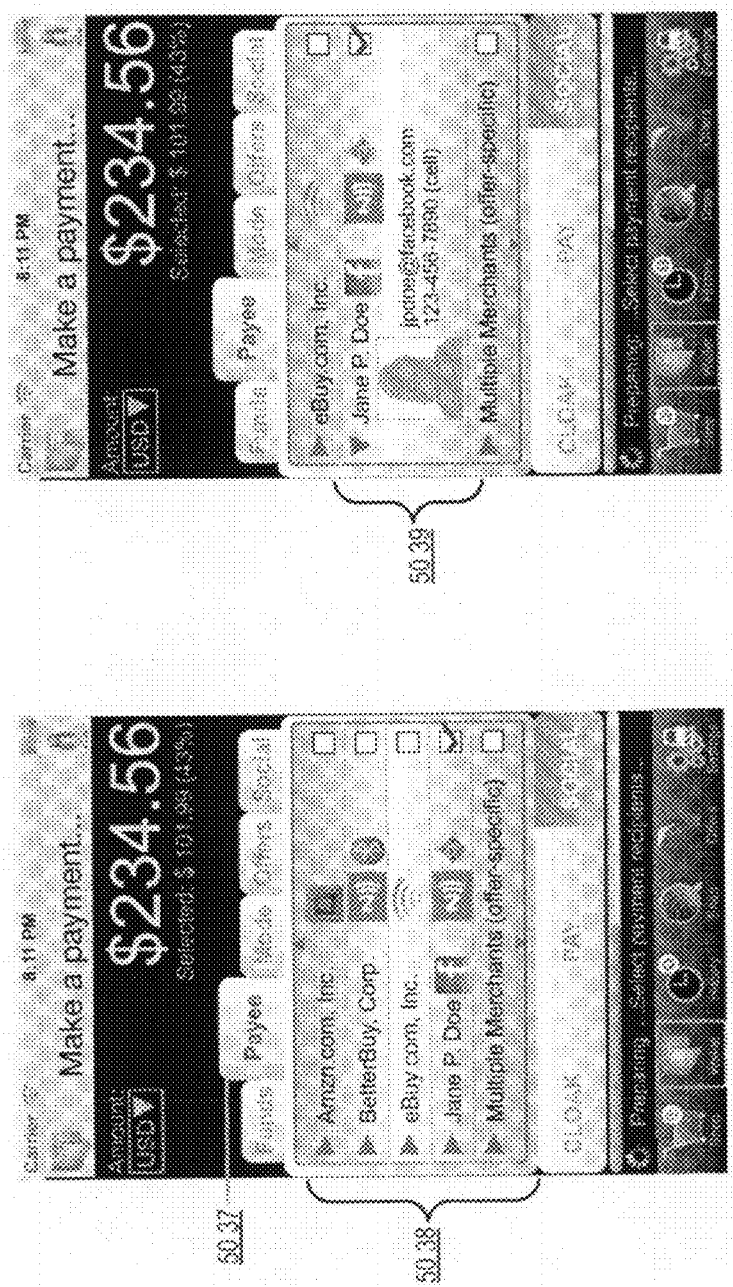

With reference to FIG. 50C, in one embodiment, the payee tab 5037 in the wallet mobile application user interface may facilitate user selection of one or more payees receiving the funds selected in the funds tab. In one implementation, the user interface may show a list of all payees 5038 with whom the user has previously transacted or available to transact. The user may then select one or more payees. The payees 5038 may include larger merchants such as Amazon.com Inc., and individuals such as Jane P. Doe. Next to each payee name, a list of accepted payment modes for the payee may be displayed. In one implementation, the user may select the payee Jane P. Doe 5039 for receiving payment. Upon selection, the user interface may display additional identifying information relating to the payee.

Figure 50D:
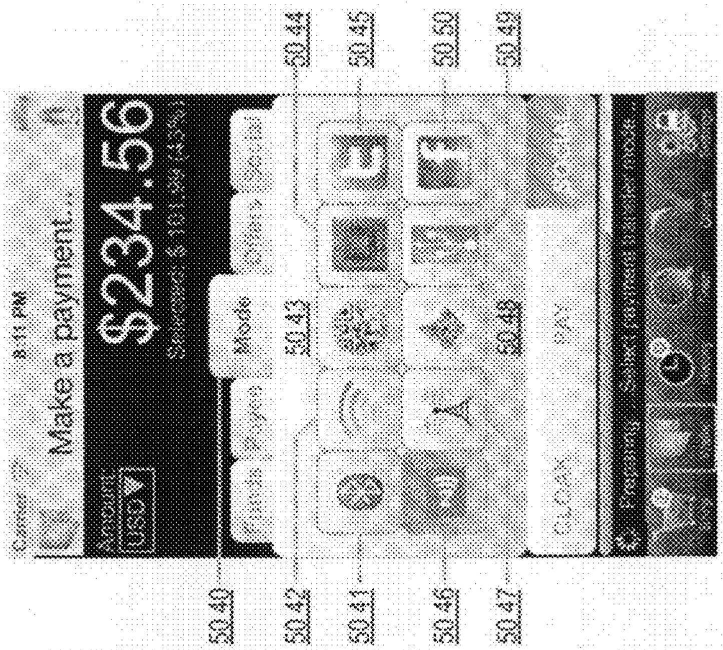

With reference to FIG. 50D, in one embodiment, the mode tab 5040 may facilitate selection of a payment mode accepted by the payee. A number of payment modes may be available for selection. Example modes include, blue tooth 5041, wireless 5042, snap mobile by user-obtained QR code 5043, secure chip 5044, TWITTER 5045, near-field communication (NFC) 5046, cellular 5047, snap mobile by user-provided QR code 5048, USB 5049 and FACEBOOK 5050, among others. In one implementation, only the payment modes that are accepted by the payee may be selectable by the user. Other non-accepted payment modes may be disabled.

Figure 50E:
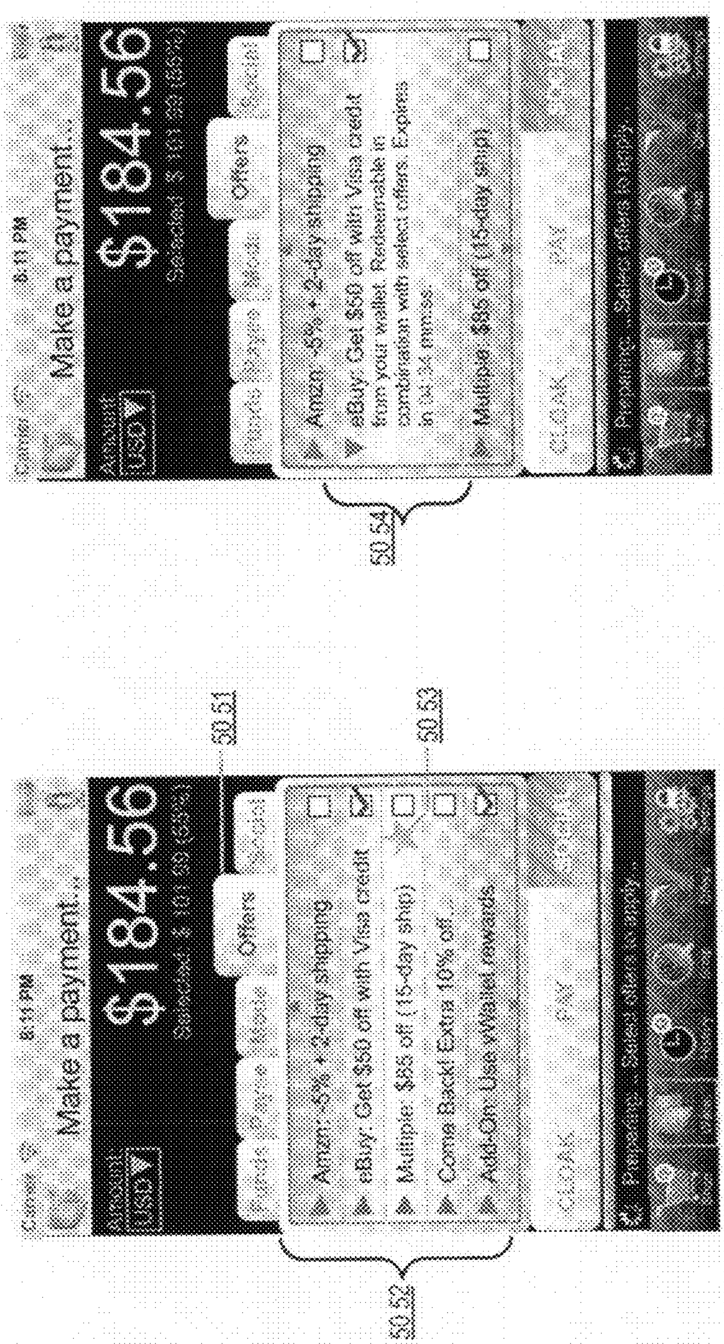

With reference to FIG. 50E, in one embodiment, the offers tab 5051 may provide real-time offers that are relevant to items in a user's cart for selection by the user. The user may select one or more offers from the list of applicable offers 5052 for redemption. In one implementation, some offers may be combined, while others may not. When the user selects an offer that may not be combined with another offer, the unselected offers may be disabled. In a further implementation, offers that are recommended by the wallet application's recommendation engine may be identified by an indicator, such as the one shown by 5053. In a further implementation, the user may read the details of the offer by expanding the offer row as shown by 5054 in the user interface.

Figure 50F:
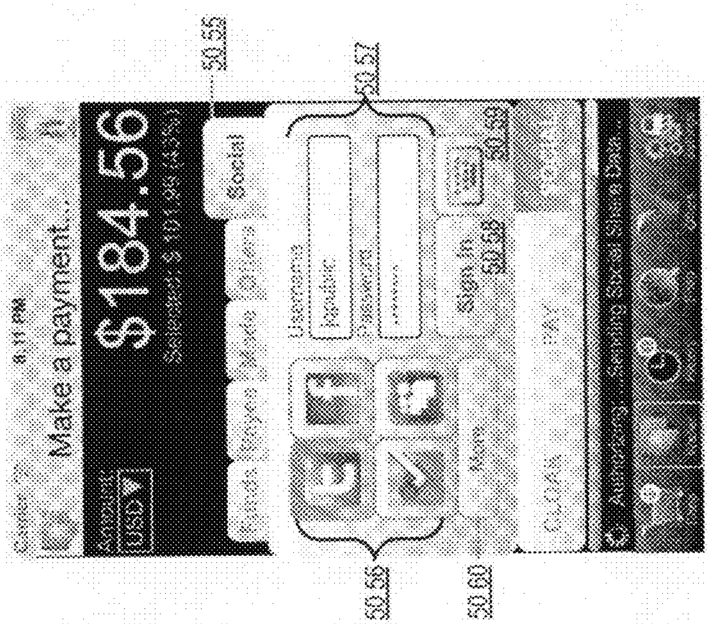

With reference to FIG. 50F, in one embodiment, the social tab 5055 may facilitate integration of the wallet application with social channels 5056. In one implementation, a user may select one or more social channels 5056 and may sign in to the selected social channel from the wallet application by providing to the wallet application the social channel user name and password 5057 and signing in 5058. The user may then use the social button 5059 to send or receive money through the integrated social channels. In a further implementation, the user may send social share data such as purchase information or links through integrated social channels. In another embodiment, the user supplied login credentials may allow UEP to engage in interception parsing.

Figure 51:
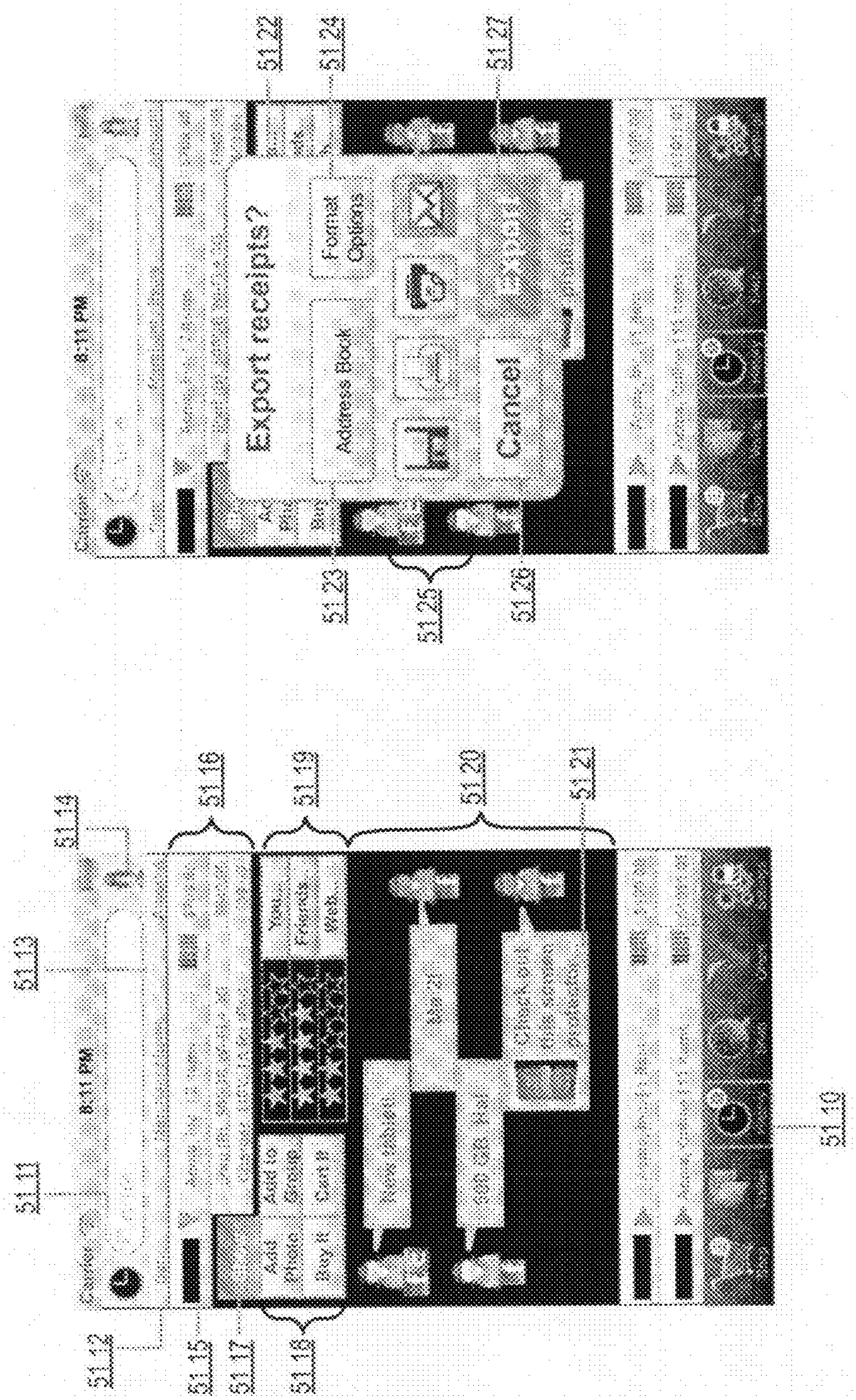
FIG. 51 shows a user interface diagram illustrating example features of virtual wallet applications, in a history mode, in some embodiments of the UEP.

FIG. 51 shows a user interface diagram illustrating example features of virtual wallet applications, in a history mode, in some embodiments of the UEP. In one embodiment, a user may select the history mode 5110 to view a history of prior purchases and perform various actions on those prior purchases. For example, a user may enter a merchant identifying information such as name, product, MCC, and/or the like in the search bar 5111. In another implementation, the user may use voice activated search feature by clicking on the microphone icon 5114. The wallet application may a query the storage areas in the mobile device or elsewhere (e.g., one or more databases and/or tables remote from the mobile device) for transactions matching the search keywords. The user interface may then display the results of the query such as transaction 5115. The user interface may also identify the date 5112 of the transaction, the merchants and items 5113 relating to the transaction, a barcode of the receipt confirming that a transaction was made, the amount of the transaction and any other relevant information.

In one implementation, the user may select a transaction, for example transaction 5115, to view the details of the transaction. For example, the user may view the details of the items associated with the transaction and the amounts 5116 of each item. In a further implementation, the user may select the show option 5117 to view actions 5118 that the user may take in regards to the transaction or the items in the transaction. For example, the user may add a photo to the transaction (e.g., a picture of the user and the iPad the user bought). In a further implementation, if the user previously shared the purchase via social channels, a post including the photo may be generated and sent to the social channels for publishing. In one implementation, any sharing may be optional, and the user, who did not share the purchase via social channels, may still share the photo through one or more social channels of his or her choice directly from the history mode of the wallet application. In another implementation, the user may add the transaction to a group such as company expense, home expense, travel expense or other categories set up by the user. Such grouping may facilitate year-end accounting of expenses, submission of work expense reports, submission for value added tax (VAT) refunds, personal expenses, and/or the like. In yet another implementation, the user may buy one or more items purchased in the a transaction. The user may then execute a transaction without going to the merchant catalog or site to find the items. In a further implementation, the user may also cart one or more items in the transaction for later purchase.

The history mode, in another embodiment, may offer facilities for obtaining and displaying ratings 5119 of the items in the transaction. The source of the ratings may be the user, the user's friends (e.g., from social channels, contacts, etc.), reviews aggregated from the web, and/or the like. The user interface in some implementations may also allow the user to post messages to other users of social channels (e.g., TWITTER or FACEBOOK). For example, the display area 5120 shows FACEBOOK message exchanges between two users. In one implementation, a user may share a link via a message 5121. Selection of such a message having embedded link to a product may allow the user to view a description of the product and/or purchase the product directly from the history mode.

In one embodiment, the history mode may also include facilities for exporting receipts. The export receipts pop up 5122 may provide a number of options for exporting the receipts of transactions in the history. For example, a user may use one or more of the options 5125, which include save (to local mobile memory, to server, to a cloud account, and/or the like), print to a printer, fax, email, and/or the like. The user may utilize his or her address book 5123 to look up email or fax number for exporting. The user may also specify format options 5124 for exporting receipts. Example format options may include, without limitation, text files (.doc, .txt, .rtf, iif, etc.), spreadsheet (.csv, .xls, etc.), image files (.jpg, .tff, .png, etc.), portable document format (.pdf), postscript (.ps), and/or the like. The user may then click or tap the export button 5127 to a initiate export of receipts.

Figure 52A:
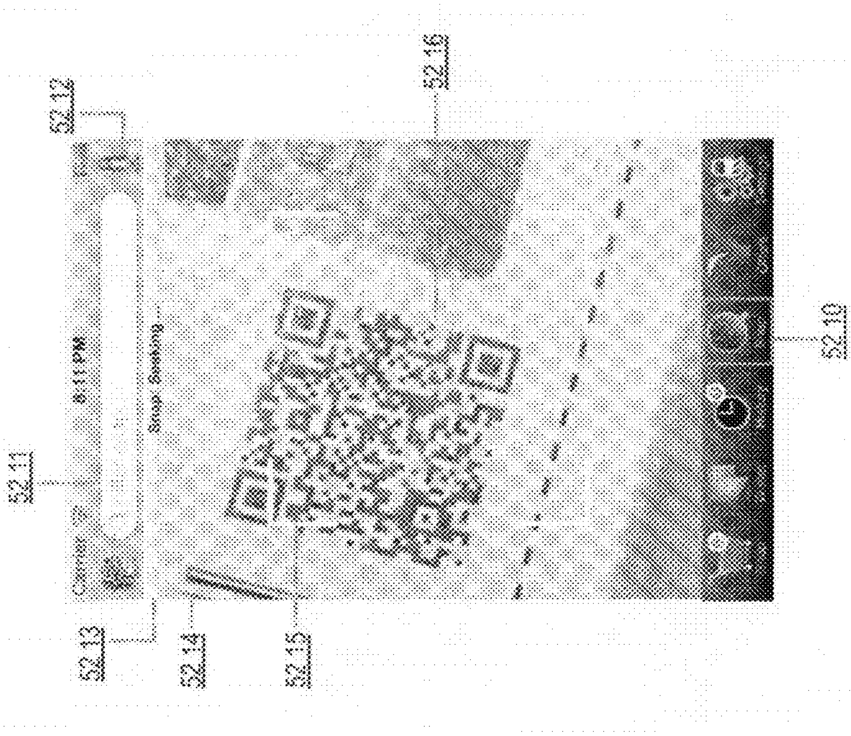
FIGS. 52A-E show user interface diagrams illustrating example features of virtual wallet applications in a snap mode, in some embodiments of the UEP.

FIGS. 52A-E show user interface diagrams illustrating example features of virtual wallet applications in a snap mode, in some embodiments of the UEP. With reference to FIG. 52A, in one embodiment, a user may select the snap mode 2110 to access its snap features. The snap mode may handle any machine-readable representation of data. Examples of such data may include linear and 2D bar codes such as UPC code and QR codes. These codes may be found on receipts, product packaging, and/or the like. The snap mode may also process and handle pictures of receipts, products, offers, credit cards or other payment devices, and/or the like. An example user interface in snap mode is shown in FIG. 52A. A user may use his or her mobile phone to take a picture of a QR code 5215 and/or a barcode 5214. In one implementation, the bar 5213 and snap frame 5215 may assist the user in snapping codes properly. For example, the snap frame 5215, as shown, does not capture the entirety of the code 5216. As such, the code captured in this view may not be resolvable as information in the code may be incomplete. This is indicated by the message on the bar 5213 that indicates that the snap mode is still seeking the code. When the code 5216 is completely framed by the snap frame 5215, the bar message may be updated to, for example, "snap found." Upon finding the code, in one implementation, the user may initiate code capture using the mobile device camera. In another implementation, the snap mode may automatically snap the code using the mobile device camera.

Figure 52B:
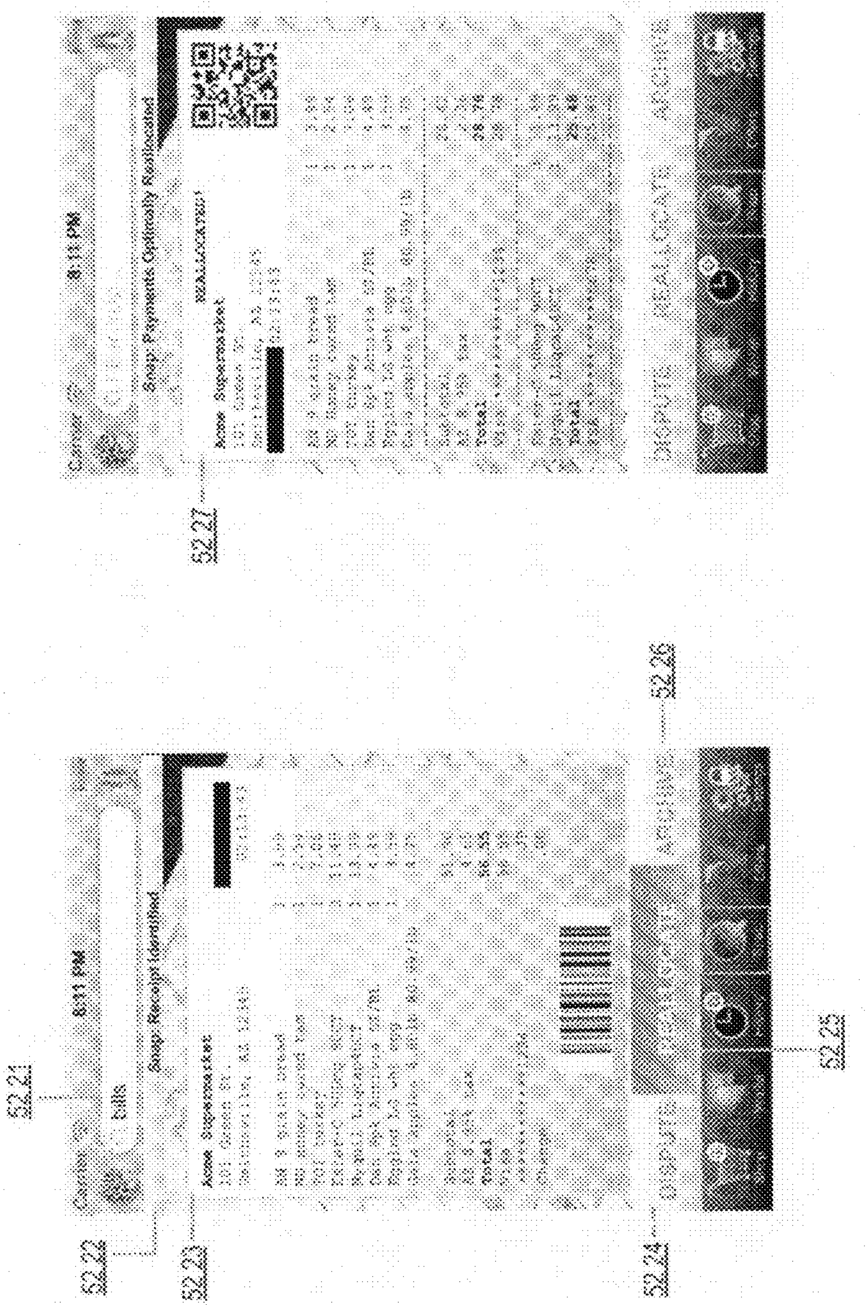

With reference to FIG. 52B, in one embodiment, the snap mode may facilitate payment reallocation post transaction. For example, a user may buy grocery and prescription items from a retailer Acme Supermarket. The user may, inadvertently or for ease of checkout for example, use his or her Visa card to pay for both grocery and a prescription items. However, the user may have an FSA account that could be used to a pay for prescription items, and which would provide the user tax benefits. In such a situation, the user may use the snap mode to initiate transaction reallocation.

As shown, the user may enter a search term (e.g., bills) in the search bar 2121. The user may then identify in the tab 5222 the receipt 5223 the user wants to reallocate. Alternatively, the user may directly snap a picture of a barcode on a receipt, and the snap mode may generate and display a receipt 5223 using information from the barcode. The user may now reallocate 5225. In some implementations, the user may also dispute the transaction 5224 or archive the receipt 5226.

In one implementation, when the reallocate button 5225 is selected, the wallet application may perform optical character recognition (OCR) of the receipt. Each of the items in the receipt may then be examined to identify one or more items which could be charged to which payment device or account for tax or other benefits such as cash back, reward points, etc. In this example, there is a tax benefit if the prescription medication charged to the user's Visa card is charged to the user's FSA. The wallet application may then perform the reallocation as the back end. The reallocation process may include the wallet contacting the payment processor to credit the amount of the prescription medication to the Visa card and debit the same amount to the user's FSA account. In an alternate implementation, the payment processor (e.g., Visa or MasterCard) may obtain and OCR the receipt, identify items and payment accounts for reallocation and perform the reallocation. In one implementation, the wallet application may request the user to confirm reallocation of charges for the selected items to another payment account. The receipt 5227 may be generated after the completion of the a reallocation process. As discussed, the receipt shows that some charges have been moved from the Visa account to the FSA.

Figure 52C:
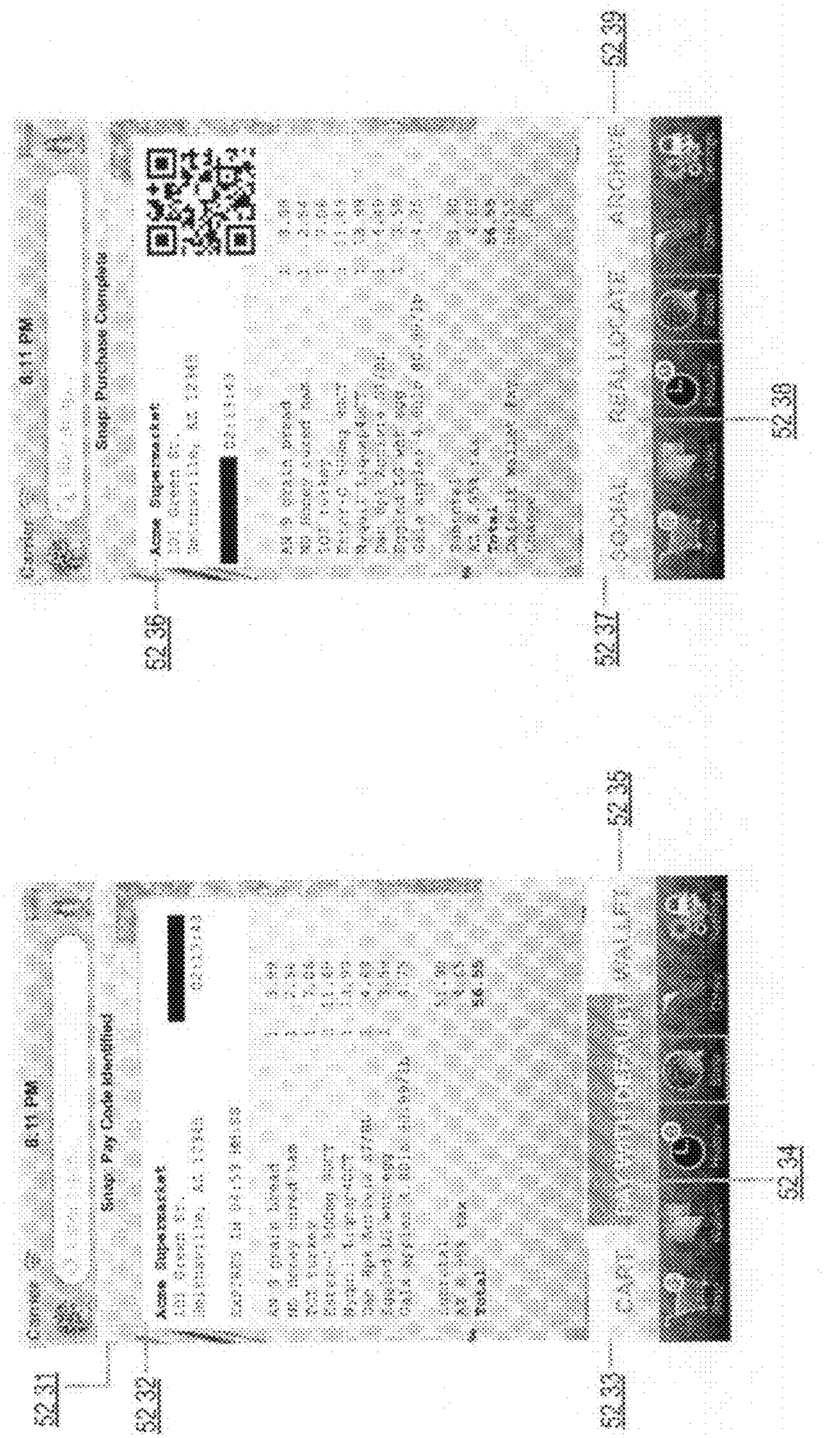

With reference to FIG. 52C, in one embodiment, the snap mode may facilitate payment via pay code such as barcodes or QR codes. For example, a user may snap a QR code of a transaction that is not yet complete. The QR code may be displayed at a merchant POS terminal, a web site, or a web application and may be encoded with information identifying items for purchase, merchant details and other relevant information. When the user snaps such as a QR code, the snap mode may decode the information in the QR code and may use the decoded information to generate a receipt 5232. Once the QR code is identified, the navigation bar 5231 may indicate that the pay code is identified. The user may now have an option to add to cart 5233, pay with a default payment account 5234 or pay with wallet 5235.

In one implementation, the user may decide to pay with default 5234. The wallet application may then use the user's default method of payment, in this example the wallet, to complete the purchase transaction. Upon completion of the transaction, a receipt may be automatically generated for proof of purchase. The user interface may also be updated to provide other options for handling a completed transaction. Example options include social 5237 to share purchase information with others, reallocate 5238 as discussed with regard to FIG. 52B, and archive 5239 to store the receipt.

Figure 52D:

With reference to FIG. 52D, in one embodiment, the snap mode may also facilitate offer identification, application and storage for future use. For example, in one implementation, a user may snap an offer code 5241 (e.g., a bar code, a QR code, and/or the like). The wallet application may then generate an offer text 5242 from the information encoded in the offer code. The user may perform a number of actions on the offer code. For example, the user use the find button 5243 to find all merchants who accept the offer code, merchants in the proximity who accept the offer code, products from merchants that qualify for the offer code, and/or the like. The user may also apply the offer code to items that are currently in the cart using the add to cart button 5244. Furthermore, the user may also save the offer for future use by selecting the save button 5245.

In one implementation, after the offer or coupon 5246 is applied, the user may have the option to find qualifying merchants and/or products using find, the user may go to the wallet using 5248, and the user may also save the offer or coupon 5246 for later use.

Figure 52E:
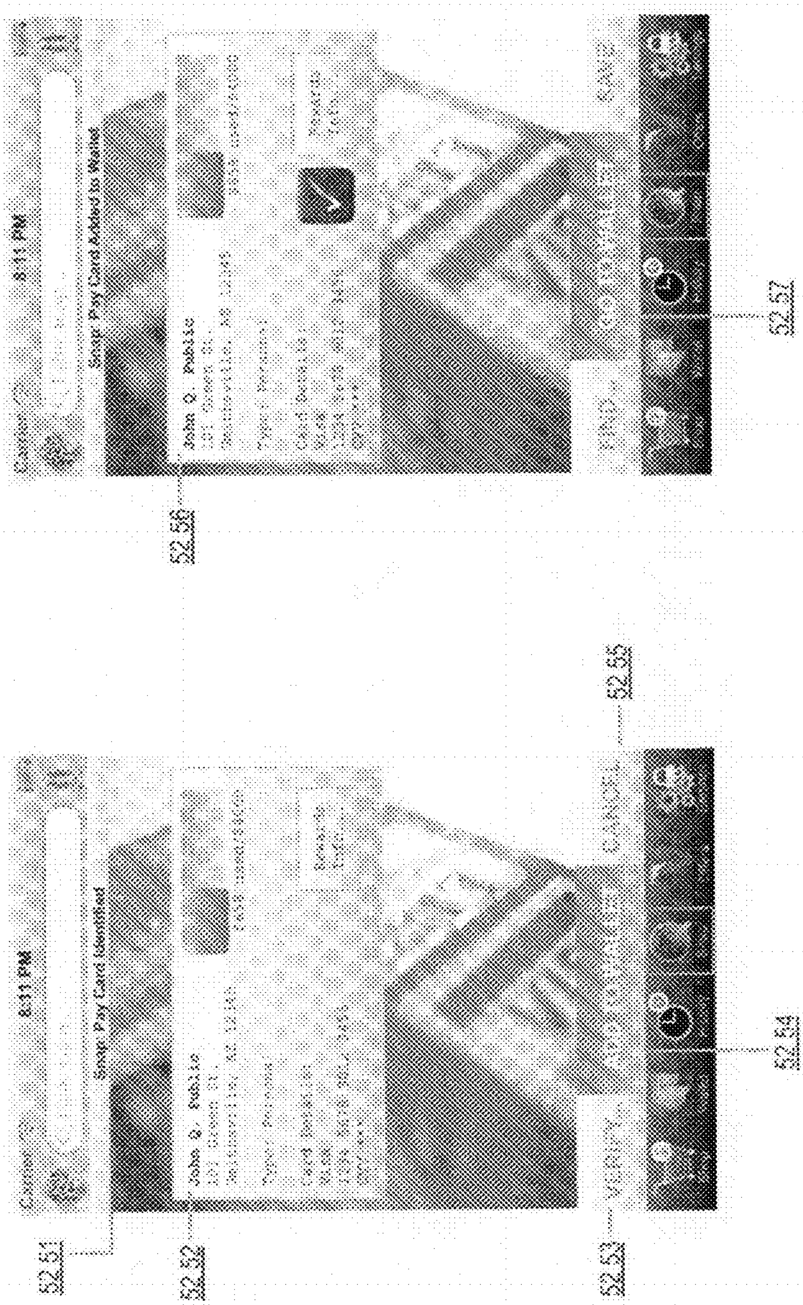

With reference to FIG. 52E, in one embodiment, the snap mode may also offer facilities for adding a funding source to the wallet application. In one implementation, a pay card such as a credit card, debit card, pre-paid card, smart card and other pay accounts may have an associated code such as a bar code or QR code. Such a code may have encoded therein pay card information including, but not limited to, name, address, pay card type, pay card account details, balance amount, spending limit, rewards balance, and/or the like. In one implementation, the code may be found on a face of the physical pay card. In another implementation, the code may be obtained by accessing an associated online account or another secure location. In yet another implementation, the code may be printed on a letter accompanying the pay card. A user, in one implementation, may snap a picture of the code. The wallet application may identify the pay card 5251 and may display the textual information 5252 encoded in the a pay card. The user may then perform verification of the information 5252 by selecting the verify button 5253. In one implementation, the verification may include contacting the issuer of the pay card for confirmation of the decoded information 5252 and any other relevant information. In one implementation, the user may add the pay card to the wallet by selecting the 'add to wallet' button 5254. The instruction to add the pay card to the wallet may cause the pay card to appear as one of the forms of payment under the funds tab 5016 discussed in FIG. 50A. The user may also cancel importing of the pay card as a funding source by selecting the cancel button 5255. When the pay card has been added to the wallet, the user interface may be updated to indicate that the importing is complete via the notification display 5256. The user may then access the wallet 5257 to begin using the added pay card as a funding source.

Figure 53:
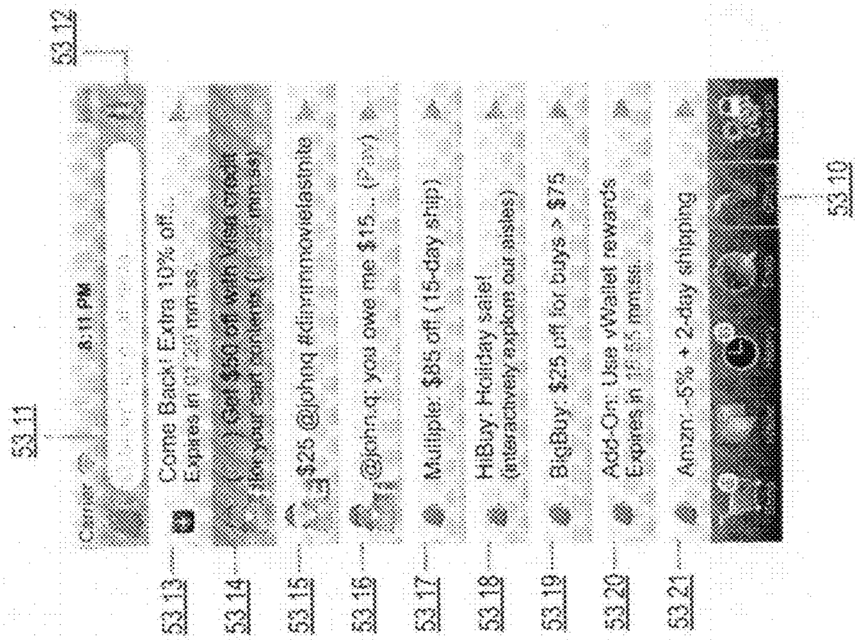
FIG. 53 shows a user interface diagram illustrating example features of virtual wallet applications, in an offers mode, in some embodiments of the UEP.

FIG. 53 shows a user interface diagram illustrating example features of virtual wallet applications, in an offers mode, in some embodiments of the UEP. In some implementations, the UEP may allow a user to search for offers for products and/or services from within the virtual wallet mobile application. For example, the user may enter text into a graphical user interface ("GUI") element 5311, or issue voice commands by activating GUI element 5312 and speaking commands into the device. In some implementations, the UEP may provide offers based on the user's prior behavior, demographics, current location, current cart selection or purchase items, and/or the like. For example, if a user is in a brick-and-mortar store, or an online shopping website, and leaves the (virtual) store, then the merchant associated with the store may desire to provide a sweetener deal to entice the consumer back into the (virtual) store. The merchant may provide such an offer 5313. For example, the offer may provide a discount, and may include an expiry time. In some implementations, other users may a provide gifts (e.g., 5314) to the user, which the user may redeem. In some implementations, the offers section may include alerts as to payment of funds outstanding to other users (e.g., 5315). In some implementations, the offers section may include alerts as to requesting receipt of funds from other users (e.g., 5316). For example, such a feature may identify funds receivable from other applications (e.g., mail, calendar, tasks, notes, reminder programs, alarm, etc.), or by a manual entry by the user into the virtual wallet application. In some implementations, the offers section may provide offers from participating merchants in the UEP, e.g., 5317-5319, 5320. These offers may sometimes be assembled using a combination of participating merchants, e.g., 5317. In some implementations, the UEP itself may provide offers for users contingent on the user utilizing particular payment forms from within the virtual wallet application, e.g., 5320.

Figure 54A:
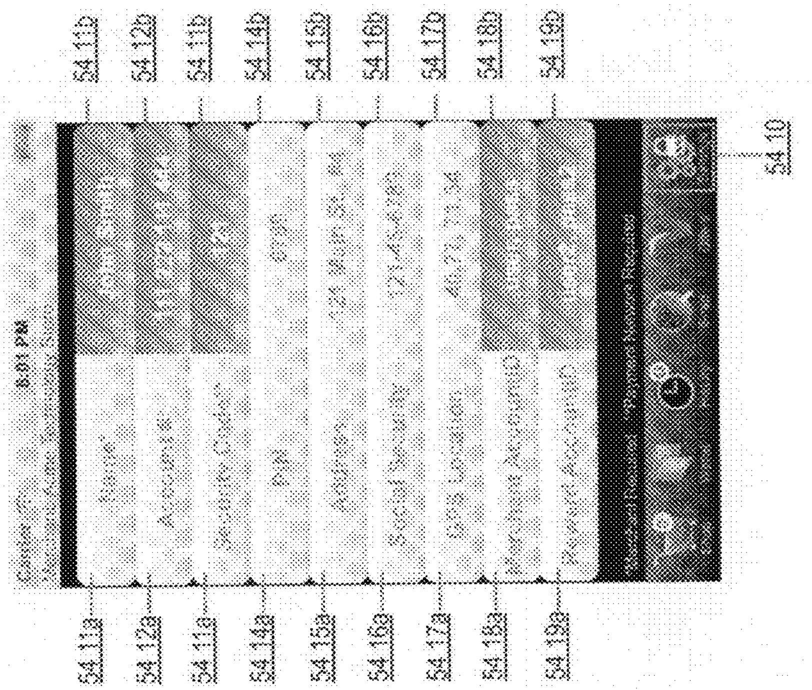
FIGS. 54A-B show user interface diagrams illustrating example features of virtual wallet applications, in a security and privacy mode, in some embodiments of the UEP.
Figure 54B:
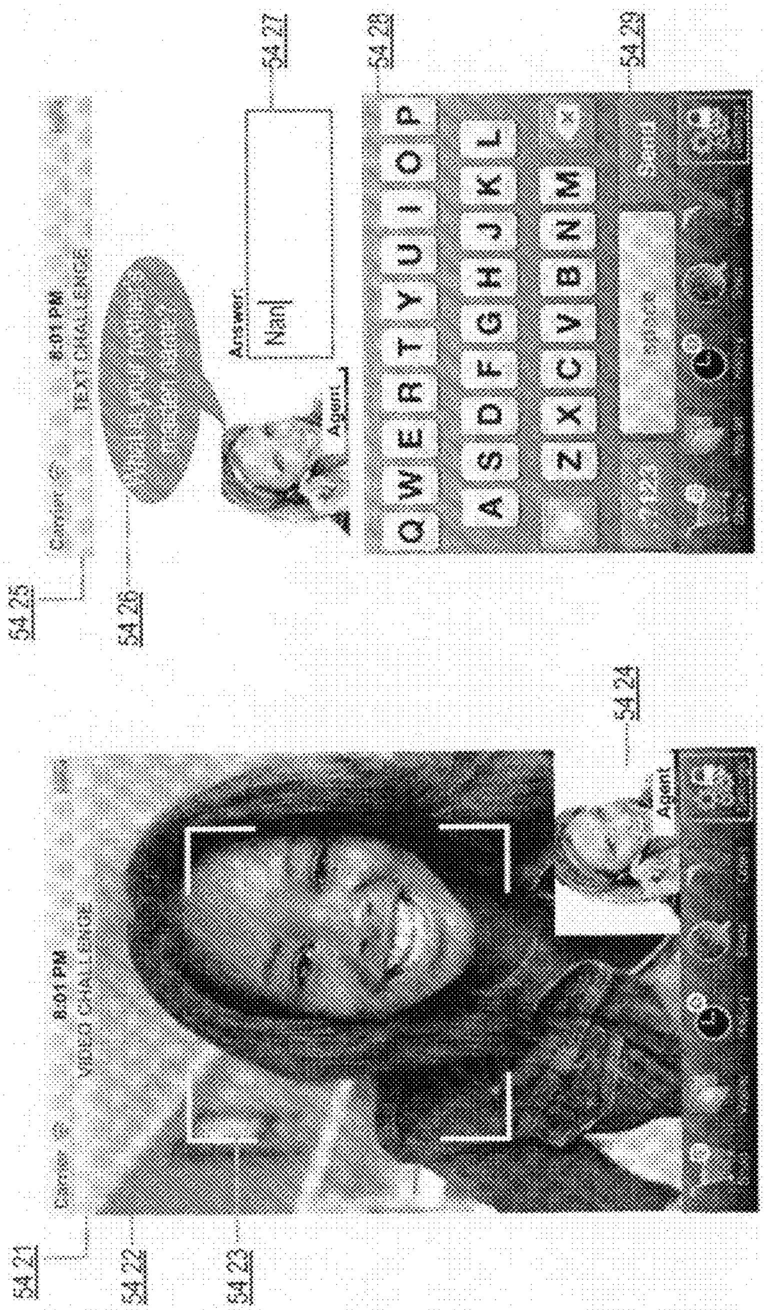

FIGS. 54A-B show user interface diagrams illustrating example features of virtual wallet applications, in a security and privacy mode, in some embodiments of the UEP. With reference to FIG. 54A, in some implementations, the user may be able to view and/or modify the user profile and/or settings of the user, e.g., by activating a user interface element. For example, the user may be able to view/modify a user name (e.g., 5411*a*-*b*), account number (e.g., 5412*a*-*b*), user security access code (e.g., 5413-*b*), user pin (e.g., 5414-*b*), user address (e.g., 5415-*b*), social security number associated with the user (e.g., 5416-*b*), current device GPS location (e.g., 5417-*b*), user account of the merchant in whose store the user currently is (e.g., 5418-*b*), the user's rewards accounts (e.g., 5419-*b*), and/or the like. In some implementations, the user may be able to select which of the data fields and their associated values should be transmitted to facilitate the purchase transaction, thus a providing enhanced data security for the user. For example, in the example illustration in FIG. 54A, the user has selected the name 5411*a*, account number 5412*a*, security code 5413*a*, merchant account ID 5418*a* and rewards account ID 5419*a* as the fields to be sent as part of the notification to process the purchase transaction. In some implementations, the user may toggle the fields and/or data values that are sent as part of the notification to process the purchase transactions. In some implementations, the app may provide multiple screens of data fields and/or associated values stored for the user to select as part of the purchase order transmission. In some implementations, the app may provide the UEP with the GPS location of the user. Based on the GPS location of the user, the UEP may determine the context of the user (e.g., whether the user is in a store, doctor's office, hospital, postal service office, etc.). Based on the context, the user app may present the appropriate fields to the user, from which the user may select fields and/or field values to send as part of the purchase order transmission.

For example, a user may go to doctor's office and desire to pay the co-pay for doctor's appointment. In addition to basic transactional information such as account number and name, the app may provide the user the ability to select to transfer medical records, health information, which may be provided to the medical provider, insurance company, as well as the transaction processor to reconcile payments between the parties. In some implementations, the records may be sent in a Health Insurance Portability and Accountability Act (HIPAA)-compliant data format and encrypted, and only the recipients who are authorized to view such records may have appropriate decryption keys to decrypt and view the private user information.

With reference to FIG. 54B, in some implementations, the app executing on the user's device may provide a "VerifyChat" feature for fraud prevention. For example, the UEP may detect an unusual and/or suspicious transaction. The UEP may utilize the VerifyChat feature to communicate with the user, and verify the authenticity of the originator of the purchase transaction. In various implementations, the UEP may send electronic mail message, text (SMS) messages, Facebook® messages, Twitter™ tweets, text chat, voice chat, video chat (e.g., Apple FaceTime), and/or the like to communicate with the user. For example, the UEP may initiate a video challenge for the user, e.g., 5421. For example, the user may need to present him/her-self via a video chat, e.g., 5422. In some implementations, a customer service representative, e.g., agent 5424, may manually determine the authenticity of the user using the video of the user. In some implementations, the UEP may utilize face, biometric and/or like recognition (e.g., using pattern classification techniques) to determine the identity of the user. In some implementations, the app may provide reference marker (e.g., cross-hairs, target box, etc.), e.g., 5423, so that the user may the video to facilitate the UEP's automated recognition of the user. In some implementations, the user may not have initiated the transaction, e.g., the transaction is fraudulent. In such implementations, the user may cancel the challenge. The UEP may then cancel the transaction, and/or initiate fraud investigation procedures on behalf of the user.

In some implementations, the UEP may utilize a text challenge procedure to verify the authenticity of the user, e.g., 5425. For example, the UEP may communicate with the user via text chat, SMS messages, electronic mail, Facebook® messages, Twitter™ tweets, and/or the like. The UEP may pose a challenge question, e.g., 5426, for the user. The app may provide a user input interface element(s) (e.g., virtual keyboard 5428) to answer the challenge question posed by the UEP. In some implementations, the challenge question may be randomly selected by the UEP a automatically; in some implementations, a customer service representative may manually communicate with the user. In some implementations, the user may not have initiated the transaction, e.g., the transaction is fraudulent. In such implementations, the user may cancel the text challenge. The UEP may cancel the transaction, and/or initiate fraud investigation on behalf of the user.

UEP Transaction Platform

Figure 55:
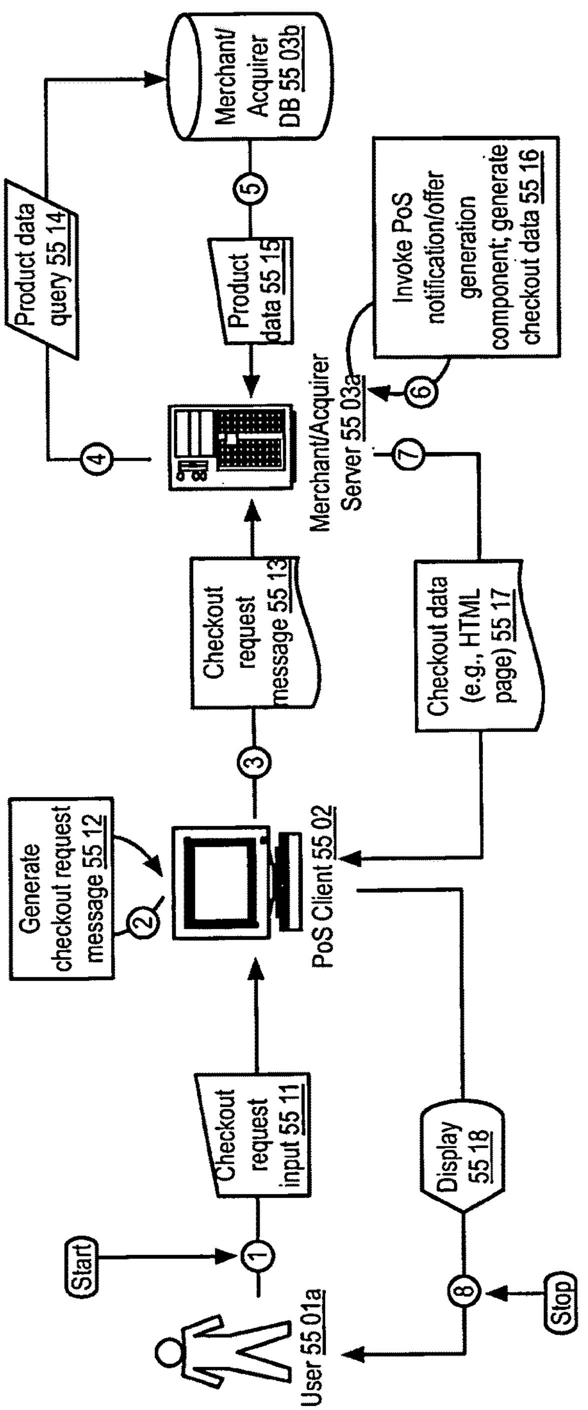
FIG. 55 shows a data flow diagram illustrating an example user purchase checkout procedure in some embodiments of the UEP.

FIG. 55 shows a data flow diagram illustrating an example user purchase checkout procedure in some embodiments of the UEP. In some embodiments, a user, e.g., 55001*a*, may desire to purchase a product, service, offering, and/or the like ("product"), from a merchant via a merchant online site or in the merchant's store. The user may communicate with a merchant/acquirer ("merchant") server, e.g., 5503*a*, via a client such as, but not limited to: a personal computer, mobile device, television, point-of-sale terminal, kiosk, ATM, and/or the like (e.g., 5502). For example, the user may provide user input, e.g., checkout input 5511, into the client indicating the user's desire to purchase the product. In various embodiments, the user input may include, but not be limited to: a single tap (e.g., a one-tap mobile app purchasing embodiment) of a touchscreen interface, keyboard entry, card swipe, activating a RFID/NFC enabled hardware device (e.g., electronic card having multiple accounts, smartphone, tablet, etc.) within the user device, mouse clicks, depressing buttons on a joystick/game console, voice commands, single/multi-touch gestures on a touch-sensitive interface, touching user interface elements on a touch-sensitive display, and/or the like. As an example, a user in a merchant store may scan a product barcode of the product via a barcode scanner at a point-of-sale terminal. As another example, the user may select a a product from a webpage catalog on the merchant's website, and add the product to a virtual shopping cart on the merchant's website. The user may then indicate the user's desire to checkout the items in the (virtual) shopping cart. For example, the user may activate a user interface element provided by the client to indicate the user's desire to complete the user purchase checkout. The client may generate a checkout request, e.g., 5512, and provide the checkout request, e.g., 5513, to the merchant server. For example, the client may provide a (Secure) Hypertext Transfer Protocol ("HTTP(S)") POST message including the product details for the merchant server in the form of data formatted according to the eXtensible Markup Language ("XML"). An example listing of a checkout request 5512, substantially in the form of a HTTP(S) POST message including XML-formatted data, is provided below:

```
POST /checkoutrequest.php HTTP/1.1
Host: www.merchant.com
Content-Type: Application/XML
Content-Length: 667
<?XML version = "1.0" encoding = "UTF-8"?>
<checkout_request>
    <checkout_ID>4NFU4RG94</checkout_ID>
    <timestamp>2011-02-22 15:22:43</timestamp>
    <purchase_detail>
        <num_products>5</num_products>
        <product_ID>AE95049324</product_ID>
        <product_ID>MD09808755</product_ID>
        <product_ID>OC12345764</product_ID>
        <product_ID>KE76549043</product_ID>
        <product_ID>SP27674509</product_ID>
    </purchase_detail>
<!--optional parameters-->
    <user_ID>john.q.public@gmail.com</user_ID>
    <PoS_client_detail>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
    </PoS_client_detail>
</checkout_request>
```

In some embodiments, the merchant server may obtain the checkout request from the client, and extract the checkout detail (e.g., XML data) from the checkout request. For example, the merchant server may utilize a parser such as the example parsers described below in the discussion with reference to FIG. 61. Based on parsing the checkout request 5512, the merchant server may extract product data (e.g., product identifiers), as well as available PoS client data, from the checkout request. In some embodiments, using the product data, the merchant server may query, e.g., 5514, a merchant/acquirer ("merchant") database, e.g., 5503*b*, to obtain product data, e.g., 5515, such as product information, product pricing, sales tax, offers, discounts, rewards, and/or other information to process the purchase transaction and/or provide value-added services for the user. For example, the merchant database may be a relational database responsive to Structured Query Language ("SQL") commands. The merchant server may execute a hypertext preprocessor ("PHP") script including SQL commands to query a database table (such as FIG. 61, Products 61191) for product data. An example product data query 5514, substantially in the form of PHP/SQL commands, is provided below:

```
<?PHP
header('Content-Type: text/plain');
mysql_connect("254.93.179.112",$DBserver,$password); // access
database server
mysql_select_db("UEP_DB.SQL"); // select database table to search
//create query
$query = "SELECT product_title product_attributes_list product_price
    tax_info_list related_products_list offers_list discounts_list
    rewards_list merchants_list merchant_availability_list
    FROM ProductsTable WHERE product_ID LIKE '%' $prodID";
$result = mysql_query($query); // perform the search query
mysql_close("UEP_DB.SQL"); // close database access
?>
```

In some embodiments, in response to obtaining the product data, the merchant server may generate, e.g., 5516, checkout data to provide for the PoS client. In some embodiments, such checkout data, e.g., 5517, may be embodied, in part, in a HyperText Markup Language ("HTML") page including data for display, such as product detail, product pricing, total pricing, tax information, shipping information, offers, discounts, rewards, value-added service information, etc., and input fields to provide payment information to process the purchase transaction, such as account holder name, account number, billing address, shipping address, tip amount, etc. In some embodiments, the checkout data may be embodied, in part, in a Quick Response ("QR") code image that the PoS client can display, so that the user may capture the QR code using a user's device to obtain merchant and/or product data for generating a purchase transaction processing request. In some embodiments, a user alert mechanism may be built into the checkout data. For example, the merchant server may embed a URL specific to the transaction into the checkout data. In some embodiments, the alerts URL may further be embedded into optional level 3 data in card authorization requests, such as those discussed further below with reference to FIGS. 57-58. The URL may point to a webpage, data file, executable script, etc., stored on the merchant's server dedicated to the transaction that is the subject of the card authorization request. For example, the object pointed to by the URL may include details on the purchase transaction, e.g., products being purchased, purchase cost, time expiry, status of order processing, and/or the like. Thus, the merchant server may provide to the payment a network the details of the transaction by passing the URL of the webpage to the payment network. In some embodiments, the payment network may provide notifications to the user, such as a payment receipt, transaction authorization confirmation message, shipping notification and/or the like. In such messages, the payment network may provide the URL to the user device. The user may navigate to the URL on the user's device to obtain alerts regarding the user's purchase, as well as other information such as offers, coupons, related products, rewards notifications, and/or the like. An example listing of a checkout data 5517, substantially in the form of XML formatted data, is provided below:

```
<?XML version = "1.0" encoding = "UTF-8"?>
<checkout_data>
    <session_ID>4NFU4RG94</session_ID>
    <timestamp>2011-02-22 15:22:43</timestamp>
    <expiry_lapse>00:00:30</expiry_lapse>
    <transaction_cost>$34.78</transaction_cost>
    <alerts_URL>www.merchant.com/shopcarts.php?sessionID=4NFU4RG94</alerts_URL>
    <!--optional data-->
    <user_ID>john.q.public@gmail.com</user_ID>
    <client_details>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
    </client_details>
    <purchase_details>
        <num_products>1</num_products>
        <product>
            <product_type>book</product_type>
            <product_params>
                <product_title>XML for dummies</product_title>
                <ISBN>938-2-14-168710-0</ISBN>
                <edition>2nd ed.</edition>
                <cover>hardbound</cover>
                <seller>bestbuybooks</seller>
            </product_params>
            <quantity>1</quantity>
        </product>
    </purchase_details>
    <offers_details>
        <num_offers>1</num_offers>
        <product>
            <product_type>book</product_type>
            <product_params>
                <product_title>Here's more XML</product_title>
                <ISBN>922-7-14-165720-1</ISBN>
                <edition>1nd ed.</edition>
                <cover>hardbound</cover>
                <seller>digibooks</seller>
            </product_params>
            <quantity>1</quantity>
        </product>
    </offers_details>
    <secure_element>www.merchant.com/securedyn/0394733/123.png</secure_element>
    <merchant_params>
        <merchant_id>3FBCR4INC</merchant_id>
        <merchant_name>Books & Things, Inc.</merchant_name>
        <merchant_auth_key>1NNF484MCP59CHB27365</merchant_auth_key>
    </merchant_params>
<checkout_data>
```

Upon obtaining the checkout data, e.g., 5517, the PoS client may render and display, e.g., 5518, the checkout data for the user.

Figure 56:
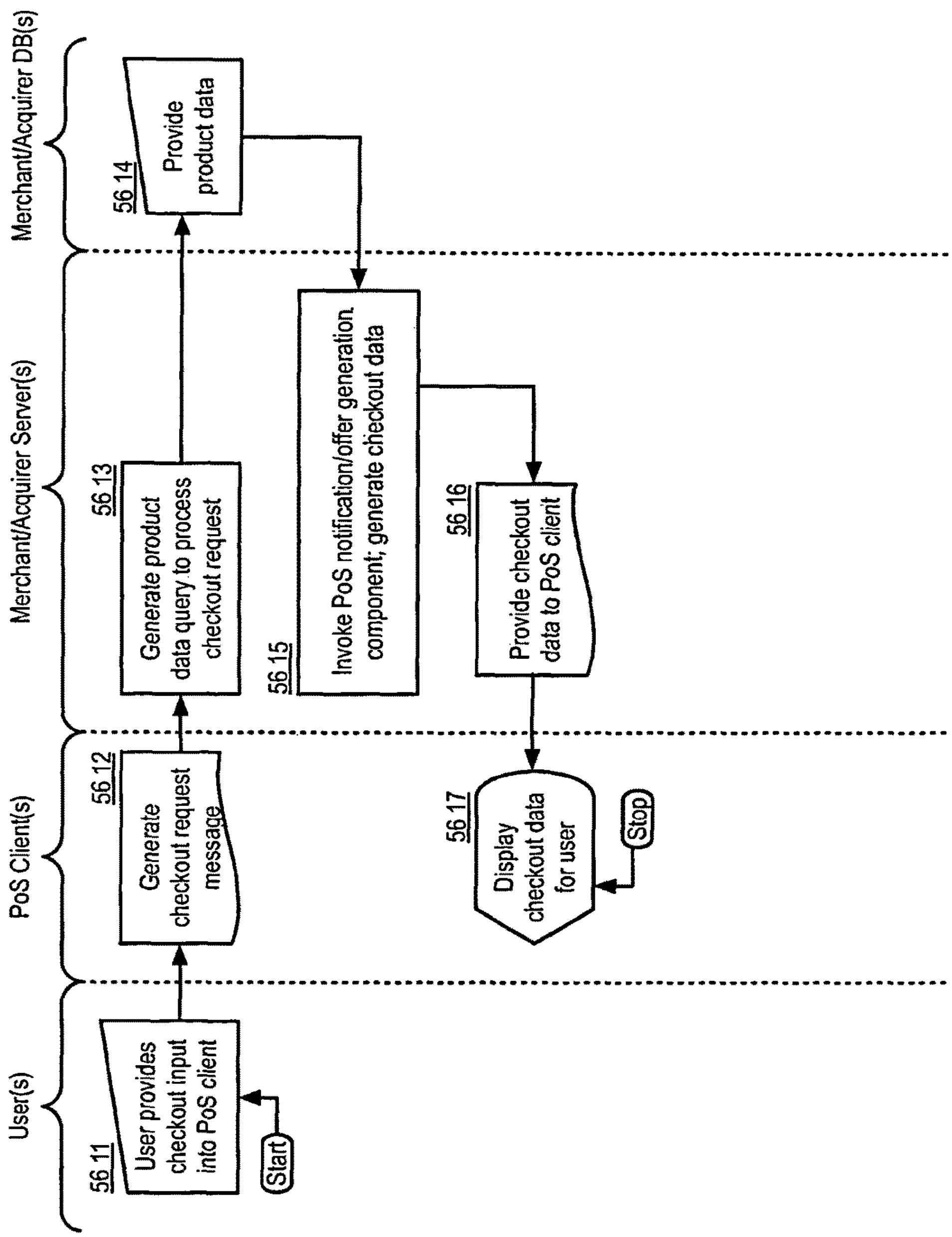
FIG. 56 shows a logic flow diagram illustrating example aspects of a user purchase checkout in some embodiments of the UEP, e.g., a User Purchase Checkout ("UPC") component 5600.

FIG. 56 shows a logic flow diagram illustrating example aspects of a user purchase checkout in some embodiments of the UEP, e.g., a User Purchase Checkout ("UPC") component 5600. In some embodiments, a user may desire to purchase a product, service, offering, and/or the like ("product"), from a merchant via a merchant online site or in the merchant's store. The user may communicate with a merchant/acquirer ("merchant") server via a PoS client. For example, the user may provide user input, e.g., 5601, into the client indicating the user's desire to purchase the a product. The client may generate a checkout request, e.g., 5602, and provide the checkout request to the merchant server. In some embodiments, the merchant server may obtain the checkout request from the client, and extract the checkout detail (e.g., XML data) from the checkout request. For example, the merchant server may utilize a parser such as the example parsers described below in the discussion with reference to FIG. 61. Based on parsing the checkout request, the merchant server may extract product data (e.g., product identifiers), as well as available PoS client data, from the checkout request. In some embodiments, using the product data, the merchant server may query, e.g., 5603, a merchant/acquirer ("merchant") database to obtain product data, e.g., 5604, such as product information, product pricing, sales tax, offers, discounts, rewards, and/or other information to process the purchase transaction and/or provide value-added services for the user. In some embodiments, in response to obtaining the product data, the merchant server may generate, e.g., 5605, checkout data to provide, e.g., 5606, for the PoS client. Upon obtaining the checkout data, the PoS client may render and display, e.g., 5607, the checkout data for the user.

Figure 57A:
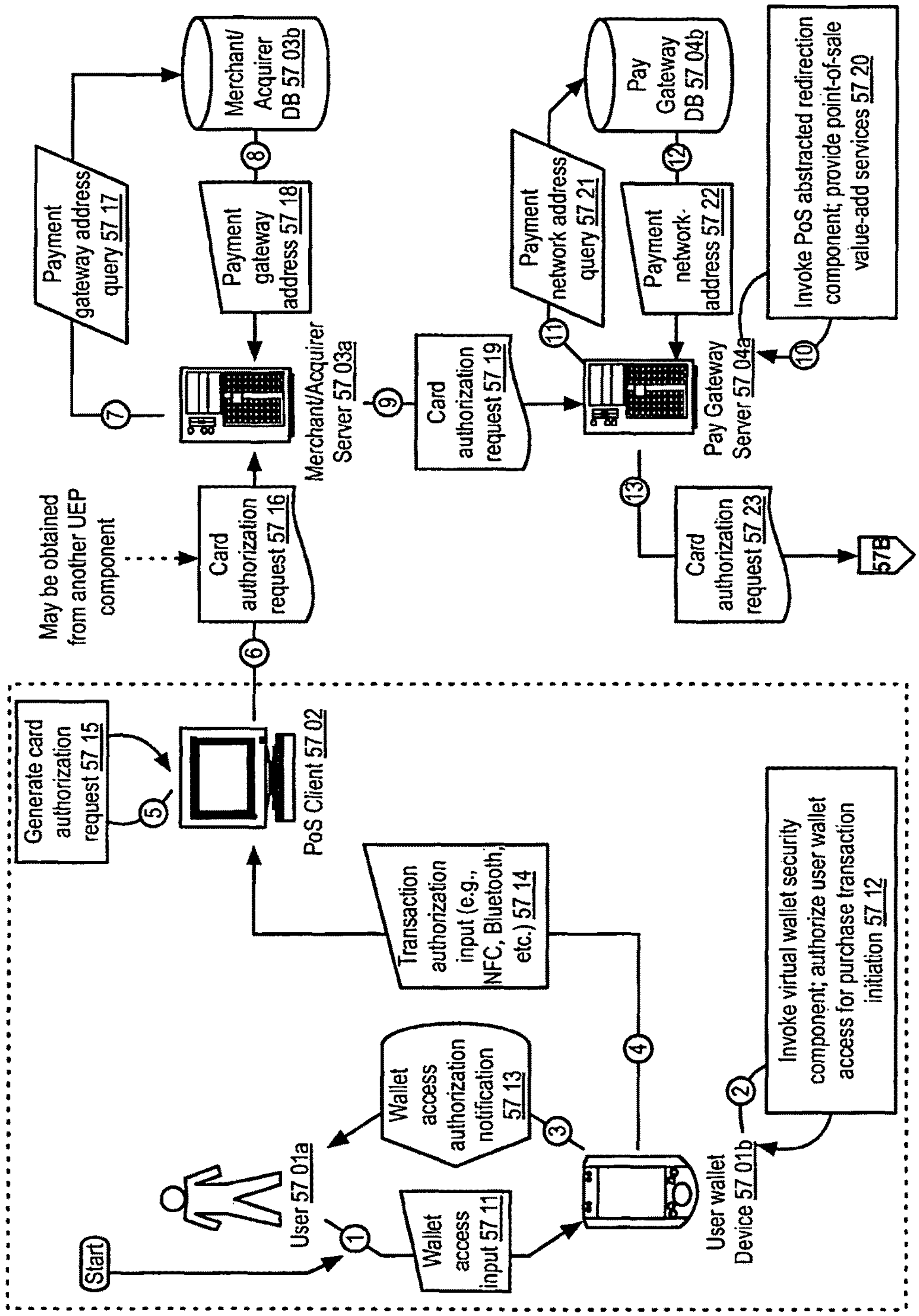
FIGS. 57A-B show data flow diagrams illustrating an example purchase transaction authorization procedure in some embodiments of the UEP.
Figure 57B:
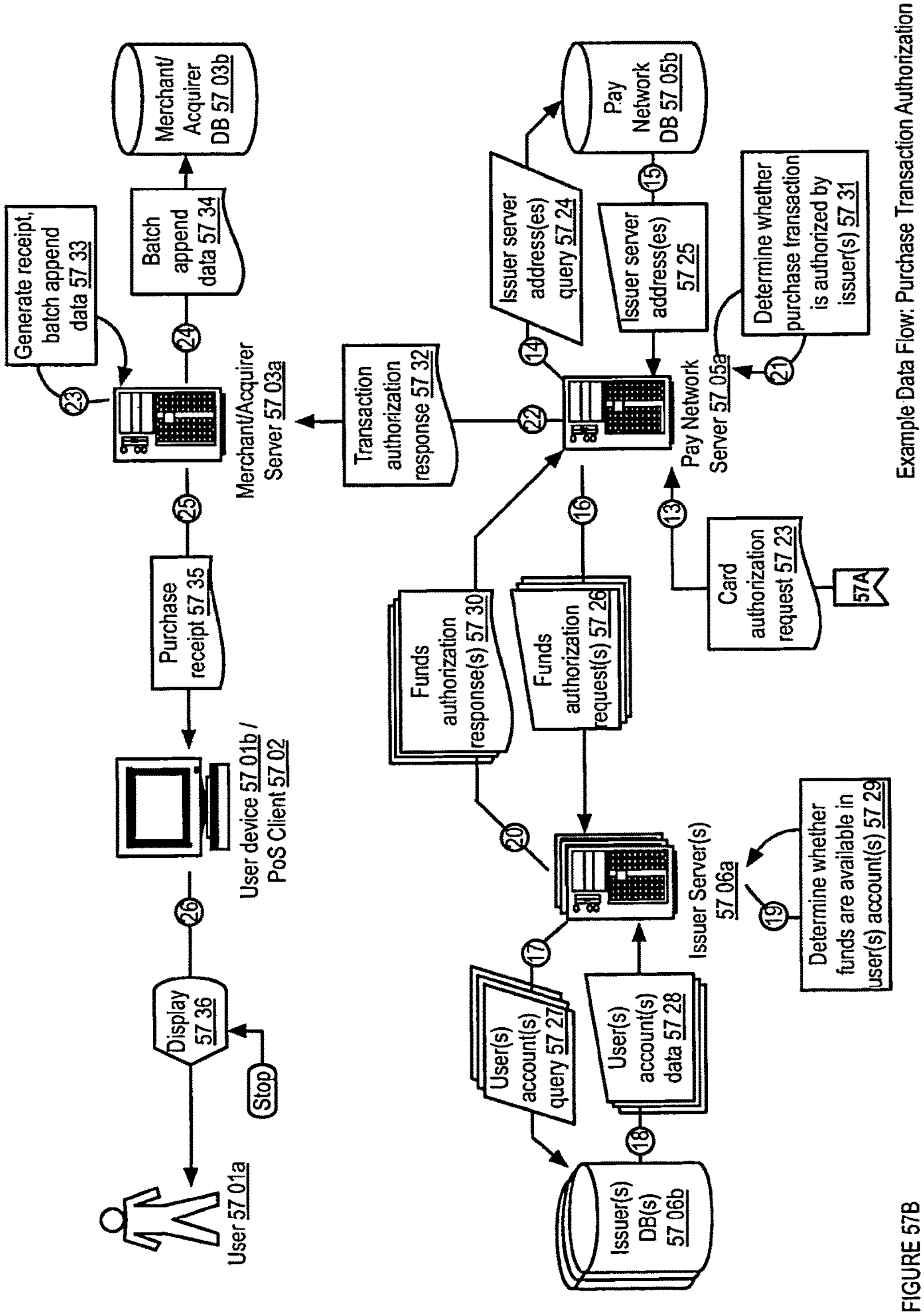

FIGS. 57A-B show data flow diagrams illustrating an example purchase transaction authorization procedure in some embodiments of the UEP. With reference to FIG. 57A, in some embodiments, a user, e.g., 5701*a*, may wish to utilize a virtual wallet account to purchase a product, service, offering, and/or the like ("product"), from a merchant via a merchant online site or in the merchant's store. The user may utilize a physical card, or a user wallet device, e.g., 5701*b*, to access the user's virtual wallet account. For example, the user wallet device may be a personal/laptop computer, cellular telephone, smartphone, tablet, eBook reader, netbook, gaming console, and/or the like. The user may provide a wallet access input, e.g., 5711 into the user wallet device. In various embodiments, the user input may include, but not be limited to: a single tap (e.g., a one-tap mobile app purchasing embodiment) of a touchscreen interface, keyboard entry, card swipe, activating a RFID/NFC enabled hardware device (e.g., electronic card having multiple accounts, smartphone, tablet, etc.) within the user device, mouse clicks, depressing buttons on a joystick/game console, voice commands, single/multi-touch gestures on a touch-sensitive interface, touching user interface elements on a touch-sensitive display, and/or the like. In some embodiments, the user wallet device may authenticate the user based on the user's wallet access input, and provide virtual wallet features for the user.

In some embodiments, upon authenticating the user for access to virtual wallet features, the user wallet device may provide a transaction authorization input, e.g., 5714, to a point-of-sale ("PoS") client, e.g., 5702. For example, the user wallet device may communicate with the PoS client via Bluetooth, Wi-Fi, cellular communication, one- or two-way near-field communication ("NFC"), and/or the like. In embodiments where the user utilizes a plastic card instead of the user wallet device, the user may swipe the plastic card at the PoS client to transfer information from the plastic card into the PoS client. For example, the PoS client may obtain, as transaction authorization input 5714, track 1 data from the user's plastic card (e.g., credit card, debit card, prepaid card, charge card, etc.), such as the example track 1 data provided below:

%B123456789012345^PUBLIC/
J.Q.^99011200000000000000901****?*
(wherein '123456789012345' is the card number of 'J.Q. Public' and has a CVV number of 901. '990112' is a service code, and *** represents decimal digits which change randomly each time the card is used.)

In embodiments where the user utilizes a user wallet device, the user wallet device may provide payment information to the PoS client, formatted according to a data formatting protocol appropriate to the communication mechanism employed in the communication between the user wallet device and the PoS client. An example listing of transaction authorization input 5714, substantially in the form of XML-formatted data, is provided below:

```
<?XML version = "1.0" encoding = "UTF-8"?>
<transaction_authorization_input>
  <payment_data>
    <account_source>
      <charge_priority>1</charge_priority>
      <charge_type>rewards</charge_type>
      <charge_issuer>Issuer1</charge_issuer>
      <charge_mode>FNC</charge_mode>
      <charge_ratio>40%</charge_ratio>
      <account_number>123456789012345</account_number>
      <account_name>John Q. Public</account_name>
      <bill_add>987 Green St #456, Chicago, IL 94652</bill_add>
      <ship_add>987 Green St #456, Chicago, IL 94652
      </ship_add>
      <CVV>123</CVV>
    </account_source>
    <account_source>
      <charge_priority>1</charge_priority>
      <charge_type>points</charge_type>
      <charge_mode>FNC</charge_mode>
```

-continued

```
      <charge_issuer>Issuer2</charge_issuer>
      <charge_ratio>60%</charge_ratio>
      <account_number>234567890123456</account_number>
      <account_name>John Q. Public</account_name>
      <bill_add>987 Green St #456, Chicago, IL 94652</bill_add>
      <ship_add>987 Green St #456, Chicago, IL 94652
      </ship_add>
      <CVV>173</CVV>
    </account_source>
    <account_source>
      <charge_priority>2</charge_priority>
      <charge_type>credit</charge_type>
      <charge_mode>FNC</charge_mode>
      <charge_issuer>Issuer1</charge_issuer>
      <charge_ratio>100%</charge_ratio>
      <account_number>345678901234567</account_number>
      <account_name>John Q. Public</account_name>
      <bill_add>987 Green St #456, Chicago, IL 94652</bill_add>
      <ship_add>987 Green St #456, Chicago, IL 94652
      </ship_add>
      <CVV>695</CVV>
    </account_source>
  </payment_data>
  <!--optional data-->
  <timestamp>2011-02-22 15:22:43</timestamp>
  <expiry_lapse>00:00:30</expiry_lapse>
  <secure_key>0445329070598623487956543322</secure_key>
  <alerts_track_flag>TRUE</alerts_track_flag>
  <wallet_device_details>
    <device_IP>192.168.23.126</client_IP>
    <device_type>smartphone</client_type>
    <device_model>HTC Hero</client_model>
    <OS>Android 2.2</OS>
    <wallet_app_installed_flag>true</wallet_app_installed_flag>
  </wallet_device_details>
</transaction_authorization_input>
```

In some embodiments, the PoS client may generate a card authorization request, e.g., 5715, using the obtained transaction authorization input from the user wallet device, and/or product/checkout data (see, e.g., FIG. 55, 5515-5517). An example listing of a card authorization request 5715, substantially in the form of a HTTP(S) POST message including XML-formatted data, is provided below:

```
POST /authorizationrequests.php HTTP/1.1
Host: www.acquirer.com
Content-Type: Application/XML
Content-Length: 1306
<?XML version = "1.0" encoding = "UTF-8"?>
<card_authorization_request>
  <session_ID>4NFU4RG94</order_ID>
  <timestamp>2011-02-22 15:22:43</timestamp>
  <expiry>00:00:30</expiry>
  <alerts_URL>www.merchant.com/shopcarts.php?sessionID=
  AEBB4356</alerts_URL>
  <!--optional data-->
  <user_ID>john.q.public@gmail.com</user_ID>
  <PoS_details>
    <PoS_IP>192.168.23.126</client_IP>
    <PoS_type>smartphone</client_type>
    <PoS_model>HTC Hero</client_model>
    <OS>Android 2.2</OS>
    <app_installed_flag>true</app_installed_flag>
  </PoS_details>
  <purchase_details>
    <cart1>
      <num_products>1</num_products>
      <product>
        <product_type>book</product_type>
        <product_params>
          <product_title>XML for dummies</product_title>
          <ISBN>938-2-14-168710-0</ISBN>
          <edition>2nd ed.</edition>
          <cover>hardbound</cover>
          <seller>bestbuybooks</seller>
```

-continued

```
                </product_params>
                <quantity>1</quantity>
            </product>
            <mode>socialpay</mode>
            <payee>
                <ID>merchant1</ID>
                <Address>123 Baker St, Chicago, IL 00000</Address>
            </payee>
            <offer>id#23456768543_2052</offer>
            <social_status>
                <type>twitter</type>
                <message>thx4thetip</message>
            </social_status>
            <cloak>ON</cloak>
        </cart1>
        <cart2>
            <num_products>1</num_products>
            <product>
                <product_type>book</product_type>
                <product_params>
                    <product_title>XML for dummies</product_title>
                    <ISBN>938-2-14-168710-0</ISBN>
                    <edition>2nd ed.</edition>
                    <cover>hardbound</cover>
                    <seller>bestbuybooks</seller>
                </product_params>
                <quantity>1</quantity>
            </product>
            <mode>NFC</mode>
            <payee>
                <ID>johnqpublic</ID>
                <Address>123 Baker St, Chicago, IL 00000</Address>
            </payee>
            <offer>id#23456768543_2052</offer>
            <social_status>
                <type>facebook</type>
                <message>@jqp: dinner was great!</message>
            </social_status>
            <cloak>OFF</cloak>
        </cart2>
    </purchase_details>
    <merchant_params>
        <merchant_id>3FBCR4INC</merchant_id>
        <merchant_name>Books & Things, Inc.</merchant_name>
        <merchant_auth_key>1NNF484MCP59CHB27365
        </merchant_auth_key>
        <merchant_mode>snap</merchant_mode>
    </merchant_params>
    <account_params>
        <account_name>John Q. Public</account_name>
        <account_type>credit</account_type>
        <account_num>123456789012345</account_num>
        <billing_address>123 Green St., Norman, OK 98765
        </billing_address>
        <phone>123-456-7809</phone>
        <sign>/jqp/</sign>
        <confirm_type>email</confirm_type>
        <contact_info>john.q.public@gmail.com</contact_info>
    </account_params>
    <shipping_info>
        <shipping_adress>same as billing</shipping_address>
        <ship_type>expedited</ship_type>
        <ship_carrier>FedEx</ship_carrier>
        <ship_account>123-45-678</ship_account>
        <tracking_flag>true</tracking_flag>
        <sign_flag>false</sign_flag>
    </shipping_info>
</card_authorization_request>
```

In some embodiments, the card authorization request generated by the user device may include a minimum of information required to process the purchase transaction. For example, this may improve the efficiency of communicating the purchase transaction request, and may also advantageously improve the privacy protections provided to the user and/or merchant. For example, in some embodiments, the card authorization request may include at least a session ID for the user's shopping session with the merchant. The session ID may be utilized by any component and/or entity having the appropriate access authority to access a secure site on the merchant server to obtain alerts, reminders, and/or other data about the transaction(s) within that shopping session between the user and the merchant. In some embodiments, the PoS client may provide the generated card authorization request to the merchant server, e.g., 5716. The merchant server may forward the card authorization request to a pay gateway server, e.g., 5704*a*, for routing the card authorization request to the appropriate payment network for payment processing. For example, the pay gateway server may be able to select from payment networks, such as Visa, Mastercard, American Express, Paypal, etc., to process various types of transactions including, but not limited to: credit card, debit card, prepaid card, B2B and/or like transactions. In some embodiments, the merchant server may query a database, e.g., merchant/acquirer database 5703*b*, for a network address of the payment gateway server, for example by using a portion of a user payment card number, or a user ID (such as an email address) as a keyword for the database query. For example, the merchant server may issue PHP/SQL commands to query a database table (such as FIG. 61, Pay Gateways 6119*h*) for a URL of the pay gateway server. An example payment gateway address query 5717, substantially in the form of PHP/SQL commands, is provided below:

```
<?PHP
header('Content-Type: text/plain');
mysql_connect("254.93.179.112",$DBserver,$password); // access
database server
mysql_select_db("UEP_DB.SQL"); // select database table to search
//create query
$query = "SELECT paygate_id paygate_address paygate_URL
   paygate_name FROM PayGatewayTable WHERE card_num
   LIKE '%' $cardnum";
$result = mysql_query($query); // perform the search query
mysql_close("UEP_DB.SQL"); // close database access
?>
```

In response, the merchant/acquirer database may provide the requested payment gateway address, e.g., 5718. The merchant server may forward the card authorization request to the pay gateway server using the provided address, e.g., 5719. In some embodiments, upon receiving the card authorization request from the merchant server, the pay gateway server may invoke a component to provide one or more services associated with purchase transaction authorization. For example, the pay gateway server may invoke components for fraud prevention, loyalty and/or rewards, and/or other services for which the user-merchant combination is authorized. The pay gateway server may forward the card authorization request to a pay network server, e.g., 5705*a*, for payment processing. For example, the pay gateway server may be able to select from payment networks, such as Visa, Mastercard, American Express, Paypal, etc., to process various types of transactions including, but not limited to: credit card, debit card, prepaid card, B2B and/or like transactions. In some embodiments, the pay gateway server may query a database, e.g., pay gateway database 5704*b*, for a network address of the payment network server, for example by using a portion of a user payment card number, or a user ID (such as an email address) as a keyword for the database query. For example, the pay gateway server may issue PHP/SQL commands to query a database table (such as FIG. 61, Pay Gateways 6119*h*) for a URL of the pay network server. An example payment network address query 5721, substantially in the form of PHP/SQL commands, is provided below:

```
<?PHP
header('Content-Type: text/plain');
mysql_connect("254.93.179.112",$DBserver,$password); // access
database server
mysql_select_db("UEP_DB.SQL"); // select database table to search
//create query
$query = "SELECT payNET_id payNET_address payNET_URL
  payNET_name FROM PayGatewayTable WHERE card_num LIKE
  '%' $cardnum";
$result = mysql_query($query); // perform the search query
mysql_close("UEP_DB.SQL"); // close database access
?>
```

In response, the payment gateway database may provide the requested payment network address, e.g., 5722. The pay gateway server may forward the card authorization request to the pay network server using the provided address, e.g., 5723.

With reference to FIG. 57B, in some embodiments, the pay network server may process the transaction so as to transfer funds for the purchase into an account stored on an acquirer of the merchant. For example, the acquirer may be a financial institution maintaining an account of the merchant. For example, the proceeds of transactions processed by the merchant may be deposited into an account maintained by at a server of the acquirer.

In some embodiments, the pay network server may generate a query, e.g., 5724, for issuer server(s) corresponding to the user-selected payment options. For example, the user's account may be linked to one or more issuer financial institutions ("issuers"), such as banking institutions, which issued the account(s) for the user. For example, such accounts may include, but not be limited to: credit card, debit card, a prepaid card, checking, savings, money market, certificates of deposit, stored (cash) value accounts and/or the like. Issuer server(s), e.g., 5706*a*, of the issuer(s) may maintain details of the user's account(s). In some embodiments, a database, e.g., pay network database 5705*b*, may store details of the issuer server(s) associated with the issuer(s). In some embodiments, the pay network server may query a database, e.g., pay network database 5705*b*, for a network address of the issuer(s) server(s), for example by using a portion of a user payment card number, or a user ID (such as an email address) as a keyword for the database query. For example, the merchant server may issue PHP/SQL commands to query a database table (such as FIG. 61, Issuers 6119*f*) for network address(es) of the issuer(s) server(s). An example issuer server address(es) query 5724, substantially in the form of PHP/SQL commands, is provided below:

```
<?PHP
header('Content-Type: text/plain');
mysql_connect("254.93.179.112",$DBserver,$password); // access
database server
mysql_select_db("UEP_DB.SQL"); // select database table to search
//create query
$query = "SELECT issuer_id issuer_address issuer_URL
  issuer_name FROM IssuersTable WHERE card_num
  LIKE '%' $cardnum";
$result = mysql_query($query); // perform the search query
mysql_close("UEP_DB.SQL"); // close database access
?>
```

In response to obtaining the issuer server query, e.g., 5724, the pay network database may provide, e.g., 5725, the requested issuer server data to the pay network server. In some embodiments, the pay network server may utilize the issuer server data to generate funds authorization request(s), e.g., 5726, for each of the issuer server(s) selected based on the pre-defined payment settings associated with the user's a virtual wallet, and/or the user's payment options input, and provide the funds authorization request(s) to the issuer server(s). In some embodiments, the funds authorization request(s) may include details such as, but not limited to: the costs to the user involved in the transaction, card account details of the user, user billing and/or shipping information, and/or the like. An example listing of a funds authorization request 5726, substantially in the form of a HTTP(S) POST message including XML-formatted data, is provided below:

```
POST /fundsauthorizationrequest.php HTTP/1.1
Host: www.issuer.com
Content-Type: Application/XML
Content-Length: 624
<?XML version = "1.0" encoding = "UTF-8"?>
<funds_authorization_request>
  <query_ID>VNEI39FK</query_ID>
  <timestamp>2011-02-22 15:22:44</timestamp>
  <transaction_cost>$22.61</transaction_cost>
  <account_params>
      <account_type>checking</account_type>
      <account_num>1234567890123456</account_num>
  </account_params>
  <!--optional parameters-->
  <purchase_summary>
      <num_products>1</num_products>
      <product>
          <product_summary>Book - XML for dummies
          </product_summary>
          <product_quantity>1</product_quantity?
      </product>
  </purchase_summary>
  <merchant_params>
      <merchant_id>3FBCR4INC</merchant_id>
      <merchant_name>Books & Things, Inc.</merchant_name>
      <merchant_auth_key>1NNF484MCP59CHB27365
      </merchant_auth_key>
  </merchant_params>
</funds_authorization_request>
```

In some embodiments, an issuer server may parse the authorization request(s), and based on the request details may query a database, e.g., user profile database 5706*b*, for data associated with an account linked to the user. For example, the merchant server may issue PHP/SQL commands to query a database table (such as FIG. 61, Accounts 6119*d*) for user account(s) data. An example user account(s) query 5727, substantially in the form of PHP/SQL commands, is provided below:

```
<?PHP
header('Content-Type: text/plain');
mysql_connect("254.93.179.112",$DBserver,$password); // access
database server
mysql_select_db("UEP_DB.SQL"); // select database table to search
//create query
$query = "SELECT issuer user_id user_name user_balance
  account_type FROM AccountsTable WHERE account_num
  LIKE '%' $accountnum";
$result = mysql_query($query); // perform the search query
mysql_close("UEP_DB.SQL"); // close database access
?>
```

In some embodiments, on obtaining the user account(s) data, e.g., 5728, the issuer server may determine whether the user can pay for the transaction using funds available in the account, 5729. For example, the issuer server may determine whether the user has a sufficient balance remaining in the account, sufficient credit associated with the account, and/or the like. Based on the determination, the issuer server(s) may provide a funds authorization response, e.g., 5730, to the pay network server. For example, the issuer server(s) may provide a HTTP(S) POST message similar to the examples above. In some embodiments, if at least one issuer server determines that the user cannot pay for the transaction using the funds available in the account, the pay network server may request payment options again from the user (e.g., by providing an authorization fail message to the user device and requesting the user device to provide new payment options), and re-attempt authorization for the purchase transaction. In some embodiments, if the number of failed authorization attempts a exceeds a threshold, the pay network server may abort the authorization process, and provide an "authorization fail" message to the merchant server, user device and/or client.

In some embodiments, the pay network server may obtain the funds authorization response including a notification of successful authorization, and parse the message to extract authorization details. Upon determining that the user possesses sufficient funds for the transaction, e.g., 5731, the pay network server may invoke a component to provide value-add services for the user.

In some embodiments, the pay network server may generate a transaction data record from the authorization request and/or authorization response, and store the details of the transaction and authorization relating to the transaction in a transactions database. For example, the pay network server may issue PHP/SQL commands to store the data to a database table (such as FIG. 61, Transactions 6119*i*). An example transaction store command, substantially in the form of PHP/SQL commands, is provided below:

```
<?PHP
header('Content-Type: text/plain');
mysql_connect("254.92.185.103",$DBserver,$password); // access
database server
mysql_select("UEP_DB.SQL"); // select
database to append
mysql_query("INSERT INTO TransactionsTable (PurchasesTable
    (timestamp, purchase_summary_list, num_products,
    product_summary, product_quantity, transaction_cost,
    account_params_list, account_name, account_type,
    account_num, billing_addres, zipcode, phone, sign,
    merchant_params_list, merchant_id, merchant_name,
    merchant_auth_key)
VALUES (time( ), $purchase_summary_list, $num_products,
    $product_summary, $product_quantity, $transaction_cost,
    $account_params_list, $account_name, $account_type,
    $account_num, $billing_addres, $zipcode, $phone, $sign,
    $merchant_params_list, $merchant_id, $merchant_name,
    $merchant_auth_key)"); // add data to table in database
mysql_close("UEP_DB.SQL"); // close connection to database
?>
```

In some embodiments, the pay network server may forward a transaction authorization response, e.g., 5732, to the user wallet device, PoS client, and/or merchant server. The merchant may obtain the transaction authorization response, and determine from it that the user possesses sufficient funds in the card account to conduct the transaction. The merchant server may add a record of the transaction for the user to a batch of transaction data relating to authorized transactions. For example, the merchant may append the XML data pertaining to the user transaction to an XML data file comprising XML data for transactions that have been authorized for various users, e.g., 5733, and store the XML data file, e.g., 5734, in a database, e.g., merchant database 404. For example, a batch XML data file may be structured similar to the example XML data structure template provided below:

```
<?XML version = "1.0" encoding = "UTF-8"?>
<merchant_data>
    <merchant_id>3FBCR4INC</merchant_id>
    <merchant_name>Books & Things, Inc.</merchant_name>
    <merchant_auth_key>1NNF484MCF59CHB27365
    </merchant_auth_key>
    <account_number>123456789</account_number>
</merchant_data>
<transaction_data>
    <transaction 1>
        ...
    </transaction 1>
    <transaction 2>
        ...
    </transaction 2>
        .
        .
        .
    <transaction n>
        ...
    </transaction n>
</transaction_data>
```

In some embodiments, the server may also generate a purchase receipt, e.g., 5733, and provide the purchase receipt to the client, e.g., 5735. The client may render and display, e.g., 5736, the purchase receipt for the user. In some embodiments, the user's wallet device may also provide a notification of successful authorization to the user. For example, the PoS client/user device may render a webpage, electronic message, text/SMS message, buffer a voicemail, emit a ring tone, and/or play an audio message, etc., and provide output including, but not limited to: sounds, music, audio, video, images, tactile feedback, vibration alerts (e.g., on vibration-capable client devices such as a smartphone etc.), and/or the like.

Figure 58A:
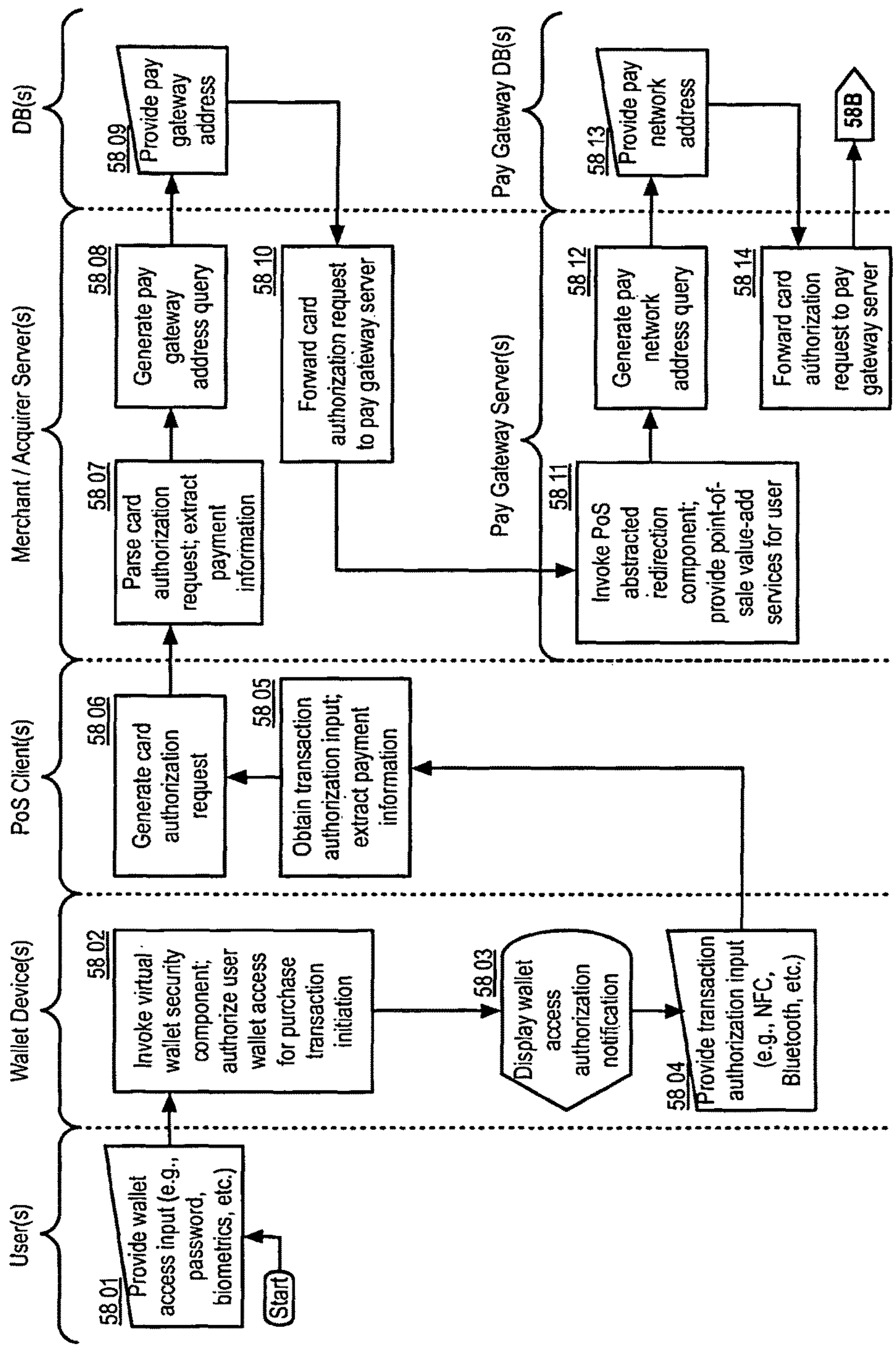
FIGS. 58A-B show logic flow diagrams illustrating example aspects of purchase transaction authorization in some embodiments of the UEP, e.g., a Purchase Transaction Authorization ("PTA") component 5800.
Figure 58B:
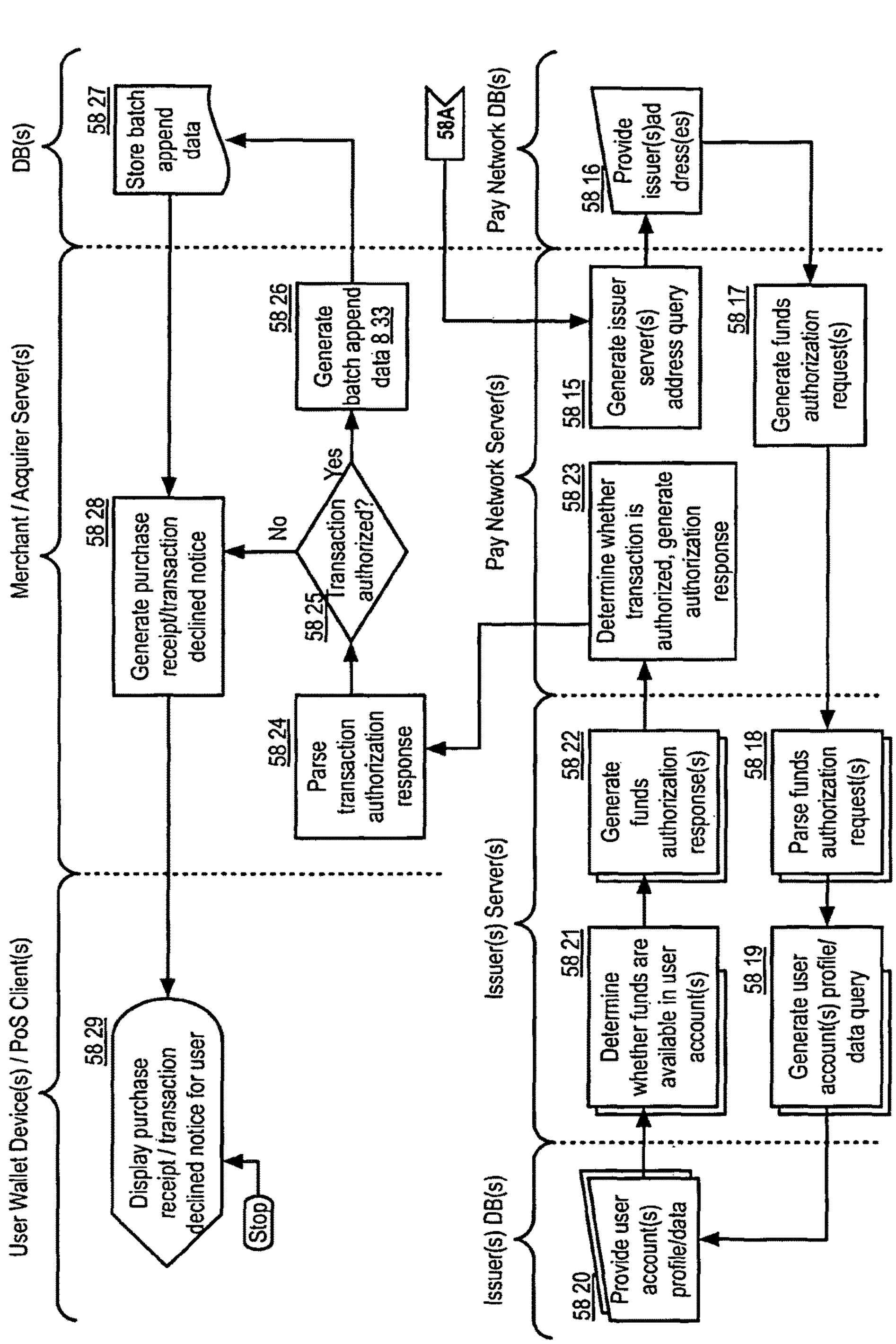

FIGS. 58A-B show logic flow diagrams illustrating example aspects of purchase transaction authorization in some embodiments of the UEP, e.g., a Purchase Transaction Authorization ("PTA") component 58000. With reference to FIG. 58A, in some embodiments, a user may wish to utilize a virtual wallet account to purchase a product, service, offering, and/or the like ("product"), from a merchant via a merchant online site or in the merchant's store. The user may utilize a physical card, or a user wallet device to access the user's virtual wallet account. For example, the user wallet device may be a personal/laptop computer, cellular telephone, smartphone, tablet, eBook reader, netbook, gaming console, and/or the like. The user may provide a wallet access input, e.g., 5801, into the user wallet device. In various embodiments, the user input may include, but not be limited to: a single tap (e.g., a one-tap mobile app purchasing embodiment) of a touchscreen interface, keyboard entry, card swipe, activating a RFID/NFC enabled hardware device (e.g., electronic card having multiple accounts, a smartphone, tablet, etc.) within the user device, mouse clicks, depressing buttons on a joystick/game console, voice commands, single/multi-touch gestures on a touch-sensitive interface, touching user interface elements on a touch-sensitive display, and/or the like. In some embodiments, the user wallet device may authenticate the user based on the user's wallet access input, and provide virtual wallet features for the user, e.g., 5802-5803.

In some embodiments, upon authenticating the user for access to virtual wallet features, the user wallet device may provide a transaction authorization input, e.g., 5804, to a point-of-sale ("PoS") client. For example, the user wallet device may communicate with the PoS client via Bluetooth, Wi-Fi, cellular communication, one- or two-way near-field communication ("NFC"), and/or the like. In embodiments where the user utilizes a plastic card instead of the user wallet device, the user may swipe the plastic card at the PoS client to transfer information from the plastic card into the PoS client. In embodiments where the user utilizes a user wallet device, the user wallet device may provide payment information to the PoS client, formatted according to a data formatting protocol appropriate to the communication mechanism employed in the communication between the user wallet device and the PoS client.

In some embodiments, the PoS client may obtain the transaction authorization input, and parse the input to extract payment information from the transaction authorization input, e.g., 5805. For example, the PoS client may utilize a parser, such as the example parsers provided below in the discussion with reference to FIG. 61. The PoS client may generate a card authorization request, e.g., 5806, using the obtained transaction authorization input from the user wallet device, and/or product/checkout data (see, e.g., FIG. 55, 5515-5517).

In some embodiments, the PoS client may provide the generated card authorization request to the merchant server. The merchant server may forward the card authorization request to a pay gateway server, for routing the card authorization request to the appropriate payment network for payment processing. For example, the pay gateway server may be able to select from payment networks, such as Visa, Mastercard, American Express, Paypal, etc., to process various types of transactions including, but not limited to: credit card, debit card, prepaid card, B2B and/or like transactions. In some embodiments, the merchant server may query a database, e.g., 5808, for a network address of the payment gateway server, for example by using a portion of a user payment card number, or a user ID (such as an email address) as a keyword for the database query. In response, the merchant/acquirer database may provide the requested payment gateway address, e.g., 5810. The merchant server may forward the card authorization request to the pay gateway server using the provided address. In some embodiments, upon receiving the card authorization request from the merchant server, the pay gateway server may invoke a component to provide one or more service associated with purchase transaction authorization, e.g., 5811. For example, the pay gateway server may invoke components for fraud prevention, loyalty and/or rewards, and/or other services for which the user-merchant combination is authorized.

The pay gateway server may forward the card authorization request to a pay network server for payment processing, e.g., 5814. For example, the pay gateway server may be able to select from payment networks, such as Visa, Mastercard, American Express, Paypal, etc., to process various types of transactions including, but not limited to: credit card, debit card, prepaid card, B2B and/or like transactions. In a some embodiments, the pay gateway server may query a database, e.g., 5812, for a network address of the payment network server, for example by using a portion of a user payment card number, or a user ID (such as an email address) as a keyword for the database query. In response, the payment gateway database may provide the requested payment network address, e.g., 5813. The pay gateway server may forward the card authorization request to the pay network server using the provided address, e.g., 5814.

With reference to FIG. 58B, in some embodiments, the pay network server may process the transaction so as to transfer funds for the purchase into an account stored on an acquirer of the merchant. For example, the acquirer may be a financial institution maintaining an account of the merchant. For example, the proceeds of transactions processed by the merchant may be deposited into an account maintained by at a server of the acquirer. In some embodiments, the pay network server may generate a query, e.g., 5815, for issuer server(s) corresponding to the user-selected payment options. For example, the user's account may be linked to one or more issuer financial institutions ("issuers"), such as banking institutions, which issued the account(s) for the user. For example, such accounts may include, but not be limited to: credit card, debit card, prepaid card, checking, savings, money market, certificates of deposit, stored (cash) value accounts and/or the like. Issuer server(s) of the issuer(s) may maintain details of the user's account(s). In some embodiments, a database, e.g., a pay network database, may store details of the issuer server(s) associated with the issuer(s). In some embodiments, the pay network server may query a database, e.g., 5815, for a network address of the issuer(s) server(s), for example by using a portion of a user payment card number, or a user ID (such as an email address) as a keyword for the database a query.

In response to obtaining the issuer server query, the pay network database may provide, e.g., 5816, the requested issuer server data to the pay network server. In some embodiments, the pay network server may utilize the issuer server data to generate funds authorization request(s), e.g., 5817, for each of the issuer server(s) selected based on the pre-defined payment settings associated with the user's virtual wallet, and/or the user's payment options input, and provide the funds authorization request(s) to the issuer server(s). In some embodiments, the funds authorization request(s) may include details such as, but not limited to: the costs to the user involved in the transaction, card account details of the user, user billing and/or shipping information, and/or the like. In some embodiments, an issuer server may parse the authorization request(s), e.g., 5818, and based on the request details may query a database, e.g., 5819, for data associated with an account linked to the user.

In some embodiments, on obtaining the user account(s) data, e.g., 5820, the issuer server may determine whether the user can pay for the transaction using funds available in the account, e.g., 5821. For example, the issuer server may determine whether the user has a sufficient balance remaining in the account, sufficient credit associated with the account, and/or the like. Based on the determination, the issuer server(s) may provide a funds authorization response, e.g., 5822, to the pay network server. In some embodiments, if at least one issuer server determines that the user cannot pay for the transaction using the funds available in the account, the pay network server may request payment options again from the user (e.g., by providing an authorization fail message to the user device and requesting the user device to provide a new payment options), and re-attempt authorization for the purchase transaction. In some embodiments, if the number of failed authorization attempts exceeds a threshold, the pay network server may abort the authorization process, and provide an "authorization fail" message to the merchant server, user device and/or client.

In some embodiments, the pay network server may obtain the funds authorization response including a notification of successful authorization, and parse the message to extract authorization details. Upon determining that the user possesses sufficient funds for the transaction, e.g., 5823, the pay network server may invoke a component to provide value-add services for the user, e.g., 5823.

In some embodiments, the pay network server may forward a transaction authorization response to the user wallet device, PoS client, and/or merchant server. The merchant may parse, e.g., 5824, the transaction authorization response, and determine from it that the user possesses sufficient funds in the card account to conduct the transaction, e.g., 5825, option "Yes." The merchant server may add a record of the transaction for the user to a batch of transaction data relating to authorized transactions. For example, the merchant may append the XML data pertaining to the user transaction to an XML data file comprising XML data for transactions that have been authorized for various users, e.g., 5826, and store the XML data file, e.g., 5827, in a database. In some embodiments, the server may also generate a purchase receipt, e.g., 5828, and provide the purchase receipt to the client. The client may render and display, e.g., 5829, the purchase receipt for the user. In some embodiments, the user's wallet device may also provide a notification of successful authorization to the user. For example, the PoS client/user device may render a webpage, electronic message, text SMS message, buffer a voicemail, emit a ring tone, and/or play an audio message, etc., and provide output including, but not limited to: sounds, music, audio, video, images, tactile feedback, vibration alerts (e.g., on vibration-capable client devices such as a smartphone etc.), and/or the like.

Figure 59A:
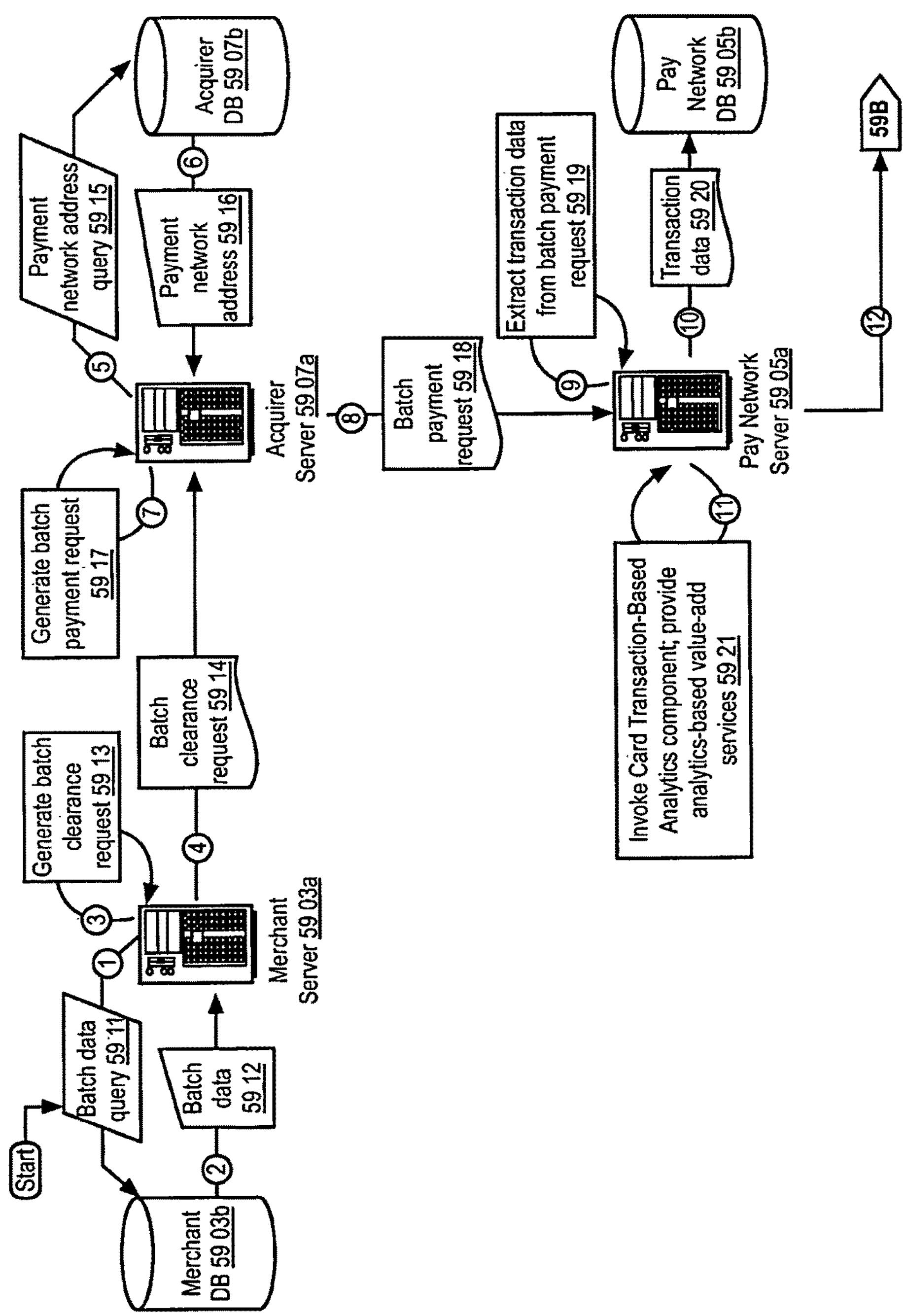
FIGS. 59A-B show data flow diagrams illustrating an example purchase transaction clearance procedure in some embodiments of the UEP.
Figure 59B:
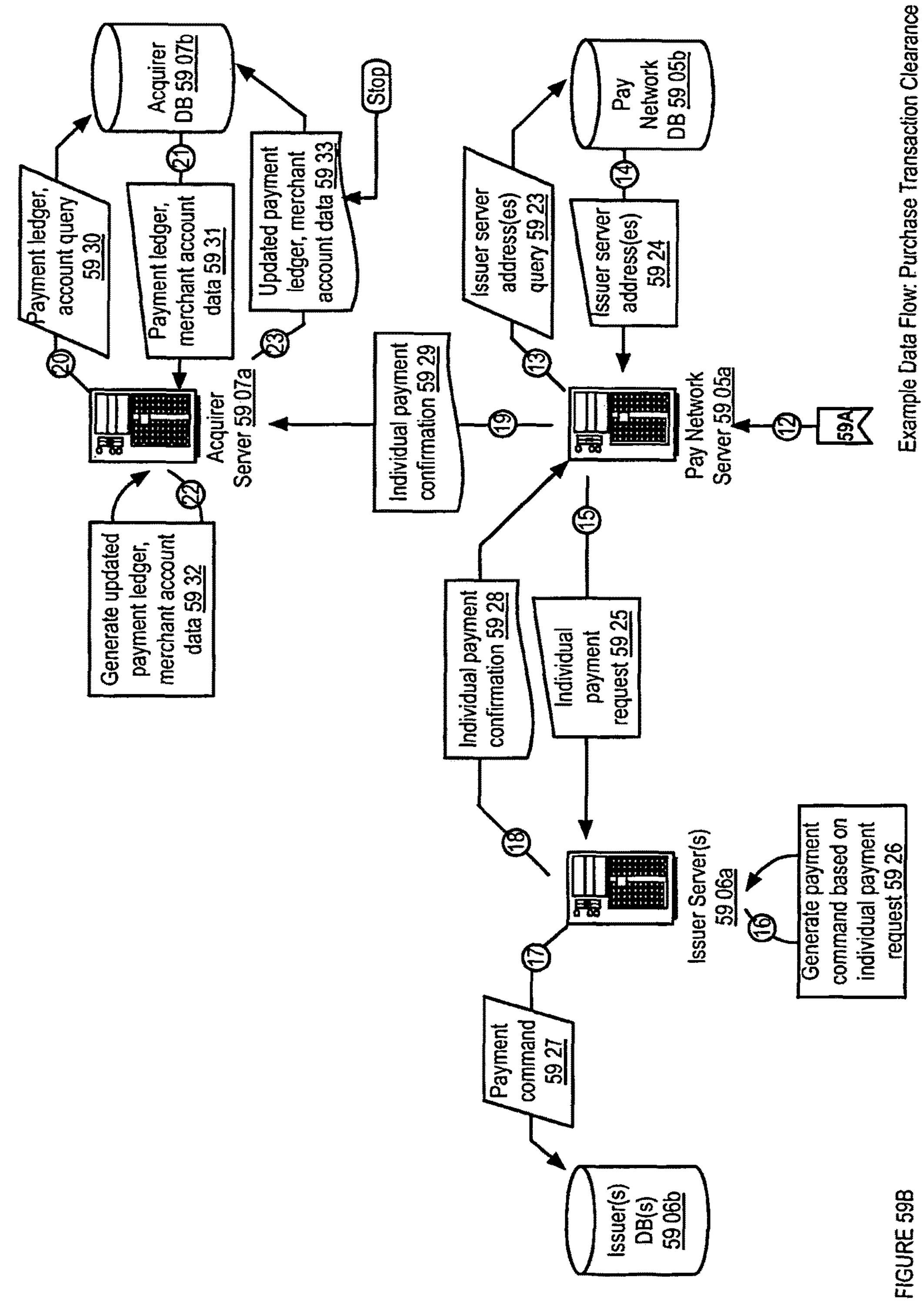

FIGS. 59A-B show data flow diagrams illustrating an example purchase transaction clearance procedure in some embodiments of the UEP. With reference to FIG. 59A, in some embodiments, a merchant server, e.g., 5903*a*, may initiate clearance of a batch of authorized transactions. For example, the merchant server may generate a batch data request, e.g., 5911, and provide the request, to a merchant database, e.g., 5903*b*. For example, the merchant server may utilize PHP/SQL commands similar to the examples provided above to query a relational database. In response to the batch data request, the database may provide the requested batch data, e.g., 5912. The server may generate a batch clearance request, e.g., 5913, using the batch data obtained from the database, and provide, e.g., 5914, the batch clearance request to an acquirer server, e.g., 5907*a*. For example, the merchant server may provide a HTTP(S) POST message including XML-formatted batch data in the message body for the acquirer server. The acquirer server may generate, e.g., 5915, a batch payment request using the obtained batch clearance request, and provide, e.g., 5918, the batch payment request to the pay network server, e.g., 5905*a*. The pay network server may parse the batch payment request, and extract the transaction data for each transaction stored in the batch payment request, e.g., 5919. The pay network server may store the transaction data, e.g., 5920, for each transaction in a database, e.g., pay network database 5905*b*. In some embodiments, the pay network server may invoke a component to provide value-add analytics services based on analysis of the transactions of the merchant for whom the UEP is clearing purchase transactions. Thus, in some embodiments, the pay network server may provide analytics-based value-added services for the merchant and/or the merchant's users.

With reference to FIG. 59B, in some embodiments, for each extracted transaction, the pay network server may query, e.g., 5923, a database, e.g., pay network database 5905*b*, for an address of an issuer server. For example, the pay network server may utilize PHP/SQL commands similar to the examples provided above. The pay network server may generate an individual payment request, e.g., 5925, for each transaction for which it has extracted transaction data, and provide the individual payment request, e.g., 5925, to the issuer server, e.g., 5906*a*. For example, the pay network server may provide an individual payment request to the issuer server(s) as a HTTP(S) POST message including XML-formatted data. An example listing of an individual payment request 5925, substantially in the form of a HTTP (S) POST message including XML-formatted data, is provided below:

```
POST /paymentrequest.php HTTP/1.1
Host: www.issuer.com
Content-Type: Application/XML
Content-Length: 788
<?XML version = "1.0" encoding = "UTF-8"?>
<pay_request>
  <request_ID>CNI4ICNW2</request_ID>
  <timestamp>2011-02-22 17:00:01</timestamp>
  <pay_amount>$34.78</pay_amount>
  <account_params>
      <account_name>John Q. Public</account_name>
      <account_type>credit</account_type>
      <account_num>123456789012345</account_num>
      <billing_address>123 Green St., Norman, OK 98765
      </billing_address>
      <phone>123-456-7809</phone>
      <sign>/jqp/</sign>
  </account_params>
  <merchant_params>
      <merchant_id>3FBCR4INC</merchant_id>
      <merchant_name>Books & Things, Inc.</merchant_name>
      <merchant_auth_key>1NNF484MCP59CHB27365
      </merchant_auth_key>
  </merchant_params>
  <purchase_summary>
      <num_products>1</num_products>
      <product>
          <product_summary>Book - XML for dummies
          </product_summary>
          <product_quantity>1</product_quantity?
      </product>
  </purchase_summary>
</pay_request>
```

In some embodiments, the issuer server may generate a payment command, e.g., 5927. For example, the issuer server may issue a command to deduct funds from the user's account (or add a charge to the user's credit card account). The issuer server may issue a payment command, e.g., 5927, to a database storing the user's account information, e.g., user profile database 5906*b*. The issuer server may provide an individual payment confirmation, e.g., 5928, to the pay network server, which may forward, e.g., 5929, the funds transfer message to the acquirer server. An example listing of an individual payment confirmation 5928, substantially in the form of a HTTP(S) POST message including XML-formatted data, is provided below:

```
POST /clearance.php HTTP/1.1
Host: www.acquirer.com
Content-Type: Application/XML
Content-Length: 206
<?XML version = "1.0" encoding = "UTF-8"?>
<deposit_ack>
  <request_ID>CNI4ICNW2</request_ID>
  <clear_flag>true</clear_flag>
  <timestamp>2011-02-22 17:00:02</timestamp>
  <deposit_amount>$34.78</deposit_amount>
</deposit_ack>
```

In some embodiments, the acquirer server may parse the individual payment confirmation, and correlate the transaction (e.g., using the request_ID field in the example above) to the merchant. The acquirer server may then transfer the funds specified in the funds transfer message to an account of the merchant. For example, the acquirer server may query, e.g. 5930, an acquirer database 5907*b* for payment ledger and/or merchant account data, e.g., 5931. The acquirer server may utilize payment ledger and/or merchant account data from the acquirer database, along with the individual payment confirmation, to generate updated payment ledger and/or merchant account data, e.g., 5932. The acquirer server may then store, e.g., 5933, the updated payment ledger and/or merchant account data to the acquire database.

Figure 60A:
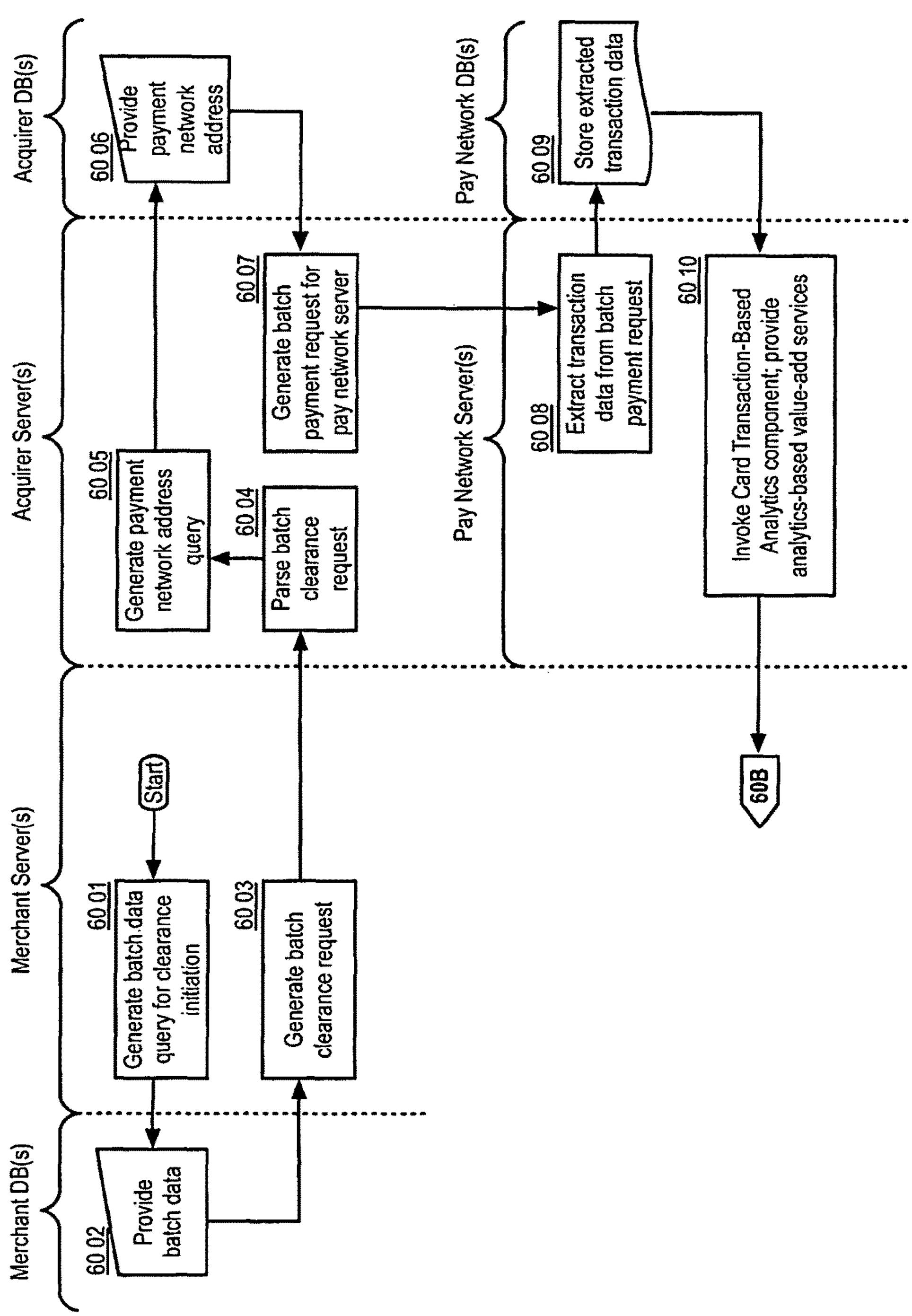
FIGS. 60A-B show logic flow diagrams illustrating example aspects of purchase transaction clearance in some embodiments of the UEP, e.g., a Purchase Transaction Clearance ("PTC") component 6000.
Figure 60B:
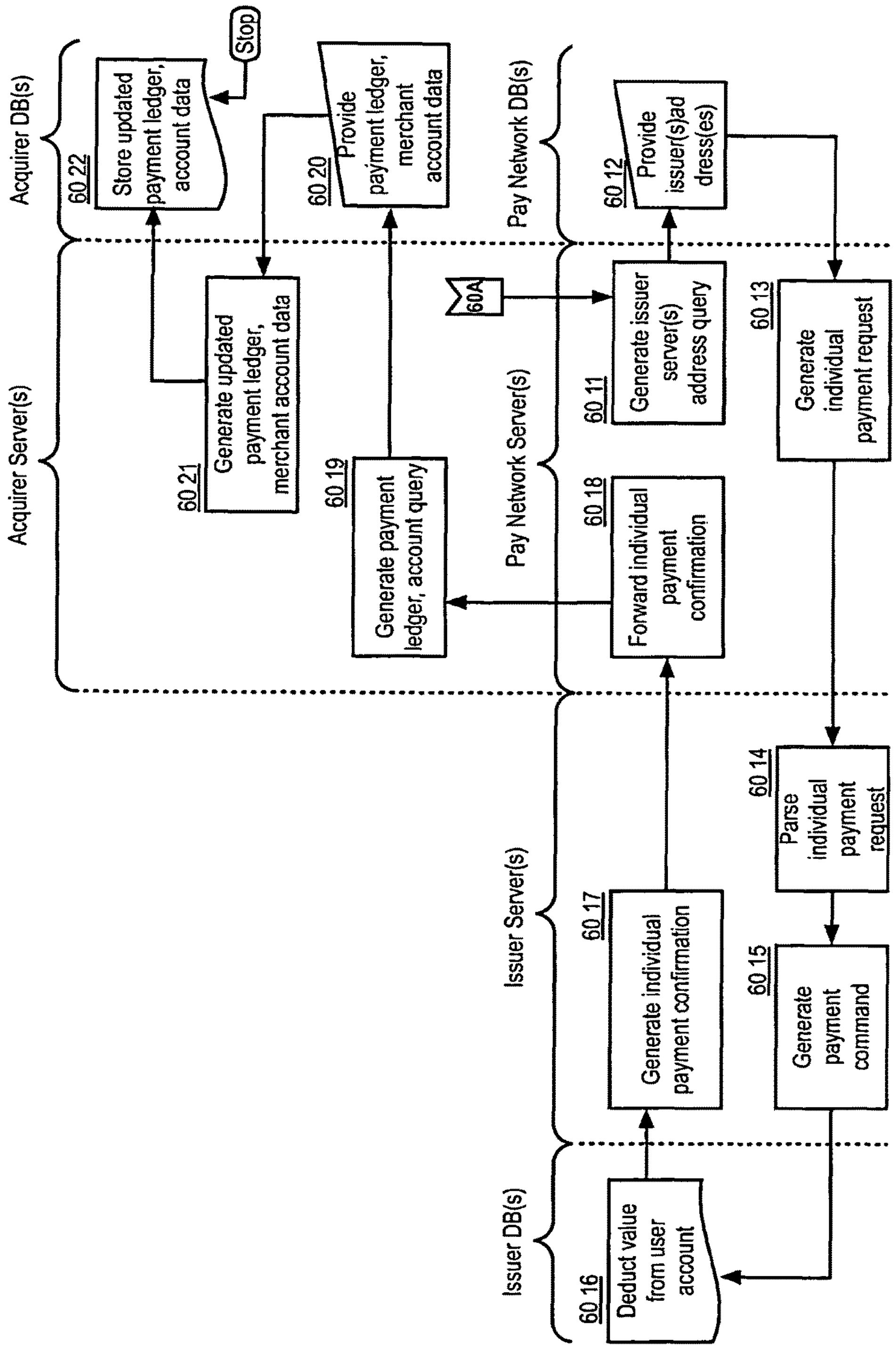

FIGS. 60A-B show logic flow diagrams illustrating example aspects of purchase transaction clearance in some embodiments of the UEP, e.g., a Purchase Transaction Clearance ("PTC") component 6000. With reference to FIG. 60A, in some embodiments, a merchant server may initiate clearance of a batch of authorized transactions. For example, the merchant server may generate a batch data request, e.g., 6001, and provide the request to a merchant database. In response to the batch data request, the database may provide the requested batch data, e.g., 6002. The server may generate a batch clearance request, e.g., 6003, using the batch data obtained from the database, and provide the batch clearance request to an acquirer server. The acquirer server may parse, e.g., 6004, the obtained batch clearance request, and generate, e.g., 6007, a batch payment request using the obtained batch clearance request to provide, the batch payment request to a pay network server. For example, the acquirer server may query, e.g., 6005, an acquirer database for an address of a payment network server, and utilize the obtained address, e.g., 6006, to forward the generated batch payment a request to the pay network server.

The pay network server may parse the batch payment request obtained from the acquirer server, and extract the transaction data for each transaction stored in the batch payment request, e.g., 6008. The pay network server may store the transaction data, e.g., 6009, for each transaction in a pay network database. In some embodiments, the pay network server may invoke a component, e.g., 6010, to provide analytics based on the transactions of the merchant for whom purchase transaction are being cleared.

With reference to FIG. 60B, in some embodiments, for each extracted transaction, the pay network server may query, e.g., 6011, a pay network database for an address of an issuer server. The pay network server may generate an individual payment request, e.g., 6013, for each transaction for which it has extracted transaction data, and provide the individual payment request to the issuer server. In some embodiments, the issuer server may parse the individual payment request, e.g., 6014, and generate a payment command, e.g., 6015, based on the parsed individual payment request. For example, the issuer server may issue a command to deduct funds from the user's account (or add a charge to the user's credit card account). The issuer server may issue a payment command, e.g., 6015, to a database storing the user's account information, e.g., a user profile database. The issuer server may provide an individual payment confirmation, e.g., 6017, to the pay network server, which may forward, e.g., 6018, the individual payment confirmation to the acquirer server.

In some embodiments, the acquirer server may parse the individual payment confirmation, and correlate the transaction (e.g., using the request_ID field in the example above) to the merchant. The acquirer server may then transfer the funds specified in the funds transfer message to an account of the merchant. For example, the acquirer server may query, e.g. 6019, an acquirer database for payment ledger and/or merchant account data, e.g., 6020. The acquirer server may utilize payment ledger and/or merchant account data from the acquirer database, along with the individual payment confirmation, to generate updated payment ledger and/or merchant account data, e.g., 6021. The acquirer server may then store, e.g., 6022, the updated payment ledger and/or merchant account data to the acquire database.

UEP Controller

Figure 61:
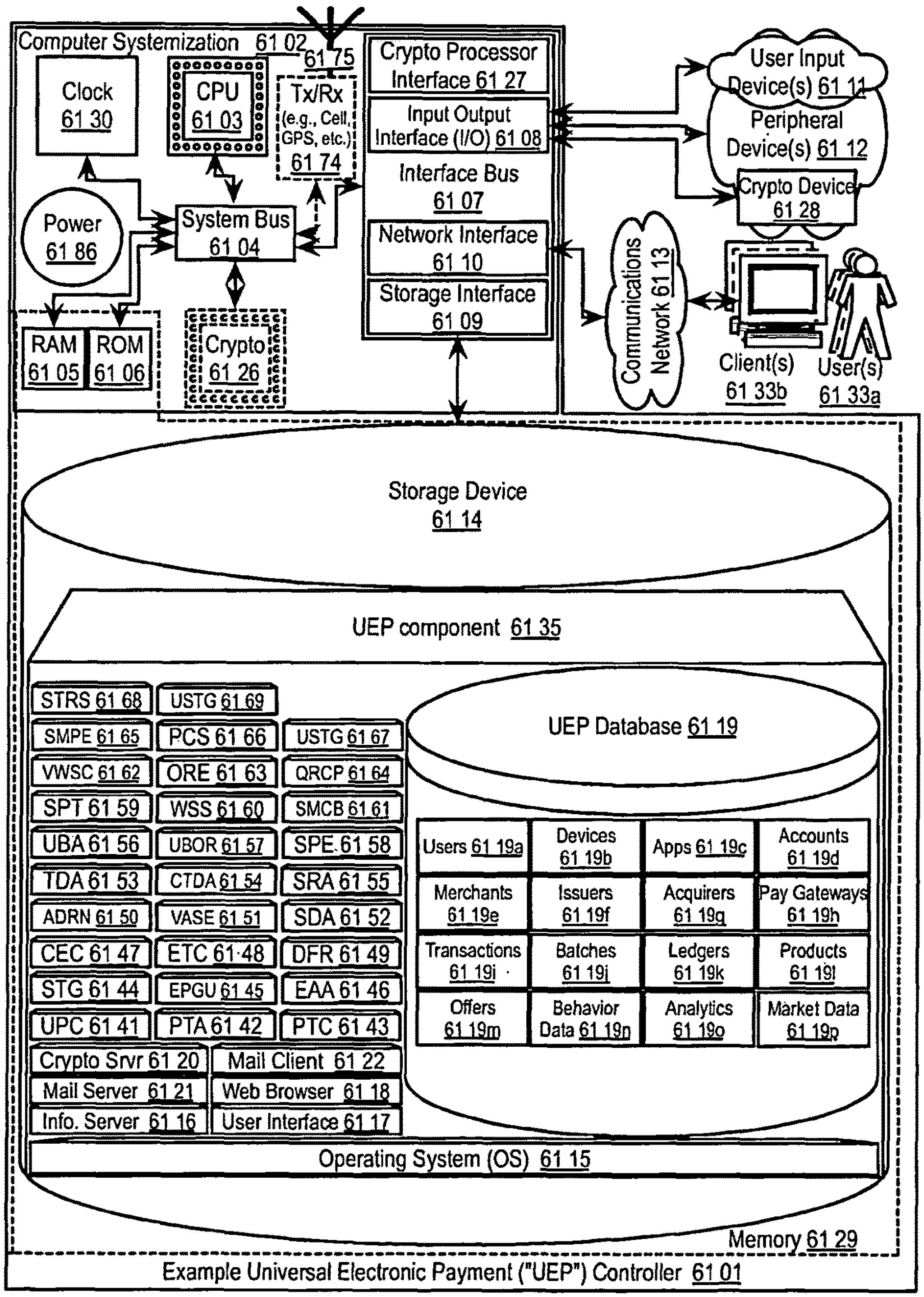
FIG. 61 shows a block diagram illustrating embodiments of a UEP controller.

FIG. 61 shows a block diagram illustrating embodiments of a UEP 1*e* controller 6101. In this embodiment, the UEP controller 6101 may serve to aggregate, process, store, search, serve, identify, instruct, generate, match, and/or facilitate interactions with a computer through various technologies, and/or other related data.

Typically, users, e.g., 6133*a*, which may be people and/or other systems, may engage information technology systems (e.g., computers) to facilitate information processing. In turn, computers employ processors to process information; such processors 6103 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 6129 (e.g., registers, cache memory, random access memory, etc.). Such a communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the UEP controller 6101 may be connected to and/or communicate with entities such as, but not limited to: one or more users from user input devices 6111; peripheral devices 6112; an optional cryptographic processor device 6128; and/or a communications network 6113. For example, the UEP controller 6101 may be connected to and/or communicate with users, e.g., 6133*a*, operating client device(s), e.g., 6133*b*, including, but not limited to, personal computer(s), server(s) and/or various mobile device(s) including, but not limited to, cellular telephone(s), smartphone(s) (e.g., iPhone®, Blackberry®, Android OS-based phones etc.), tablet computer(s) (e.g., Apple iPad™, HP Slate™, Motorola Xoom™, etc.), eBook reader(s) (e.g., Amazon Kindle™, Barnes and Noble's Nook™ eReader, etc.), laptop computer(s), a notebook(s), netbook(s), gaming console(s) (e.g., XBOX Live™, Nintendo® DS, Sony PlayStation® Portable, etc.), portable scanner(s), and/or the like.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The UEP controller 6101 may be based on computer systems that may comprise, but are not limited to, components such as: a computer systemization 6102 connected to memory 6129.

Computer Systemization

A computer systemization 6102 may comprise a clock 6130, central processing unit ("CPU(s)" and/or "processor(s)" (these terms are used interchangeable throughout the disclosure unless noted to the contrary)) 6103, a memory 6129 (e.g., a read only memory (ROM) 6106, a random access memory (RAM) 6105, etc.), and/or an interface bus 6107, and most frequently, although not necessarily, are all interconnected and/or communicating through a system bus 6104 on one or more (mother)board(s) 6102 having conductive and/or otherwise transportive circuit pathways through which instructions (e.g., binary encoded signals) may travel to effectuate communications, operations, storage, etc. The computer systemization may be connected to a power source 6186; e.g., optionally the power source may be internal. Optionally, a cryptographic processor 6126 and/or transceivers (e.g., ICs) 6174 may be connected to the system bus. In another embodiment, the cryptographic processor and/or transceivers may be connected as either internal and/or external peripheral devices 6112 via the interface bus I/O. In turn, the transceivers may be connected to antenna(s) 6175, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing UEP controller to determine its location)); Broadcom BCM4329FKUBG transceiver chip (e.g., providing 802.1n, Bluetooth 2.1+ EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and a generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 6129 beyond the processor itself; internal memory may include, but is not limited to: fast registers, various levels of cache memory (e.g., level 1, 2, 3, etc.), RAM, etc. The processor may access this memory through the use of a a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the UEP controller and beyond through various interfaces. Should processing requirements dictate a greater amount speed and/or capacity, distributed processors (e.g., Distributed UEP), mainframe, multi-core, parallel, and/or supercomputer architectures may similarly be employed. Alternatively, should deployment requirements dictate greater portability, smaller Personal Digital Assistants (PDAs) may be employed.

Depending on the particular implementation, features of the UEP may be achieved by implementing a microcontroller such as CAST's R8051XC2 microcontroller; Intel's MCS 51 (i.e., 8051 microcontroller); and/or the like. Also, to implement certain features of the UEP, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the UEP component collection (distributed or a otherwise) and/or features may be implemented via the microprocessor and/or via embedded components; e.g., via ASIC, coprocessor, DSP, FPGA, and/or the like. Alternately, some implementations of the UEP may be implemented with embedded components that are configured and used to achieve a variety of features or signal processing.

Depending on the particular implementation, the embedded components may include software solutions, hardware solutions, and/or some combination of both hardware/software solutions. For example, UEP features discussed herein may be achieved through implementing FPGAs, which are a semiconductor devices containing programmable logic components called “logic blocks”, and programmable interconnects, such as the high performance FPGA Virtex series and/or the low cost Spartan series manufactured by Xilinx. Logic blocks and interconnects can be programmed by the customer or designer, after the FPGA is manufactured, to implement any of the UEP features. A hierarchy of programmable interconnects allow logic blocks to be interconnected as needed by the UEP system designer/administrator, somewhat like a one-chip programmable breadboard. An FPGA’s logic blocks can be programmed to perform the operation of basic logic gates such as AND, and XOR, or more complex combinational operators such as decoders or simple mathematical operations. In most FPGAs, the logic blocks also include memory elements, which may be circuit flip-flops or more complete blocks of memory. In some circumstances, the UEP may be developed on regular FPGAs and then migrated into a fixed version that more resembles ASIC implementations. Alternate or coordinating implementations may migrate UEP controller features to a final ASIC instead of or in addition to FPGAs. Depending on the implementation all of the aforementioned embedded components and a microprocessors may be considered the “CPU” and/or “processor” for the UEP.

Power Source

The power source 6186 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 6186 is connected to at least one of the interconnected subsequent components of the UEP thereby providing an electric current to all subsequent components. In one example, the power source 6186 is connected to the system bus component 6104. In an alternative embodiment, an outside power source 6186 is provided through a connection across the I/O 6108 interface. For example, a USB and/or IEEE 1394 connection carries both data and power across the connection and is therefore a suitable source of power.

Interface Adapters

Interface bus(ses) 6107 may accept, connect, and/or communicate to a number of interface adapters, conventionally although not necessarily in the form of adapter cards, such as but not limited to: input output interfaces (I/O) 6108, storage interfaces 6109, network interfaces 6110, and/or the like. Optionally, cryptographic processor interfaces 6127 similarly may be connected to the interface bus. The interface bus provides for the communications of interface adapters with one another as well as a with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 6109 may accept, communicate, and/or connect to a number of storage devices such as, but not limited to: storage devices 6114, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 6110 may accept, communicate, and/or connect to a communications network 6113. Through a communications network 6113, the UEP controller is accessible through remote clients 6133*b* (e.g., computers with web browsers) by users 6133*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed UEP), architectures may similarly be employed to pool, load balance, and/or otherwise increase the communicative a bandwidth required by the UEP controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 6110 may be used to engage with various communications network types 6113. For example, multiple network interfaces may be employed to allow for the communication over broadcast, multicast, and/or unicast networks.

Input Output interfaces (I/O) 6108 may accept, communicate, and/or connect to user input devices 6111, peripheral devices 6112, cryptographic processor devices 6128, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid a Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 6111 often are a type of peripheral device 6112 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 6112 may be connected and/or communicate to I/O and/or other facilities of the like such as network interfaces, storage interfaces, directly to the interface bus, system bus, the CPU, and/or the like. Peripheral devices may be external, internal and/or part of the UEP controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 6128), force-feedback devices (e.g., vibrating motors), network interfaces, printers, scanners, storage devices, transceivers (e.g., a cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the UEP controller may be embodied as an embedded, dedicated, and/or monitor-less (i.e., headless) device, wherein access would be provided over a network interface connection.

Cryptographic units such as, but not limited to, microcontrollers, processors 6126, interfaces 6127, and/or devices 6128 may be attached, and/or communicate with the UEP controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 6129. However, memory is a fungible technology and resource, thus, any number of memory embodiments may be employed in lieu of or in concert with one another. It is to be understood that the UEP controller and/or a computer systemization may employ various forms of memory 6129. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 6129 will include ROM 6106, RAM 6105, and a storage device 6114. A storage device 6114 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 6129 may contain a collection of program and/or database components and/or data such as, but not limited to: operating system component(s) 6115 (operating system); information server component(s) 6116 (information server); user interface component(s) 6117 (user interface); Web browser component(s) 6118 (Web browser); database(s) 6119; mail server component(s) 6121; mail client component(s) 6122; cryptographic server component(s) 6120 (cryptographic server); the UEP component(s) 6135; and/or the like (i.e., collectively a component collection). These components may be stored and accessed from the storage devices and/or from storage devices accessible through an interface bus. Although non-conventional program components such as those in the component collection, typically, are stored in a local storage device 6114, they may also be loaded and/or stored in memory such as: peripheral devices, RAM, remote storage facilities through a communications network, ROM, various forms of memory, and/or the like.

Operating System

The operating system component 6115 is an executable program component facilitating the operation of the UEP controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating a system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the UEP controller to communicate with other entities through a communications network 6113. Various communication protocols may be used by the UEP controller as a subcarrier transport mechanism for interaction, such as, but not limited to: multicast, TCP/IP, UDP, unicast, and/or the like.

Information Server

An information server component 6116 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure a Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the UEP controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the UEP database 6119, operating systems, other program components, user interfaces, Web browsers, and/or the like.

Access to the UEP database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the UEP. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the UEP as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 6117 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user a interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 6118 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would a similarly affect the obtaining and the provision of information to users, user agents, and/or the like from the UEP enabled nodes. The combined application may be nugatory on systems employing standard Web browsers.

Mail Server

A mail server component 6121 is a stored program component that is executed by a CPU 6103. The mail server may be a conventional Internet mail server such as, but not limited to sendmail, Microsoft Exchange, and/or the like. The mail is server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the UEP.

Access to the UEP mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 6122 is a stored program component that is a executed by a CPU 6103. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program sl component, system, user, and/or data communications, requests, information, and/or responses. Generally, the mail client provides a facility to compose and transmit electronic mail messages.

Cryptographic Server

A cryptographic server component 6120 is a stored program component that is executed by a CPU 6103, cryptographic processor 6126, cryptographic processor interface 6127, cryptographic processor device 6128, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital a signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTIPS), and/or the like. Employing such encryption security protocols, the UEP may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the UEP component to engage in secure transactions if so desired. The cryptographic component facilitates the secure accessing of resources on the UEP and facilitates the access of secured resources on remote systems; i.e., it may act as a client and/or server of secured resources. Most frequently, the cryptographic component a communicates with information servers, operating systems, other program components, and/or the like. The cryptographic component may contain, communicate, generate, obtain, and/or provide program component, system, user, and/or data communications, requests, and/or responses.

The UEP Database

The UEP database component 6119 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the UEP database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can a include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the UEP database is implemented as a data-structure, the use of the UEP database 6119 may be integrated into another component such as the UEP component 6135. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 6119 includes several tables 6119*a-o*. A Users table 6119*a* may include fields such as, but not limited to: user_id, ssn, dob, first_name, last_name, age, state, address_firstline, address_secondline, zipcode, devices_list, contact_info, contact_type, alt_contact_info, alt_contact_type, and/or the like. The Users table may support and/or track multiple entity accounts on a UEP. A Devices table 6119*b* may include fields such as, but not limited to: device_ID, device_name, device_IP, device_MAC, device_type, device_model, device_version, device_OS, device_apps_list, device_securekey, wallet_app_installed_flag, and/or the like. An Apps table 6119*c* may include fields such as, but not limited to: app_ID, app_name, app_type, app_dependencies, and/or the like. An Accounts table 6119*d* may include fields such as, but not limited to: account_number, account_security_code, account_name, issuer_acquirer_flag, issuer_name, acquirer_name, account_address, a routing_number, access_API_call, linked_wallets_list, and/or the like. A Merchants 9*a* table 6119*e* may include fields such as, but not limited to: merchant_id, merchant_name, merchant_address, ip_address, mac_address, auth_key, port_num, security_settings_list, and/or the like. An Issuers table 6119*f* may include fields such as, but not limited to: issuer_id, issuer_name, issuer_address, ip_address, mac_address, auth_key, port_num, security_settings_list, and/or the like. An Acquirers table 6119*g* may include fields such as, but not limited to: account_firstname, account_lastname, account_type, account_num, account_balance_list, billingaddress_line1, billingaddress_line2, billing_zipcode, billing_state, shipping_preferences, shippingaddress_line1, shippingaddress_line2, shipping_zipcode, shipping_state, and/or the like. A Pay Gateways table 6119*h* may include fields such as, but not limited to: gateway_ID, gateway_IP, gateway_MAC, gateway_secure_key, gateway_access_list, gateway_API_call_list, gateway_services_list, and/or the like. A Transactions table 6119*i* may include fields such as, but not limited to: order_id, user_id, timestamp, transaction_cost, purchase_details_list, num_products, products_list, product_type, product_params_list, product_title, product_summary, quantity, user_id, client_id, client_ip, client_type, client_model, operating_system, os_version, app_installed_flag, user_id, account_firstname, account_lastname, account_type, account_num, account_priority_account_ratio, billingaddress_line1, billingaddress_line2, billing_zipcode, billing_state, shipping_preferences, shippingaddress_line1, shippingaddress_line2, shipping_zipcode, shipping_state, merchant_id, merchant_name, merchant_auth_key, and/or the like. A Batches table 6119*j* may include fields such as, but not limited to: batch_id, transaction_id_list, timestamp_list, cleared_flag_list, clearance_trigger_settings, and/or the like. A Ledgers table 6119*k* a may include fields such as, but not limited to: request_id, timestamp, deposit_amount, batch_id, transaction_id, clear_flag, deposit_account, transaction_summary, payor_name, payor_account, and/or the like. A Products table 61191 may include fields such as, but not limited to: product_ID, product_title, product_attributes_list, product_price, tax_info_list, related_products_list, offers_list, discounts_list, rewards_list, merchants_list, merchant_availability_list, and/or the like. An Offers table 6119*m* may include fields such as, but not limited to: offer_ID, offer_title, offer_attributes_list, offer_price, offer_expiry, related_products_list, discounts_list, rewards_list, merchants_list, merchant_availability_list, and/or the like. A Behavior Data table 6119*n* may include fields such as, but not limited to: user_id, timestamp, activity_type, activity_location, activity_attribute_list, activity_attribute_values_list, and/or the like. An Analytics table 61190 may include fields such as, but not limited to: report_id, user_id, report_type, report_algorithm_id, report_destination_address, and/or the like. A Market Data table 6119*p* may include fields such as, but not limited to: market_data_feed_ID, asset_ID, asset_symbol, asset_name, spot_price, bid_price, ask_price, and/or the like; in one embodiment, the market data table is populated through a market data feed (e.g., Bloomberg's PhatPipe, Dun & Bradstreet, Reuter's Tib, Triarch, etc.), for example, through Microsoft's Active Template Library and Dealing Object Technology's real-time toolkit Rtt.Multi.

In one embodiment, the UEP database may interact with other database systems. For example, employing a distributed database system, queries and data access by search UEP component may treat the combination of the UEP database, an integrated data security layer database as a single database entity.

In one embodiment, user programs may contain various user interface a primitives, which may serve to update the UEP. Also, various accounts may require custom database tables depending upon the environments and the types of clients the UEP may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 6119*a-o*. The UEP may be configured to keep track of various settings, inputs, and parameters via database controllers.

The UEP database may communicate to and/or with other components in a component collection, including itself, and/or facilities of the like. Most frequently, the UEP database communicates with the UEP component, other program components, and/or the like. The database may contain, retain, and provide information regarding other nodes and data.

The UEPs

The UEP component 6135 is a stored program component that is executed by a CPU. In one embodiment, the UEP component incorporates any and/or all combinations of the aspects of the UEP discussed in the previous figures. As such, the UEP affects accessing, obtaining and the provision of information, services, transactions, and/or the like across various communications networks.

The UEP component may transform touchscreen inputs into a virtual a wallet mobile application interface via UEP components into purchase transaction triggers and receipt notices, and/or the like and use of the UEP. In one embodiment, the UEP component 6135 takes inputs (e.g., checkout request 5511; product data 5515; wallet access input 5711; transaction authorization input 5714; payment gateway address 5718; payment network address 5722; issuer server address(es) 5725; funds authorization request(s) 5726; user(s) account(s) data 5728; batch data 5912; payment network address 5916; issuer server address(es) 5924; individual payment request 5925; payment ledger, merchant account data 5931; and/or the like) etc., and transforms the inputs via various components (e.g., UPC 6141; PTA 6142; PTC 6143; STG 6144; EPGU 6145; EAA 6146; CEC 6147; ETC 6148; DFR 6149; ADRN 6150; VASE 6151; SDA 6152; TDA 6153; CTDA 6154; SRA 6155; UBA 6156; UBOR 6157; SPE 6158; SPT 6159; WSS 6160; SMCB 6161; VWSC 6162; ORE 6163; QRCP 6164; SMPE 6165; PCS 6166; UST 6167; STRS 6168; USTG 6169; and/or the like), into outputs (e.g., checkout request message 5513; checkout data 5517; card authorization request 5716, 5723; funds authorization response(s) 5730; transaction authorization response 5732; batch append data 5734; purchase receipt 5735; batch clearance request 5914; batch payment request 5918; transaction data 5920; individual payment confirmation 5928, 5929; updated payment ledger, merchant account data 5933; and/or the like).

The UEP component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, a shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the UEP server employs a cryptographic server to encrypt and decrypt communications. The UEP component may communicate to and/or with other components in a component collection, including itself, and/or facilities of the like. Most frequently, the UEP component communicates with the UEP database, operating systems, other program components, and/or the like. The UEP may contain, communicate, generate, obtain, and/or provide program component, system, user, and/or data communications, requests, and/or responses.

Distributed UEPs

The structure and/or operation of any of the UEP node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to a improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the UEP controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or a readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the UEP controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message
do {
  $input = "";
  $input = socket_read($client, 1024);
  $data .= $input;
} while($input != "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xay.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference herein.

In order to address various issues and advance the art, the entirety of this application for UNIVERSAL ELECTRONIC PAYMENT APPARATUSES, METHODS AND SYSTEMS (including the Cover Page, Title, Headings, Field, Background, a Summary, Brief Description of the Drawings, Detailed Description, Claims, Abstract, Figures, Appendices and/or otherwise) shows by way of illustration various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in a parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations, including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a UEP individual and/or enterprise user, database configuration and/or relational model, data type, data transmission and/or network framework, syntax structure, and/or the like, various embodiments of the UEP may be implemented that enable a great deal of flexibility and customization. For example, aspects of the UEP may be adapted for financial trading; operations security; resource management; and/or the like. While various embodiments and discussions of the UEP have been directed to electronic commerce, however, it is to be understood that the embodiments described herein may be readily configured and/or customized for a wide variety of other applications and/or implementations.

What is claimed is:

1. A multi-merchant virtual wallet shopping processor-implemented method, comprising:

receiving, at a pay network server from a virtual wallet application executing on a data processor of a user device, a product information search request, wherein the product information search request corresponds to both:

a first product included in at least a first inventory of a first merchant of a plurality of merchants within a vicinity of the user device, and a second product included in at least a second inventory of a second merchant of the plurality of merchants within the vicinity of the user device;

querying, by the pay network server, a first merchant server and a second merchant server for information on the first product for sale by the first merchant and for information on the second product for sale by the second merchant, respectively;

displaying, in response to the product information search request and in a single user interface of the virtual wallet application executing on the user device, information on the first product for sale by the first merchant and the second product for sale by the second merchant;

generating, by the virtual wallet application, a single purchase transaction request for both the first product and the second product by the virtual wallet application, based on the information on the first product for sale by the first merchant and the second product for sale by the second merchant, wherein the single purchase transaction request includes only a session ID for a shopping session including the first product for sale by the first merchant and the second product for sale by the second merchant;

providing, to the pay network server that is remote from the plurality of merchants within the vicinity of the user device, via the virtual wallet application executing on the user device, the single purchase transaction request for payment processing, wherein the single purchase transaction request includes only the session ID for the shopping session including the first product for sale by the first merchant and the second product for sale by the second merchant;

providing, by the pay network server to a first merchant server, and in response to the single purchase transaction request, a first checkout request for the first product and, to a second merchant server, a second checkout request for the second product; and obtaining, by the virtual wallet application from the pay network server, an electronic purchase receipt for the first product for sale by the first merchant and the second product for sale by the second merchant.

2. The method of claim 1, wherein the user device is a mobile device.

3. The method of claim 1, wherein the product information search request is generated in response to user entry of a search keyword into the virtual wallet application.

4. The method of claim 1, wherein the product information search request is generated using information on a prior purchase via the virtual wallet application.

5. The method of claim 1, wherein the product information search request is provided via a virtual wallet application executing on the user device.

6. The method of claim 1, wherein the first merchant and the second merchant are different from each other.

7. The method of claim 1, wherein the product information search request includes information identifying a location of the user device, as well as a request for product information from merchant in the vicinity of the user device.

8. A multi-merchant virtual wallet shopping apparatus, comprising:

a processor; and a memory disposed in communication with the processor and storing processor-executable instructions to:

receive, at a pay network server from a virtual wallet application executing on a data processor of a user device, a product information search request, wherein the product information search request corresponds to both:

a first product included in at least a first inventory of a first merchant of a plurality of merchants within a vicinity of the user device, and a second product included in at least a second inventory of a second merchant of the plurality of merchants within the vicinity of the user device;

query, by the pay network server, a first merchant server and a second merchant server for information on the first product for sale by the first merchant and for information on the second product for sale by the second merchant, respectively;

display, in response to the product information search request and in a single user interface of the virtual wallet application executing on the user device, information on the first product for sale by the first merchant and the second product for sale by the second merchant;

generate, by the virtual wallet application, a single purchase transaction request for both the first product and the second product by the virtual wallet application, based on the information on the first product for sale by the first merchant and the second product for sale by the second merchant, wherein the single purchase transaction request includes only a session ID for a shopping session including the first product for sale by the first merchant and the second product for sale by the second merchant;

provide, to the pay network server that is remote from the plurality of merchants within the vicinity of the user device, via the virtual wallet application executing on the user device, the single purchase transaction request for payment processing, wherein the single purchase transaction request includes only the session ID for the shopping session including the first product for sale by the first merchant and the second product for sale by the second merchant;

provide, by the pay network server to a first merchant server, and in response to the single purchase transaction request, a first checkout request for the first product and, to a second merchant server, a second checkout request for the second product; and obtain, by the virtual wallet application from the pay network server, an electronic purchase receipt for the first product for sale by the first merchant and the second product for sale by the second merchant.

9. The apparatus of claim 8, wherein the user device is a mobile device.

10. The apparatus of claim 8, wherein the product information search request is generated in response to user entry of a search keyword into the virtual wallet application.

11. The apparatus of claim 8, wherein the product information search request is generated using information on a prior purchase via the virtual wallet application.

12. The apparatus of claim 8, wherein the product information search request is provided via a virtual wallet application executing on the user device.

13. The apparatus of claim 8, wherein the first merchant and the second merchant are different from each other.

14. The apparatus of claim 8, wherein the product information search request includes information identifying a location of the user device, as well as a request for product information from merchant in the vicinity of the user device.

15. A processor-readable tangible medium storing processor-executable multi-merchant virtual wallet shopping instructions to:

receive, at a pay network server from a virtual wallet application executing on a data processor of a user device, a product information search request, wherein the product information search request corresponds to both:

a first product included in at least a first inventory of a first merchant of a plurality of merchants within a vicinity of the user device, and a second product included in at least a second inventory of a second merchant of the plurality of merchants within the vicinity of the user device;

query, by the pay network server, a first merchant server and a second merchant server for information on the first product for sale by the first merchant and for information on the second product for sale by the second merchant, respectively;

display, in response to the product information search request and in a single user interface of the virtual wallet application executing on the user device, information on the first product for sale by the first merchant and the second product for sale by the second merchant;

generate, by the virtual wallet application, a single purchase transaction request for both the first product and the second product by the virtual wallet application, based on the information on the first product for sale by the first merchant and the second product for sale by the second merchant, wherein the single purchase transaction request includes only a session ID for a shopping session including the first product for sale by the first merchant and the second product for sale by the second merchant;

provide, to the pay network server that is remote from the plurality of merchants within the vicinity of the user device, via the virtual wallet application executing on the user device, the single purchase transaction request for payment processing, wherein the single purchase transaction request includes only the session ID for the shopping session including the first product for sale by the first merchant and the second product for sale by the second merchant;

provide, by the pay network server to a first merchant server, and in response to the single purchase transaction request, a first checkout request for the first product and, to a second merchant server, a second checkout request for the second product; and obtain, by the virtual wallet application from the pay network server, an electronic purchase receipt for the first product for sale by the first merchant and the second product for sale by the second merchant.

16. The medium of claim 15, wherein the user device is a mobile device.

17. The medium of claim 15, wherein the product information search request is generated in response to user entry of a search keyword into the virtual wallet application.

18. The medium of claim 15, wherein the product information search request is generated using information on a prior purchase via the virtual wallet application.

19. The medium of claim 15, wherein the product information search request is provided via a virtual wallet application executing on the user device.

20. The medium of claim 15, wherein the first merchant and the second merchant are different from each other.

21. The medium of claim 15, wherein the product information search request includes information identifying a location of the user device, as well as a request for product information from merchant in the vicinity of the user device.

* * * * *